(12) United States Patent
Jenkins et al.

(10) Patent No.: US 7,933,852 B2
(45) Date of Patent: Apr. 26, 2011

(54) METHOD AND APPARATUS FOR DEVELOPING COGNITIVE SKILLS

(75) Inventors: William M. Jenkins, Berkely, CA (US); Logan E De Ley, Alameda, CA (US); Virginia A. Mann, Irvine, CA (US); Terri Kim Matter, Gilroy, CA (US); Steven L. Miller, Pacifica, CA (US)

(73) Assignee: Scientific Learning Corporation, Oakland, CA (US)

(*) Notice: Subject to any disclaimer, the term of this patent is extended or adjusted under 35 U.S.C. 154(b) by 719 days.

(21) Appl. No.: 11/423,182

(22) Filed: Jun. 9, 2006

(65) Prior Publication Data
US 2007/0288411 A1 Dec. 13, 2007

Related U.S. Application Data

(60) Provisional application No. 60/804,282, filed on Jun. 9, 2006.

(51) Int. Cl.
*G06N 5/00* (2006.01)
(52) U.S. Cl. ........................................................ 706/45
(58) Field of Classification Search .................... 706/45; 434/350, 236; 206/425
See application file for complete search history.

(56) References Cited

U.S. PATENT DOCUMENTS

| | | | |
|---|---|---|---|
| 3,618,231 A | 11/1971 | Nason | |
| 4,021,937 A | 5/1977 | Kravitz | |
| 4,044,476 A | 8/1977 | Marsh | |
| 4,579,533 A | 4/1986 | Anderson et al. | |
| 5,393,070 A | 2/1995 | Best | |
| 5,458,338 A | 10/1995 | Beardsley | |
| 5,495,557 A | 2/1996 | Hyman et al. | |
| 5,658,161 A | 8/1997 | Roberts et al. | |
| 5,738,523 A | 4/1998 | Wagoner et al. | |
| 5,927,988 A | 7/1999 | Jenkins et al. | |
| 5,997,304 A | 12/1999 | Wood | |
| 6,018,768 A | 1/2000 | Ullman et al. | |
| 6,077,085 A | 6/2000 | Parry et al. | |

(Continued)

FOREIGN PATENT DOCUMENTS

WO WO2005099414 10/2005

OTHER PUBLICATIONS

Courville, et al., Similarity and discrimination in classical conditioning: A latent variable account, DRAFT: NIPS 17 Preproceedings, 2004, pp. 1-8.*

*Primary Examiner* — Wilbert L Starks, Jr.
(74) *Attorney, Agent, or Firm* — James W. Huffman

(57) ABSTRACT

System and method for developing cognitive skills in a student, utilizing a computing device to present stimuli and to record responses. A stimulus may be graphically presented to the student via the computing device, and the student may be required to respond to the stimulus. A determination may then be made as to the correctness of the student's response. The graphically presenting, requiring, and determining may be performed for each of a plurality of stimuli. Additionally, the graphically presenting, requiring, determining, and performing may be performed in an iterative manner to improve the cognitive skills of the student. Various exercises directed to different cognitive skills and learning approaches may utilize this basic framework, and may be performed in an iterative manner to build cognitive skills in the student.

43 Claims, 51 Drawing Sheets

U.S. PATENT DOCUMENTS

| | | | |
|---|---|---|---|
| 6,159,014 A | 12/2000 | Jenkins et al. | |
| 6,216,869 B1 * | 4/2001 | Zhang | 206/425 |
| 6,299,452 B1 | 10/2001 | Wasowicz et al. | |
| 6,341,959 B1 | 1/2002 | Wen et al. | |
| 6,599,129 B2 | 7/2003 | Jenkins et al. | |
| 6,652,283 B1 * | 11/2003 | Van Schaack et al. | 434/236 |
| 6,669,479 B1 | 12/2003 | Jenkins | |
| 6,726,486 B2 | 4/2004 | Budra et al. | |
| 6,729,882 B2 | 5/2004 | Noble | |
| 6,755,657 B1 | 6/2004 | Wasowicz | |
| 6,898,138 B2 | 5/2005 | Meyer et al. | |
| 6,978,115 B2 * | 12/2005 | Whitehurst et al. | 434/350 |
| 6,986,663 B2 | 1/2006 | Budra et al. | |
| 7,062,220 B2 | 6/2006 | Haynes et al. | |
| 7,101,185 B2 | 9/2006 | Budra et al. | |
| 7,120,073 B2 | 10/2006 | Meyer et al. | |
| 7,549,864 B2 | 6/2009 | Apichella et al. | |
| 7,563,099 B1 | 7/2009 | Iftikhar | |
| 2002/0076675 A1 | 6/2002 | Budra et al. | |
| 2003/0008267 A1 | 1/2003 | Boon | |
| 2003/0027112 A1 | 2/2003 | Warneke et al. | |
| 2003/0048308 A1 | 3/2003 | Friedlander | |
| 2004/0023193 A1 | 2/2004 | Wen et al. | |
| 2004/0029084 A1 | 2/2004 | Johnson et al. | |
| 2004/0180311 A1 | 9/2004 | Budra et al. | |
| 2004/0219495 A1 | 11/2004 | Marcus et al. | |
| 2005/0020336 A1 | 1/2005 | Cesare | |
| 2005/0037324 A1 | 2/2005 | Sumimoto | |
| 2005/0130113 A1 | 6/2005 | Bergan | |
| 2005/0153263 A1 | 7/2005 | De Ley et al. | |
| 2005/0191603 A1 | 9/2005 | Budra et al. | |
| 2005/0277099 A1 | 12/2005 | Van Schaack et al. | |
| 2006/0040242 A1 | 2/2006 | Mejia | |
| 2006/0063139 A1 | 3/2006 | Carver et al. | |
| 2006/0111902 A1 | 5/2006 | Julia et al. | |
| 2006/0141425 A1 | 6/2006 | De Ley et al. | |
| 2006/0166172 A1 | 7/2006 | May | |
| 2006/0188854 A1 | 8/2006 | De Ley et al. | |
| 2007/0248938 A1 | 10/2007 | Ronald | |
| 2007/0288513 A1 | 12/2007 | Jenkins et al. | |
| 2007/0298383 A1 | 12/2007 | Jenkins et al. | |
| 2007/0298384 A1 | 12/2007 | Jenkins et al. | |
| 2007/0298385 A1 | 12/2007 | Jenkins et al. | |

* cited by examiner

| Task Area | Name | Cognitive Skills | Goal |
|---|---|---|---|
| Spelling/Decoding | Wood Works | • Memory— using long-term recall for spelling and using working memory to remember the target word<br>• Attention—selective attention<br>• Processing—auditory and visual | Build accuracy and fluency in phonemic analysis, decoding, and spelling by working with multiple spelling patterns for 36 English phonemes. |
| Vocabulary/ Critical Thinking | Gator Jam | • Memory—exercising long-term memory for vocabulary and working memory for comparing words<br>• Attention— selectively attending to various linguistic dimensions<br>• Processing—developing fluent access to the multiple relationships among words<br>• sequencing—recognizing directionality of word relationships | Build vocabulary skills and improve accuracy and fluency in critical thinking and abstract reasoning by working with twelve important semantic/grammatical relationships among words. |
| Passage Comp. | Lana's Lanes | • Memory—using working memory for sentence comprehension and building text-level representations in long-term memory<br>• Attention—selectively attending to critical information and sustaining attention across longer passages and question sets<br>• Processing -- developing fluency in extracting and integrating meaning from longer text passages<br>• sequencing -- recognizing causal and temporal event sequences in texts | Build skills in accurate text comprehension and the use of comprehension strategies, when reading fiction and nonfiction texts that include literary structures and devices. |
| Passage Comp. | Quack Splash | • Memory using working memory to hold words and sentences in memory while completing or reorganizing paragraphs.<br>• Attention—sustaining attention across multiple steps to accurately complete a longer passage.<br>• Processing—using language skills to process grammar and meaning<br>• sequencing recognizing and correcting the serial order of scrambled sentences and paragraphs. | Build skills in constructing and organizing multiple-paragraph stories and expository passages, including skills in understanding and using figurative language. |
| Sentence Comp. | Toad Loader | • Memory – using working memory to keep track of available words and phrases while constructing possible sentences<br>• Attention – selectively attending to grammatical features of words and phrases<br>• Processing – using language processing skills to identify written words and phrases and to construct and analyze possible sentences<br>• sequencing – manipulating word order to build a variety of grammatical sentences | Build accuracy and fluency in recognizing and constructing sentences by manipulating grammatical forms and inflections. |

Figure 3

METHOD AND APPARATUS FOR DEVELOPING COGNITIVE SKILLS

PRIORITY CLAIM

This application claims benefit of priority of U.S. Provisional Application Ser. No. 60/804,282 titled "Method and Apparatus for Developing Cognitive Skills", filed Jun. 9, 2006, whose inventors were Logan E. De Ley, Williams M. Jenkins, Virginia A. Mann, Terri Matter and Steven L. Miller, and which is hereby incorporated by reference in its entirety as though fully and completely set forth herein.

FIELD OF THE INVENTION

The present invention relates to the field of cognitive development, and more particularly to a system and method for improving cognitive skills in children.

DESCRIPTION OF THE RELATED ART

The present application relates to a computer software program entitled "Fast ForWord to Reading 5" developed by Scientific Learning Corporation. Founded in 1996, Scientific Learning (Nasdaq: SCIL) combines the latest advances in brain research and proprietary technology to create products and services that develop learning and communication skills. Based on more than 30 years of neuroscience research, Scientific Learning's Fast ForWord® family of products use patented technology to target the language and reading skills widely recognized as the keys to all learning. Each product's interactive exercises integrate proprietary CD-ROM and Internet technology to create an optimal learning environment that adapts to the level of each student. Patented Web-based tracking tools provide ongoing monitoring of each student's progress. In March of 1997, after an extensive field trial with almost 500 children at 35 sites, the Company launched its first Fast ForWord® product, Fast ForWord Language software, an Internet and CD-ROM product that develops the fundamental language skills that are the building blocks for reading success. The product is described in the following U.S. Pat. No. 5,927,988 entitled "METHOD AND APPARATUS FOR TRAINING OF SENSORY AND PERCEPTUAL SYSTEMS IN LLI SUBJECTS"; U.S. Pat. No. 6,159,014 entitled "METHOD AND APPARATUS FOR TRAINING OF COGNITIVE AND MEMORY SYSTEMS IN HUMANS"; and U.S. Pat. No. 6,261,101 entitled "METHOD AND APPARATUS FOR COGNITIVE TRAINING OF HUMANS USING ADAPTIVE TIMING OF EXERCISES"; each of which is hereby incorporated by reference for all purposes. Numerous other patents have been issued to Scientific Learning Corporation for its inventions.

SUMMARY OF THE INVENTION

One embodiment of the present invention comprises a system and method for improving cognitive skills of students, such as fundamental cognitive skills related to memory, attention, processing, and sequencing (MAPS), foundational reading skills such as phonemic awareness, phonics, fluency, vocabulary, and comprehension, as identified by the National Reading Panel, and may cover specific academic skills that $5^{th}$ graders are expected to master.

Note that the invention emphasizes the kinds of advanced comprehension and vocabulary skills students need to master written material across the curriculum at the $5^{th}$ grade level. For example, extensive practice in analyzing the meanings of words with common Latin and Greek roots is provided. Students may also learn to attend to syntactic structures and signal words in order to grasp the organization and meaning of complex sentences and passages. Advanced practice in spelling, decoding, and phonemic analysis may also be provided to help students gain automaticity with word forms and thus shift more of their attention from decoding to comprehension.

The invention is intended for execution on a computing device capable of displaying and aurally presenting words and/or phonemes, sentences, passages, tables, diagrams, and so forth. Various embodiments of the invention utilize a number of exercises to train students, the exercises presenting information aurally and/or visually, i.e., graphically, and requiring the student to make selections based on the information presented. The selections may be recorded, with the exercise tracking progress according to the selections.

Various embodiments of a computer-implemented method for developing cognitive skills in a student utilizing a computing device to present stimuli and to record responses, are described below.

In preferred embodiment, a stimulus set comprising a plurality of stimuli may be provided. A stimulus from the stimulus set may be presented to the student via the computing device. The student may then be required to respond to the stimulus, and a determination made as to whether the response is correct. The graphically presenting, requiring, and determining may be performed for each of a plurality of stimuli. Moreover, the graphically presenting, requiring, determining, and performing, may be repeated in an iterative manner to improve the cognitive skills of the student.

In one embodiment, the graphically presenting, the requiring, and the determining composes a trial, and a unit comprises a specified set of trials, where a unit is the smallest group of trials evaluated for advancement, and where passing the unit means that the student has correctly performed a specified percentage of trials in the unit. The performing the graphically presenting, the requiring, and the determining for each of a plurality of stimuli may include performing trials in each unit of a plurality of units for each level of a plurality of levels. In one embodiment, the repeating the graphically presenting, the requiring, the determining, and the performing, in an iterative manner may be performed over a plurality of sessions, and where each successive session begins approximately where a previous session ends. For example, the sessions may occur a specified number times each day, for a specified number of days.

In preferred embodiments, if the student fails a unit, the unit may be repeated until the student passes the unit, or the student fails the unit a specified number of times. If the student fails the unit the specified number of times, the unit may be retained, e.g., marked or indicated, for later presentation to the student, and a next unit performed.

One or more introductory trials may be performed to demonstrate to the student what is required in performing a trial. In some embodiments, a fluency round may be performed, comprising a time-limited round of one or more trials from a previously presented unit.

In preferred embodiments, the graphically presenting, the requiring, and the determining may be performed via a graphical user interface (GUI) displayed on a display of the computing device. For example, the GUI may display a student indicator, a time indicator, an initiation button, whereby the student invokes presenting stimulus words, and a score indicator. Some embodiments of the GUI may also display a passage length indicator, graphically indicating the student's progress in reading a multi-page passage.

Moreover, in some embodiments, the method may include indicating if the student's response is correct. For example, a respective sound may be presented indicating correctness or incorrectness of the response, a respective graphical indication of correctness or incorrectness of the response may be provided, and/or points may be awarded based on the correctness of the response. Note that in various embodiments, sounds may be presented to the student via headphones and/or speakers attached to the computing device.

In embodiments of one exercise (referred to herein as Wood Works), directed to building accuracy and fluency in phonemic analysis, decoding, and spelling skills in the student, providing a stimulus set may include providing a stimulus word set comprising a plurality of stimulus words, each comprising a word element. A plurality of bins may be displayed via the computing device, where each of the plurality of bins represents a respective word element from a plurality of word elements. In this case, the graphically presenting a stimulus from the stimulus set to the student via the computing device may include presenting a stimulus word from the stimulus word set to the student, where the stimulus word contains one of the plurality of word elements represented by the plurality of bins. Requiring the student to respond to the stimulus may include requiring the student to select a bin from the plurality of bins representing a word element contained in the presented stimulus word, and a determination made as to whether the student selected the bin correctly.

The performing the graphically presenting, the requiring, and the determining for each of a plurality of stimuli may further include repeating the displaying, the presenting, the requiring, and the determining for each stimulus word in the stimulus word set, and where the repeating builds accuracy and fluency in phonemic analysis, decoding, and spelling skills in the student.

In one embodiment, the word element may be a phoneme, where presenting the stimulus word includes graphically presenting the stimulus word from the stimulus word set to the student. Displaying a plurality of bins may include graphically displaying a phonetic symbol for the respective phoneme of each bin, and aurally presenting a description of the respective phoneme of each bin.

In another embodiment, the word element may be a spelling pattern, where the presenting the stimulus word includes audibly presenting the stimulus word from the stimulus word set to the student. Similar to above, displaying the plurality of bins may include graphically displaying the respective spelling pattern of each bin.

In embodiments of another exercise (referred to herein as Gator Jam), directed to building vocabulary skills and improves accuracy and fluency in critical thinking and abstract reasoning in the student, providing a stimulus set may include providing an analogy set comprising a plurality of analogies. In this exercise, graphically presenting a stimulus from the stimulus set to the student via the computing device may include displaying an incomplete analogy via a computing device, where the analogy is missing a word. The method may also include presenting a plurality of words to the student, where one of the plurality of words includes the missing word of the incomplete analogy. The student may then be required to select a word from the plurality of words to complete the incomplete analogy, and a determination made as to the correctness of the word selection. The performing the graphically presenting, the requiring, and the determining for each of a plurality of stimuli may further include repeating the displaying, the presenting, the requiring, and the determining for each analogy in the analogy set, and where the repeating may build vocabulary skills and improves accuracy and fluency in critical thinking and abstract reasoning in the student.

In one embodiment, the displaying, the receiving user input, and the performing, may be performed for successive categories from multiple categories until trials for each of the multiple categories have been completed, where the performing the displaying, the receiving user input, and the performing, for successive categories from the multiple categories until trials for each of the multiple categories have been completed composes performing a unit in stage 1.

The method may further include displaying an analogy via the computing device, where the analogy has a category from plurality of categories. A set of categories may be presented to the student, where one of the set of categories is the category of the analogy. The student may then be required to select a category for the analogy from the set of categories, and a determination made as to whether the student selected the category correctly. The displaying the analogy, the presenting the set of categories, the requiring the student to select a category, and the determining if the student selected the category correctly may be repeated for each analogy in the analogy set, where the repeating may build vocabulary skills and improve accuracy and fluency in critical thinking and abstract reasoning in the student.

In one embodiment, the analogy set may be included in a plurality of analogy sets, and the method may further include performing the repeating the displaying the analogy, the presenting the set of categories, the requiring the student to select a category, and the determining if the student selected the category correctly for each of at least a subset of analogy sets in the plurality of analogy sets.

The displaying the analogy, the presenting the set of categories, the requiring the student to select a category, and the determining if the student selected the category correctly may compose performing a trial in stage 2.

In embodiments of another exercise (referred to herein as Toad Loader), directed to building accuracy and fluency in recognizing and constructing sentence structures in the student, the providing a stimulus set may include providing a set of pictures and corresponding sentences comprising a plurality of pictures and corresponding sentences. Graphically presenting a stimulus from the stimulus set to the student via the computing device may include displaying a picture via a computing device, and presenting a plurality of sentence segments to the student, where one of the plurality of sentence segments is a portion of a sentence that correctly describes the picture. Requiring the student to respond to the stimulus may include requiring the student to select a sentence segment from the plurality of sentence segments that constructs at least a portion of the sentence that correctly describes the picture. Determining if the response is correct may include determining if the student selected the sentence segment correctly. In one embodiment, the displaying, the presenting, the requiring, and the determining may be performed for successive additional pluralities of sentence segments until the sentence that correctly describes the picture is complete. Similarly, the displaying, the presenting, the requiring, the determining, and the performing the displaying, the presenting, the requiring, and the determining for successive additional pluralities of sentence segments may be performed for successive additional sentences describing the picture. The performing the graphically presenting, the requiring, and the determining for each of a plurality of stimuli may include repeating the displaying, the presenting, the requiring, and the determining for each picture in the set of pictures and corresponding sentences, where the repeating builds accuracy and fluency in recognizing and constructing sentence structures in the student.

In one embodiment, the set of pictures and corresponding sentences may include sentences comprising each of a plurality of structure types. Trials each have a corresponding level, and a unit may refer to all trials directed to a respective structure type within a level.

In embodiments of another exercise (referred to herein as Lana's Lanes), directed to building skills in accurate text comprehension and the use of comprehension strategies in the student, the providing a stimulus set may include providing a stimulus passage set including a plurality of stimulus passages, where each stimulus passage may include one or more pages. Graphically presenting a stimulus from the stimulus set to the student via the computing device may include presenting a page from a stimulus passage from the stimulus passage set to the student via a computing device. The method may further include asking the student a question regarding the page, and textually presenting a plurality of answers to the student via the computing device, where one of the answers is a correct answer to the question. Requiring the student to respond to the stimulus may include requiring the student to select an answer from the plurality of answers to answer the question, and determining if the response is correct may include determining if the student selected the correct answer. In some embodiments, the asking, the presenting the plurality of answers, the requiring, and the determining may be performed for one or more additional questions regarding the page. The presenting the page, the asking, the textually presenting the plurality of answers, the requiring, and the determining may be performed for each page of the stimulus passage. Similarly, the performing the graphically presenting, the requiring, and the determining for each of a plurality of stimuli may include repeating the performing for each stimulus passage in the stimulus passage set, where the repeating builds skills in accurate text comprehension and the use of comprehension strategies in the student.

In one embodiment, the presenting the page, the asking, the textually presenting the plurality of answers, the requiring, and the determining composes performing a trial in stage 1. If the trial in stage 1 is passed or has been failed a specified number of times, trials in stage 2 directed to the stimulus passage may be performed. In one embodiment, performing a trial in stage 2 may include asking the student a logic question regarding the stimulus passage, and presenting a plurality of logic answers to the student via the computing device, where one of the logic answers is a correct answer to the logic question. The student may then be required to select a logic answer from the plurality of logic answers to answer the logic question, and a determination made as to whether the student selected the correct logic answer.

In another embodiment, performing a trial in stage 2 may include displaying a plurality of logic diagrams regarding the stimulus passage set to the student via the computing device, and directing the student to select one of the plurality of logic diagrams to match a logical statement. The student may then be required to select a logic diagram from the plurality of logic diagrams to match the logical statement, and a determination made as to whether the student selected the correct logic diagram.

In a further embodiment, performing a trial in stage 2 may include displaying an incomplete construct directed to the stimulus passage, where the incomplete construct is missing a text portion. The construct may include one or more of a circle diagram, a graphic organizer, e.g., a table, concept web, timeline, and/or flowchart, and a summary. A plurality of textual responses may be presented to the student via the computing device, where one of the textual responses provides the missing text portion. The student may then be required to select a textual response from the plurality of textual responses to provide the missing text portion, and a determination made as to whether the student selected the correct textual response.

In one embodiment, the incomplete construct may be missing one or more additional text portions, in which case performing a trial in stage 2 may include performing the presenting the plurality of textual responses, the requiring the student to select a textual response, and the determining if the student selected the correct textual response in an iterative manner until the construct is complete.

If there are no further trials to be performed in stage 2 in the current level, then trials in stage 3 may be performed. Performing a trial in stage 3 may include displaying a completed construct from stage 2 directed to the stimulus passage, and asking the student a question regarding information displayed in the completed construct. A plurality of responses may be presented to the student via the computing device, where one of the responses correctly answers the question regarding the information. The student may then be required to select a response from the plurality of responses to answer the question, and a determination made as to whether the student selected the correct response.

In embodiments of another exercise (referred to herein as Quack Splash), directed to building skills in constructing and organizing multiple-paragraph stories and expository passages in the student, the providing a stimulus set may include providing a stimulus passage set including a plurality of stimulus passages, where each stimulus passage may include a sequence of one or more pages. Graphically presenting a stimulus from the stimulus set to the student via the computing device and requiring the student to respond to the stimulus may include performing a sentence ordering task or a paragraph cloze task, with respect to a paragraph of a stimulus passage from the set of stimulus passages. Similarly, the determining if the response is correct may include determining if the student performed the sentence ordering task or the paragraph cloze task correctly. The performing the graphically presenting, the requiring, and the determining for each of a plurality of stimuli may include repeating the performing and the determining for each paragraph of each page for each stimulus passage of the plurality of stimulus passages, where the repeating builds skills in constructing and organizing multiple-paragraph stories and expository passages in the student.

For example, in one embodiment, performing the sentence ordering task may include presenting a plurality of sentences of the paragraph from a page of the stimulus passage from the stimulus passage set to the student via a computing device, where the sentences are out of order. The student may then be required to select a next sentence from the plurality of sentences to construct the paragraph, where one of the plurality of sentences is a correct next sentence in the paragraph, and a determination made as to whether the student selected the correct next sentence. The correct next sentence may then be removed from the plurality of sentences, and displayed in the paragraph. The requiring the student to select a next sentence, the determining if the student selected the correct next sentence, the removing, and the displaying the correct next sentence in the paragraph may be repeated until the paragraph is complete.

In one embodiment, performing the paragraph cloze task may include displaying a paragraph from the stimulus passage, where the paragraph is missing a portion, and presenting a plurality of textual responses to the student, where one of the textual responses provides the missing portion of the paragraph. The student may then be required to select a textual response from the plurality of textual responses to complete the paragraph, and a determination made as to whether the student correctly selected the textual response.

In some embodiments, the performing the sentence ordering task or the paragraph cloze task, and the determining if the student performed the sentence ordering task or the paragraph cloze task correctly composes performing a trial in stage 1. The method may further include: for each stimulus passage, performing a trial in stage 2 with respect to the stimulus passage, where performing the trial in stage 2 includes performing a paragraph sequencing task. The paragraph sequencing task may include presenting a plurality of paragraphs from a page of the stimulus passage from the stimulus passage set to the student via a computing device, where the paragraphs are out of order. The student may then be required to select a next paragraph from the plurality of paragraphs to construct the page, where one of the plurality of paragraphs is a correct next paragraph in the page, and a determination made as to whether the student selected the correct next paragraph. The correct next paragraph may be removed from the plurality of paragraphs, and displayed in the page. Moreover, the requiring the student to select a next paragraph, the determining if the student selected the correct next paragraph, the removing, and the displaying the correct next paragraph in the page may be repeated until the page is complete. Additionally, this repeating may repeated for each page in the stimulus passage.

In some embodiments, the method may further include: for each stimulus passage, performing one or more trials in stage 3 with respect to the stimulus passage, where performing a trial in stage 3 may include performing a comprehension task. For example, the comprehension task may include displaying the stimulus passage to the student via the computing device, and asking the student a question regarding the stimulus passage. A plurality of answers may be presented to the student via the computing device, where one of the answers is a correct answer to the question. The student may then be required to select an answer from the plurality of answers to answer the question, and, as before, a determination made as to whether the student selected the correct answer.

Thus, various embodiments of exercises are provided whereby cognitive skills of the student may be improved.

BRIEF DESCRIPTION OF THE DRAWINGS

A better understanding of the present invention can be obtained when the following detailed description of the preferred embodiment is considered in conjunction with the following drawings, in which:

FIG. 3 is a table illustrating exercises included in various embodiments of the invention;

Figure 1:
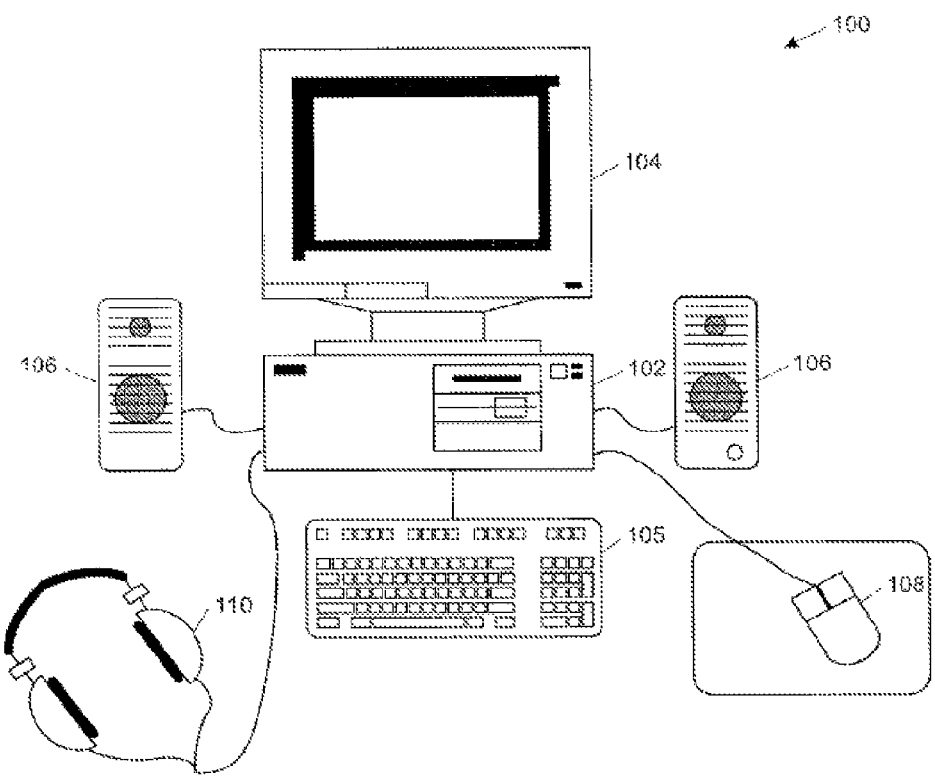
FIG. 1 is a block diagram of a personal computing device upon which embodiments of the invention may operate.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1—Computer System

FIG. 1 illustrates an exemplary computer system 100 for executing a computer program (or computer programs) to train or retrain a student, according to embodiments of the present invention. The computer system 100 contains a computer 102, having a CPU, memory, hard disk and CD ROM drive (not shown), attached to a monitor 104. The monitor 104 may provide visual prompting and feedback to the student during execution of the computer program.

As shown, attached to the computer 102 are a keyboard 105, speakers 106, a mouse 108, and headphones 110. The speakers 106 and the headphones 110 may provide auditory prompting and feedback to the student during execution of the computer program. The mouse 108 may allow the student to navigate through the computer program, and to select particular responses after visual or auditory prompting by the computer program. The keyboard 105 may allow an instructor (or a student) to enter alphanumeric information about the student into the computer 102. Embodiments of the present invention may execute on either IBM compatible computers or Macintosh computers, although it should be noted that any computer platforms are contemplated as applicable to the present invention.

The computer system 100 may include a memory medium(s) on which one or more computer programs or software components according to one embodiment of the present invention may be stored. For example, the memory medium may store one or more programs which are executable to perform the methods described herein. The memory medium may also store operating system software, as well as other software for operation of the computer system.

Figure 2:
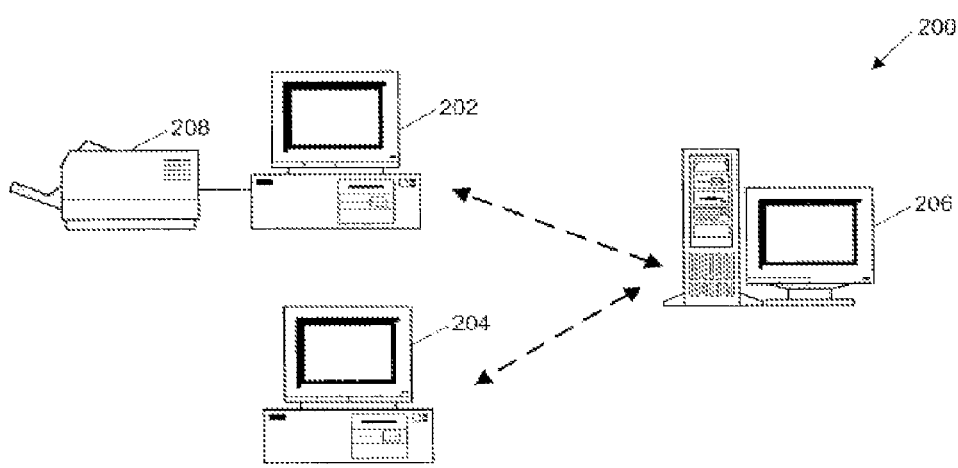
FIG. 2 is a block diagram of a computer network upon which embodiments of the invention may operate.

Now referring to FIG. 2, an exemplary computer network 200 is shown. As FIG. 2 indicates, the computer network 200 includes computers 202 and 204, which may be similar to that described above with reference to FIG. 1, connected to a server 206. The connection between the computers 202, 204 and the server 206 may be made via a local area network (LAN), a wide area network (WAN), such as the Internet, or via modem connections, directly or through the Internet. A printer 208 is shown connected to the computer 202 to illustrate that a student can print out reports associated with the computer program(s) of the present invention. The computer network 200 may allow information such as test scores, exercise statistics, and other student information to flow from a student's computer 202 and/or 204 to a server 206. An administrator may review the information and can then download configuration and control information pertaining to a particular student to the student's computer 202 and/or 204.

FIG. 3: Overview of Exemplary Exercises

One embodiment of the present invention comprises a system and method for improving cognitive skills of students, such as fundamental cognitive skills related to memory, attention, processing, and sequencing (MAPS), foundational reading skills such as phonemic awareness, phonics, fluency, vocabulary, and comprehension, as identified by the National Reading Panel, and may cover specific academic skills that $5^{th}$ graders are expected to master.

Note that the invention emphasizes the kinds of advanced comprehension and vocabulary skills students need to master written material across the curriculum at the $5^{th}$ grade level. For example, extensive practice in analyzing the meanings of words with common Latin and Greek roots is provided. Students may also learn to attend to syntactic structures and signal words in order to grasp the organization and meaning of complex sentences and passages. Advanced practice in spelling, decoding, and phonemic analysis may also be provided to help students gain automaticity with word forms and thus shift more of their attention from decoding to comprehension.

More specifically, embodiments of the present invention may emphasize: metacognitive understanding of word and text meaning, critical thinking at the sentence and paragraph level, comprehension strategies (graphic organizers and summaries), tasks that build writing skills along with reading comprehension (construction of grammatical sentences and construction of well organized paragraphs and passages), exercising vocabulary skills through analogies and other approaches, figurative language and literary devices, longer fiction and non-fiction passages (longest passage is around 4000 words), and systematic use of academic vocabulary from multiple content areas (e.g., science, math, social studies) as well as passages with science and humanities themes.

As noted above, the present invention preferably includes a number of program exercises, each of which is directed at training particular cognitive skills. FIG. 3 provides an overview of exemplary exercises that may be included in the present invention. As FIG. 3 indicates, in this embodiment, the exercises include:

Wood Works: A spelling/decoding exercise that: develops memory by requiring the student to use long-term recall for spelling and to use working memory to remember the target word; that develops attention by requiring the student to exercise selective attention; and that develops processing by requiring the student to process both auditory and visual information. The goal of this exercise is to build accuracy and fluency in phonemic analysis, decoding, and spelling by working with multiple spelling patterns for phonemes.

Gator Jam: A vocabulary/critical thinking exercise that: develops memory by requiring the student to exercising long-term memory for vocabulary and working memory for comparing words; that develops attention by requiring the student to selectively attend to various linguistic dimensions; that develops processing by requiring the student to develop fluent access to multiple relationships among words; and that develops sequencing skills by requiring the student to recognize directionality of word relationships. The goal of this exercise is to build vocabulary skills and improve accuracy and fluency in critical thinking and abstract reasoning by working with important semantic/grammatical relationships among words.

Lana's Lanes: A passage comprehension exercise that: develops memory by requiring the student to use working memory for sentence comprehension and to build text-level representations in long-term memory; that develops attention by requiring the student to selectively attend to critical information and to sustain attention across longer passages and question sets; that develops processing by requiring the student to develop fluency in extracting and integrating meaning from longer text passages; and that develops sequencing skills by requiring the student to recognize causal and temporal event sequences in texts. The goal of this exercise is to build skills in accurate text comprehension and the use of comprehension strategies, when reading fiction and nonfiction texts that include literary structures and devices.

Quack Splash: A passage comprehension exercise that: develops memory by requiring the student to use working memory to hold words and sentences in memory while completing or reorganizing paragraphs; that develops attention by requiring the student to sustain attention across multiple steps to accurately complete a longer passage; that develops processing by requiring the student to use language skills to process grammar and meaning; and that develops sequencing skills by requiring the student to recognize and correct the serial order of scrambled sentences and paragraphs. The goal of this exercise is to build skills in constructing and organizing multiple-paragraph stories and expository passages, including skills in understanding and using figurative language.

Toad Loader: A sentence comprehension exercise that: develops memory by requiring the student to use working memory to keep track of available words and phrases while constructing possible sentences; that develops attention by requiring the student to selectively attend to grammatical features of words and phrases; that develops processing by requiring the student to use language processing skills to identify written words and phrases and to construct and analyze possible sentences; and that develops sequencing skills by requiring the student to manipulate word order to build a variety of grammatical sentences. The goal of this exercise is to build accuracy and fluency in recognizing and constructing sentences by manipulating grammatical forms and inflections.

Each of these exercises, which will be described below in detail, follows a common scheme, described below with respect to FIG. 4.

Figure 4:
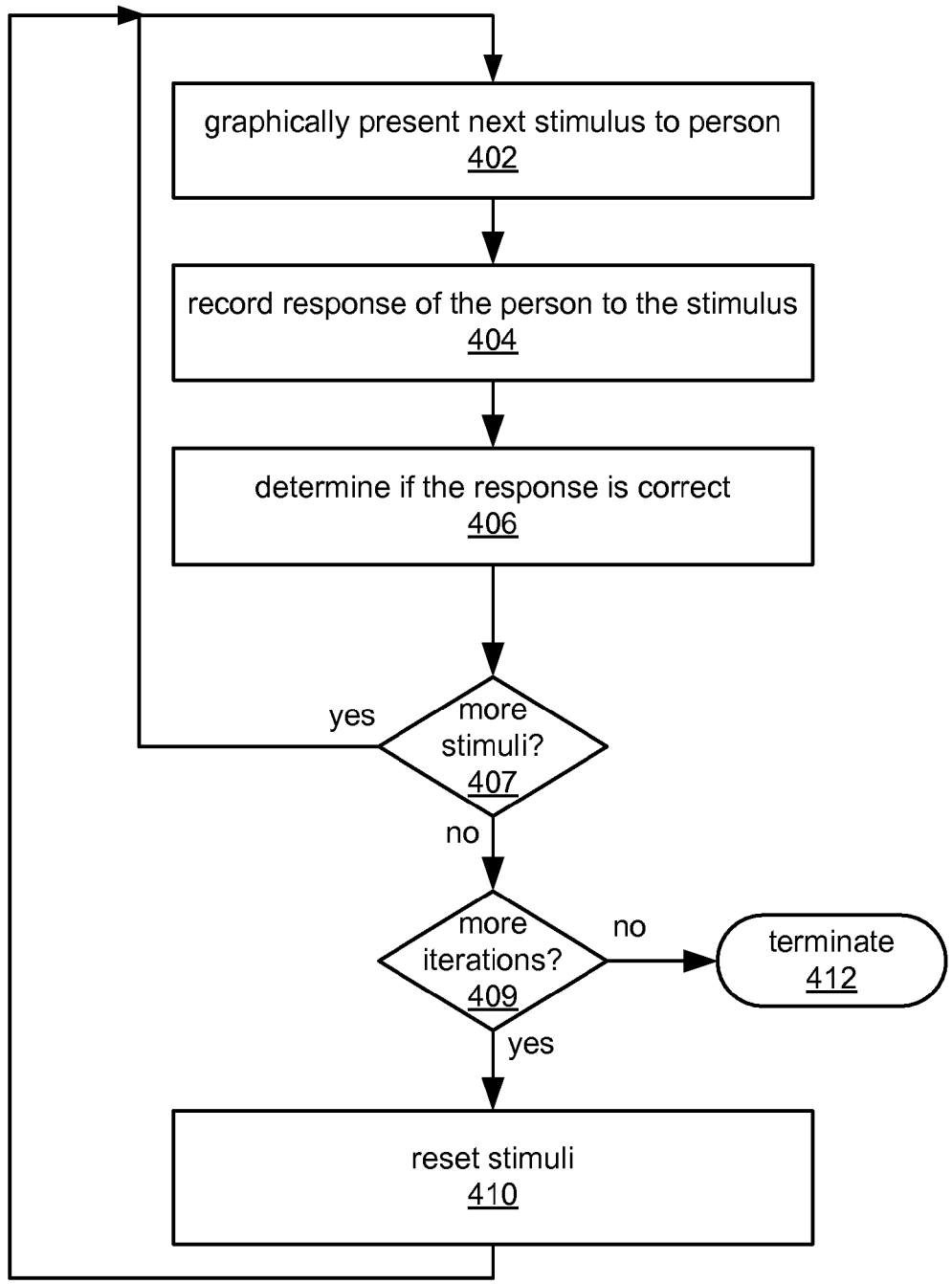
FIG. 4 is a high-level flowchart diagram of a method for improving cognitive skills in a student, according to one embodiment.

FIG. 4—Method for Developing Cognitive Skills

FIG. 4 is a flowchart diagram of a method for developing cognitive skills, according to some embodiments of the invention. It should be noted that in various embodiments, some of the method elements described may be performed concurrently, in a different order than described, or may be omitted. Additional method elements may be performed as desired. As FIG. 4 shows, the method may be performed as follows:

In 402, a stimulus, e.g., a next stimulus from a plurality of stimuli, i.e., may be graphically presented to a student, e.g., a child student. For example, depending on the particular exercise being performed, the stimulus may be or include a textual story, passage, sentence or sentence fragment, word, phoneme, and so forth. In some cases, an image may also be presented that corresponds or relates to the textual stimulus.

In 404, the student's response to the stimulus may be recorded. For example, after the stimulus has been presented, the student may be presented with a number of possible responses, one of which is preferably the correct, or at least the most correct, response to the presented stimulus, the others being alternate (and incorrect) answers, referred to as foils. The student may select one of the responses, e.g., via a pointing device, such as a mouse, trackball, stylus, or even via a touch-screen, as desired, and the selected response recorded. In some embodiments, the stimulus and/or the responses may be compound. For example, as will be described below in detail, in some cases (e.g., exercises), a text story or passage may be presented to the user (i.e., the student) as a stimulus, and then one or more additional or subordinate stimuli may be presented, e.g., questions regarding the presented story or passage (or other sub-stimulus). In one embodiment, the student may respond to each of the additional stimuli (e.g., sub-stimuli), for example, as just after) each sub-stimulus is presented, although in other embodiments, the user may provide multiple responses to a stimulus contiguously.

In 406, a determination may be made as to whether the response is correct, i.e., whether the student selected or indicated the correct response to the presented stimulus. Note that while in most cases this determination may be made after each response, in some cases or embodiments, multiple responses may be recorded and then the determination made for each of the multiple recorded responses.

In some embodiments, an indication may be provided to the student as to whether the selected response was correct. As one example, if the student responds correctly, a "ding" may be played indicating the correctness of the response, whereas if the student responds incorrectly, a "thunk" may be played, indicated the incorrectness of the response. In addition, are alternatively, a graphical indication may be provided, e.g., an image or short animation indicating the correctness or incorrectness of the response. In some embodiments, points may be awarded based on the performance of the student. As indicated above, the various audial indications may be presented to the student via speakers or headphones coupled to the computing system.

As indicated in 407, a determination may be made as to whether there are further stimuli to present to the student, and if so, the method may proceed to method element 402 and continue as described above. If there are no further stimuli, the method may proceed to method element 409.

Note that the above described graphically presenting (402), recording response (404), and determining (406) for each of the plurality of stimuli may span multiple exercises, such as those described generally above, and in detail below. In other words, the method is not limited to performance of any single exercise, but rather, performance of all exercises included in the program is contemplated, possibly over multiple sessions.

In 409, a determination may be made as to whether there are more iterations to be performed, i.e., whether further repetitions of the exercises already performed (e.g., all the exercises) are to be made.

If further iterations are to be performed, then in 410, the stimuli may be reset, and the method may proceed to method element 402 and continue as described above. If there are no further iterations to perform, the method may terminate, as indicated in 412. In other words, the method may proceed with the exercises described herein (or functional equivalents) in an iterative manner, preferably over a series of sessions spanning days, weeks, or even months. Such repetition may facilitate effective development of cognitive skills in the student. Note that in preferred embodiments, the stimuli for a given exercise may be presented in a different order, e.g., randomly, each time that exercise is performed.

Note that in the exercises described herein, each stimulus/response cycle is referred to as a trial. In other words, the displaying, presenting, requiring, and determining for each stimulus word compose performing a trial for each stimulus word. Trials may be grouped into units, which may be evaluated to determine the student's progression through the exercise. A unit is a smallest group of trials to be evaluated for advancement, and passing the unit comprises the student correctly sorting a specified percentage of the stimulus words in the unit. An open unit refers to a unit that has not been passed. An open level (i.e., an open progression level) refers to a level that has not been completed. All units are initially open units, and all levels are initially open levels. Each exercise generally includes performing trials in each unit of a plurality of units for each level of a plurality of levels (or a single level). Thus, performing trials in each unit of a plurality of units for each level of a plurality of levels includes performing trials in each open unit of the plurality of open units for each open level of the plurality of open levels. Moreover, some of the exercises may include multiple tasks, and multiple levels, which the student must perform to complete the exercise. For example, in one embodiment, respective subsets of the plurality of levels may be associated with performance of respect tasks. Similarly, in some embodiments, respective subsets of the plurality of levels may be associated with the difficulty of stimulus words in units of the level, e.g., easy and hard vocabulary words.

Exercises

Figure 5:
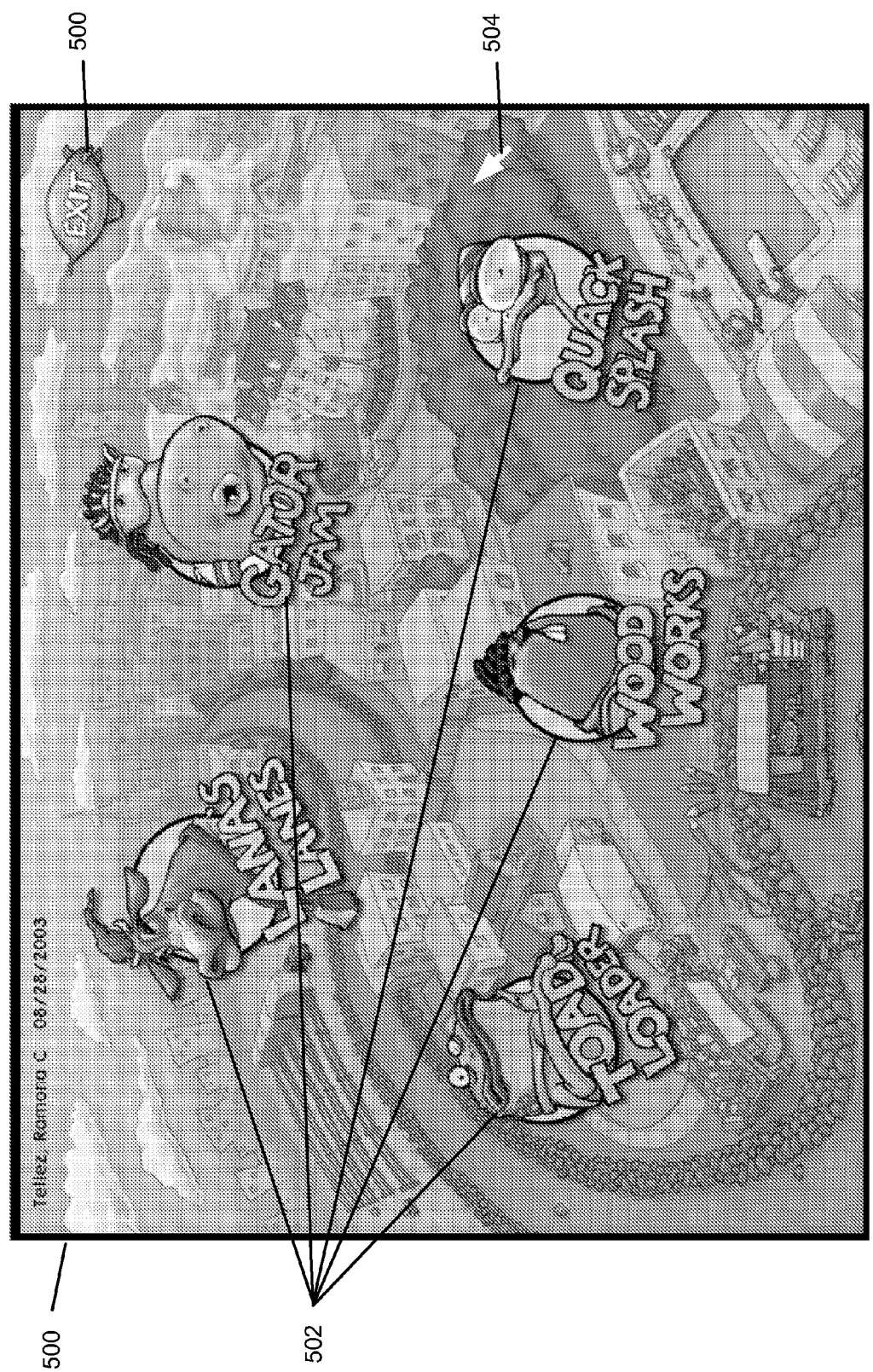
FIG. 5 is a screen shot of a top-level exercise invocation screen, according to one embodiment of the invention.

Referring to FIG. 5, an exemplary startup screen 500 for the program is shown. As mentioned above, in the embodiment described herein, the program includes five exercises, with the respective exercises being invocable from the startup screen 500 via illustrative icons or graphemes 502. As may be seen, the exercises invocable from the startup screen 500 include: Wood Works, Gator Jam, Lana's Lanes, Quack Splash, and Toad Loader. While the embodiments of the exercises described herein are directed to the English language, other languages are also contemplated, as the techniques and methods described herein are broadly applicable to development of cognitive reading skills (and more general cognitive skills) in any language.

As shown, the startup screen 500 contains a cursor, or selection tool 504, and an exit button 506. Although not shown, when the screen 500 is presented, entertaining music may be played through the speakers or headphones. The student begins one of the exercises by moving the selector 504 on top of the exercise icon or grapheme 502, and indicating the selection (e.g., by clicking the mouse). The program then leads the student through the invoked exercise. In one embodiment, after a session for one of the exercises is completed, the student is automatically taken to the next exercise in the set, as appropriate. In an alternative embodiment, the student is taken back to the screen 500 for selection of another exercise. In this embodiment, any exercises already played during the present session may be grayed out so that they may not be reselected.

The exercises will now be described in detail. The description will provide a general overview of an exercise, including its goals, its features, and a brief description of the exercise. A flow chart illustrating the method of the exercise will be described, including the tasks of the exercise, and the student's interaction in the exercise. During the description, the reader will be referred to the drawings where s/he will be walked through the exercise play, as if s/he were at the computer, particularly illustrating the novel features of the exercise. Exemplary stimulus sets used to train the student will be provided.

Exercise 1: Wood Works

The goal of this exercise is to build accuracy and fluency in spelling, decoding, and phonemic analysis by working with multiple spelling patterns for English phonemes. In a first portion of this exercise the student sorts written words into various sound or phoneme bins labeled with phonetic (e.g., dictionary) symbols. In a second portion of the exercise the student sorts spoken words into spelling bins labeled with spelling patterns. Thus, the student may sort textual words into bins based on specified word elements, e.g., phonemes and spelling patterns.

Students develop advanced phonics and spelling skills as they categorize words with complex spelling patterns by sound and identify the correct spelling patterns for words that use different spellings for the same sounds (e.g., foci, tidewater, delightful, hydrogen).

Multiple words are presented to illustrate each targeted word element, e.g., spelling pattern, including examples of the element or pattern in initial, medial, and final position, whenever appropriate (e.g., query, equator, unique). The most common spelling patterns for a large number (e.g., 24) of phonemes are covered, along with sound-spelling relationships that are commonly confused, e.g., by English language learners. In one embodiment, over 1,500 spelling words are presented, including many (e.g., 55) terms from math and geometry, many (e.g., 98) from social studies and geography, and many (e.g., 100) from the sciences.

As students progress, they move from more familiar terms (e.g., 4th and 5th grade level words of one to two syllables) to more challenging terms (e.g., 5th and 6th grade level words of two to five syllables), as well as academic terms.

As mentioned above, this exercise develops cognitive skills in the student, such as memory, by developing long-term recall for spelling; working memory to remember target word; attention, by focusing on selective attention; and processing, by developing both auditory and visual cognitive processing skills.

Figure 6:
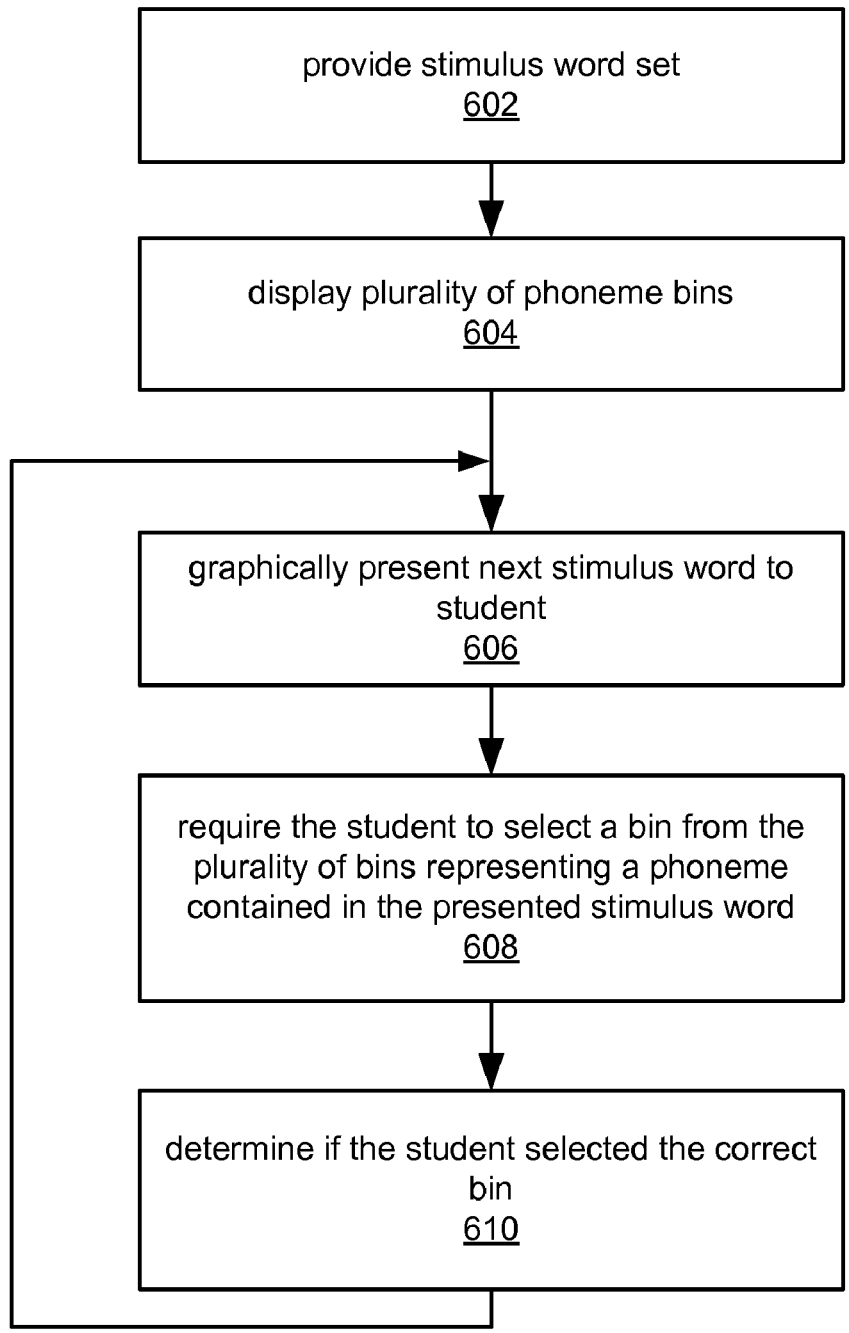
FIG. 6 is a high-level flowchart of a method for building accuracy and fluency in phonemic analysis, decoding, and spelling via a computing device, according to one embodiment.

FIG. 6—Method for Building Accuracy and Fluency in Phonemic Analysis, Decoding, and Spelling Via Phonetic-Based Sorting FIG. 6 is a flowchart diagram of one embodiment of a computer-implemented method for building accuracy and fluency in phonemic analysis, decoding, and spelling via a computing device by working with multiple spelling patterns for phonemes, e.g., for English phonemes. It should be noted that in various embodiments, some of the method elements described may be performed concurrently, in a different order than described, or may be omitted. Additional method elements may be performed as desired. As FIG. 6 shows, the method may be performed as follows:

In 602, a stimulus word set may be provided. As noted above, the stimulus word set may include words that contain respective phonemes in various different positions in the word (e.g., query, equator, and unique). In some embodiments, the stimulus word set may be organized according to any of a variety of schemes, e.g., based on word length, difficulty, commonness, phonetic content, and so forth, as desired.

In 604, a plurality of bins, e.g., phoneme bins, may be displayed. For example, graphical representations, e.g., icons or graphemes) of containers may be presented, which the student may select to indicate a sorting operation. Each bin is preferably labeled with a corresponding phoneme. The bins may be presented in random order.

In preferred embodiments, a graphical user interface (GUI) may be provided whereby the exercise may be performed, where the GUI preferably displays two or more of: a student indicator, a time indicator, an initiation button, whereby the student invokes presentation of stimulus words, and a score indicator.

Figure 7:
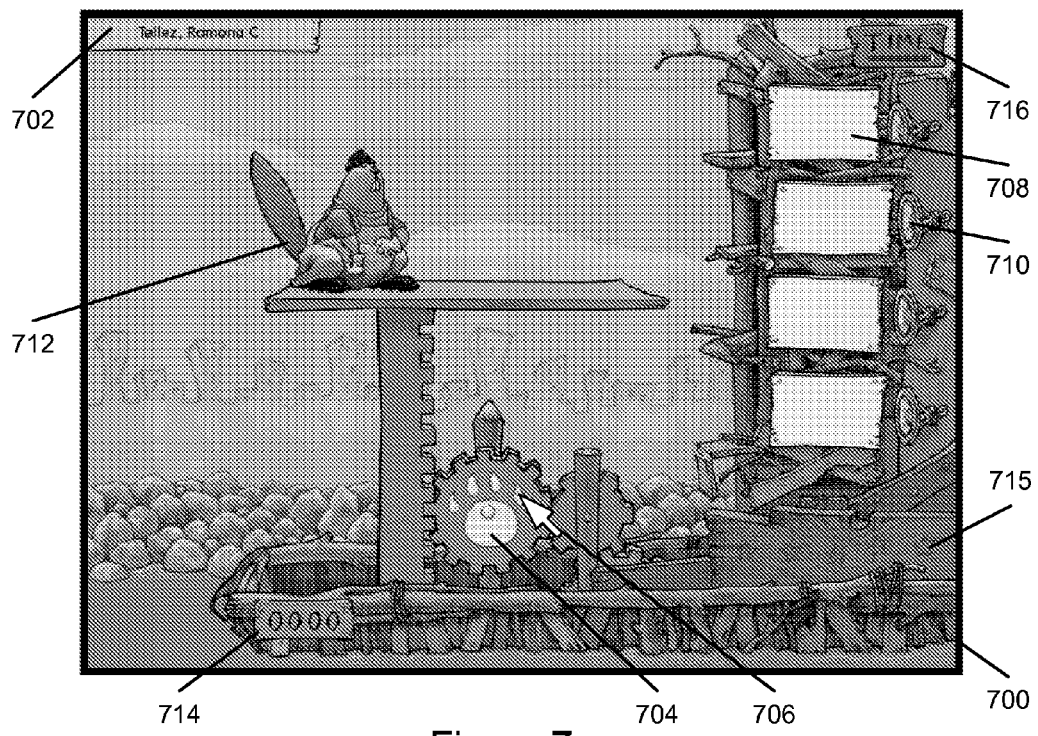
FIG. 7 is an exemplary introductory screenshot from a phoneme sorting task of the Wood Works exercise, according to one embodiment.

FIG. 7 illustrates an exemplary introductory screen for the exercise wherein the phoneme bins are displayed. As FIG. 7 shows, the screen includes the name of the student 702, an initiation button, in this case, a selection paw 704, also referred to as an OR button, and a cursor 706. To begin a trial, the student may move the cursor 706 over the selection paw 704 and indicate the selection, e.g., by clicking the mouse. The screen 700 further includes a number of labeled shelves or bins 708, representing sorting bins into which the student may sort target phonemes, as will be described below, a number of speakers 710, a main character, in this case, a beaver 712, a score indicator 714, progress markers 715 indicating progress through the exercise, and a time indicator 716.

In preferred embodiments, displaying the plurality of bins may include graphically displaying a phonetic symbol for the respective phoneme of each bin, and aurally presenting a description of the respective phoneme of each bin. In some cases, e.g., for the first trial of a set of stimulus words, each bin may be highlighted as its description is aurally presented. This highlighting may be removed once the description is presented. The speakers 710 may allow a student to auditorily replay phonemes (e.g., their descriptions) that are on the corresponding shelves or bins 708 as desired. In one embodiment, the student can click on a speaker next to a bin at any time to repeat the definition for the bin, but fewer points may be awarded. Additionally, clicking on the speaker may invoke highlighting of the associated bin, e.g., in white. Moreover, in some embodiments, once the speaker has been clicked, i.e., once help has been requested, the trial may be counted as incorrect for the purposes of advancement. The score indicator 714 may add points to the students score as the student correctly responds to trials. The time indicator 716 may provide a graphical illustration of the relative time left for the exercise. Exercise play may begin when the student selects the selection paw 704.

In some embodiments, a bin may be displayed into which stimulus words that do not contain any of the presented phonemes can be sorted. This bin is preferably placed at the end (e.g., bottom or far right) of the other displayed bins, and may be labeled "none", or some other descriptive label as desired.

Figure 8:
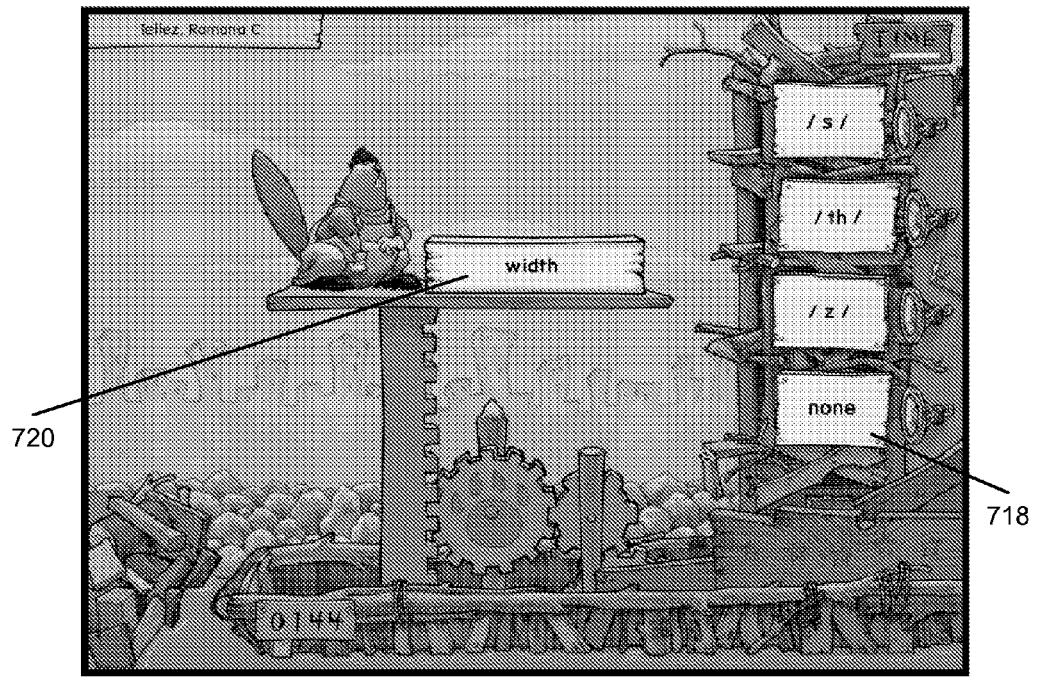
FIG. 8 is an exemplary screenshot of a trial from the phoneme sorting task of the Wood Works exercise, according to one embodiment.

FIG. 8 is an exemplary screen shot from the Wood Works exercise illustrating one embodiment of the basic exercise setup for this phoneme sorting task. As may be seen, in this embodiment, each of the bins is labeled with the corresponding phoneme for sorting presented stimulus items, and where the last or bottom bin is labeled "none" (718).

In 606, a stimulus word (e.g., a next stimulus word) from the stimulus word set may be graphically presented to the student via the computing device, where the stimulus word contains one of the plurality of phonemes represented by the plurality of bins. For example, a textual representation of the stimulus word may be shown on the screen. As FIG. 8 shows, in this embodiment, a board 720 is displayed that includes the textual stimulus word (as a label). Note that the GUI displays a main character (in this case, a beaver), where the main character performs or assists in performing the presenting the stimulus word.

In 608, the student may be required to select a bin from the plurality of bins representing a phoneme contained in the presented stimulus word. For example, the student may be required to select one of the displayed bins, where the bin selection indicates or asserts that the phoneme of the selected bin is included in the stimulus word. For example, in the embodiment shown in FIG. 8, the stimulus word "width" includes the phoneme "\th\", and so the second bin from the top is the correct bin.

The student preferably selects the bin via a pointing device, such as a mouse, although any other means for selection may also be used as desired.

As FIG. 6 also shows, in 610, a determination may be made as to whether the student selected the correct bin, and the result stored. This result may then be used to drive further operations, such as, for example, the awarding of points to the student, and so forth. Moreover, such results from multiple trials may be used to determine and/or guide the student's progress through the exercise, e.g., by influencing the difficulty of subsequent stimulus word/bin presentations. For example, once all the trials in a unit have been performed, the student's degree of success for the unit may be ascertained, and may be used to determine the next unit to be performed.

As described above, in preferred embodiments, an indication, i.e., graphical and/or audial, may be provided as to the student's correctness (or incorrectness), e.g., via speakers or headphones. For example, a "thunk" sound may be played indicating incorrectness, or a "ding" may be played indicating correctness, and the facial expression of the character may also provide such an indication, e.g., smiling when the selection is correct. Of course, any other types of indication may be used as desired. For example, in one embodiment, if the student selects the correct bin, the bin may be highlighted, e.g., in yellow, and an animation presented moving the stimulus word (e.g., the board with the stimulus word label) into the correct bin. Points may also be awarded based on the correctness of the response. In one embodiment, if bonus points are earned, a special indication may be provided, e.g., 3 dings may be played.

Similarly, in one embodiment, if the selection is incorrect, a "thunk" may be played, the correct bin may be highlighted, e.g., in white, the board displaying the stimulus word may be highlighted, e.g., in white, and the letters in the stimulus word that represent the phoneme may be highlighted differently, e.g., in blue. If the word contains none of the displayed phonemes, no letters may be highlighted. Additionally, upon such an incorrect response, the stimulus word may be pronounced. The highlights may then be removed and the stimulus word may disappear.

As FIG. 6 also indicates, additional stimulus words from the stimulus word set may be presented, where the student is required to select an appropriate bin for each word, and the correctness or incorrectness of each selection determined and stored, as described above. At the end of each trial, if the unit is not completed, the next trial may automatically be presented. In various embodiments, the stimulus words for a unit may be presented according to a specified order, or may be presented randomly, as desired. Thus, the graphically presenting, the requiring, and the determining may be performed for each stimulus word in the stimulus word set to build accuracy and fluency in phonemic analysis, decoding, and spelling skills in the student, as FIG. 6 indicates.

Moreover, in preferred embodiments, the displaying, the graphically presenting, the requiring, and the determining may be repeated for each stimulus word in the stimulus word set, where the repeating builds accuracy and fluency in phonemic analysis, decoding, and spelling skills in the student. In other words, the student may be exposed to the stimulus word set (one word at a time, in the manner described above) multiple times to facilitate development of the student's phonemic and spelling skills. As noted above, such repetition may occur in a plurality of sessions over days, weeks, or even months. Additionally, in some embodiments, the stimulus word set may be included in a plurality of stimulus word sets, and the method may include performing the repeating for each stimulus word set in the plurality of stimulus word sets. For example, in one embodiment, each stimulus word set from the plurality of stimulus word sets may be associated with a unit directed to stimulus words from the stimulus word set, and performing the repeating for each stimulus word set in the plurality of stimulus word sets may include performing trials in each unit of a plurality of units for each level of a plurality of levels, as will be described in more detail below.

In one embodiment, an introductory or training set of trials may be performed, e.g., prior to performance of the "official" trials. In other words, stimulus words from an introductory training set may be presented, where the phonemes are easily contrasted, to familiarize the student with the task. In some embodiments, the student may be required to meet some specified level of success with the introductory trials before progressing to the remaining sets of the exercise, i.e., the student may be required to "pass" the training portion of the exercise before proceeding. In one embodiment, if the student incorrectly selects a bin for a stimulus word, the correct bin may be indicated, e.g., via highlighting.

Figure 9:
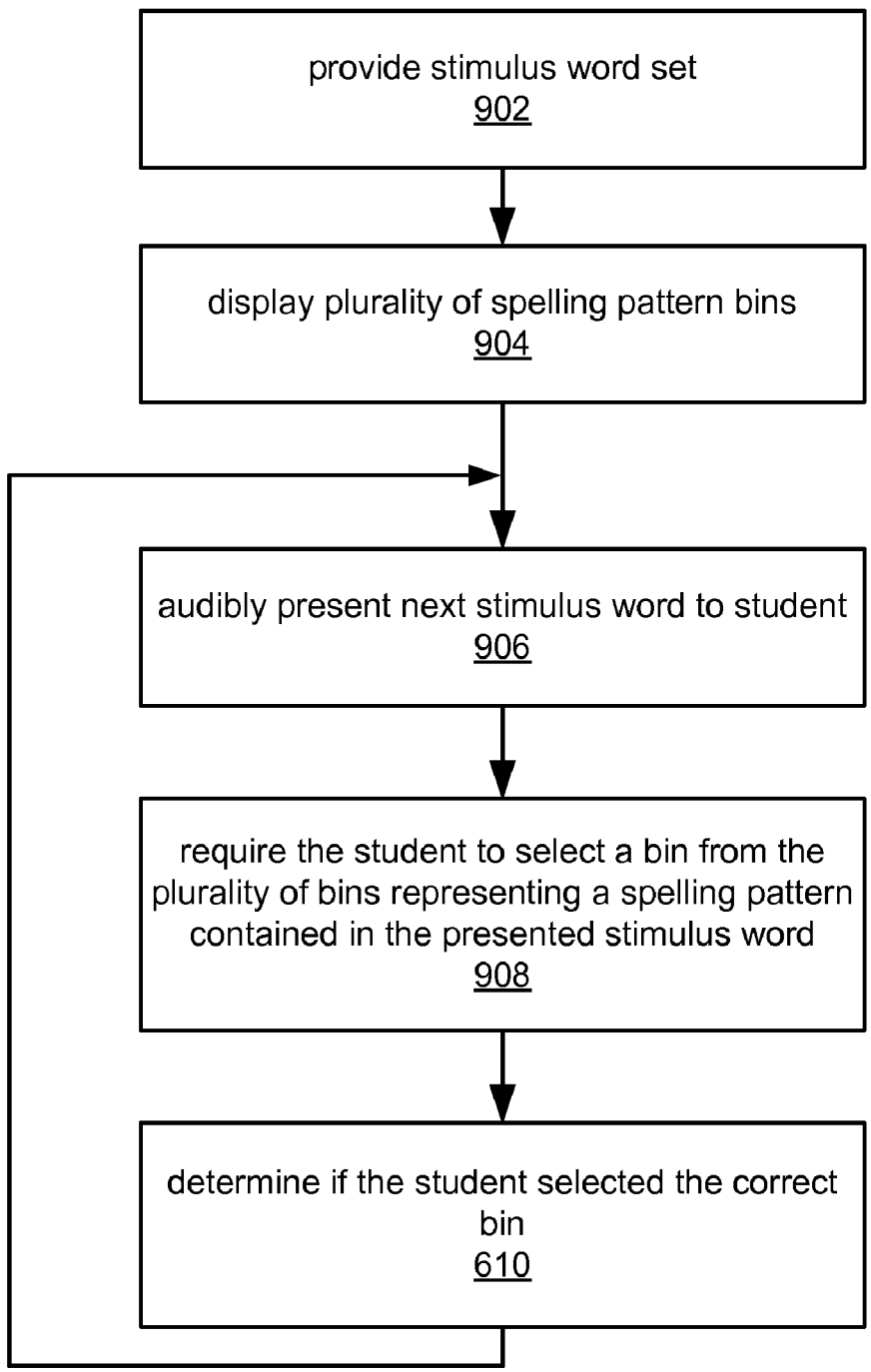
FIG. 9 is a high-level flowchart of another method for building accuracy and fluency in phonemic analysis, decoding, and spelling via a computing device, according to one embodiment.

In some embodiments, the exercise may include multiple tasks. For example, in the embodiment described herein, the method of FIG. 6, directed to phoneme-based sorting, may be a first task of the exercise, and a second task, e.g., directed to spelling-based sorting, may also be included in the exercise. FIG. 9, described below, illustrates just such an additional task.

FIG. 9—Method for Building Accuracy and Fluency in Phonemic Analysis, Decoding, and Spelling Via Spelling-Based Sorting FIG. 9 is a flowchart diagram of one embodiment of a computer-implemented method for building accuracy and fluency in phonemic analysis, decoding, and spelling via a computing device by matching spoken words with multiple spelling patterns, e.g., for English word spelling patterns. As noted above, while the embodiments of the exercises described herein are directed to the English language, other languages are also contemplated, as the techniques and methods described herein are broadly applicable to development of cognitive reading skills (and more general cognitive skills) in any language. It should be further noted that in various embodiments, some of the method elements described may be performed concurrently, in a different order than described, or may be omitted. Additional method elements may be performed as desired. Note that for brevity, descriptions of method elements that are similar to those of the method of FIG. 6, described above, may be abbreviated.

As FIG. 9 shows, the method may be performed as follows:

In 902, a stimulus word set may be provided, where the stimulus word set may include words that contain respective spelling patterns in various different positions in the word (e.g., play, ailment, bat, etc.).

In 904, a plurality of spelling pattern bins may be displayed, e.g., graphical representations, e.g., icons or graphemes, of containers may be presented, which the student may select to indicate a sorting operation. Each bin is preferably labeled with an associated spelling pattern. In other words, the bin labels are text, and represent parts of words, and how they are spelled. For example, a student may be sorting a word that includes a long-a sound (age, drain, delay, or apron). The bin labels in this case may be "a_e", "ai","ay" and "a"). Similar to the method of FIG. 6, a spelling pattern bin labeled "none" may be included, into which words that do not contain any of the presented spelling patterns can be sorted. The spelling pattern bins may be in a random order.

Figure 10:
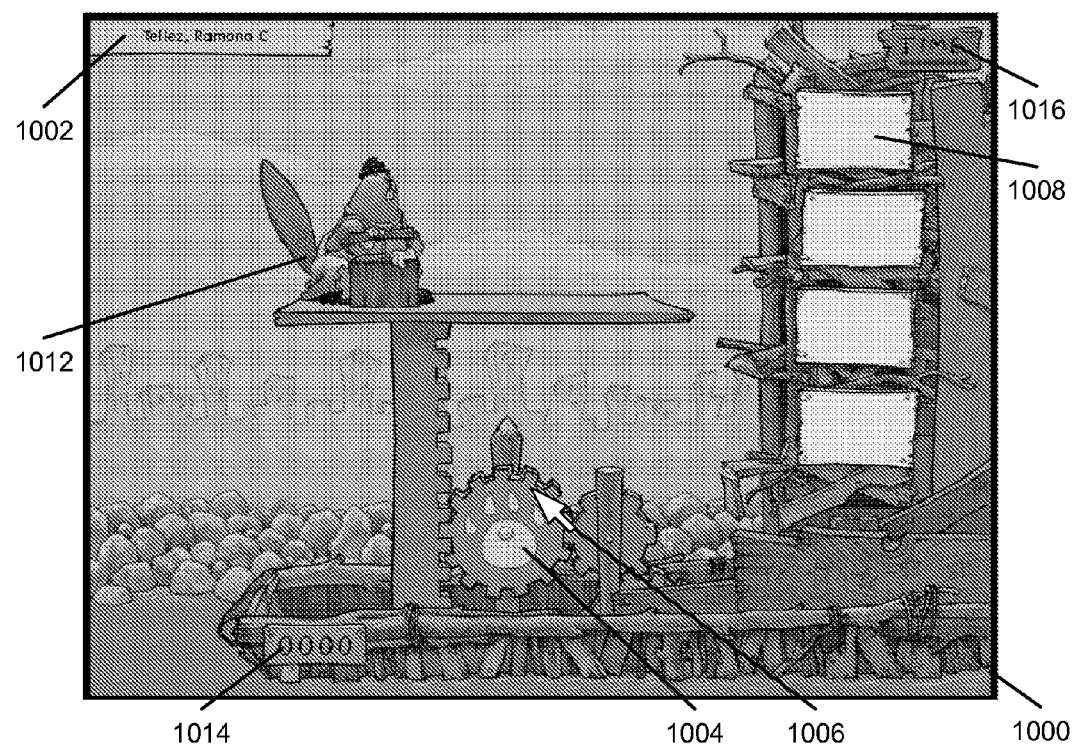
FIG. 10 is an exemplary introductory screenshot from a spelling pattern sorting task of the Wood Works exercise, according to one embodiment.

FIG. 10 is an exemplary screen shot 1000 from the Wood Works exercise illustrating one embodiment of the basic exercise setup for the spelling pattern sorting task. As shown, similar to the screen shot of FIG. 7, the screen includes the name of the student 1002, initiation button 1004, in this case, a selection paw 1004, also referred to as an OR button, and cursor 1006. As above, to begin a trial, the student may move the cursor 1006 over the selection paw 1004 and indicate the selection, e.g., by clicking the mouse. Also similar to FIG. 7, the screen 1000 further includes labeled shelves or bins 1008, representing sorting bins into which the student may sort target spelling patterns, as will be described below, beaver 1012, score indicator 1014, and time indicator 1016. In preferred embodiments, displaying the plurality of bins may include graphically displaying the respective spelling pattern of each bin.

Note that for this task, there are no speakers for audibly presenting the spelling patterns, since the student is expected to recognize the spelling patterns visually. As with the previous task, the score indicator 1014 may add points to the students score as the student correctly responds to trials, and the time indicator 1016 may provide a graphical illustration of the relative time left for the exercise. Exercise play may begin when the student selects the selection paw 1004.

In 906, a stimulus word (e.g., a next stimulus word) from the stimulus word set may be audibly or aurally presented to the student via the computing device (e.g., via speakers or headphones), e.g., may be pronounced, where the stimulus word contains one of the plurality of spelling patterns represented by the plurality of spelling pattern bins. As noted above, in some embodiments, because the stimulus word is presented audibly, the spelling pattern bins may not have corresponding speakers (e.g., images of speakers), and so the student may not have the option of hearing the sounds of the spelling patterns of the bins. Thus, the student may hear a word as it is presented to be sorted into a bin, based on a spelling pattern that occurs in the word. In one embodiment, when the stimulus word is presented, an object representing or associated with the stimulus word may be displayed, e.g., a log may be displayed that should be sorted into one of the bins.

Figure 11:
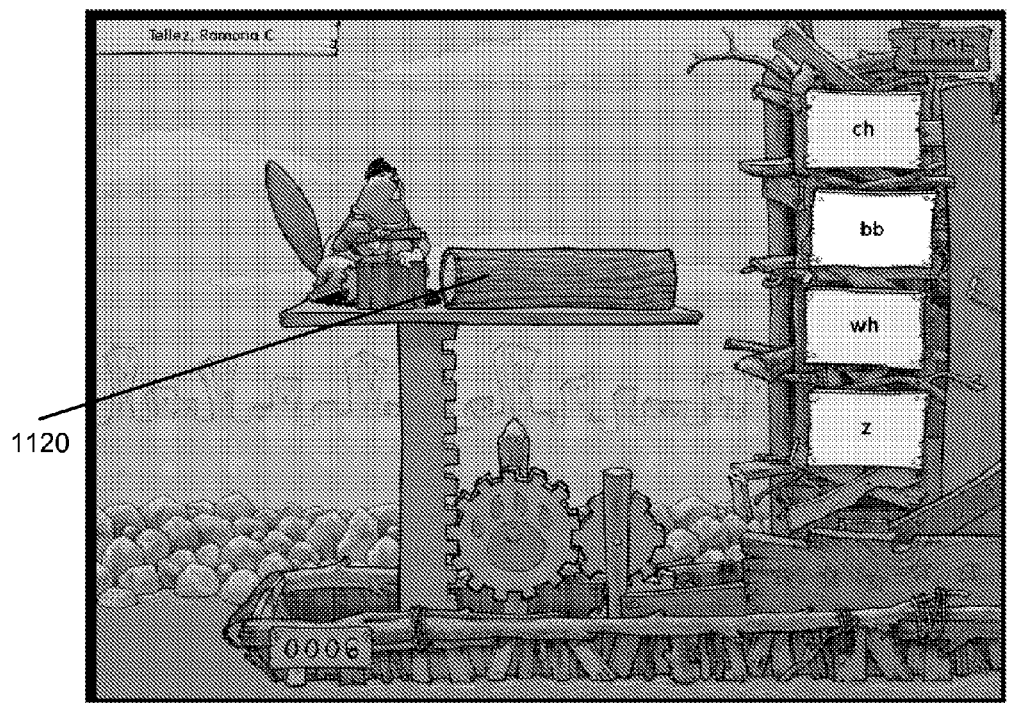
FIGS. 11 and 12 are exemplary screenshots of a trial from the spelling pattern sorting task of the Wood Works exercise, according to one embodiment.

FIG. 11 is an exemplary screenshot from the Wood Works exercise illustrating one embodiment of a sorting problem presented as part of the spelling pattern sorting task. As may be seen, each of the spelling pattern bins is labeled with a corresponding spelling pattern, specifically, "ch", "bb", "wh", and "z". Note that in some embodiments, the bottom bin may be reserved for sorting words that do not belong in any of the spelling pattern bins, and may be labeled "none" (or equivalent), similar to the above-described phoneme sorting task. As may be seen in FIG. 11, a log 1120 is displayed representing the audibly presented word.

In 608, the student may be required to select a bin from the plurality of bins representing a spelling pattern contained in the presented stimulus word. Said another way, the student may be required to select one of the displayed bins, where the bin selection indicates or asserts that the spelling pattern of the selected bin is included in the stimulus word. For example, in an exemplary case, the stimulus word "rabbit" may be audibly presented, and so a spelling pattern bin labeled "bb" would be the correct bin for sorting the word. In one embodiment, once the student has sorted the word, the presented (and sorted) stimulus word may be presented, i.e., displayed. The student may then sort the word by clicking on the bin with a spelling pattern that is contained in the stimulus word.

Figure 12:
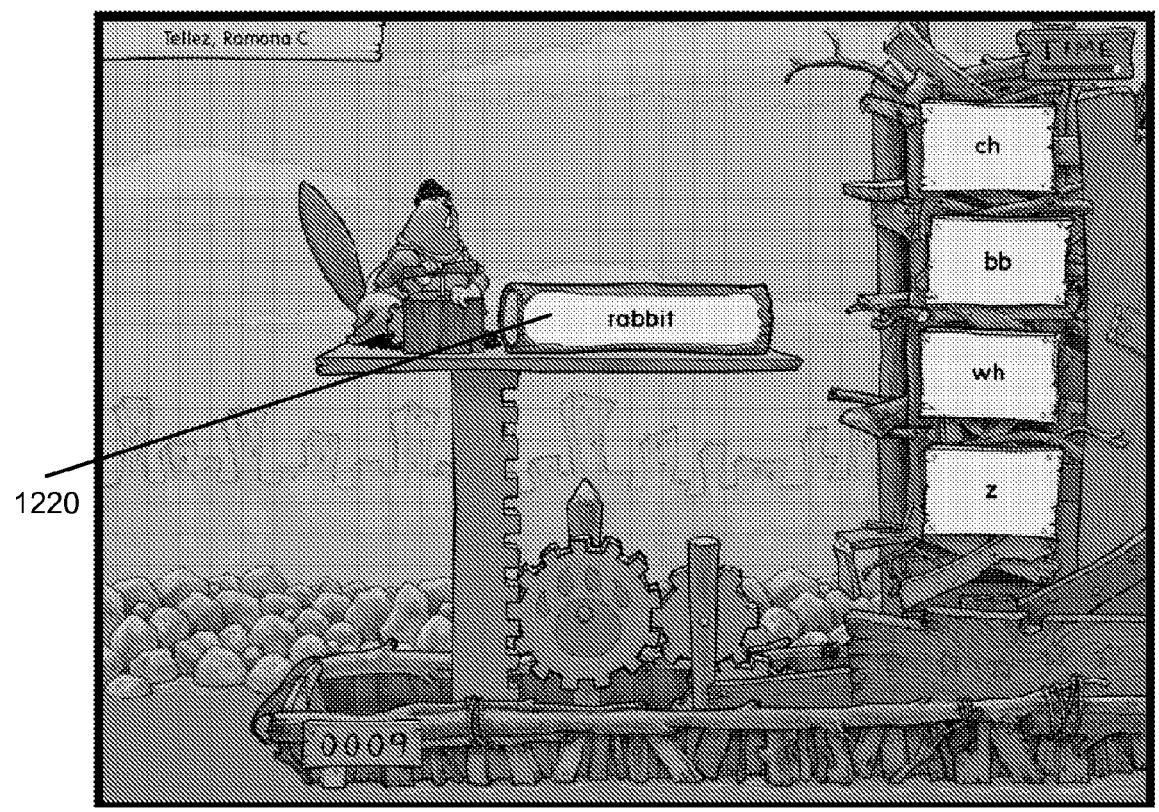

As may be seen in FIG. 11, the student has selected the "bb" bin (which is shown highlighted). FIG. 12 is an exemplary screenshot showing the displayed word (on the log), where the word is displayed in response to the student's selection.

In 610, a determination may be made as to whether the student selected the correct bin, and the result stored. As described above, this result may then be used to drive further operations, such as, for example, the awarding of points to the student, and so forth. As also described above, such results from multiple trials may be used to determine and/or guide the student's progress through the exercise, e.g., by influencing the difficulty of subsequent stimulus word/bin presentations. As further described above, in preferred embodiments, an indication, i.e., graphical and/or audial, may be provided as to the student's correctness (or incorrectness), e.g., a "thunk" sound may be played indicating incorrectness, or a "ding" may be played indicating correctness, and the facial expression of the character may also provide such an indication, e.g., smiling when the selection is correct.

As noted above with respect to the method of FIG. 6, any other types of indication may be used as desired. For example, if the student selects the correct bin, a "ding" may be played, the bin may be highlighted, e.g., in yellow, the text of the stimulus word may be revealed, e.g., on the log, and an animation presented moving the stimulus word (e.g., the board with the stimulus word label) into the correct bin. As above, points may also be awarded based on the correctness of the response. In one embodiment, if bonus points are earned, a special indication may be provided, e.g., 3 dings may be played.

Similarly, in one embodiment, if the selection is incorrect, a "thunk" may be played, the correct bin may be highlighted, e.g., in white, the audibly presented stimulus word may be displayed graphical (textually), e.g., the log may display the stimulus word, where the stimulus word may be highlighted, e.g., in white, and the letters in the stimulus word that match the spelling pattern may be highlighted differently, e.g., in blue. If the word contains none of the displayed spelling patterns, no letters may be highlighted. Additionally, upon such an incorrect response, the stimulus word may be pronounced. The highlights may then be removed and the stimulus word may disappear.

As FIG. 9 also indicates, additional stimulus words from the stimulus word set may be presented, where the student is required to select an appropriate spelling pattern bin for each word, and the correctness or incorrectness of each selection determined and stored, as described above. Moreover, similar to above, in preferred embodiments, the displaying, the audibly presenting, the requiring, and the determining may be repeated for each stimulus word in the stimulus word set, where the repeating builds accuracy and fluency in spelling pattern analysis, decoding, and spelling skills in the student. In other words, the student may be exposed to the stimulus word set (one word at a time, in the manner described above) multiple times to facilitate development of the student's spelling skills. As noted above, such repetition may occur in a plurality of sessions over days, weeks, or even months.

As with the first (i.e., phonetic) task, in one embodiment, an introductory or training set of trials may be performed, e.g., prior to performance of the "official" trials, i.e., stimulus words from an introductory training set may be presented, where the spelling patterns are easily contrasted, to familiarize the student with the task. As before, in some embodiments, the student may be required to meet some specified level of success with the introductory trials before progressing to the remaining sets of the exercise, i.e., the student may be required to "pass" the training portion of the exercise before proceeding.

Fluency Rounds

In one embodiment, the exercise may include fluency rounds, which present time-limited versions of trials in the exercise. For example, in one embodiment, when a student clicks on the OR button, e.g., the "paw" button, after passing 2 units, a fluency round may be triggered. The OR button may change to a timer, which may count down a 60 second (or other specified duration) time limit. The trials for the fluency round may be randomly sampled from the last completed unit. If the student does not click on the correct answer within a specified time interval, e.g., 3 seconds, the trial may be considered incorrect. Note that in some embodiments, fluency round trials may not be evaluated for advancement. Note further that, other than the timing and progression/scoring, the trials of the fluency round may be performed as described above with respect to (one or both of) the two tasks of the exercise. In other words, the trials of the fluency round may be similar to those of the current task. Moreover, the order of the bins may be the same as in the previous unit.

In some embodiments, rewards for fluency rounds may be different from those of regular rounds or trials. For example, in one embodiment, only designated animations (e.g., fast only) may play during a fluency round, i.e., reward animations may not play. Points may be awarded as in regular play, but bonus points earned during the fluency round may be awarded at the end of the fluency round. If the last trial of the fluency round is answered incorrectly, the bonus points may not be awarded onscreen, but may still be added to the student's point total.

Regarding exit/reentry, in some embodiments, the fluency round may always play for the full duration, e.g., 60 seconds, unless the student exits manually. If the student exits manually from the fluency round, upon re-entry the remainder of the fluency round may be skipped, and the student may begin with the next open unit. If no units remain open, the student may not be allowed to return to the exercise.

Exemplary Content and Progression

The following presents an exemplary embodiment of a content set for the above-described exercise (Wood Works), although it should be noted that the information is exemplary only, and is not intended to limit the exercise to any particular set of phonemes, words, spelling patterns, or progression sequence or criteria.

Overview:

| Task | sets | Vocabulary levels | Total units | Trials per unit | Total trials |
|---|---|---|---|---|---|
| Phoneme sort introduction | 1 | 1 | 1 | 20 | 20 |
| Phoneme sort | 7 | 2 | 14 | 20 | 280 |
| Spelling sort introduction | 1 | 1 | 1 | 20 | 20 |
| Spelling sort | 29 | 2 | 58 | 20 | 1160 |
| | | | | | 1480 |

Exemplary Content Stats:

Easy Level Vocabulary 725 unique words, consisting primarily of $4^{th}$ and $5^{th}$ grade terms (per Mogilner). All words are one or two syllables in length.

Hard Level Vocabulary 778 unique words, consisting primarily of $5^{th}$ and $6^{th}$ grade terms and elementary/middle school level academic terms. There are 256 academic words among the hard level items, consisting of 100 science terms, 57 math and geometry terms, and 99 social studies & geography terms. All words are two or more syllables in length.

Task 1: Sort by Phoneme

| Introductory Phoneme set | | |
|---|---|---|
| 0. (/k/ /sh/ /ē/ /n/) | | |
| | Content type | |
| Phoneme sets | phoneme type | visual match (higher = easier) |
| 1. /z/ /s/ /th/ none | consonant | medium |
| 2. /l/ /r/ /w/ none | consonant | medium |
| 3. /zh/ /j/ /ng/ none | consonant | low |
| 4. /ch/ /sh/ /k/ none | consonant | low |
| 5. /ə/ /ō/ /oi/ /ou/ | vowels | low |
| 6. /a/ /e/ /i/ none | vowels | low |
| 7. /ā/ /ē/ /ī/ none | vowels | low |

Task 2: Sort by Spelling

| Spelling sets | Phoneme type | |
|---|---|---|
| 0. (wh, bb, z, ch) | /w b z ch/ | |
| Spelling sets | Phoneme(s) | Content Type |
| 1. (b, p, v, f) | /b p v f/ | ELL confusable |
| 2. (es, s, ex, sh) - initial | /es s eks sh/ | ELL confusable |
| 3. (j, h, g, y) | /j h g y/ | ELL confusable |
| 4. (ll, y, w, e) | /l, y, w, ee/ | ELL confusable |
| 5. (x, ks, ck, sk) | /ks, ks, k, sk/ | ELL confusable |
| 6. (d, dd, ed, none) | /d/ | simple consonant |
| 7. (t, tt, ed, none) | /t/ | simple consonant |
| 8. (m, mm, lm, none) | /m/ | simple consonant |
| 9. (n, nn, kn, none) | /n/ | simple consonant |
| 10. (r, rr, wr, none) | /r/ | simple consonant |
| 11. (s, c, ss, sc) | /s/ | complex consonant |
| 12. (s, z, zz, none) | /z/ | complex consonant |
| 13. (c, cc, k, qu) | /k/ | complex consonant |
| 14. (g, j, dg, none) | /j/ | complex consonant |
| 15. (ch, t, tch, none) | /ch/ | complex consonant |
| 16. (ti, sh, ch, c) | /sh/ | complex consonant |
| 17. (u, o, ou, none) | /u/ hut | short vowel |
| 18. (i, y, e, none) | /i/ | short vowel |
| 19. (o, a, au, aw) | /aw/ | short vowel |
| 20. (oo, u, ou, none) | /oo/ took | short vowel |
| 21. (a, a_e, ai, ay) | /ā/ | long vowel |
| 22. (e, ea, ee, ie) | /ē/ | long vowel |
| 23. (i_e, i, y, igh) | /ī/ | long vowel |
| 24. (o, o_e, ow, oa) | /ō/ | long vowel |
| 25. (oo, u_e, o_e, ou) | /OO/ boot | long vowel |
| 26. (u, u_e, ew, ue) | /yOO/ | special vowel |
| 27. (are, air, ar, none) | /ar/ | special vowel |
| 28. (eer, ear, ere, none) | /er/ | special vowel |
| 29. (er, ir, ur, none) | /ər/ | special vowel |

Progression:

| Term | General definition | Exercise-specific definition |
|---|---|---|
| Trial | The stimulus and response options presented to a student; response is evaluated | Stimulus word and 4 response options |
| Unit | the smallest group of trials to be evaluated for advancement | A total of 20 trials, sampled from a single content set. |

-continued

| Term | General definition | Exercise-specific definition | |
|---|---|---|---|
| Category | a subset of the content set, defined by having common characteristics | The target phoneme or spelling pattern category into which a word will be sorted. (e.g., /z/, or eer) | |
| Set | content set from which trials are sampled or taken to create a unit | A set of 4 phoneme or 4 spelling pattern categories (or 3 and a "none of the above" category). Level 1, Set /z/ /s/ /th/ none Level 2, Set 1 b, p, v, f | |
| Level | grouping of sets designated as hierarchically equivalent based on one or more shared attributes | Level: grouped by Vocabulary, Task attributes<br><br>Level 1: Easy, phoneme<br>Level 2: Easy, spelling<br>Level 3: Hard, phoneme<br>Level 4: Hard, spelling | Sublevel: grouped by Content Type attribute<br><br>3 types<br>6 types<br>3 types<br>6 types |
| Level Attributes | Attributes by which sets are grouped into levels (or sublevels). The attributes and the hierarchy assigned to the attributes may differ across exercises. | Vocabulary: difficulty level of vocabulary in content set Easy (4$^{th}$ & 5$^{th}$ grade words, 1-2 syllables long) Hard (5$^{th}$ & 6$^{th}$ grade & academic words*, 2-5 syllables long) Task: activity performed by student; independent of other tasks Task 1 (sort by phoneme into bins labeled with dictionary phoneme symbols) Task 2 (sort by spelling pattern into bins labeled with letters) | Content Type: type of content in set (see chart below) |

Note that in the embodiments described herein, the academic vocabulary set used in the exercise includes math, science, and social studies terms commonly found in elementary and intermediate level textbooks. Most 5$^{th}$ graders should have some familiarity with most of the academic vocabulary in this exercise.

Order of Progression:

In one embodiment, the student may progress through the content in the order in which it is shown in the chart below. The sets within each content type may be presented in random order.

| level-id | Vocabulary level | Task | type-id | Content Type | set-ids | # of Sets (units) | Min. # of trials |
|---|---|---|---|---|---|---|---|
| 1 | NA | phoneme | 0 | intro | 0 | 1 | 20 |
| 1 | easy | phoneme | 1 | consonant med | 1-2 | 2 | 40 |
| 1 | easy | phoneme | 2 | consonant low | 3-4 | 2 | 40 |
| 1 | easy | phoneme | 3 | vowel low | 5-7 | 3 | 60 |
| 2 | NA | spelling | 0 | intro | 0 | 1 | 20 |
| 2 | easy | spelling | 1 | ELL confusable | 1-5 | 5 | 100 |
| 2 | easy | spelling | 2 | simple consonant | 6-10 | 5 | 100 |
| 2 | easy | spelling | 3 | complex consonant | 11-16 | 6 | 120 |
| 2 | easy | spelling | 4 | short vowel | 17-20 | 4 | 80 |
| 2 | easy | spelling | 5 | long vowel | 21-25 | 5 | 100 |
| 2 | easy | spelling | 6 | special vowel | 26-29 | 4 | 80 |
| 3 | hard | phoneme | 1 | consonant med | 1-2 | 2 | 40 |

-continued

| level-id | Vocabulary level | Task | type-id | Content Type | set-ids | # of Sets (units) | Min. # of trials |
|---|---|---|---|---|---|---|---|
| 3 | hard | phoneme | 2 | consonant low | 3-4 | 2 | 40 |
| 3 | hard | phoneme | 3 | vowel low | 5-7 | 3 | 60 |
| 4 | hard | spelling | 1 | ELL confusable | 1-5 | 5 | 100 |
| 4 | hard | spelling | 2 | simple consonant | 6-10 | 5 | 100 |
| 4 | hard | spelling | 3 | complex consonant | 11-16 | 6 | 120 |
| 4 | hard | spelling | 4 | short vowel | 17-20 | 4 | 80 |
| 4 | hard | spelling | 5 | long vowel | 21-25 | 5 | 100 |
| 4 | hard | spelling | 6 | special vowel | 26-29 | 4 | 80 |
| | | | | | | 74 | 1480 |

Note that the exercise includes a plurality of progression levels, each with a respective level ID. As shown, level 1 corresponds to the phoneme sorting task with easy vocabulary, level 2 corresponds to the spelling pattern task with easy vocabulary, level 3 corresponds to the phoneme sorting task with hard vocabulary, level 2 corresponds to the spelling pattern task with hard vocabulary. Thus, as the student progresses through the levels, they may alternate between the two tasks. As will be described below, the exercise may also include a plurality of difficulty levels, although these should not be confused with the progression levels.

In one embodiment, the exercise content may be organized as follows:
4 Progression Levels
Each level=1 sorting task at a vocabulary level (easy, hard)

$$\text{Percent thru} = \frac{\text{closed sets}}{74} * 100$$

Levels presented in order
Content types within levels presented in order
2 Sorting Tasks (See Chart Below for Details):
  Sort by Phoneme: L1, L3
  3 content types/level
  8 sets/level
  Sort by Spelling: L2, L4
  6 content types/level
  30 sets/level
Sets
Set=4 sorting categories
Sets presented randomly within content type
Sets can't be reopened once closed
Each set=20 trials
Unit=1 set
Exercise also includes fluency rounds. See FIG. 13, described below, for progression.
Evaluation of Trial:
  A trial may be evaluated as correct if the student clicks on the correct bin to sort the word. If the student makes the correct selection they may receive points and that trial is considered "passed" and counted toward advancement.
  If the student clicks on the speaker button, and then answers the trial correctly, the student receives fewer points, and the trial may be counted as incorrect for the purposes of advancement. If the student clicks on the incorrect bin, the trial is considered "failed" and the student receives no points.

Evaluation of Unit:
  In this exemplary embodiment, a unit includes 20 trials. Each unit may randomly sample 5 words from each of the 4 categories in the set. If 5 words are not available, the unit may randomly sample from the remaining words in the set. The same target category should not be presented more than 3 consecutive times in a unit. After 20 trials, the unit may be evaluated for advancement.
Advancement:
  If 90% of the words (18 out of 20) in the unit are sorted correctly, the unit is passed; otherwise, the unit is failed. If a unit is passed, the student advances to the next available unit. If a unit is failed, the unit immediately repeats. The unit may repeat until the student has either passed the unit or has attempted the unit 3 times.
Plateau Based Transition:
  After 3 attempts, the student may plateau transition to the next available unit. After all units in the exercise have been passed or attempted 3 times, any units not passed may be repeated. The units may be repeated following the same progression and advancement rules as during initial presentation. Note that if the unit is an introductory unit, the student may NOT plateau transition after 3 attempts, but may repeat the unit until it is passed.
Exit and Re-Entry:
  The student may be allowed to manually exit or time out prior to clicking the OR button for any trial. The exercise cannot be exited while a trial is in progress. Upon re-entry, the student may be returned to the exact point from which they exited.
Progress Markers:
  Progress through the exercise (comparable to percent-through) may be marked by the addition of a total of 5 markers (stars). The first 4 stars may be awarded after 15 units have been passed. The last star may be awarded after 14 units have been passed.
End of Exercise:
  The exercise may end when the student has met passing criteria in all units. It may then return to the wrapper, e.g., the startup screen, via a "Good Job" screen.
  In preferred embodiments, the exercise may include multiple difficulty levels, e.g., corresponding to the degree of difficulty of the exercise content. Note that these difficulty levels are not the same as the progression levels described elsewhere. The following is an exemplary content mapping for data sets for this exercise (Wood Works).

Content Mapping:

| | Type-id | Content type | Set-ids (units) | (min) Total Eval Trials to pass |
|---|---|---|---|---|
| Easy Vocabulary    Vocab-level = easy* | | | | |
| Sort by Phoneme    Task = phoneme | | | | |
| Introductory Set | 0 | | 0 | 20 |
| Level 1: Consonant sounds with few spellings | 1 | consonant med | 1, 2 | 40 |
| Level 2: Consonant sounds with many spellings | 2 | consonant low | 3, 4 | 40 |
| Level 3: Vowel sounds with many spellings | 3 | vowel low | 5, 6, 7 | 60 |
| Sort by Spelling    Task = spelling Pattern | | | | |
| Introductory set | 0 | | 0 | 20 |
| Level 1: Common errors for English Language Learners | 1 | ELL confusable | 1, 2, 3, 4, 5 | 100 |
| Level 2: Simple consonant patterns | 2 | simple consonant | 6, 7, 8, 9, 10 | 100 |
| Level 3: Complex consonant patterns | 3 | complex consonant | 11, 12, 13, 14, 15, 16 | 120 |
| Level 4: Short vowels | 4 | short vowel | 17, 18, 19, 20 | 80 |
| Level 5: Long vowels | 5 | long vowel | 21, 22, 23, 24, 25 | 100 |
| Level 6: Special vowels | 6 | special vowel | 26, 27, 28, 29 | 80 |
| Hard Vocabulary    Vocab-level = hard* | | | | |
| Sort by Phoneme    Task = phoneme | | | | |
| Level 1: Consonant sounds with few spellings | 1 | consonant med | 1, 2 | 40 |
| Level 2: Consonant sounds with many spellings | 2 | consonant low | 3, 4 | 40 |
| Level 3: Vowel sounds with many spellings | 3 | vowel low | 5, 6, 7 | 60 |
| Sort by Spelling    Task = spelling Pattern | | | | |
| Level 1: Common errors for English Language Learners | 1 | ELL confusable | 1, 2, 3, 4, 5 | 100 |
| Level 2: Simple consonant patterns | 2 | simple consonant | 6, 7, 8, 9, 10 | 100 |
| Level 3: Complex consonant patterns | 3 | complex consonant | 11, 12, 13, 14, 15, 16 | 120 |
| Level 4: Short vowels | 4 | short vowel | 17, 18, 19, 20 | 80 |
| Level 5: Long vowels | 5 | long vowel | 21, 22, 23, 24, 25 | 100 |
| Level 6: Special vowels | 6 | special vowel | 26, 27, 28, 29 | 80 |

*For the introductory sets, the vocabulary level is "training"

As may be seen, each task of the exercise (i.e., sort by phoneme, and sort by spelling pattern) includes multiple difficulty levels (not to be confused with progression levels, as presented in the Order of Progression chart above, and in this embodiment, also has easy vocabulary and hard vocabulary portions (each of which has multiple levels). Moreover, as also indicated above, the stimulus words may be organized into units based on these levels, as well as type ID and content type, where content type correlates with level.

Figure 13:
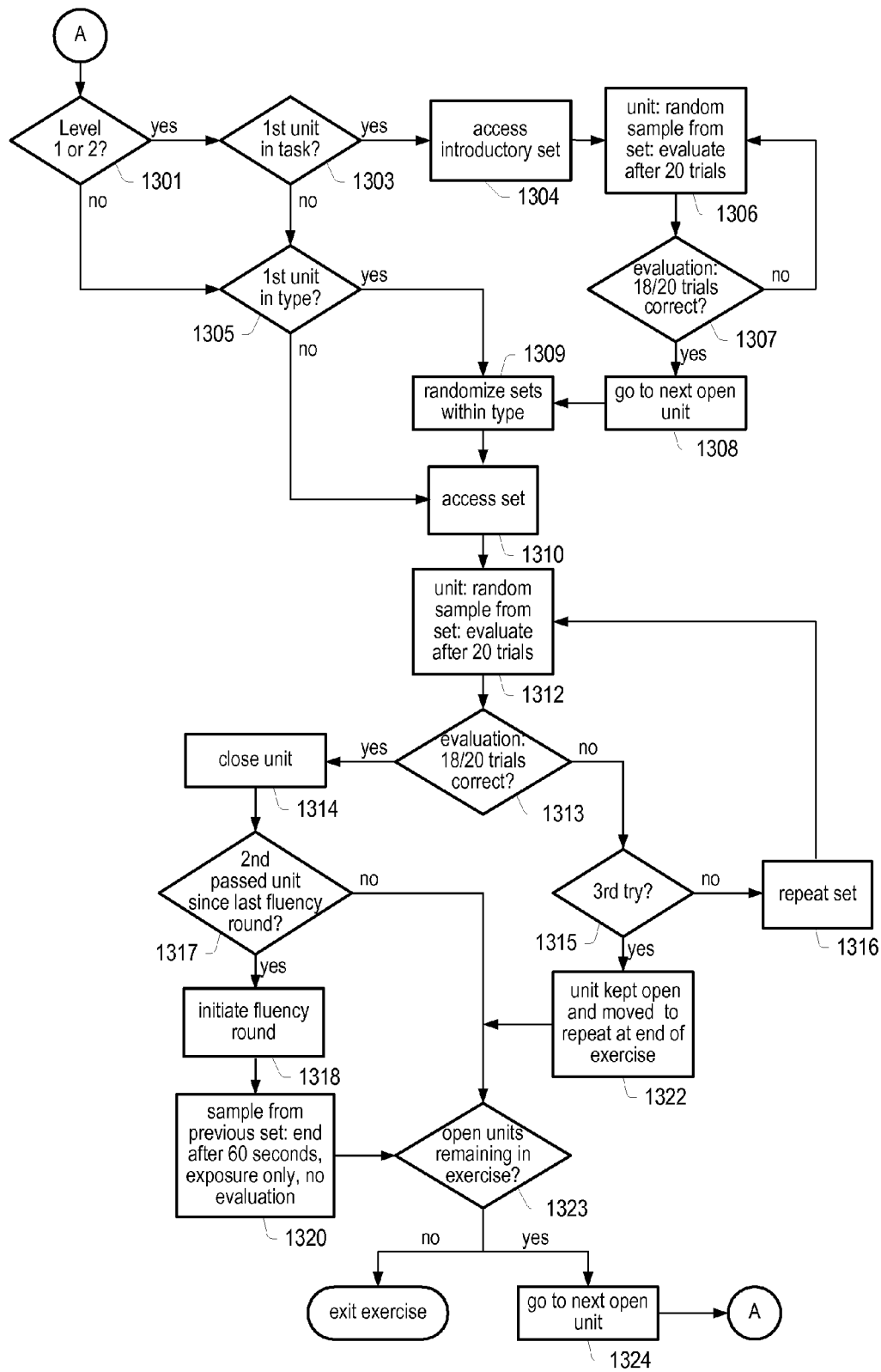
FIG. 13 is a detailed flowchart diagram illustrating progression through the Wood Works exercise, according to one embodiment.

FIG. 13—Detailed Progression through Wood Works Units

FIG. 13 flowcharts a computer-implemented method for building accuracy and fluency in phonemic analysis, decoding, and spelling via a computing device, according to one embodiment. More specifically, the method is directed to performance of units in the Wood Works exercise, including fluency rounds. Note that the method of FIG. 13 is applicable to, and may include, the methods of FIGS. 6 and 9 (and vice versa). As noted above, in various embodiments, some of the method elements described may be performed concurrently, in a different order than described, or may be omitted. Additional method elements may be performed as desired. As FIG. 13 shows, the method may be performed as follows:

As indicated, once the exercise has begun, then in 1301, a determination may be made as to whether the current level is 1 or 2. If the current level is neither 1 or 2, then the method may proceed to 1305, described below. If, on the other hand, the current level is determined to be 1 or 2, then the method may proceed to 1303.

In 1303, a determination may be made as to whether the current unit is the first unit in the current task. If the current unit is determined to not be the first unit in the current task, then the method may proceed to 1305, described below. If the current unit is determined to be the first unit in the current task, then an introductory set, e.g., an introductory stimulus word set, may be accessed or provided, as indicated in 1304.

After 1304, then in 1306, a unit of trials may be performed, where, as indicated, the unit comprises a random sample of stimulus words from the introductory set of 1304. As also indicated, in this embodiment, the unit includes the performance of 20 trials (although in other embodiments, a unit may include a different number of trials), after which the student's performance on the unit may be evaluated.

In 1307, a determination may be made as to whether the student correctly performed a specified fraction or percentage of the trials, e.g., 18 out of 20 (90%). If not, then the method may return to 1306, and the unit may be performed again and evaluated. This performance and evaluation may be repeated until the specified percentage of trails in the unit is performed correctly, or, in some embodiments, until some maximum number of iterations has been performed. If the student has correctly performed the specified fraction or percentage of the trials in the unit, e.g., passed 90% of the trials, then the method may proceed to 1308.

In 1308, the next open unit may be determined, i.e., the next unit that has not been performed (and passed), and then the method may proceed to 1309, described below.

In 1305, a determination may be made as to whether the current unit is the first unit in the current content type (see Order of Progression chart above). If so, then the method may proceed to 1309, described below. If the current unit is determined to not be the first unit in the current content type, the method may proceed to 1310, described below.

In 1309, stimulus word sets within the current content type may be randomized, i.e., shuffled.

In 1310, a next set from the randomized sets may be determined and accessed.

In 1312, a unit of trials from the next set of stimulus words (from 1310) may be performed, where, as indicated, the unit comprises a random sample of stimulus words from the set. As also indicated, in this embodiment, the unit includes the performance of 20 trials (although in other embodiments, a unit may include a different number of trials), after which the student's performance on the unit may be evaluated.

In 1313 a determination may be made as to whether the student correctly performed a specified fraction or percentage of the trials, e.g., 18 out of 20 (90%). If the student has correctly performed the specified fraction or percentage of the trials in the unit, e.g., passed 90% of the trials, then the method may proceed to 1314. If not, then the method may continue to 1315.

In 1315, a determination may be made as to whether the student has failed this unit for a third time, and if not, the method may proceed to 1316.

In 1316, the set of stimulus words of the current unit may be accessed or initialized (again), and another unit (or in some embodiments, the same unit) using the same set of stimulus words (from 1310) may be performed, where, as indicated, the unit comprises a random sample of stimulus words from the set. Thus, the set, i.e., a unit from the set, may be repeated until the specified percentage of trails in the unit is performed correctly, or until the maximum number of iterations has been performed, in this embodiment, three.

If the student has failed the unit for the third time, then in 1322, the unit may be kept open for later performance, e.g., at the end of the exercise, after which the method may proceed to 1323, described below.

If in 1313, the student passed the unit (e.g., correctly performed 90% or more of the trials, then the unit may be closed, as indicated in 1314, and the method may proceed to 1317. Note that in preferred embodiments, once a unit is closed, the unit may not be subsequently opened during the exercise, i.e., the student may not perform trials again in that unit.

In 1317, a determination may be made as to whether the unit just passed is the second passed unit since the last fluency round. If not, then the method may proceed to 1323, described below. If so, then the method may proceed to 1318, where a fluency round may be initiated.

In 1320, a unit of trials from the previous set of stimulus words (from 1310) may be performed, where, as indicated, the unit comprises a random sample of stimulus words from the (previous) set. In contrast with regular trials, fluency rounds are timed. For example, in one embodiment, the fluency round may be ended after 60 seconds, although other time limits may be used as desired. Moreover, the student's performance in the fluency round may not be evaluated. Note that the stimulus words used in the fluency round are those of a closed unit, i.e., the immediately previous unit that has just been passed and closed.

In 1323, a determination may be made as to whether there are any remaining open units in the exercise, i.e., units that have not been passed. If not, then the exercise may be exited, as shown. If there are further open units in the exercise, then in 1324, the method may determine the next open unit, and proceed with 1301, continuing as described above until there are no further open units in the exercise to perform.

In one embodiment, once the exercise has been completed, the student's performance on the exercise may be displayed. Additionally, in some embodiments, the student's progression through the plurality of exercises may be displayed. In preferred embodiments, the top-level screen of FIG. 5 may be displayed, whereby the student may select the next exercise to perform. Alternatively, in one embodiment, the next exercise to perform may be determined automatically, and a corresponding introductory screen for the next exercise may be displayed.

Note that performance of the method of FIG. 13 may include performing units at various progression levels, and at various levels of difficulty, e.g., using easy and hard vocabulary, as indicated by the order of progression chart above. Also, in preferred embodiments, the exercise may be repeated as desired, e.g., in sessions over days, weeks, or even months, to improve cognitive reading skills in the student.

Exercise 2: Gator Jam

The goal of this exercise (i.e., Gator Jam) is to build vocabulary skills and improve accuracy and fluency in critical thinking and abstract reasoning by working with important semantic/grammatical relationships among words.

In this exercise, students work with analogies in two ways, helping them to learn targeted vocabulary in the context of analogies, while also learning to analyze analogies and identify the semantic relationships they convey. Alternate responses (i.e., other than the correct one) relate in some other way to words in the analogy stem, so that students must read each analogy closely and reflect on its vocabulary and semantic relationships, in order to select the correct answer. The exercise includes a large number (e.g., 95) key vocabulary words (along with a great many (e.g., over 1900) context words), each of which is presented in different analogies (e.g., 3 to 6 different analogies) so that students can learn different aspects of each word's meaning.

In one exemplary embodiment, the key vocabulary words cover 27 Latin and Greek morphemes (prefixes, roots, or suffixes) that are widely used in English (e.g., able, auto, cred, dis, en, form, graph, in inter, ist, ive, ment, meter, mis, phon, port, pre, re, scope, sign, spect, sphere, tele, trans, y, ion, al). To help students recognize and learn these high-utility morphemes, each of them appears in a plurality (e.g., 2 to 7) of the key vocabulary words. In one embodiment, a built-in glossary may provide dictionary-like definitions of the key words and other difficult terms in each item for students that need extra vocabulary support.

As noted above, this exercise facilitates cognitive skill development in the student with respect to memory, by exercising long-term memory for vocabulary and working memory for comparing words; with respect to attention, by using selective attention for making selections along various linguistic dimensions; with respect to processing, by developing fluent access to the multiple relationships among words; and with respect to sequencing, by recognizing directionality of word relationships.

More specifically, in a first task or stage, the student may be required to complete analogies in a cloze task format where one of four terms of a presented analogy is missing. In a second task or stage, the student may reread the completed analogies, and sort them based on the type of analogical relationship illustrated or represented. This exercise may facilitate vocabulary and concept development, may require the student to know abstract, derived roots and affixes from Greek and Latin, and to use this knowledge to analyze the meaning of complex words, and to understand and explain frequently used synonyms and antonyms.

Figure 14:
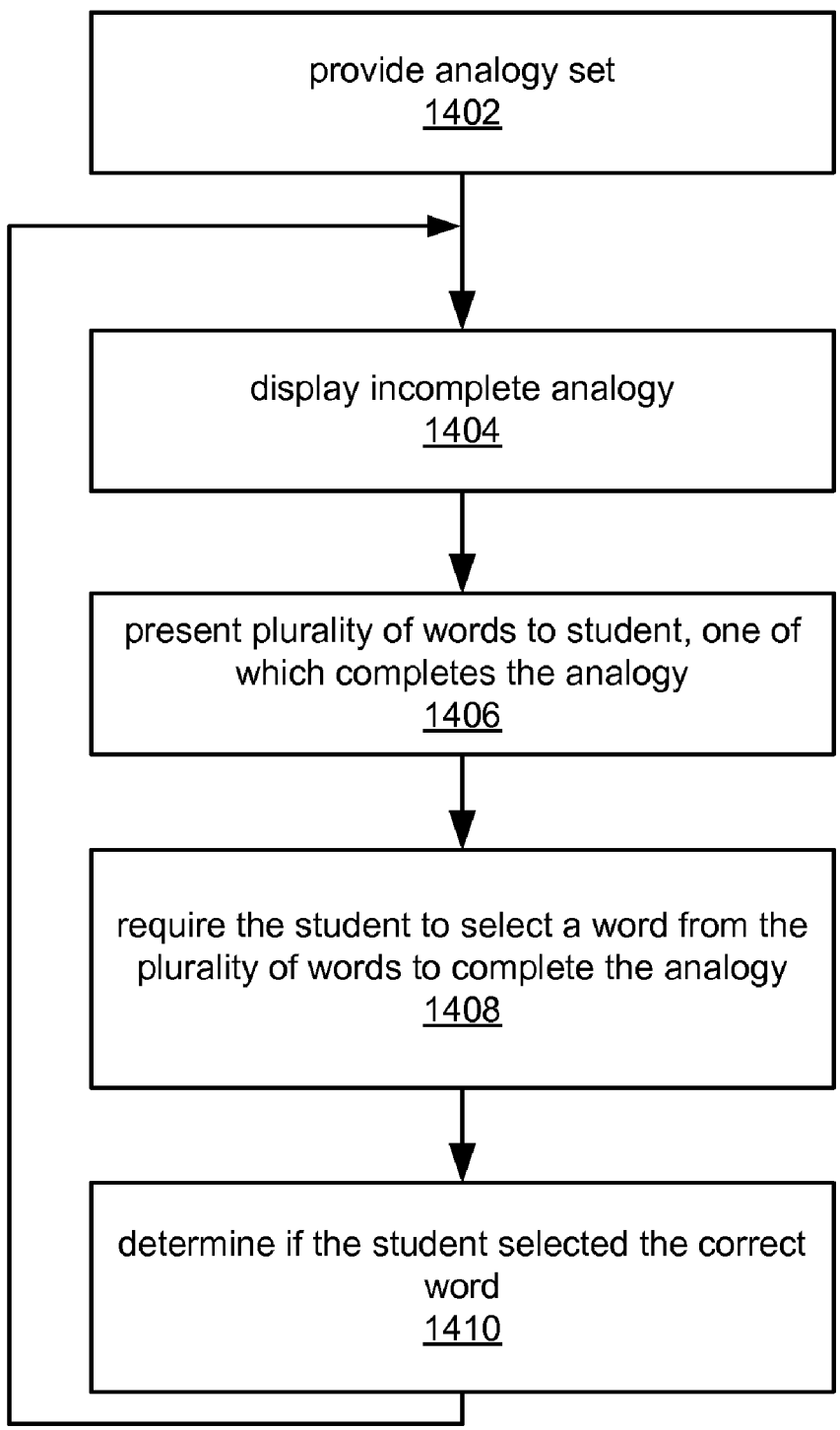
FIG. 14 is a high-level flowchart of a computer-implemented method for building vocabulary skills and improving accuracy and fluency in critical thinking and abstract reasoning by working with important semantic/grammatical relationships among words in an analogy completion task, according to one embodiment.

FIG. 14—Method for Building Vocabulary Skills and Improving Accuracy and Fluency in Critical Thinking and Abstract Reasoning Via Analogy Completion FIG. 14 is a flowchart diagram of one embodiment of a computer-implemented method for building vocabulary skills and improving accuracy and fluency in critical thinking and abstract reasoning by working with important semantic/grammatical relationships among words. More specifically, the method is directed to the first stage of the exercise, wherein the student completes (or attempts to complete) a series of incomplete analogies in a variety of analogy categories. As above, in various embodiments, some of the method elements described may be performed concurrently, in a different order than described, or may be omitted. Additional method elements may be performed as desired. As FIG. 14 shows, the method may be performed as follows:

In 1402, a set of analogies may be provided. In one embodiment, the set of analogies may include analogies in each of a plurality of categories, including, for example, synonyms, antonyms, cause and effect, and grammatical forms, among others. (A more complete list of such categories is provided below.) In one embodiment, a subset of the categories may be presented to the student, from which the student may select a particular category of analogy. The student may then perform trials in the selected category, as described below.

Figure 15:
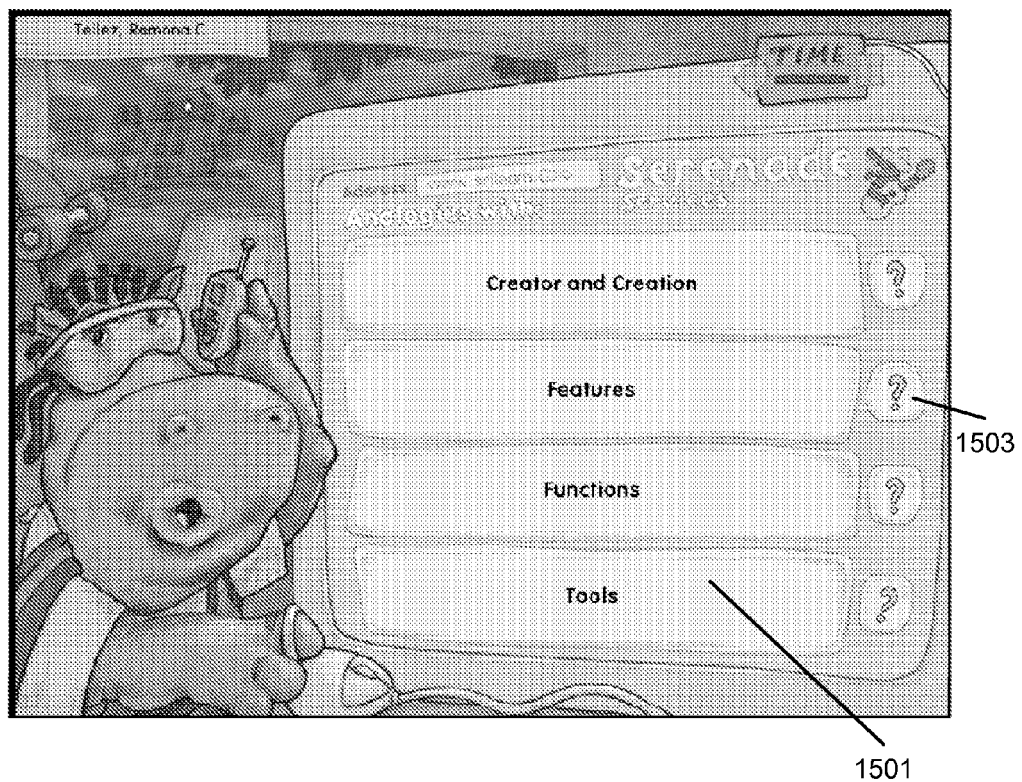
FIG. 15 is an exemplary screenshot of a screen for selecting from among a plurality of analogy types for performing trials in the Gator Jam exercise, according to one embodiment.

As with the above-described Wood Works exercise, in preferred embodiments, a graphical user interface (GUI) may be provided whereby the exercise may be performed. In one embodiment, before beginning trials, the student may be allowed to select an analogy category from the plurality of categories, e.g., from a plural subset of the plurality of categories, via a selection screen. For example, four categories may be presented at a time. FIG. 15 illustrates an exemplary screenshot of a screen in which a plurality of analogy categories 1501 is shown, i.e., a subset of the analogy categories, where, as mentioned, the student may select one of the categories for performance of trials in that category. As also shown, means, e.g., a button 1503 (see question mark buttons by each presented category), may be provided for each category shown whereby the student may invoke a definition or explanation of the category.

Figure 16:
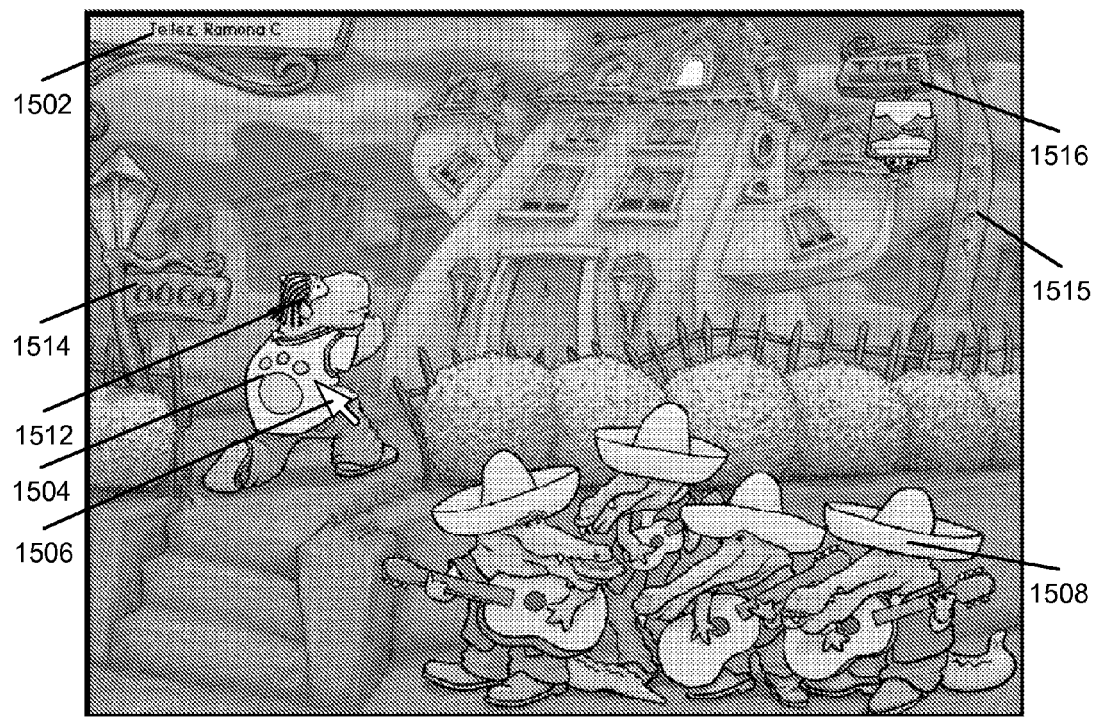
FIG. 16 is an exemplary introductory screenshot from an analogy completion task in the Gator Jam exercise, according to one embodiment.

Once the student has selected an analogy category 1501, a screen may be presented whereby the student may begin trials. FIG. 16 illustrates an exemplary introductory screen for trials in the exercise. As with FIG. 7, the screen includes the name of the student 1502, an initiation button, in this case, a selection paw 1504, also referred to as an OR button, and a cursor 1506. To begin a trial, the student may move the cursor 1506 over the selection paw 1504 and indicate the selection, e.g., by clicking the mouse. The screen further includes a main character, in this case, a hippopotamus 1512, secondary characters 1508, in this case, alligators, a score indicator 1514, progress markers 1515 indicating progress through the exercise, and a time indicator 1516. The score indicator 1514 may add points to the students score as the student correctly responds to trials. The time indicator 1516 may provide a graphical illustration of the relative time left for the exercise. Exercise play may begin when the student selects the selection paw 1504.

Figure 17:
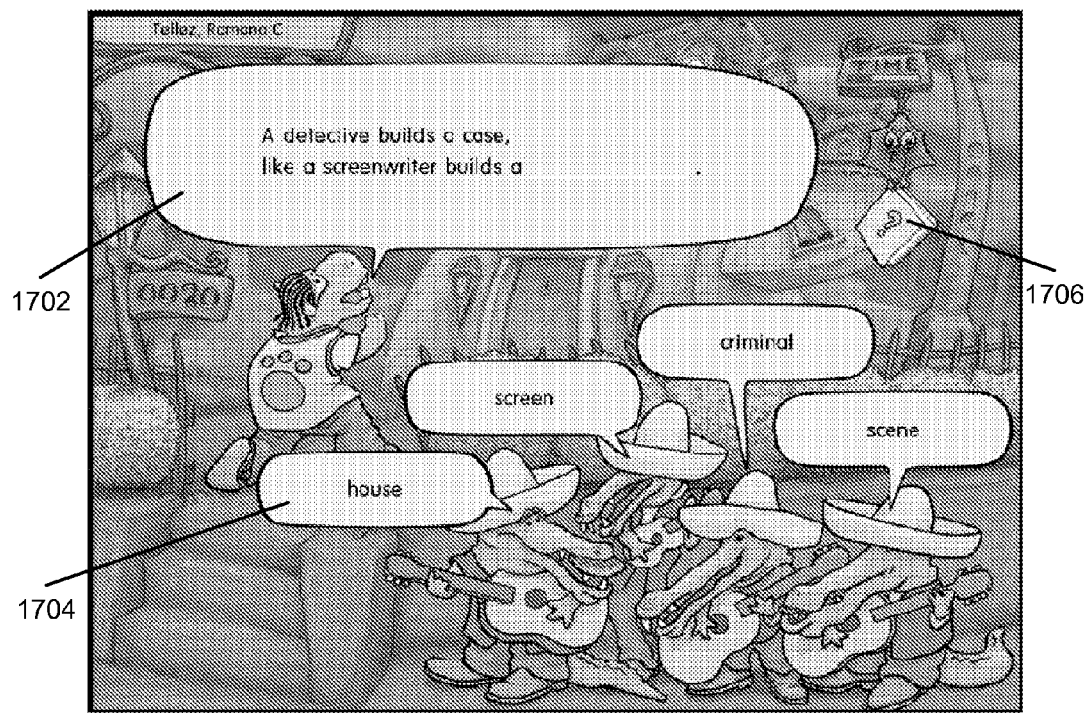
FIGS. 17 and 18 are exemplary screenshots illustrating a trial in the analogy completion task of the Gator Jam exercise, according to one embodiment.

In 1404, an incomplete analogy may be presented or displayed to the student via a computing device. In preferred embodiments, the incomplete analogy may be presented textually or graphically, although in some embodiments, the incomplete analogy may be presented audibly, e.g., via spoken words, possibly with a distinctive sound in place of the textual blank. FIG. 17 illustrates an exemplary screenshot wherein the main character 1512 (the hippopotamus) presents an incomplete analogy 1702, in this example case, "A detective builds a case, like a screenwriter builds a _____."

In 1406, a plurality of words may be presented to the student, where one of the words correctly completes the incomplete analogy. As FIG. 17 also shows, in addition to, and/or in response to, the incomplete analogy presented in FIG. 17, a corresponding plurality of words is shown presented by respective secondary characters 1508, i.e., the alligators. As shown, following the example of 1404, the words presented are "house", "screen", "criminal", and "scene". As also shown, in this embodiment, a dictionary icon 1706 may be provided whereby the student may invoke help for the trial, e.g., word definitions, explanations or definitions of analogy categories, and so forth, as will be discussed in more detail below.

Figure 18:
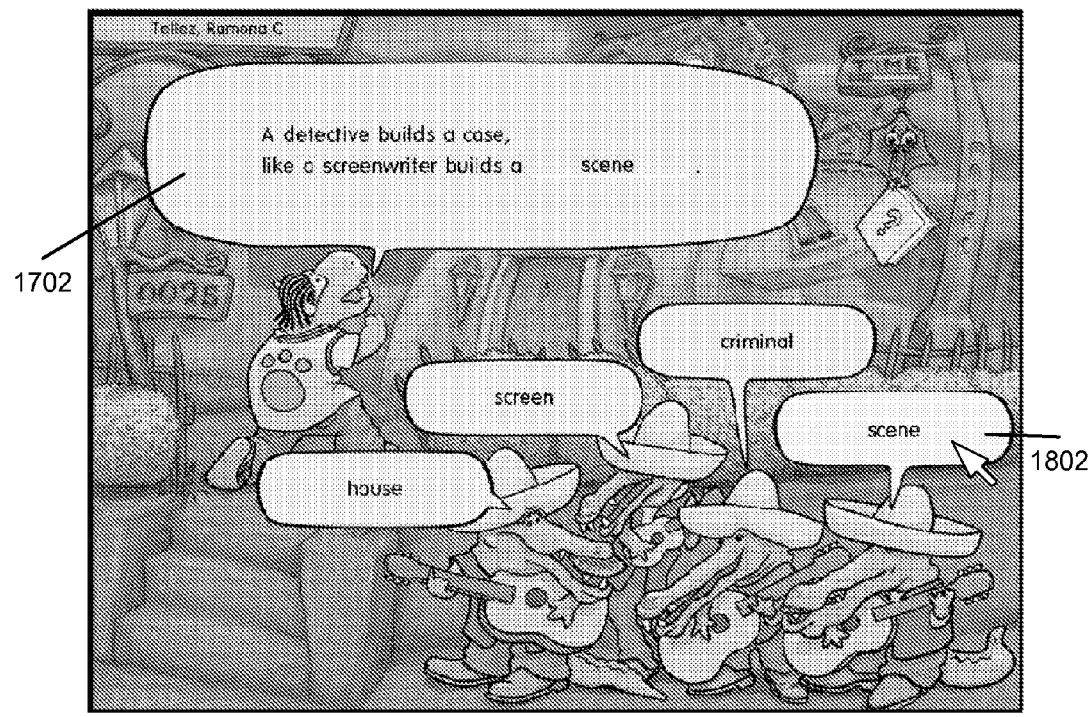

In 1408, the student may be required to select a word from the plurality of words to complete the analogy, e.g., by clicking on the word, although any other means for selection may also be used as desired. For example, in one embodiment, voice recognition technology may be used that allows the student to select the word verbally, e.g., by speaking the word. FIG. 18 illustrates an exemplary screenshot showing student selection of the (correct) word "scene" 1802 to complete the example incomplete analogy 1702 of FIG. 17.

As FIG. 14 also shows, in 1410, a determination may be made as to whether the student selected the correct word, and the result stored. As with the previously described exercise, this result may then be used to drive further operations, such as, for example, the awarding of points to the student, and so forth. Moreover, such results from multiple trials may be used to determine and/or guide the student's progress through the exercise, e.g., by influencing the difficulty of subsequent analogies. For example, once all the trials in a unit have been performed, the student's degree of success for the unit may be ascertained, and may be used to determine the next unit, level, or stage, to be performed.

As described above, in preferred embodiments, an indication, i.e., graphical and/or audial, may be provided as to the student's correctness (or incorrectness), e.g., via speakers or headphones. For example, a "thunk" sound may be played indicating incorrectness, or a "ding" may be played indicating correctness. In some embodiments, the facial expression of the character may also provide such an indication, e.g., smiling, etc., when the selection is correct. Of course, any other types of indication may be used as desired. For example, in one embodiment, as may be seen in FIG. 18, the correct selection of the word may result in highlighting of the word or the speech balloon containing the word, e.g., in yellow, and the word may be put in place (in the blank) to complete the analogy 1702. A "ding" may be played, and points may be awarded based on the correctness of the response. In one embodiment, if bonus points are earned, a special indication may be provided, e.g., 3 dings may be played. Additionally, in some embodiments, a "correct" reward animation may be played.

Similarly, in one embodiment, if the selection is incorrect, a "thunk" may be played, and the speech balloon containing the correct word may be highlighted, e.g., in white, and the incorrect ones grayed out. Additionally, the correct word may be put in place (in the blank) to complete the analogy. The student may then be given some time, e.g., 2 seconds, to read the completed analogy before proceeding to the next analogy.

As FIG. 14 also indicates, additional incomplete analogies from the set of analogies may be presented, where, as described above, the student is required to select an appropriate word (from additional pluralities of words), and the correctness or incorrectness of each selection determined and stored, as described above. At the end of each trial, if the unit is not completed, the next trial may automatically be presented. In various embodiments, the analogies for a unit may be presented according to a specified order, or may be presented randomly, as desired. Thus, the presenting, the requiring, and the determining may be performed for each analogy in the set of analogies to build vocabulary skills and improve accuracy and fluency in critical thinking and abstract reasoning.

Moreover, in preferred embodiments, the presenting the incomplete analogy, the presenting the plurality of words, the requiring, and the determining may be repeated for each analogy in the set of analogies, where the repeating builds vocabulary skills and improves accuracy and fluency in critical thinking and abstract reasoning in the student. In other words, the student may be exposed to the analogy set (one analogy at a time, in the manner described above) multiple times to facilitate development of the student's vocabulary and reasoning skills. As noted above, such repetition may occur in a plurality of sessions over days, weeks, or even months. Additionally, in some embodiments, the set of analogies may be included in a plurality of analogy sets, and the method may include performing the repeating for each analogy set in the plurality of analogy sets. For example, in one embodiment, each analogy set from the plurality of analogy sets may be associated with a unit directed to analogies from the analogy set, and performing the repeating for each analogy set in the plurality of analogy sets may include performing trials in each unit of a plurality of units for each level of a plurality of levels, as will be described in more detail below.

As the student completes the trials (e.g., 5 trials) in each category (e.g., from the subset), that category may be grayed out, and may not be available for selection (e.g., until possibly presented as part of another subset of categories). In other words, only the categories not completed for the current evaluation may be active. Once all the categories in the subset have been completed, a new subset of categories may be presented, from which the student may select the next category in which to work. A unit may include trials directed to a specified number of such subsets of categories. For example, in one embodiment, a unit may include all trials for a single subset, e.g., four, of the analogy categories. Thus, if each category includes five trials, and each subset includes four categories, the number of trials in a unit is 20, although other schemes are also contemplated.

As mentioned above, in some embodiments, the exercise may include multiple levels, i.e., progression levels, that determine various aspects of the trials presented to the student, and/or additional information that may be made available to the student. For example, in one embodiment, in stage 1 of the exercise (i.e., the analogy completion portion described above with reference to FIG. 14), the student may begin at level 1, where, if the student selects a category for the first time, a definition for the selected analogy type (category) may be presented (may be displayed on the screen). The student may dismiss the definition when ready to begin trials in the category, e.g., by clicking on a "done reading" button or equivalent.

In level 1 trials, the analogies may be presented with context sentences that make the relationship explicit (e.g., "Banana is a kind of fruit, like cucumber is a kind of _____"). In subsequent levels, e.g., levels 2-4, the analogies may be presented in a non-supportive carrier sentence (e.g., "Banana is to fruit, as cucumber is to _____"). After completing the trials for the category, e.g., after 5 trials have been performed, the student may return to the selection screen and choose another category. After the student has completed all trials in each category, the trials may be evaluated.

In addition to the definitions provided initially in level 1, in some embodiments, the student may have access to definitions of selected terms throughout the exercise, e.g., via a dictionary icon, although use of the definitions may result in reduced points. For example, during stage 1 (analogy completion) brief definitions may be available for one or more vocabulary words. A student who needs a word defined may be able to click on a question mark on the dictionary, and a list of the words defined for that trial may appear. The student can then click on a word to display a definition. For example, in some embodiments, if the student clicks on the question mark on the book (dictionary), dictionary pages may appear with a list of words from the current trial on the top page. The student may then click on a question mark (?) next to the word he/she needs defined. The question mark may change to an arrow and a definition of the word may appear on the bottom page of the dictionary. Note that if a previous definition is displayed, it may be replaced and its icon changed back to the question mark.

At least one definition (the key vocabulary word) may be defined for each trial. However, as noted above, use of this support may result in reduced points for a correct trial. Also, as described above with reference to FIG. 15, in some embodiments, on the selection screen, the student may click on a question mark icon next to each analogy type to read a definition for that type, although other means of definition invocation may be used as desired. For example, in one embodiment, when the definition for an analogy is invoked, a speech balloon may replace the displayed analogy types, where the speech balloon contains an explanation and example of the analogy type for which the question mark was selected. In one embodiment, in level 1, when the student clicks on an analogy type, if the student has not previously selected the analogy type, the definition or explanation (and possibly example) for the selected analogy type may automatically appear on the screen, e.g., in a speech balloon. As with the word definitions, a done reading button (or functional equivalent) may be displayed, which the student may click when ready to move on. When the student clicks the button, the speech balloon may be replaced by the analogy types. Once the student has selected the analogy type, the screen may change to a pre-trial screen with OR button, e.g., as described above with reference to FIG. 16.

After all trials for the selected category are completed, the selection screen may reappear with completed categories grayed out and unavailable, i.e., only the categories not completed for the current evaluation may be active. This selection and performance may continue until the trials in each of the presented categories have been completed, i.e., until the unit is done, after which a new subset of categories may be presented, and so forth.

Figure 19:
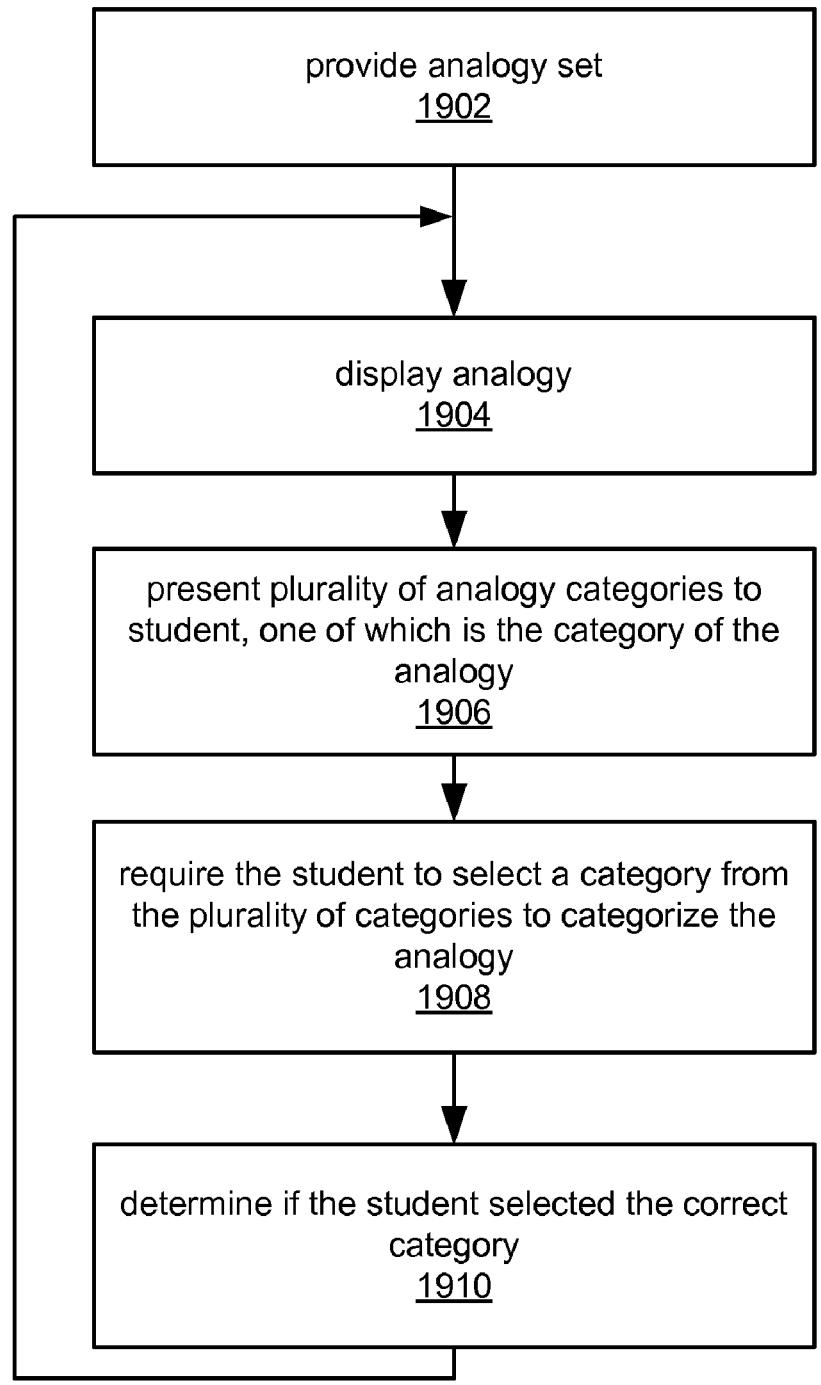
FIG. 19 is a high-level flowchart of a computer-implemented method for building vocabulary skills and improving accuracy and fluency in critical thinking and abstract reasoning by working with important semantic/grammatical relationships among words in an analogy categorization task, according to one embodiment.

FIG. 19—Method for Building Vocabulary Skills and Improving Accuracy and Fluency in Critical Thinking and Abstract Reasoning Via Analogy Categorization As noted above, in some embodiments, the exercise (i.e., the Gator Jam exercise) may include a second stage or task, where, for example, the second stage is directed to categorization of presented analogies. FIG. 14 is a flowchart diagram of one embodiment of another computer-implemented method for building vocabulary skills and improving accuracy and fluency in critical thinking and abstract reasoning by working with important semantic/grammatical relationships among words. More specifically, the method is directed to the second stage of the Gator Jam exercise, wherein the student categorizes analogies according to a variety of analogy categories. As above, in various embodiments, some of the method elements described may be performed concurrently, in a different order than described, or may be omitted. Additional method elements may be performed as desired. As FIG. 19 shows, the method may be performed as follows:

In 1902, a set of analogies may be provided. In one embodiment, the set of analogies may include analogies in each of a plurality of categories, including, for example, synonyms, antonyms, categories, features, cause and effect, tools, and grammatical forms, among others. A more complete list of such categories is provided below.

Figure 20:
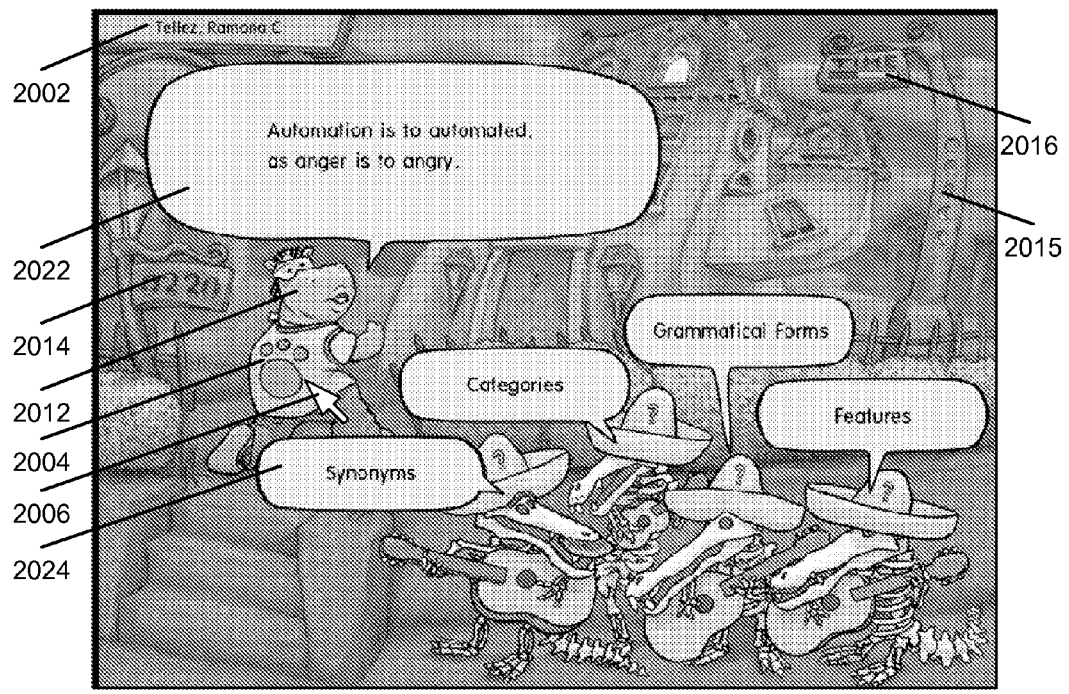
FIGS. 20 and 21 are exemplary screenshots illustrating a trial in the analogy categorization task of the Gator Jam exercise, according to one embodiment.

In 1904, an analogy (from the set of analogies) may be displayed. FIG. 20 is illustrates an exemplary screen shot of the GUI for the second stage of the Gator Jam exercise. As may be seen, similar to stage 1 of the exercise, the screen includes the name of the student 2002, an initiation button, in this case, a selection paw 2004, also referred to as an OR button, and a cursor 2006. To begin a trial, the student may move the cursor 2006 over the selection paw 2004 and indicate the selection, e.g., by clicking the mouse. The screen further includes a main character 2012, in this case, the hippopotamus of the previous stage, secondary characters 2008, in this case, skeletal alligators, a score indicator 2014, progress markers 2015 indicating progress through the exercise, and a time indicator 2016. Similar to above, the score indicator 2014 may add points to the students score as the student correctly responds to trials, and the time indicator 2016 may provide a graphical illustration of the relative time left for the exercise. Play may begin when the student selects the selection paw 2004, at which point an analogy 2022 may be presented. As FIG. 20 shows, in this particular case, the presented analogy 2022 is: "Automation is to automated, as anger is to angry."

In 1906, a set of analogy categories may be presented to the student, e.g., from the plurality of categories, where one of the presented categories is that of the presented analogy. As may be seen, in the example of FIG. 20, the categories presented are: "Synonyms", "Categories", "Grammatical Forms", and "Features", although it should be noted that these are but exemplary categories, and many other additional analogy categories are also contemplated as being included in the analogy categories used.

Figure 21:
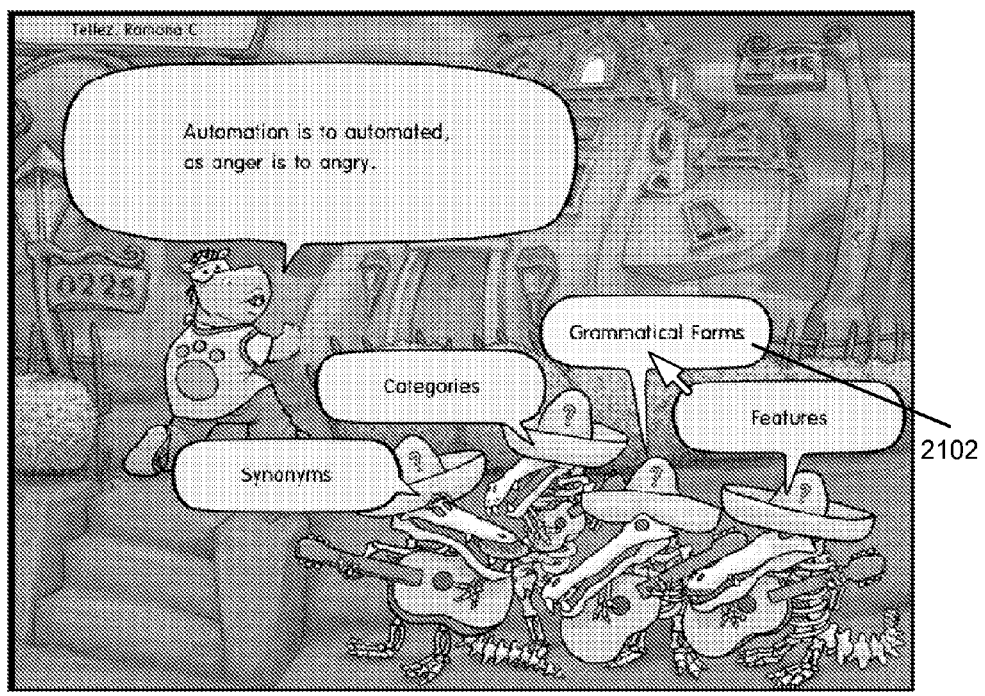

In 1908, the student may be required to select a category from the set of categories to categorize the presented analogy 2022. For example, the student may click on the speech balloon that contains the selected category. FIG. 21 illustrates the student's selection of "graphical forms" 2102, since the analogy 2022 is directed to different grammatical forms of the words automate and anger.

In 1910, a determination may be made as to whether the student selected the correct analogy category, and the result stored. As described previously, this result may then be used to drive further operations, such as, for example, the awarding of points to the student, and so forth. Moreover, such results from multiple trials may be used to determine and/or guide the student's progress through the exercise. For example, once all the trials in a unit have been performed, the student's degree of success for the unit may be ascertained, and may be used to determine the next unit, level, or stage, to be performed.

As described above, in preferred embodiments, an indication, i.e., graphical and/or audial, may be provided as to the student's correctness (or incorrectness), e.g., via speakers or headphones. For example, a "thunk" sound may be played indicating incorrectness, or a "ding" may be played indicating correctness. In some embodiments, an animation of the main character and/or the secondary characters may also provide such an indication when the selection is correct, e.g., a "correct" animation may be presented. Of course, any other types of indication may be used as desired. For example, in one embodiment, as may be seen in FIG. 18, the correct selection of the category may result in highlighting of the category or the speech balloon containing the category, e.g., in yellow. A "ding" may be played, and points may be awarded based on the correctness of the response. In one embodiment, if bonus points are earned, a special indication may be provided, e.g., 3 dings may be played. Note that in one embodiment, this stage, e.g., stage 2, the categorization stage, may allow the student to move through it quickly, and so while short standard "correct" animations may play, no reward animations may be played during this stage.

Similar to the above stage, in one embodiment, if the selection is incorrect, a "thunk" may be played, and the speech balloon containing the correct category may be highlighted, e.g., in white, and the incorrect ones grayed out. The exercise (or stage) may pause for a short time, e.g., for 1 second, to allow the student to read the analogy before moving on.

As FIG. 19 also indicates, additional analogies from the set of analogies may be presented, where, as described above, the student is required to select an appropriate category (from additional pluralities of categories), and the correctness or incorrectness of each selection determined and stored, as described above. At the end of each trial, if the unit is not completed, the next trial may automatically be presented. In various embodiments, the analogies for a unit may be presented according to a specified order, or may be presented randomly, as desired. Similarly, the particular group or subset of categories for a unit may be presented randomly, or in accordance with a specified order. Thus, the displaying, the presenting, the requiring, and the determining may be performed for each analogy in the set of analogies to build vocabulary skills and improve accuracy and fluency in critical thinking and abstract reasoning.

Moreover, as with stage 1, in preferred embodiments, the displaying the analogy, the presenting the set of categories, the requiring, and the determining may be repeated for each analogy in the set of analogies in an iterative manner, where the repeating builds vocabulary skills and improves accuracy and fluency in critical thinking and abstract reasoning in the student. In other words, the student may be exposed to the analogy set (one analogy at a time, in the manner described above) multiple times to facilitate development of the student's vocabulary and reasoning skills. As noted above, such repetition may occur in a plurality of sessions over days, weeks, or even months. Additionally, in some embodiments, the set of analogies may be included in a plurality of analogy sets, and the method may include performing the repeating for each analogy set in the plurality of analogy sets. In one embodiment, each analogy set (or subset) from the plurality of analogy sets may be associated with a unit directed to analogies from the analogy set, and performing the repeating for each analogy set in the plurality of analogy sets may include performing trials in each unit of a plurality of units for each level of a plurality of levels, as will be described in more detail below.

Moreover, in preferred embodiments, the exercise may include performing units in each of the two stages (of Gator Jam) described above, where, for example, the student may perform units at various levels in stage 1, and then may perform units at various levels in stage 2. In one embodiment, over the course of the exercise the student may switch back and forth between the two stages numerous times, until all units at all levels of both stages have been performed (possibly over multiple sessions, of course).

As with stage 1 of Gator Jam, in some embodiments, in stage 2, a dictionary icon may be provided whereby the student may invoke help for the trial, e.g., analogy category definitions, explanations, examples, and so forth. For example, referring again to FIGS. 20 and 21, note that in this embodiment, each of the alligators has a hat marked with a question mark. The student may click on the question mark of a particular hat to invoke help regarding the analogy category or type presented by that alligator. For example, in response to such an invocation, the speech balloons with the analogy types may disappear, and a speech balloon with the definition of the analogy type may be displayed. As with the previously described help invocations, a done reading button (or equivalent) may also be displayed in the speech balloon, whereby the student may dismiss the help information and return to the trial.

Exemplary Content and Progression

The following presents an exemplary embodiment of a content set for the above-described exercise (Gator Jam), although it should be noted that the information is exemplary only, and is not intended to limit the exercise to any particular set of analogies, analogy categories, or progression sequence or criteria. Note that some of the information provided below is directed to stage 1 (analogy completion), while other information is directed to stage 2 (analogy categorization).

Overview

| Level | Key Vocabulary | Content |
|---|---|---|
| 1 | Easy | 80 novel analogies |
| 2 | Easy | 80 analogies repeated from Level 1 with non-supportive context |
| 3 | Hard | 240 novel analogies, non-supportive context |
| 4 | Challenge | 80 novel analogies, son-supportive context |
| | | Total Content = 400 unique analogies |

| Level | Vocab words | Analogy types | Groups (5 items of same type) | Items per group | Sets (4 groups; Set = Unit) | Trials per Unit Completion Stage | Trials per Unit Categorization Stage | Trials per Level |
|---|---|---|---|---|---|---|---|---|
| 1 | 20 | 12 | 16 | 5 | 4 | 20 | 0 | 80 |
| 2 | | | 16 | 5 | 4 | 20 | 20 | 160 |
| 3 | 55 | 12 | 48 | 5 | 12 | 20 | 20 | 480 |
| 4 | 20 | 11 | 16 | 5 | 4 | 20 | 20 | 160 |
| | 95 | | | | 24 | | | 880 |

Key Vocabulary

| EASY <=4th grade level | | HARD 5th-7th grade level | | CHALLENGING >=8th grade level |
|---|---|---|---|---|
| involve | autobiography | geography | photograph | regeneration |
| inside | autograph | hemisphere | porter | reformation |
| uniform | conform | horizontal | prehistoric | intrusive |
| form | conversation | import | prejudice | ingestion |
| artist | credulous | incredible | prescribe | dissent |
| scientist | critical | innumerable | respiration | disarmament |
| dentist | destruction | inspect | signature | intersection |
| atmosphere | disbelief | international | significant | interference |
| telescope | discourage | interpret | spectacle | transformation |
| telephone | discredit | interval | spectator | translucent |
| television | distasteful | massive | symphony | preamble |
| microscope | durable | microphone | thermometer | precedent |

-continued

| EASY <=4th grade level | | HARD 5th-7th grade level | | CHALLENGING >=8th grade level |
|---|---|---|---|---|
| detective | endanger | misfortune | translate | seismograph |
| relative | enlarge | misrepresent | transmit | oceanography |
| hasty | enrage | negative | transport | automation |
| angry | enrich | notable | typical | autonomy |
| easy | exclusive | paragraph | vital | stratosphere |
| movement | festive | passport | | representative |
| payment | formula | perimeter | | navigable |
| experiment | | | | variable |

Glossary Definitions:

Definitions may be provided in a built-in glossary for key vocabulary terms and "unfamiliar" context terms. Note that both objective and subjective criteria may be used to determine whether a term should be considered "unfamiliar" in this context. As used herein, in general, a word may be considered "unfamiliar" if it appears on the fifth or sixth grade list in the Children's Writer's Word Book (Mogilner) or on any of the academic word lists in The Reading Teacher's Book of Lists (Fry et al). Educated judgements have been made to eliminate from this set words that were likely to be familiar to most 4th graders, and to add words that were likely to be unfamiliar to many 5th graders.

Exemplary Content Stats (Summary):

The following 12 analogy types may be presented at least once in levels 1, 2, and 3 (Creator and Creation is not included in level 4). Some analogy types may be presented in multiple sets within each level.

| | Analogy type | Easy Analogies | Hard Analogies | Challenging Analogies | Total |
|---|---|---|---|---|---|
| 1 | Synonyms | 5 | 35 | 15 | 55 |
| 2 | Antonyms | 5 | 30 | 15 | 50 |
| 3 | Weaker and Stronger | 5 | 20 | 5 | 30 |
| 4 | Categories | 10 | 10 | 5 | 25 |
| 5 | Part to Whole | 5 | 15 | 5 | 25 |
| 6 | Grammatical Forms | 10 | 25 | 10 | 45 |
| 7 | Features | 10 | 35 | 5 | 50 |
| 8 | Locations | 5 | 15 | 5 | 25 |
| 9 | Cause and Effect | 5 | 10 | 5 | 20 |
| 10 | Creator and Creation | 5 | 5 | 5 | 15 |
| 11 | Functions | 10 | 25 | 5 | 40 |
| 12 | Tools | 5 | 15 | 0 | 20 |
| | Total | 80 | 240 | 80 | 400 |

Progression:

Terms:

| Term | General definition | Exercise-specific definition |
|---|---|---|
| Trial | The stimulus and response options presented to a student; response is evaluated as correct or incorrect | Stage 1:<br>Stimulus = incomplete analogy<br>4 Response options: words/phrase to complete analogy<br>Stage 2:<br>Stimulus = Completed analogy<br>4 Response options: analogy type |
| Unit | the smallest group of trials to be evaluated for advancement | Stage 1: A total of 20 trials, taken from a single content set (5 trials from each category)<br>Stage 2: no evaluation |
| Category | a subset of the content set, defined by having common characteristics | The category is defined by the analogy type (e.g., Synonyms):<br>Stage 1: The student selects which analogy type to work on from the selection screen.<br>Stage 2: The student categorizes the analogy by clicking on the correct analogy type |
| Set | content set from which trials are sampled or taken to create a unit | A set of 4 categories (analogy types) presented together |
| Stage | One of multiple activities performed by a student on a set of content; presentation of content is dependent upon passing same content at a previous stage | Stage 1: Completion: student completes the analogy<br>Stage 2: Categorization: student selects the correct analogy type. Stage 2 is presented only after Stage 1 is passed. |
| Level | grouping of sets designated as hierarchically equivalent based on one or more shared attributes | Level: grouped by Vocabulary, Supporting Context<br>Level 1: Easy, supportive context<br>Level 2: Easy, non-supportive context<br>Level 3: Hard, non-supportive context<br>Level 4: Challenging, non-supportive context |

-continued

| Term | General definition | Exercise-specific definition |
|---|---|---|
| Level Attributes | Attributes by which sets are grouped into levels (or sublevels). The attributes and the hierarchy assigned to the attributes may differ across exercises. | Vocabulary (Easy <=$4^{th}$ grade; Hard $5^{th}$-$7^{th}$ grade; Challenge >=$8^{th}$ grade or academic) Context: Supportive vs. Non-supportive context (non-supportive for categorization stage) |

Order of Progression:

In one embodiment, the student may progress through the content in the order in which it is shown in the chart below. The trials within each category may be presented in random order.

| level-id | Set-ids | category-ids | Categories (analogy types) |
|---|---|---|---|
| 1 | 1 | 1, 2, 3, 4 | Synonyms, Antonyms, Weaker and Stronger, Categories |
|  | 2 | 4, 5, 6, 7 | Categories, Part to Whole, Grammatical Forms, Features |
|  | 3 | 6, 8, 9, 11 | Grammatical Forms, Locations, Cause and Effect, Functions |
|  | 4 | 7, 10, 11, 12 | Features, Creator and Creation, Functions, Tools |
| 2 | 1 | 4, 6, 9, 12 | Categories, Grammatical Forms, Cause and Effect, Tools |
|  | 2 | 1, 3, 8, 11 | Synonyms, Weaker and Stronger, Locations, Functions |
|  | 3 | 2, 5, 7, 11 | Antonyms, Part to Whole, Features, Functions |
|  | 4 | 4, 6, 7, 10 | Categories, Grammatical Forms, Features, Creator and Creation |
| 3 | 1 | 1, 4, 6, 7 | Synonyms, Categories, Grammatical Forms, Features |
|  | 2 | 1, 2, 5, 12 | Synonyms, Antonyms, Part to Whole, Tools |
|  | 3 | 1, 3, 6, 7 | Synonyms, Weaker and Stronger, Grammatical Forms, Features |
|  | 4 | 2, 5, 7, 10 | Antonyms, Part to Whole, Features, Creator and Creation |
|  | 5 | 1, 8, 11, 12 | Synonyms, Locations, Functions, Tools |
|  | 6 | 2, 3, 7, 11 | Antonyms, Weaker and Stronger, Features, Functions |
|  | 7 | 1, 8, 9, 12 | Synonyms, Locations, Cause and Effect, Tools |
|  | 8 | 2, 6, 7, 8 | Antonyms, Grammatical Forms, Features, Locations |
|  | 9 | 1, 3, 5, 11 | Synonyms, Weaker and Stronger, Part to Whole, Functions |
|  | 10 | 6, 7, 9, 11 | Grammatical Forms, Features, Cause and Effect, Functions |
|  | 11 | 1, 2, 4, 11 | Synonyms, Antonyms, Categories, Functions |
|  | 12 | 2, 3, 6, 7 | Antonyms, Weaker and Stronger, Grammatical Forms, Features |
| 4 | 1 | 1, 4, 6, 7 | Synonyms, Categories, Grammatical Forms, Features |
|  | 2 | 2, 5, 8, 10 | Antonyms, Part to Whole, Locations, Creator and Creation |
|  | 3 | 1, 2, 6, 9 | Synonyms, Antonyms, Grammatical Forms, Cause and Effect |
|  | 4 | 1, 2, 3, 11 | Synonyms, Antonyms, Weaker and Stronger, Functions |

Evaluation of Trial:

Stage 1, Completion: A trial may be evaluated as correct if the student clicks on the correct word to complete the analogy. Trials that are evaluated as correct may be awarded points. If the student clicks on the dictionary icon, and then answers the trial correctly, the student may receive fewer points, but the trial may still be counted as correct for the purposes of advancement. If the student clicks on the incorrect bin, the trial may be "failed" and the student may receive no points.

Stage 2, Categorization: Trials in the categorization round may not be evaluated for the purpose of advancement, but may be evaluated as correct or incorrect for the purpose of data reporting and awarding of points. A trial may be evaluated as correct if the student clicks on the correct analogy type. Trials that are evaluated as correct may be awarded points. If the student clicks on the dictionary icon, and then answers the trial correctly, the student may receive fewer points, but the trial may still be counted as correct. If the student clicks on the incorrect bin, the trial may be "failed" and the student may receive no points.

Evaluation of Unit:

Stage 1: Completion

A unit is preferably comprised of 20 trials. Each unit may randomly present 5 items from each category as it is selected from the selection screen. The exercise may track the number of correct trials in each category. After 20 trials, the unit may be evaluated for advancement.

Stage 2: Categorization

In Stage 2, the 20 trials from the last unit passed may be randomly presented for categorization. These trials may not be evaluated for advancement.

Advancement:

Stage 1: Completion

In order to pass a unit, the student may be required to answer 18 out of 20 trials correctly (90%), although other passing thresholds may be used as desired. Additionally, the student may be required to answer at least 4 out of 5 trials in each category within the unit correctly. If the unit is passed, the student may advance to the next selection screen presenting the next unit (e.g., level 1 only) or to stage 2 for the current unit (levels 2-4). If the unit is failed, the student may return to the selection screen for the current unit with all categories again available for selection. The student may be required to repeat all trials in the unit and may be given a total of 3 attempts to pass the unit.

Stage 2: Categorization:

Stage 2 trials are not evaluated for advancement.

Plateau Based Transition:

If after 3 attempts, the student has not met the criteria for passing the unit, the student may transition to the next selection screen presenting the next unit. The student may not advance to Stage 2 of a unit if the unit was not passed at Stage 1. After all units in the exercise have been completed (passed or failed 3 times), those units that were not passed may be repeated, using the same progression and rules of advancement as when they were originally presented. The student may continue to work on these units until mastery is achieved.

Exit and Re-Entry:

The student may be allowed to manually exit or time out prior to any trial.

If the student exits during stage 1, completion, and they have not completed the current unit, they may always be returned to the selection screen. If they did not complete all 5 trials of the category they were in when they exited, that category may still be available on the selection screen, and when they select it again, they may be presented with all 5 trials. Those trials previously worked on for that category may not be counted.

If the student exits immediately prior to or during stage 2, categorization, upon re-entry they may be returned to the exact trial from which they exited; they may not be presented with any of the same trials they completed prior to exiting.

Progress Markers:

Progress through the exercise (comparable to percent-through) may be marked by the addition of a total of 5 markers (e.g., moon phases). The first 4 markers may be awarded after 5 units have been passed. The last marker may be awarded after 4 units have been passed. The total number of markers may be 5.

End of Exercise:

The exercise may ends when the student has met passing criteria in all units. It may then return to the wrapper, e.g., the startup screen, via a "Good Job" screen.

Figure 22:
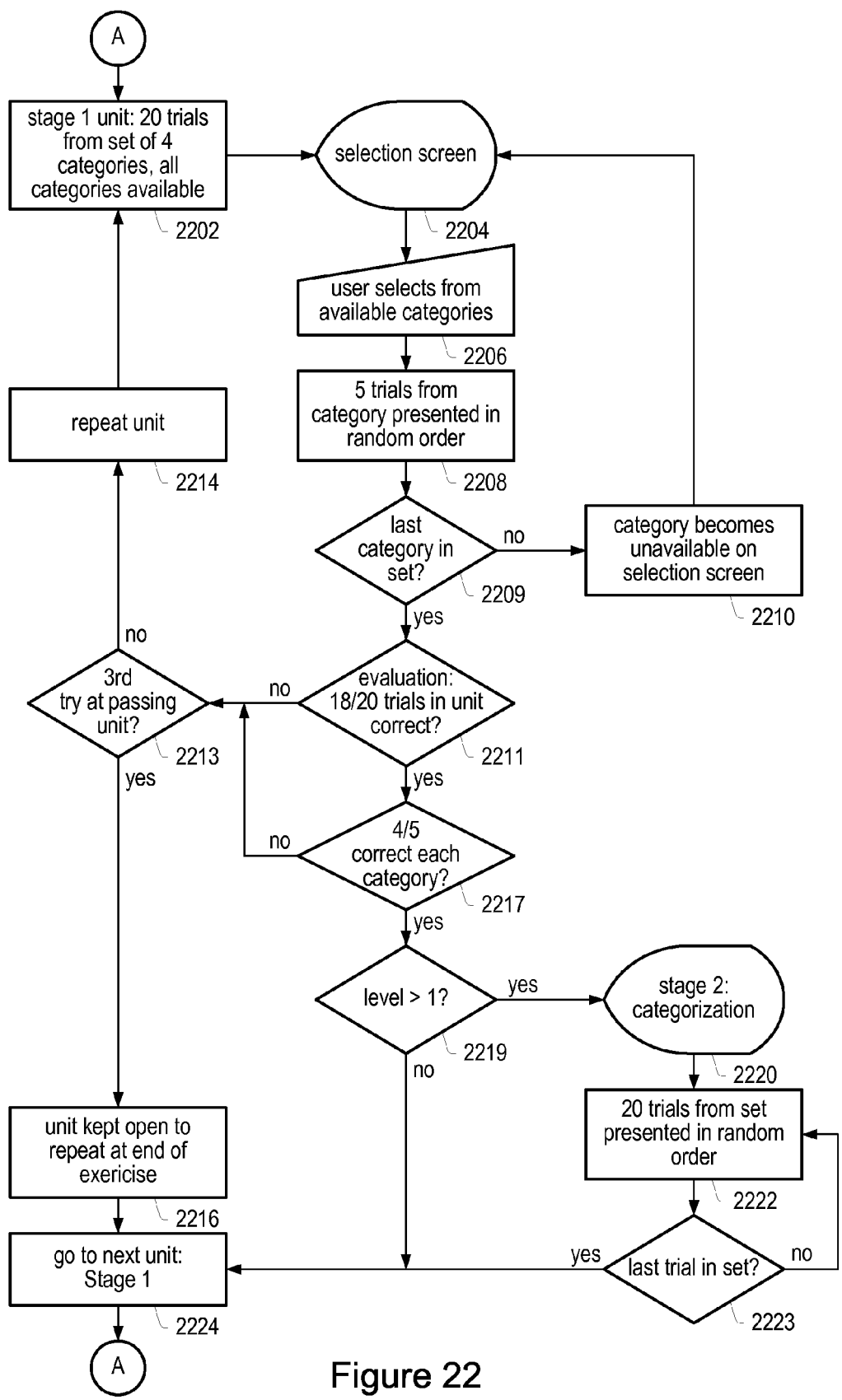
FIG. 22 is a detailed flowchart diagram illustrating progression through the Gator Jam exercise, according to one embodiment.

FIG. 22—Detailed Progression through Gator Jam Exercise

FIG. 22 flowcharts a computer-implemented method for building vocabulary skills and improving accuracy and fluency in critical thinking and abstract reasoning by working with important semantic/grammatical relationships among words via a computing device, according to one embodiment. More specifically, the method is directed to performance of units in the Gator Jam exercise, including units in stage 1 and stage 2 of the exercise. Note that the method of FIG. 22 is applicable to, and may include, the methods of FIGS. 14 and 19 (and vice versa). As noted above, in various embodiments, some of the method elements described may be performed concurrently, in a different order than described, or may be omitted. Additional method elements may be performed as desired. As FIG. 22 shows, the method may be performed as follows:

In 2202, a next unit (initially, for example, a first unit at level 1) in stage 1 (analogy completion) of the exercise may be initialized for performance by the student. In one embodiment, the unit may include 20 trials directed to various sets of a plurality of categories, where, for example, each set may include four categories from the plurality of categories. Examples of analogy categories include, but are not limited to, synonyms, antonyms, weaker and stronger, categories, part to whole, grammatical forms, and features, among others. As described above, the particular sets may be specified for use with regard to performance of particular units, as may be seen above in the Order of Progression table. The categories in a particular set may be presented in a specified order, or in a random order, as desired. Note that as units are performed in sequence, the level may be incremented, e.g., in accordance with the Order of Progression table presented above.

In 2204, a selection screen may be displayed wherein a set (i.e., a subset) of the plurality of categories may be presented to the student. In some embodiments, definitions, explanations, and/or examples, of the presented categories may be available to the student, as described above in detail (see, e.g., FIG. 15 and associated text).

In 2206, user input may be received selecting a category from the presented set of categories. In other words, the student may select, e.g., via a mouse click, one of the presented categories.

In 2208, trials directed to the selected category may be performed. For example, in one embodiment, 5 trials in the selected category may be presented and performed. In various embodiments, the particular trials may be presented and performed in random order, or according to a specified order.

In 2209, a determination may be made as to whether the selected category was the last in the presented set of categories.

If in 2209, it is determined that the selected category is not the last category in the presented set, then in 2210, the category may be made unavailable for re-selection in the current unit. The method may then proceed back to 2204, where the selection screen (with the set of categories) may be displayed, and where, for example, as described above, the category may be grayed out in the display, indicating its unavailability. The method may then continue from 2204 as described above.

If in 2209, it is determined that the selected category was the last category in the presented set, then the current unit has been completed and may be evaluated. In 2211, a determination may be made as to whether a specified level of success has been met by the student with respect to the unit, e.g., whether 18 of the 20 trials in the unit were performed correctly.

If 18 of the 20 trials in the unit were not performed correctly, then in 2213, a determination may be made as to whether the unit has been failed a specified number of times, e.g., if this was the third try at passing the unit.

If the unit has not been failed the specified number of time, e.g., if this was not the third try at passing the unit, then in 2214, the unit may be repeated, as shown, continuing with 2202, and proceeding as described above, initializing and performing trials in the unit. In other words, in 2214, the unit may be marked or otherwise indicated for repeating, and then the method may proceed with 2202, 2204, 2206, and so forth, as described above.

If in 2213, it is determined that the unit has been failed the specified number of times, e.g., three times, then in 2216, the unit may be kept open for performance at the end of the exercise. Thus, any unit that has been failed the specified number of times may be retained (and kept open) for repeat performance by the student at the end of the exercise. The method may then proceed to 2224, described below.

If in 2211, it is determined that the specified number of trials in the unit were performed correctly, e.g., that (at least) 18 of the 20 trials in the unit were performed correctly, then in 2217, a determination may be made as to whether a specified level of success was achieved by the student with respect to trials in each of the presented categories. For example, in one embodiment, the method may determine if $4/5$ (i.e., 80%) of the categories in the unit were performed correctly, i.e., if 80% of the trials in each category of the unit were performed correctly. If not, then the method may proceed to 2213, and continue as described above. Thus, passing the unit may involve multiple criteria, e.g., with respect to the trials in the unit, and with respect to the trials in each category.

If in 2217, it is determined that the specified level of success was achieved by the student with respect to trials in each of the presented categories in the unit (e.g., 80% success in each category, then in 2219, a determination may be made as to whether the current level is greater than one, i.e., if the level>1. If not, then the method may proceed to 2224, described below.

If in 2217 it is determined that the current level is greater than one, then in 2220, a screen for stage 2 of the exercise may be displayed. In other words, the initial screen for the analogy categorization task or stage may be presented to the student.

A next unit of the analogy categorization stage (stage 2) may then be performed. For example, in one embodiment, 20 trials from the plurality of analogies, e.g., from the set of analogies, may be presented and performed, as indicated in 2222. Note that, as above, in various embodiments, the trials may be presented in random order, or according to a specified order, as desired.

In 2223, a determination may be made as to whether there are any more trials in the set to be performed, i.e., whether the trial just performed is the last of the set. If not, then the method may return to 2222, and perform a further trial in the set, and continue as described above. If there are not further trials in the set, then the method may proceed to 2224. Note that in one embodiment, the trials performed in 2222 may be directed to analogies from the unit performed immediately previously in stage 1, where, as indicated in 2219 above, the level is greater than 1.

In 2224, a next unit may be marked or indicated for presentation and performance by the student, and the method may proceed to 2202 and continue as described above. The method may thus proceed in an iterative manner, presenting trials in units in multiple levels, and in both stages (i.e., analogy completion, and analogy categorization), until the exercise has been completed.

As described above, the exercise may be performed multiple times, as well, e.g., over a plurality of sessions, possibly over days, weeks, or even months, to build vocabulary skills and improve accuracy and fluency in critical thinking and abstract reasoning by working with important semantic/grammatical relationships among words.

Exercise 3: Toad Loader

The goal of this exercise (i.e., Toad Loader) is to build accuracy and fluency in recognizing and constructing sentence structures, varying in the use of inflections and grammatical forms.

In this exercise, the student constructs multiple sentences to describe each of a plurality of illustrations, developing the grammatical skills and flexibility to put ideas into words with varied sentence structure. More specifically, the student may build a sentence that describes the associated illustration by selecting the correct words or word groups from a set of foils. Multiple sentences about an illustration may use similar vocabulary with a different grammatical structure, so that the student experiences using different sentences to express similar ideas. In some embodiments, across the exercise, a number (e.g., 15) of grammatical structures are covered, including, for example, passive voice, appositive phrases, and compound sentences, as well as pronouns and articles commonly confused, e.g., by English language learners. Alternate responses may be carefully constructed so that the student must attend to semantic, morphological, and syntactic aspects of the words or word groups they are putting together. As the student progresses, the sentences presented may become longer, use higher-level vocabulary, and may become more grammatically complex.

The exercise may develop various cognitive skills in the student, such as memory, e.g., by using working memory to keep track of available words and phrases while constructing possible sentences, attention, e.g., by selectively attending to grammatical features of words and phrases, processing, by using language processing skills to identify written words and phrases and to construct and analyze possible sentences, and sequencing, by manipulating word order to build a variety of grammatical sentences. Aspects of the exercise may develop the student's sentence structure skill by improving the student's ability to identify and correctly use prepositional phrases, appositives, and independent and dependent clauses; use transitions and conjunctions to connect ideas, and may develop the student's grammar skills by improving the student's ability to identify and correctly use verbs that are often misused (e.g., lie/lay), modifiers, and pronouns. Additionally, usage of articles and pronouns may be targeted, as a feature designed to assist (e.g., English) language students.

Figure 23:
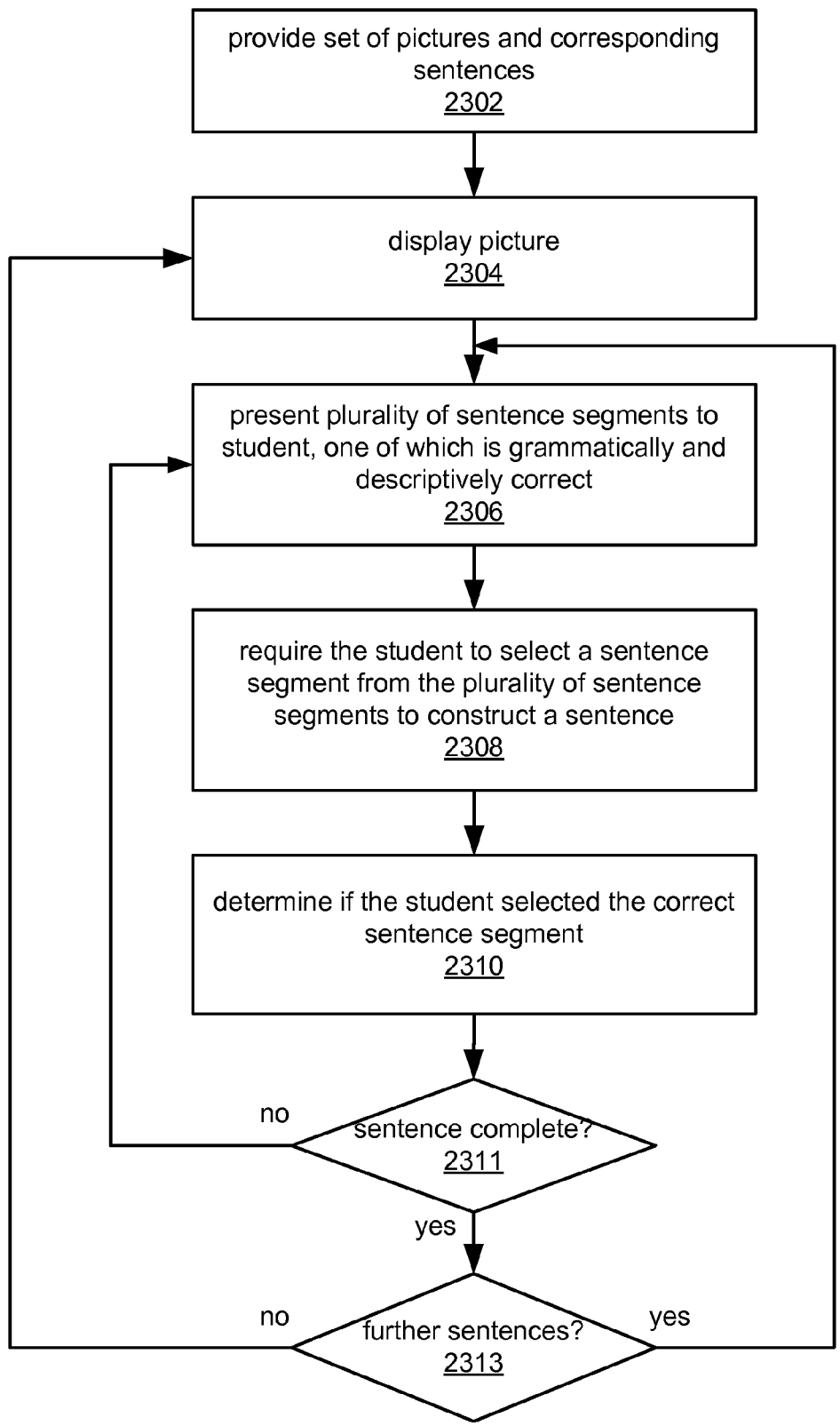
FIG. 23 is a high-level flowchart of a computer-implemented method for building accuracy and fluency in recognizing and constructing sentence structures, varying in the use of inflections and grammatical forms, according to one embodiment.

FIG. 23—Method for Building Accuracy and Fluency in Recognizing and Constructing Sentence Structures FIG. 23 is a flowchart diagram of a method for building accuracy and fluency in recognizing and constructing sentence structures via a computing device, according to one embodiment. As noted above, in various embodiments, some of the method elements described may be performed concurrently, in a different order than described, or may be omitted. Additional method elements may be performed as desired. As FIG. 23 shows, the method may be performed as follows:

In 2302, a set of pictures or illustrations and corresponding descriptive sentences may be provided. As with the above-described exercises, in preferred embodiments, a graphical user interface (GUI) may be provided whereby the exercise may be performed.

Figure 24:
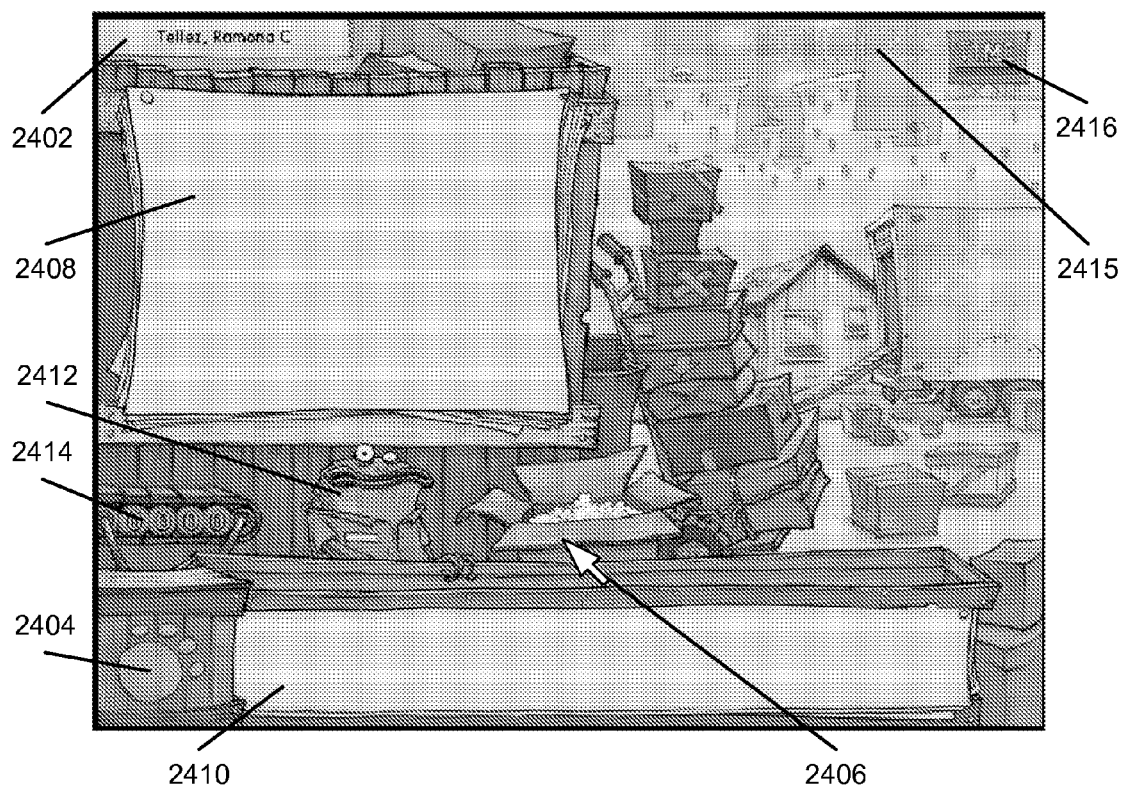
FIG. 24 is an exemplary screenshot of an introductory screen for the Toad Loader exercise, according to one embodiment.

FIG. 24 illustrates an exemplary screenshot 2400 of an introductory screen for the Toad Loader exercise. As FIG. 24 shows, (and as with FIGS. 7 and 16, described above) the screen includes the name of the student 2402, an initiation button, in this case, a selection paw 2404, also referred to as an OR button, and a cursor 2406. To begin a trial, the student may move the cursor 2406 over the selection paw 2404 and indicate the selection, e.g., by clicking the mouse. The screen further includes a main character, in this case, a toad (or frog) 2412, a score indicator 2414, progress markers 2415 indicating progress through the exercise, and a time indicator 2416. The score indicator 2414 may add points to the students score as the student correctly responds to trials. The time indicator 2416 may provide a graphical illustration of the relative time left for the exercise. As FIG. 24 also shows, in this embodiment, a picture display 2408 is provided for displaying pictures, and a sentence box 2410 is included for constructing and displaying descriptive sentences. Exercise play may begin when the student selects the selection paw 2404.

In 2304, a picture from the set of pictures may be displayed, e.g., on a display of a computing device. For example, the picture may include one or more characters (preferably not the main character of the exercise), e.g., anthropomorphic animal characters, performing an action, or involved in an illustrated situation or scene. In one embodiment, an initial portion of a sentence describing the picture may be provided, e.g., in the sentence box 2410, e.g., in a first level (i.e., level 1) of the exercise, although in some embodiments, e.g., in subsequent levels, no initial sentence portion may be provided.

In 2306, a plurality of sentence segments may then be presented, e.g., from the set of corresponding sentences. For example, a set of (e.g., four) words and/or phrases may be presented to the student, where one of the words or phrases may at least partially describe the displayed picture, e.g., may be from a descriptive sentence (from the set of descriptive sentences) corresponding to the picture.

Figure 25:
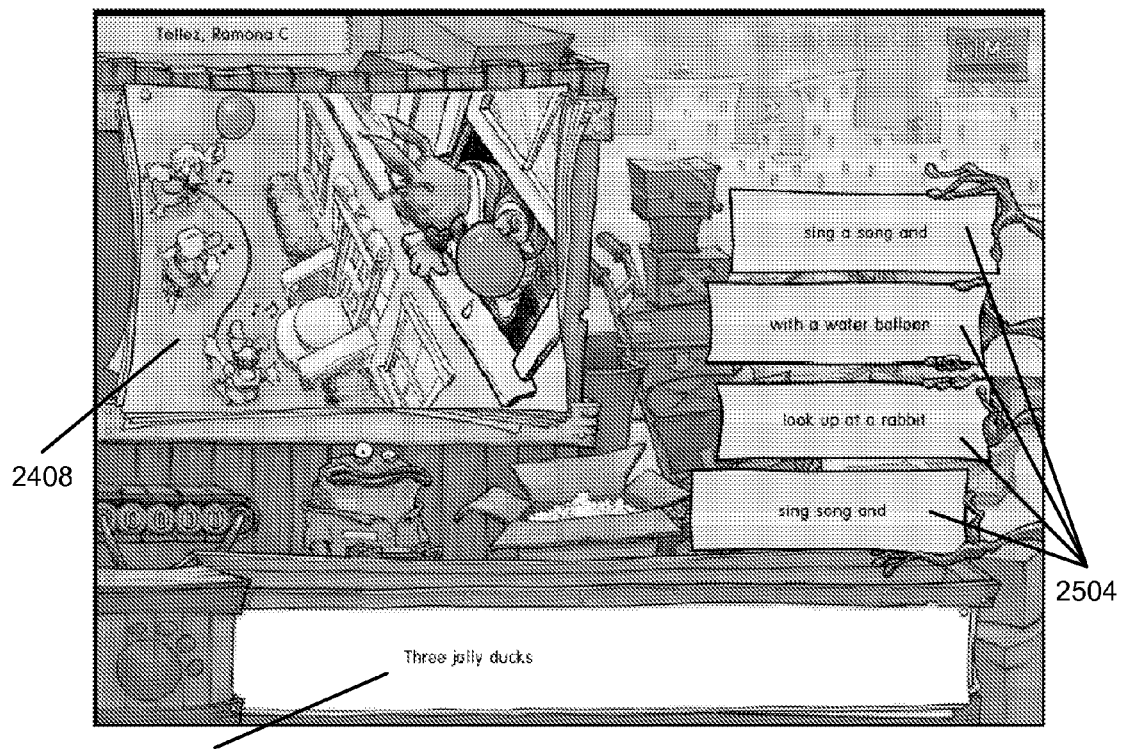
FIGS. 25-29 are exemplary screenshots illustrating trials in the Toad Load exercise, according to one embodiment.

FIG. 25 illustrates another exemplary screenshot from the Toad Load exercise, in this case, at level 1. In this Figure, the picture display 2408 shows a character, e.g., a rabbit, holding a water balloon and looking down from an upper story window at a group of other animal characters, specifically, ducks, singing and playing jump rope. In the sentence box 2410, an exemplary initial sentence portion is shown: "Three jolly ducks". In this example, presented sentence segments 2504 include: "sing a song and", "with a water balloon", "look up at a rabbit", and "sing song and".

In 2308, the student may be required to select a sentence segment from the presented sentence segments that correctly or most appropriately furthers construction of the descriptive sentence, e.g., that is grammatically and descriptively most appropriate, e.g., by clicking on the sentence segment, although any other means for selection may also be used as desired.

Figure 26:
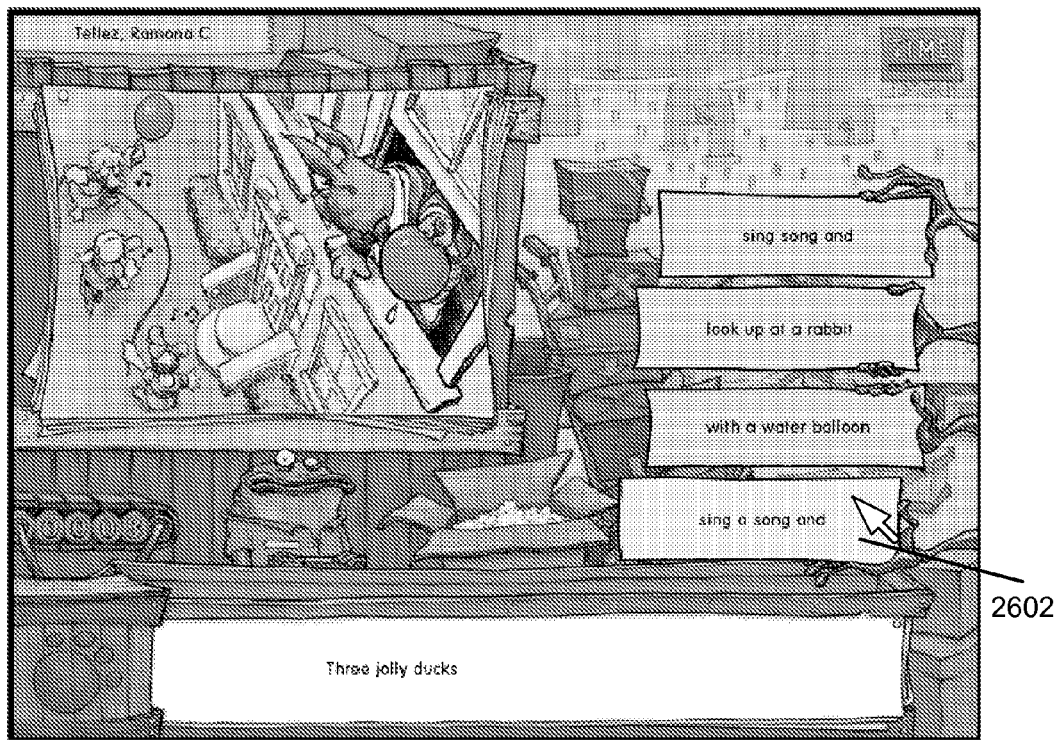

FIG. 26 illustrates user selection of a sentence segment 2602 ("sing a song and"), where the selection is shown highlighted in white.

Once the student has selected a sentence segment, a determination may be made as to whether the selection is correct, as indicated in 2310. Following the example of 2304 and 2306, the correct sentence segment is "sing a song and", as adding this sentence segment to the sentence portion results in the grammatically and descriptively correct sentence fragment: "Three jolly ducks sing a song and".

If the student made the correct selection, the correct sentence segment may be highlighted, e.g., a box containing the sentence segment may be highlighted in yellow, and added to the sentence box 2410, resulting in a grammatically correct sentence portion or fragment, describing the picture, although in some embodiments, the resulting sentence construction may be a complete sentence, as will be described below.

If the student selected in incorrect sentence segment, the correct sentence segment may be highlighted, e.g., a box containing the sentence segment may be highlighted in white, and added to the sentence box 2410, e.g., in blue text, and the incorrect selections or foils may be dimmed or grayed out, or otherwise modified to indicate their incorrectness.

Figure 27:
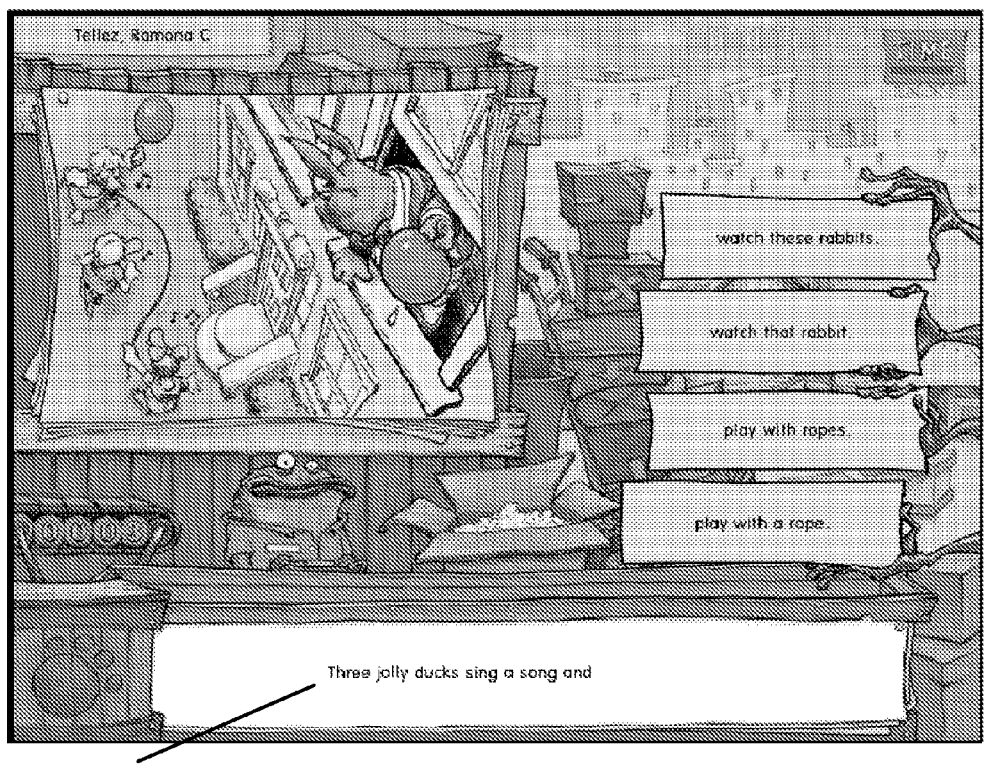

FIG. 27 illustrates the addition of the selected (correct) sentence segment to the sentence box, resulting in the sentence construction: "Three jolly ducks sing a song and" 2702.

Moreover, as with the above exercises, in preferred embodiments, an indication, i.e., graphical and/or audial, may be provided as to the student's correctness (or incorrectness), e.g., via speakers or headphones. For example, a "thunk" sound may be played indicating incorrectness, or a "ding" may be played indicating correctness and points awarded (or, as above, in the case of bonus points, 3 "dings" may be played). In some embodiments, an animation of the main character and/or the secondary characters may also provide such an indication when the selection is correct, e.g., a "correct" animation may be presented. Of course, any other types of indication may be used as desired. In one embodiment, an animation may be presented when the student begins a trial, e.g., the main character may present the picture, and one or more secondary characters may present the sentence segments. Similarly, the removal of previous pictures and/or sentence segments may be animated.

Note that in some embodiments, an incorrect selection may result in failure of the current trial, unit, and/or level, where failed units may be repeated (possibly a number of times) later, e.g., at the end of the current level, and/or at the end of the exercise, as will be described in detail below. For example, in one embodiment, all sentences from failed units for a given picture may be (re)presented before moving on to another picture, and all failed units in a level may be (re)presented before moving on to another level. Thus, in some embodiments, each unit may be performed until either the unit is passed, or the unit has been failed a specified number of times (e.g., 3 times), where the additional performances (beyond the first failure) may be performed just after the first failure, and/or at the end of the level. Moreover, the units that have been failed the specified number of times may be repeated at the end of the exercise until all units have been passed.

In 2311, a determination may be made as to whether the sentence construction is complete, i.e., is a complete sentence. If the sentence is not yet complete, then the current trial is not finished, and the method may proceed to 2306, where a new plurality of sentence segments pertaining to the picture may be presented, and the method may continue as described above until the sentence in the sentence box 2410 is complete. Once the sentence is complete, the student may be given some time, e.g., 2 seconds, to read the completed sentence before proceeding to the next sentence.

Figure 28:
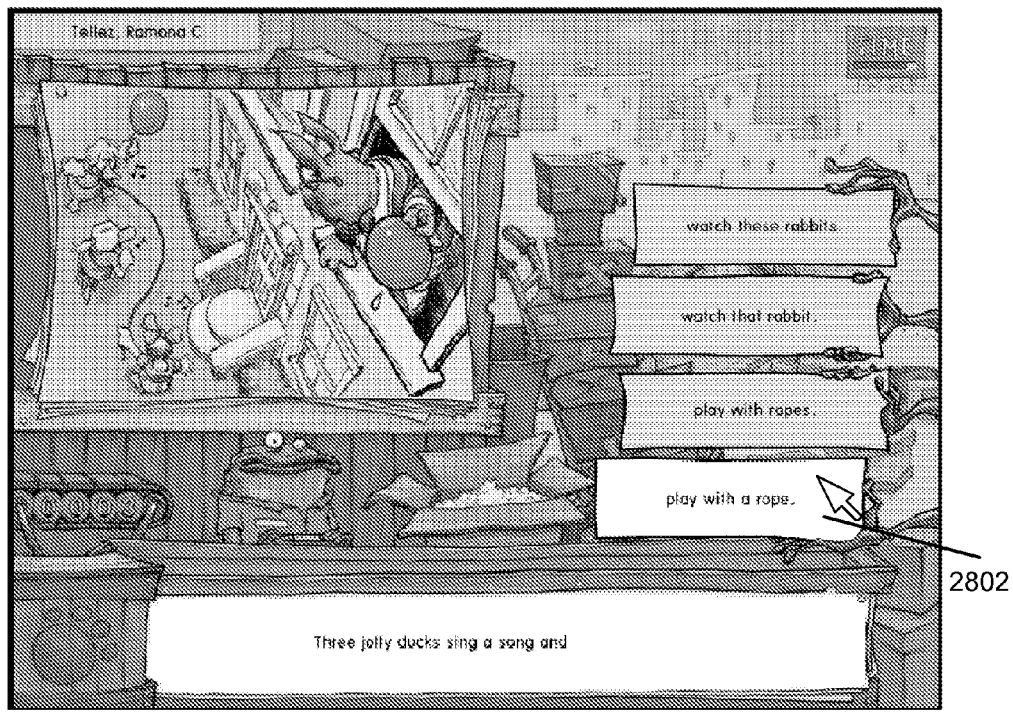
Figure 29:
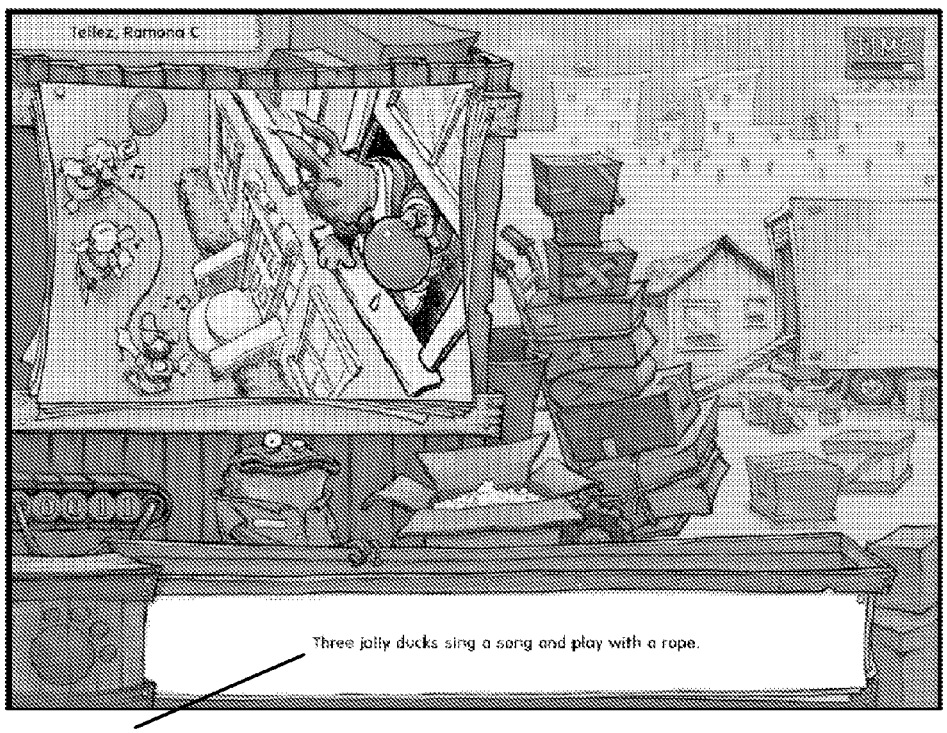

FIG. 28 is an exemplary screen shot of the Toad Loader exercise showing a new set of sentence segments pertaining to the picture, where the presented sentence segments include: "watch these rabbits", "watch that rabbit", "play with ropes", and "play with a rope". As FIG. 28 also indicates, the student has correctly selected "play with a rope" 2802. FIG. 29 is an exemplary screenshot showing the correctly completed sentence 2902: "Three jolly ducks sing a song and play with a rope." In preferred embodiments, the interactive process of sentence construction resulting in a complete sentence composes a trial in the exercise. In other words, there is preferably one trial per sentence, although there may be multiple presentations/responses for each sentence, as described above.

If in 2311, it is determined that the sentence is complete, then in 2313, a determination may be made as to whether there are further sentences to be constructed with respect to the displayed picture. For example, in one embodiment, each picture may have a specified number of associated sentences, e.g., 5, which target multiple grammatical structures. Note that, as described below in detail, in preferred embodiments, each response for each sentence segment may be evaluated as correct or incorrect (see 2310, above) and points awarded after each correct response. However, the entire trial may not be evaluated as correct unless all segments of the sentence have been selected correctly. In this case, additional points may be awarded when the sentence is completed.

If in 2311, it is determined that there are further sentences (i.e., one or more) associated with the current picture, then the method may, for example, clear the sentence box of the previous sentence and remove the previous presented sentence segments, and the method may proceed to 2306, where a new plurality of sentence segments pertaining to the picture may be presented, and the method may continue as described above.

If in 2311, it is determined that there are no further sentences to be constructed with respect to the current picture, then the method may proceed to 2304, where a new picture, i.e., the next picture, may be presented, and the method may continue as described above. In one embodiment, the user may use the initiation button (e.g., selection paw 2404) to invoke the next picture.

Thus, as FIG. 23 indicates, additional pictures from the set of pictures may be presented, where, as described above, the student is required to select appropriate sentence segments, and the correctness or incorrectness of each selection determined and stored, as described above. Note that the various pluralities of sentence segments used to construct a sentence are presented in a specified order (as opposed to randomly), such that the sentence is constructed from beginning to end, i.e., from left to right, in the same way that the completed sentence may be read. In other words, each of the (correct) sentence segments in a unit is successive to the previously presented (correct) sentence segment. Similarly, the trials or sentences directed to a picture may be presented in a specified order, e.g., not randomly. Thus, the displaying, the presenting, the requiring, and the determining may be performed for each sentence or sentence portion directed to each picture in the set of pictures to build accuracy and fluency in recognizing and constructing sentence structures.

Moreover, in preferred embodiments, the displaying the picture, the presenting the plurality of sentence segments, the requiring, and the determining may be repeated for each picture and corresponding group of sentences, where the repeating builds accuracy and fluency in recognizing and constructing sentence structures in the student. In other words, the student may be exposed to the picture/sentence set (one picture/group of sentences at a time, in the manner described above) multiple times to facilitate development of the student's sentence construction, grammar, and reasoning skills. As noted above, such repetition may occur in a plurality of sessions over days, weeks, or even months. Additionally, in some embodiments, the set of pictures/sentences may be included in a plurality of picture/sentence sets, and the method may include performing the repeating for each picture/sentence set in the plurality of picture/sentence sets.

As the student completes the trials (e.g., 5 trials) for each picture, the student may progress through a plurality of levels, where, for example, the sentence construction may be increasingly difficult or subtle, and/or may be focused on various different structural elements. In one embodiment, a unit may refer to trials directed to a respective (sentence) structure type within a level, where, for example, the number of trials in each unit may vary between units. Detailed information regarding units, levels, and progression through them, is provided below.

Thus, performing the repeating for each picture/sentence set in the plurality of picture/sentence sets may include performing trials in each unit of a plurality of units for each level of a plurality of levels, as will be described in more detail below. As also indicated above, such performing with respect to the multiple picture/sentence sets may itself be repeated in an iterative manner, e.g., over a plurality of sessions, as described above, to facilitate development of the student's sentence construction, grammar, and reasoning skills.

In one embodiment, the method may also include performing introductory or training trials, where, for example, initially instructions may be provided explaining what is expected of the student in the exercise, and then example trials performed where the correct sentence segments are indicated to the student. After the introductory or training trials are completed, the student may begin the actual trials of the exercise, as described above.

Exemplary Content and Progression

The following presents an exemplary embodiment of a content set for the above-described exercise (Toad Loader), although it should be noted that the information is exemplary only, and is not intended to limit the exercise to any particular set of pictures, sentences, sentence segments, or progression sequence or criteria.

Overview:

| Level | Vocab | Sentence Type | Stem | Sentence Length | Grammar Structures (unit) | Trials per Structure (unit) | Trials | Pictures |
|---|---|---|---|---|---|---|---|---|
| 1 | Easy | All | yes | 4-16 | 15 | 4 | 60 | 12 |
| 2 | Easy | Low to Moderate Complexity | no | 4-12 | 11 | 9-10 | 100 | 20 |
| 3 | Hard | Low to Moderate Complexity | no | 4-12 | 11 | 9-10 | 100 | 20 |
| 4 | Easy | Moderate to High Complexity | no | 10-24 | 10 | 10 | 100 | 20 |
| 5 | Hard | Moderate to High Complexity | no | 10-24 | 10 | 10 | 100 | 20 |
| Total | | | | | 57 | | 460 | 92 |

Vocabulary:
Easy vocabulary items may use 4th grade level terms or lower. Hard vocabulary items may also include 5th & 6th grade level terms and academic terms.

Grammatical Structures:
There may be a total of 15 grammatical structures. Multiple grammatical structures may be distributed across each level. For example, in one embodiment, the first (introductory) level, may expose students to all 15 of the targeted grammatical structures. Levels 2 and 3 may contain 11 structures that can occur in simple sentences. Levels 4 and 5 may contain 10 structures. Five relatively simple structures (which are not in some (e.g., California) curriculum standards) may not be included in these levels. Two structures that involve non-simple sentences may be added in these levels.

| Structure type-id | Structure type | Sentence sample | Levels |
|---|---|---|---|
| 1 | Attributive/stative: SV | The girl is quick. | 1, 2, 3 |
| 2 | Simple negation | The boy is not walking a dog. | 1, 2, 3 |
| 3 | Infinitival complement to verb | The girl asked to hold the baby. | 1, 2, 3 |
| 4 | Passive voice: OVS present & past | The apple was eaten by the girl in red. | 1, 2, 3 |
| 5 | *Articles: definite & indefinite | She swims twice a week. | 1, 2, 3 |
| 6 | *Appositive phrase | Mr. Smith, the political candidate, is saluting the stallions. | ALL |
| 7 | *Prep phrases mod S, V, or O | The kids jump on the bed. | ALL |
| 8 | *Prep phrases + sentence | Inside the cave there is a bear sleeping soundly. | ALL |
| 9 | *Pronoun (case & person/order) | She and I will go to the parade. | ALL |
| 10 | *Commonly misused verbs | All that sawing raises a cloud of sawdust. | ALL |
| 11 | *Simple Modifier | He will sweep the sidewalk completely clean. | ALL |
| 12 | Subject relativization: S + mod + VO | The woman who chases the dog has a stick. | 1, 4, 5 |
| 13 | Object relativization: SVO + mod | The baby pets a dog that is sleeping. | 1, 4, 5 |
| 14 | *Complex Sent. (Independent and Dependent Clauses with Transition) | The criminal was holding a bag of money, when the sheriff grabbed him. | 1, 4, 5 |
| 15 | *Compound Sent. (Multiple Independent Clauses with Conjunction or Transition) | The criminal was hoping to escape; however, the sheriff grabbed him. | 1, 4, 5 |

*New structures (not covered in "Language Comprehension Builder" in Fast ForWord Language or "Twisted Pictures in Fast ForWord to Reading 3)

Foils:

Each item may have at least one grammatical foil and at least one semantic foil. Grammatical foils may be semantically appropriate but ungrammatical in the target position and/or following the preceding fragments. Semantic foils may refer to items, actions, or relationships not relevant to the picture or semantically inappropriate for some other reason (e.g., repeating already stated information).

Progression:

| Term | General definition | Exercise-specific definition |
|---|---|---|
| Trial | Stimulus and response options presented to a student; response is evaluated | Level 1: Stimulus = picture + sentence stem<br>Level 2: Stimulus = picture only<br>Response options: 4 response options presented for each remaining sentence segment; all segments must be correct to evaluate trial as correct |
| Unit | the smallest group of trials to be evaluated for advancement | Within a level, all trials (sentences) of the same structure type. These trials will be distributed across entire level.<br>Level 1: 15 units, 4 trials each<br>Levels 2, 3: 11 units, 9-10 trials each<br>Levels 4, 5: 10 units, 10 trials each |
| Level | Grouping of content designated as hierarchically equivalent based on one or more shared attributes | Levels 1-5: grouped based on Vocabulary, Sentence Type, and Sentence Length. |
| Level Attributes | Attributes by which content is grouped into levels (or sublevels). The attributes and the hierarchy assigned to the attributes may differ across exercises. | Level 1: introductory level presents easy, short sentences, all sentence structures and includes sentence stem.<br>Other levels are grouped based on:<br>Vocabulary: difficulty level of vocabulary<br>Easy $4^{th}$ grade or lower<br>Hard: $5^{th}$ and $6^{th}$ grade + academic<br>Sentence type: simple, compound/complex<br>Sentence Length: Ave. # of words in passage: |

Order of Progression:

The student may progress through the content by level as shown in the chart below. The pictures may be presented in random order within a level. The trials (sentences) for a given picture may not be presented randomly, but may be presented sequentially, e.g., based on sentence number.

| Level | Picture Id | Sentence id (per picture) | Units | Advancement Criteria |
|---|---|---|---|---|
| 1 | 1-12 | 1-5 | 15 | 4/4 |
| 2 | 13-32 | 1-5 | 11 | 8/9, 9/10 |
| 3 | 53-72 | 1-5 | 11 | 8/9, 9/10 |
| 4 | 33-52 | 1-5 | 10 | 9/10 |
| 5 | 73-92 | 1-5 | 10 | 9/10 |

Evaluation of Trial:

A trial may be considered to be ALL segment selections for a given sentence. Each response for each sentence segment may be evaluated as correct or incorrect and points awarded after each correct response. However, the entire trial may not be evaluated as correct unless all segments of the sentence were selected correctly. In this case, additional points may be awarded when the sentence is completed. Note that the trial may be considered incorrect if any incorrect response is made for any segment of the sentence, but the student may still be presented with the remaining segments of the sentence and may earn points for each correct segment.

Evaluation of Unit:

A unit may comprise the total number of trials of the same structure type within a level. The number of units may vary for each level, as described in the progression chart above. After all trials in a unit have been presented, the unit may be evaluated. At the end of the level, the evaluation status of all units may be used to determine advancement to the next level.

Advancement:

In order to pass a unit, the student preferably must meet the advancement criteria as presented in the progression chart above. At the end of the level, any units for which the criteria were not met may be presented again, following the original progression rules (All sentences from failed units for a given picture may be presented before moving on to another picture.)

Plateau Based Transition:

In one embodiment, if after 3 attempts, the student has not met the criteria for passing the all units within a level, the student may transition to the next level. After all units in the exercise have been completed (passed or failed 3 times), those units that were not passed may be repeated, using the same progression and rules of advancement as when they were originally presented. The student may continue to work on these units until mastery is achieved, e.g., until the units are passed.

Exit and Re-Entry:

The student may time out or exit at any time, except when a trial is in progress. A trial may be considered in progress until all segments of the sentence have been completed. Re-entry may return the student to the point from which they exited Progress markers:

Progress through the exercise (comparable to percent-through) may be marked by the addition of a total of 5 markers. The first 2 markers may be awarded after every 12 units passed. The last 3 markers may be awarded after every 11 units passed. The total number of markers may be 5.

End of Exercise:

The exercise may ends when the student has met passing criteria in all units. It may then return to the wrapper, e.g., the startup screen, via a "Good Job" screen.

Figure 30:
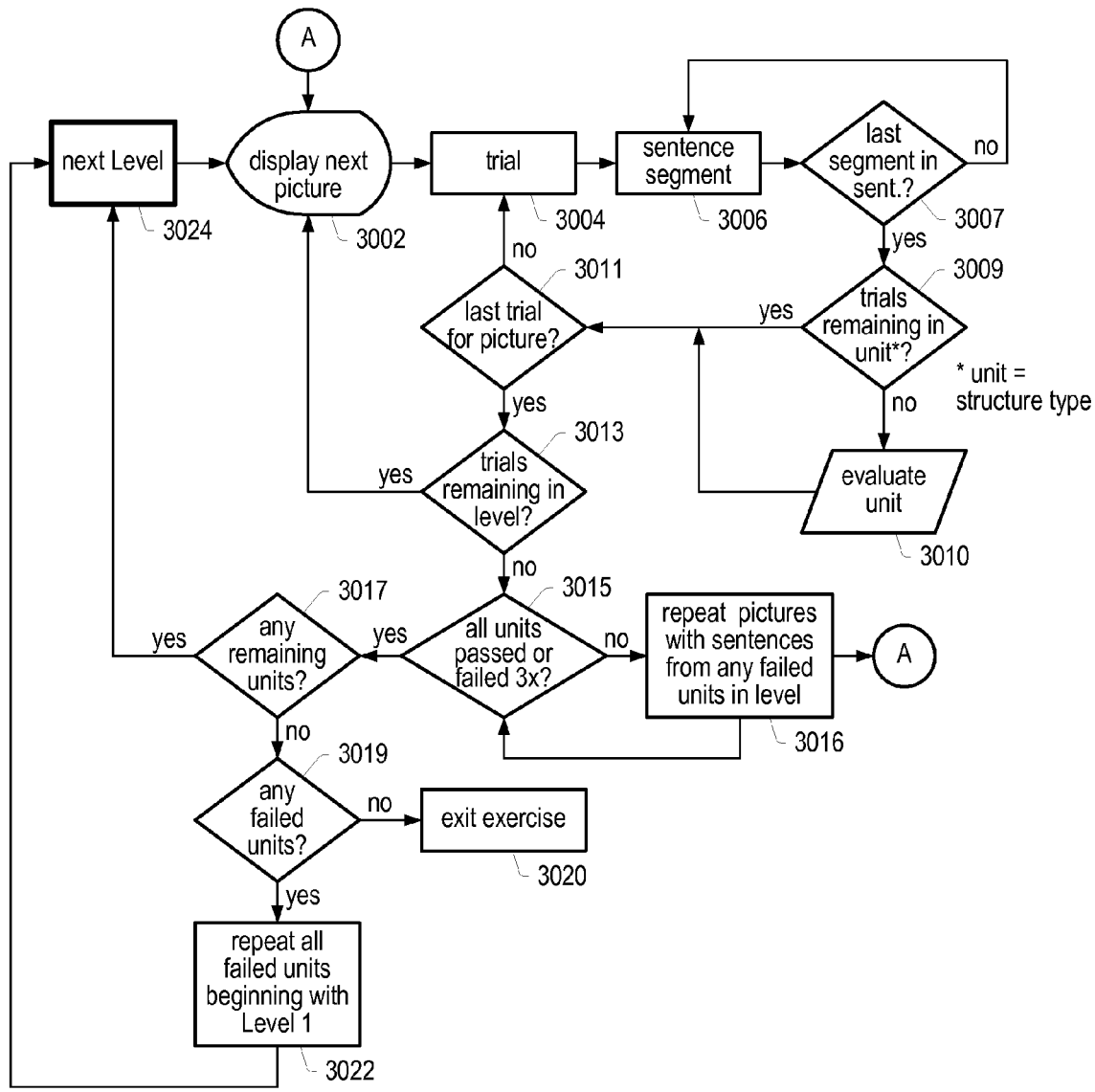
FIG. 30 is a detailed flowchart illustrating progression through the Gator Jam exercise, according to one embodiment.

FIG. 30—Detailed Progression Through Gator Jam Exercise

FIG. 30 flowcharts a computer-implemented method for building accuracy and fluency in recognizing and constructing sentence structures via a computing device, according to one embodiment. More specifically, the method is directed to performance of units in the Toad Loader exercise. Note that the method of FIG. 30 is applicable to, and may include, the method of FIG. 23 (and vice versa), and the description below may refer to various figures and passages directed to that method for brevity. Moreover, any of the aspects described above with respect to the method of FIG. 23 may be considered applicable to the method of FIG. 30 (and vice versa). As noted above, in various embodiments, some of the method elements described may be performed concurrently, in a different order than described, or may be omitted. Additional method elements may be performed as desired. As FIG. 30 shows, the method may be performed as follows:

In 3002, a next picture may be displayed to the student, e.g., see, for example, the picture of FIG. 25, after which a trial may be initiated, as indicated in 3004.

In 3006, a next sentence segment may be presented to the student, e.g., along with a set of foils or alternate answers, as described at length above with reference to 2306 of FIG. 23, and the above-described requiring the selection (2308) and determination of correctness (2310) performed.

In 3007, a determination may be made as to whether this is the last segment in the sentence, i.e., if the current sentence construction is complete, i.e., is a complete sentence, as described above in 2311.

If the sentence is not yet complete, then the current trial is not finished, and the method may proceed to 3006, where the next sentence segment may be presented, e.g., along with a new set of foils, and the method may continue as shown. In other words, as described above with reference to 2306, a new plurality of sentence segments pertaining to the picture may be presented, and the method may continue as described above until the sentence is complete.

If in 3007, it is determined that this was the last sentence segment for the sentence, then in 3009, a determination may be made as to whether there are any trials remaining in the current unit, where, as noted above, a unit comprises all trials in a particular level that are directed to a given structure type, e.g., to a respective grammar structure of the presented sentences. Thus, per level, each unit may be directed to a respect structure type. If there are further trials in the current unit, then the method may proceed to 3011, as shown.

If in 3009, it is determined that there are no further trials to performed in the current unit, then in 3010, the unit may be evaluated. For example, in one embodiment, if the student correctly performed all trials in the unit, then the unit is passed, otherwise, the unit fails or is failed. Once the unit has been evaluated, the method may proceed to 3011.

In 3011, a determination may be made as to whether the current trial, i.e., the last trial performed, was the last trial for the current picture. For example, the method may determine whether there are further sentences to be constructed regarding the current presented picture. If this was not the last trial for the picture, then the method may proceed to 3004, where a new trial may be initiated, and the method may continue as described above.

If in 3011, it is determined that the trial was the last trial for the current picture, then in 3013, a determination may be made as to whether there are further trials in the current level.

If there are further trials in the current level, then the method may proceed to 3002, where a next picture may be displayed, as shown, and the method may continue as described above. However, if there are no further trials to be performed in the current level, then the method may proceed to 3015.

In 3015, a determination may be made as to whether all units in the current level have either been passed, or failed a specified number of times, e.g., 3 times. If not, then the failed (e.g., less than 3 times) units of the level may be repeated, as indicated in 3016. In other words, trials in any units that have been failed, but less than the specified number of times, may be performed, as indicated. Note that, as described above, units that have been failed the specified number of times may be retained for performance at the end of the exercise, as will be seen below.

If all units of the level have either been passed or failed the specified number of times, then in 3017 a determination may be made as to whether there are further units to be performed in the exercise. If there are further open units remaining, then the method may proceed to 3024, where the next level is initiated and the method may continue as described above.

If in 3017, it is determined that there are no further units to be performed in the exercise, then in 3019, a determination may be made as to whether there are any failed units in the exercise, i.e., units that have not been passed, and if there are no failed units, then the exercise may be exited, as shown in 3020, otherwise, the method may proceed to 3022.

In 3022, all failed units in the exercise, i.e., those that have not been passed, may be repeated, beginning with level 1. In other words, any units that have not been passed may be performed according to level, i.e., beginning with level 1, and performing all failed (as yet unpassed) units in each successive level, as indicated by the progression to 3024, where a next level is initiated, and the method may continue as described above.

Thus, various embodiments of the methods described above may build accuracy and fluency in recognizing and constructing sentence structures in the student.

Exercise 4: Lana's Lanes

The goal of this exercise (i.e., Lana's Lanes) is to build skills in accurate text comprehension and the use of comprehension strategies, when reading fiction and nonfiction texts that include literary structures and devices.

In this exercise, the student may work with various comprehension strategies, e.g., four of the seven critical comprehension strategies as identified by the National Reading Panel: graphic/semantic organizers, summarization, question answering, and using multiple strategies. New strategies may be introduced with highly scaffolded tasks, but as students progress this scaffolding may be reduced and students may work more independently with the strategy. Comprehension questions may initially focus on literal facts, but as student progresses, inferential processes (e.g., main idea, central conflict, conclusions, generalizations, themes, metaphors) may be increasingly emphasized. Moreover, the student may be given opportunities to analyze the structural features of such strategy constructs or devices as logic diagrams, tables, concept webs, flowcharts, timelines, and summaries, and how these devices can organize information from a text. In some embodiments, passages may be evenly divided between fiction and non-fiction, with some of the fiction extracted from public domain literature. The exercise may progress from shorter texts (75-200 words) to longer texts (240-480 words), and the difficulty level of the passages may increase from 3rd-5th grade level to 6th-7th grade level.

The exercise may develop various cognitive skills in the student, such as memory, e.g., by using working memory for sentence comprehension and building text-level representations in long-term memory; attention, by selectively attending to critical information and sustaining attention across longer passages and question sets; processing, by developing fluency in extracting and integrating meaning from longer text passages; and sequencing by recognizing causal and temporal event sequences in texts, among others.

More specifically, the exercise may require the student to read a short fiction or non-fiction passage, answer questions regarding the passage, complete a graphic organizer or summary of the passage, and answer comprehension questions. This process may then be repeated for each of a plurality of passages. For example, in one embodiment, for each passage, the student may be required to complete 3 stages: 1) passage read with comprehension-check questions, where the student may independently read fiction and non-fiction passages and answer comprehension-check questions by clicking on the correct answer; 2) strategy, where the student may be required to complete a strategy task, such as choosing or completing graphic organizers and summaries; and 3) post-strategy comprehension questions, where, once the strategy task is correctly completed, the student may be required to answer additional comprehension questions about the passage.

The student may develop skills regarding gaining information from text, such as discerning main ideas and evidence that supports those ideas, and drawing inferences, conclusions, or generalizations. The student may develop skills in structural analysis of text, such as understanding text features (e.g., format, graphics, diagrams, illustrations, charts, maps), and analyzing text that is organized in sequential or chronological order. Moreover, in a more indirect manner, the student may develop skills in literary analysis of fiction, such as identifying the main problem and how it is resolved, contrasting characters in a work of fiction in relation to the plot or theme, recognizing themes, and describing the function and effect of common literary devices (e.g., imagery, metaphor, symbolism).

Figure 31:
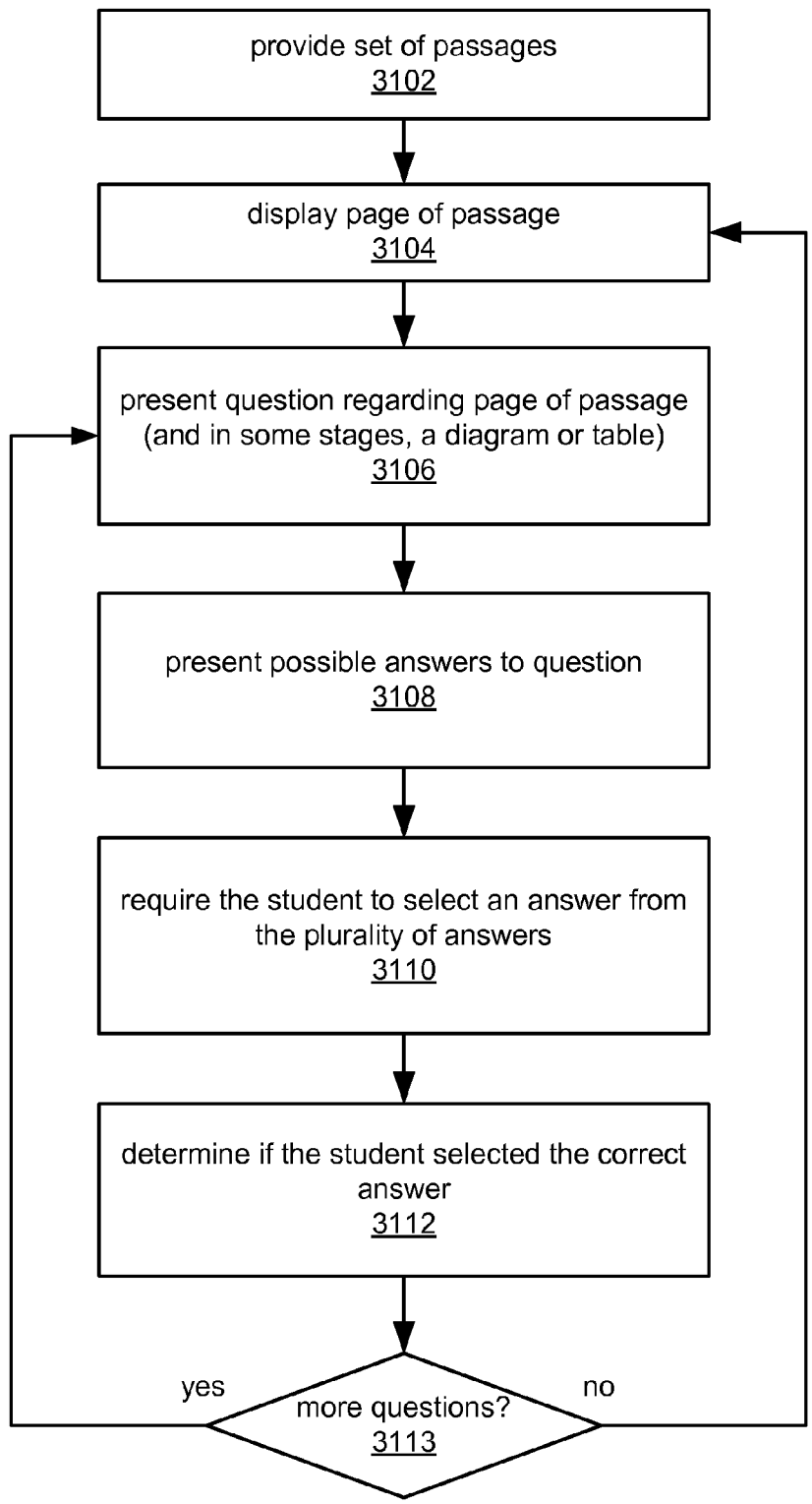
FIG. 31 is a high-level flowchart of a computer-implemented method for building skills in accurate text comprehension and the use of comprehension strategies, when reading fiction and nonfiction texts that include literary structures and devices, according to one embodiment.

FIG. 31—Method for Building Skills in Accurate Text Comprehension and Use of Comprehension Strategies FIG. 31 is a flowchart diagram of a method for building skills in accurate text comprehension and the use of comprehension strategies via a computing device, according to one embodiment. As noted above, in various embodiments, some of the method elements described may be performed concurrently, in a different order than described, or may be omitted. Additional method elements may be performed as desired. As FIG. 31 shows, the method may be performed as follows:

In 3102, a set of stimulus passages, i.e., textual passages, may be provided. As with the above-described exercises, in preferred embodiments, a graphical user interface (GUI) may be provided whereby the exercise may be performed.

Figure 32:
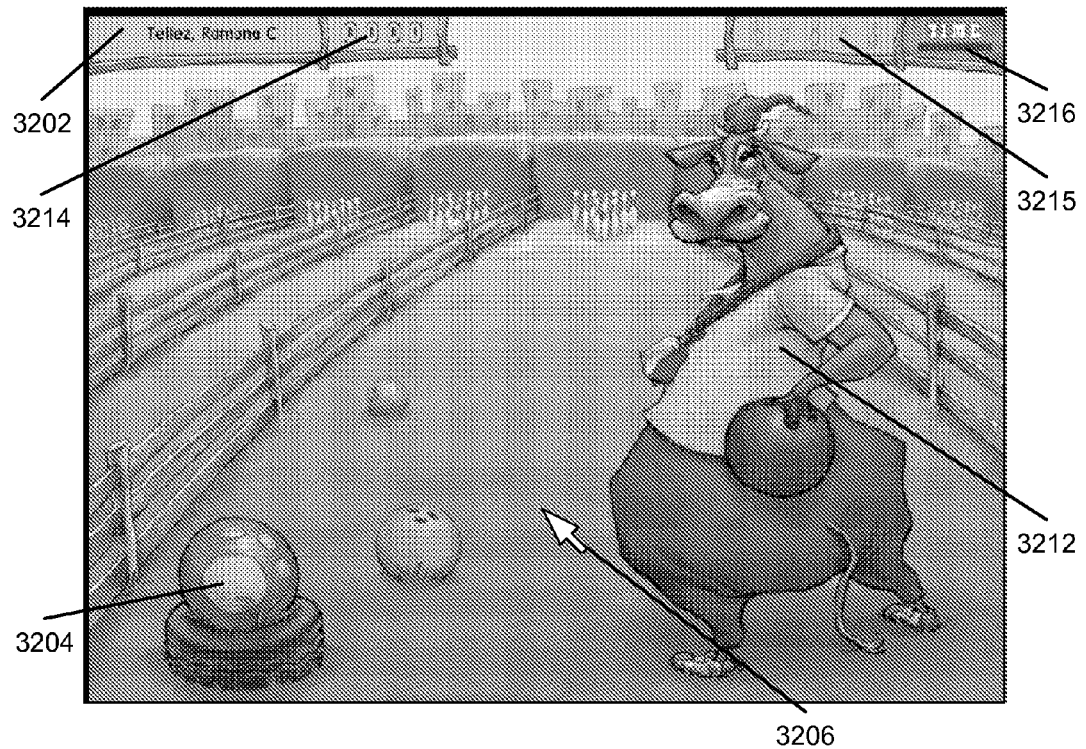
FIG. 32 is an exemplary screenshot of an introductory screen for the Lana's Lanes exercise, according to one embodiment.

FIG. 32 illustrates an exemplary screenshot 3200 of an introductory screen for the Lana's Lanes exercise. As FIG. 32 shows, (and as with FIGS. 7, 16, and 24, described above) the screen includes the name of the student 3202, an initiation button, in this case, a selection paw 3204, also referred to as an OR button, and a cursor 3206. To begin a trial, the student may move the cursor 3206 over the selection paw 3204 and indicate the selection, e.g., by clicking the mouse. The screen further includes a main character, in this case, a cow 3212, a score indicator 3214, progress markers 3215 indicating progress through the exercise, and a time indicator 3216. The score indicator 3214 may add points to the students score as the student correctly responds to trials. The time indicator 3216 may provide a graphical illustration of the relative time left for the exercise. Exercise play may begin when the student selects the selection paw 3204.

Figure 33:
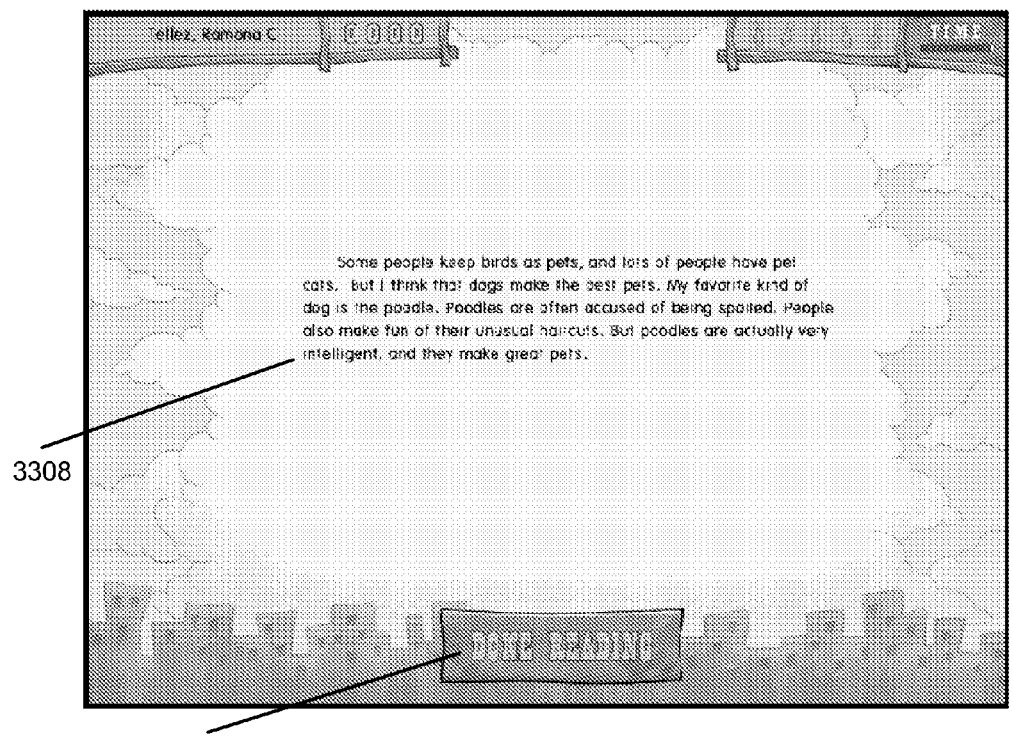
FIGS. 33-35 are exemplary screenshots illustrating trials in stage 1 of the Lana's Lanes exercise, according to one embodiment.

In 3104, a next page of a stimulus passage from the set of stimulus passages may be displayed, e.g., on a display of a computing device. For example, the page of the stimulus passage may be presented in the above-described GUI. FIG. 33 is an exemplary screenshot from the exercise, where, as may be seen, a first page of a stimulus passage 3308 is displayed. In this example, the page discusses pets in general, and dogs in particular, especially poodles. As also shown, a "done reading" button 3310 may be provided for dismissing the screen once the student has read the presented page.

Figure 34:
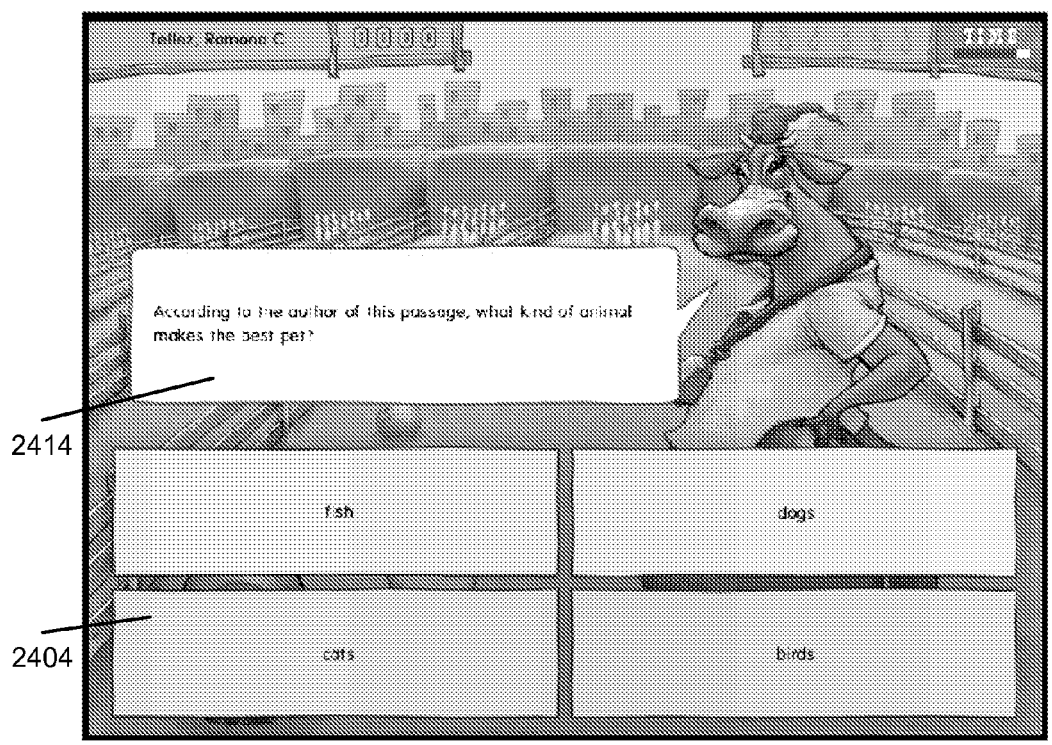

In 3106, a question (or other request or prompt for response) regarding the presented page of the stimulus passage may be presented to the student, i.e., may be asked of the student. For example, the question may relate to a plot, character, knowledge, conclusions, and/or logical relationships indicated in the page, among others. In one embodiment, such questions may be presented in a first stage, i.e., stage 1, of the exercise. In some embodiments, e.g., in successive stages, e.g., stage 2 and/or stage 3, of the exercise, one or more logic diagrams (e.g., circle or Euler diagrams) or tables may be displayed, where the question may relate to the diagram(s) or table(s), as will be described in detail below. FIG. 34 is an exemplary screenshot from stage 1 of the exercise, where question 3414 is presented, specifically, "According to the author of this passage, what kind of animal makes the best pet?"

In 3108, a plurality of possible answers to the question (or request or prompt for response) of 3106 may be textually presented to the student, one of which is the correct or most appropriate response. Turning again to FIG. 34, in this example, four possible answers are shown: "fish", "dogs", "cats", and "birds".

Figure 35:
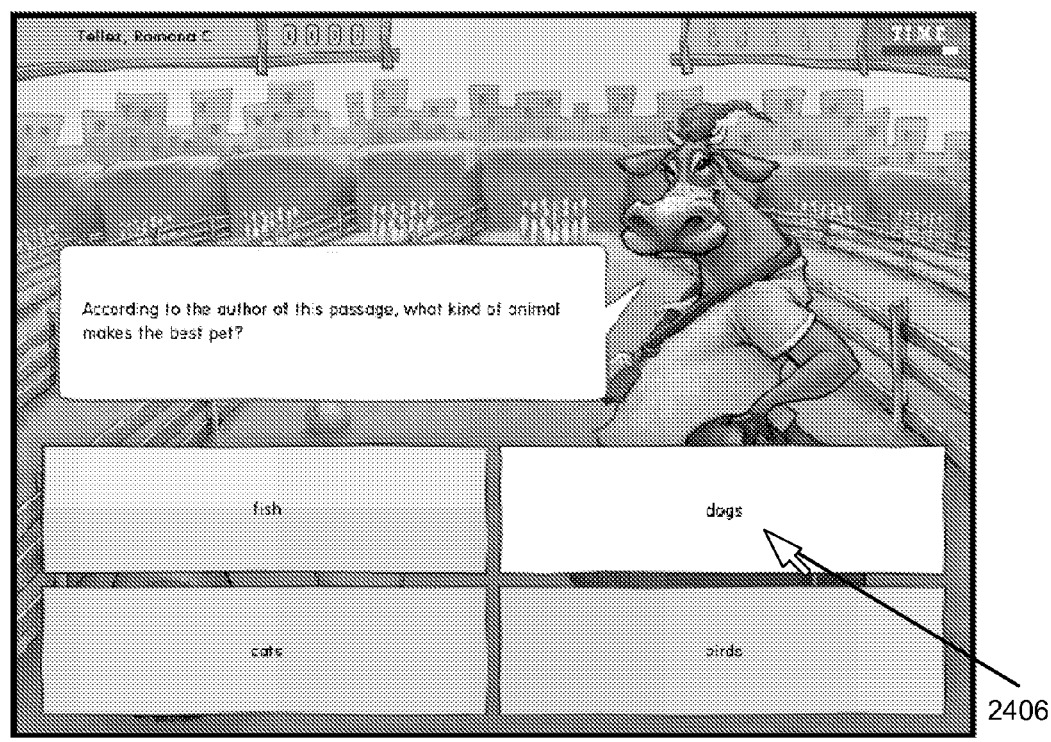

In 3110, the student may be required to select an answer from the plurality of possible answers, e.g., via a mouse or other pointing device. FIG. 35 is an exemplary screenshot of the exercise illustrating user selection of the (correct) answer "dogs", which is shown highlighted. Note that this question/response may be considered to be a stage 1 trial.

In 3112, a determination may be made as to the correctness of the student's selection, i.e., whether the selected answer is correct or not. As with the above exercises, in preferred embodiments, an indication, i.e., graphical and/or audial, may be provided as to the student's correctness (or incorrectness), e.g., via speakers or headphones. For example, a "thunk" sound may be played indicating incorrectness, or a "ding" may be played indicating correctness and points awarded (or, as above, in the case of bonus points, 3 "dings" may be played). In some embodiments, an animation of the main character and/or secondary characters may also provide such an indication when the selection is correct, e.g., a "correct" animation may be presented. Of course, any other types of indication may be used as desired.

Note that in some embodiments, an incorrect selection may result in failure of the current trial, unit, and/or level, where failed units may be repeated (possibly a number of times) later, e.g., at the end of the current level, and/or at the end of the exercise, as will be described in detail below. Thus, in some embodiments, each unit may be performed until either the unit is passed, or the unit has been failed a specified number of times (e.g., 3 times), where the additional performances (beyond the first failure) may be performed just after the first failure, and/or at the end of the level. Moreover, the units that have been failed the specified number of times may be repeated at the end of the exercise until all units have been passed.

Figure 36:
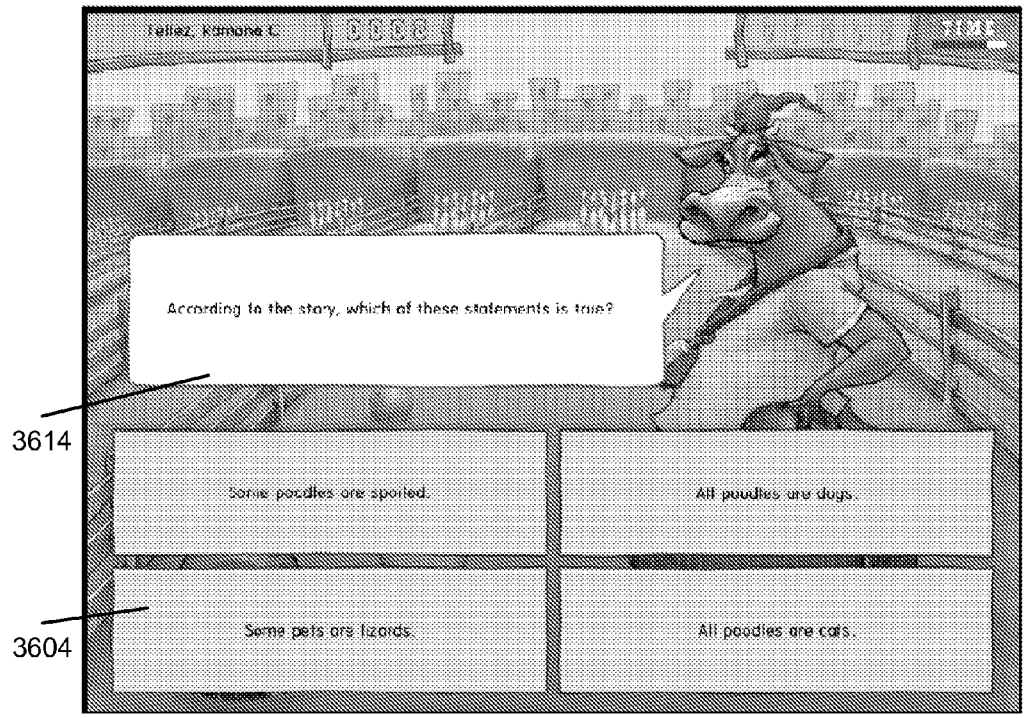
FIGS. 36 and 37 are exemplary screenshots illustrating question/response trials in a strategy task in stage 2 of the Lana's Lanes exercise, according to one embodiment.
Figure 37:
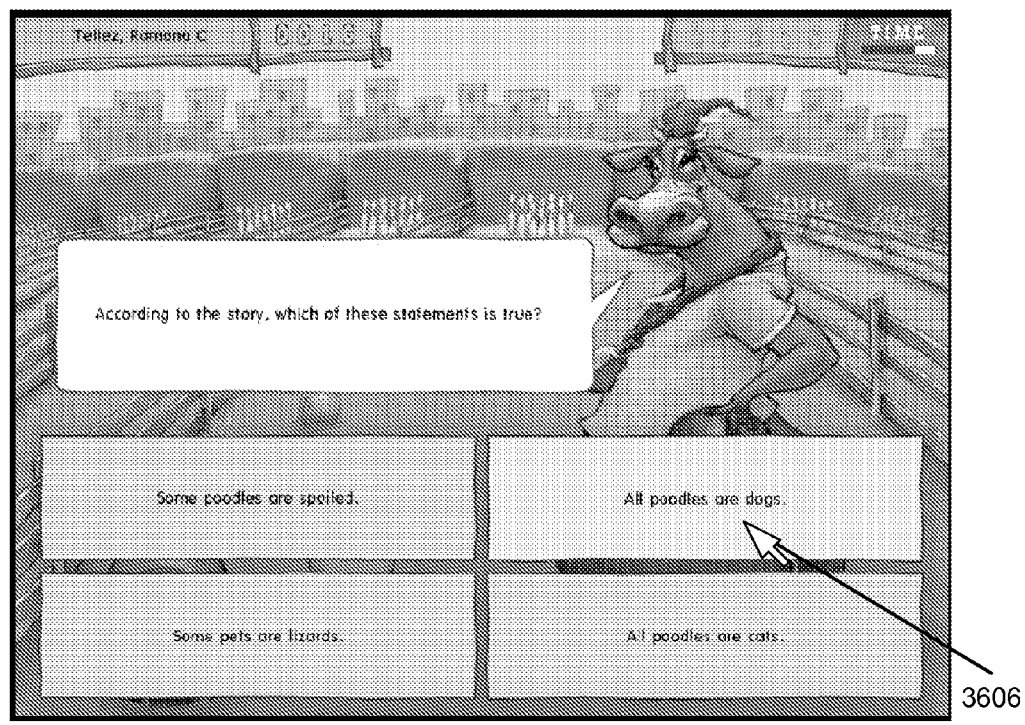

In 3113, a determination may be made as to whether there are further questions (or requests for response) to be answered regarding the page of the stimulus passage. If there are further questions, then the method may proceed to 3106, where a next question may be displayed, e.g., in stage 2, and the method may continue as described above. For example, FIG. 36 illustrates presentation of another question 3614, e.g., a logic question, regarding the passage, specifically, "According to the story, which of these statements is true?", as well as additional possible answers 3604 to the question, and FIG. 37 illustrates user selection of the answer "All poodles are dogs." 3606. Note that in some embodiments, the logic question/response may be considered to be a first trial in stage 2 of the exercise, e.g., to be followed by a second trial in stage 2, such as, for example, a trial in a "choose the diagram" strategy task, described below in detail.

If there are no further questions regarding the current page of the passage, the method may proceed to 3104, where a next page of the passage may be presented, and the method may continue as described above.

In preferred embodiments, once all the pages of the current stimulus passage have been presented and responded to, pages of a next passage may be presented, and the method may continue as described above in an iterative manner, thereby building skills in accurate text comprehension and the use of comprehension strategies in the student.

Thus, as FIG. 31 indicates, additional stimulus passages from the set of stimulus passages may be presented, where, as described above, the student is required to select appropriate answers to presented questions, and the correctness or incorrectness of each selection determined (and recorded or stored), as described above. Note that in some embodiments, the passages may be presented in a specified order (as opposed to randomly), such that the passages may form an extended story or article. Thus, the displaying, the presenting the question, the presenting the possible answers, the requiring, and the determining may be performed for each page in each passage in the set of passages to build skills in accurate text comprehension and the use of comprehension strategies.

Moreover, in preferred embodiments, the displaying the page of the passage, the presenting the question, the presenting the possible answers, the requiring, and the determining may be repeated for each stimulus passage, where the repeating builds skills in accurate text comprehension and the use of comprehension strategies in the student. In other words, the student may be exposed to the passages multiple times to facilitate development of the student's passage comprehension and reasoning skills. Such repetition may occur in a plurality of sessions over days, weeks, or even months. Additionally, in some embodiments, the set of stimulus passages may be included in a plurality of stimulus passage sets, and the method may include performing the repeating for each stimulus passage set in the plurality of stimulus passage sets.

In one embodiment, as the student completes trials for each passage, the student may progress through a plurality of levels, where, for example, the passages and questions may be increasingly difficult or subtle, and/or may be focused on various different relationships of elements in the passages. In one embodiment, a unit may refer to trials directed to stage 3 of a respective passage. Detailed information regarding units, levels, and progression through them, is provided below.

Thus, performing the repeating for each stimulus passage set in the plurality of stimulus passage sets may include performing trials in each unit of a plurality of units for each level of a plurality of levels, as will be described in more detail below. As also indicated above, such performing with respect to the multiple stimulus passage sets may itself be repeated in an iterative manner, e.g., over a plurality of sessions, as described above, to facilitate development of the student's skills in accurate text comprehension and the use of comprehension strategies.

In one embodiment, the method may also include performing introductory or training trials, where, for example, initially instructions may be provided explaining what is expected of the student in the exercise, and then example trials performed where the correct responses are indicated to the student. After the introductory or training trials are completed, the student may begin the actual trials of the exercise, as described above.

As noted above, in some embodiments, the above method may be performed in each of a plurality of successive stages, where, for example, in stage 1, textual questions/answers may be presented as described above until all the pages of the passage have been presented (and responded to), and where, for example, in stage 2, one or more questions may be presented with respect to auxiliary information regarding aspects of the passage, e.g., with respect to set relationship or logic diagrams, also referred to as Euler or circle diagrams; or graphic organizers, such as tables, concept webs, and timelines/flowcharts; regarding the passage. After stage 2, a third stage, i.e., stage 3, may be performed, in which summary information may be presented and/or queried for. Moreover, each stage may include a plurality of tasks, each directed to a particular skill or learning approach, as described in more detail below.

Overview of Exercise Stages

The following are high-level descriptions of exemplary stages of the exercise (Lana's Lanes), although it should be noted that variations of the described stages are also contemplated. More detailed descriptions follow.

Stage 1: Passage Read/Check Questions

In one exemplary embodiment of stage 1 of the exercise, each presented passage may be 1 to 4 "pages" in length and may be presented on screen as text only. The passages may increase in difficulty (e.g., lexiled for grade levels 4-7) as the student progresses through the exercise. As noted above, once the page has been presented, the student may click a "Done Reading" button (or equivalent) to indicate they are finished reading the page. After each page, one (or more) multiple choice comprehension question(s) may be presented, where the question is designed to help students think about what they are reading by highlighting important information and promoting inference. FIGS. 33-35 illustrate exemplary embodiments of the questions/responses in stage 1. After the textual questions regarding the passage have been responded to in stage 1, such as those of FIGS. 34-35, the method may proceed to stage 2, described below.

Stage 2: Strategy:

In one exemplary embodiment of stage 2 of the exercise, the student may be required to perform one or more of the following strategy tasks for each passage.

Circle Diagrams

In a first task of this task group, specifically, a "choose the correct diagram" task, the student may be required to select a statement that is true about the passage from a plurality of statements. Then, the student may be presented with multiple circle diagrams and may be required to click the diagram that correctly represents the statement (i.e., the statement just selected).

In a second task of this task group, specifically, a "complete a diagram" task, the student may be presented with a circle diagram that has been partially completed, and may be required to select missing elements by clicking on the item that belongs in the specified location.

Graphic Organizers:

In this strategy task, specifically, a "complete the organizer" task, the student may be presented with a partially completed or empty organizer, and may be required to select missing elements by clicking on the item that belongs in the specified location. In one embodiment, graphic organizers may be grouped into 3 basic types: 1) Tables, 2) Concept Webs, and 3) Timelines/Flowcharts.

Summarization

In these strategy tasks, i.e., summarization tasks, the student may, using a cloze-task interface, demonstrate understanding of summarization skills by completing one of the following tasks:

In a first task of this task group, specifically, a "choose the best summary" task, the student may be presented with a number of completed summaries (e.g., 4 summaries), and may be required to choose the best one.

In a second task of this task group, specifically, a "build a summary" task, the student may be presented with the beginning of a summary, and may be required to complete it by selecting the remaining sentences. The student may be presented with a number (e.g., 4) of sentences and asked to click the one that comes next in the summary. The correct response may then be added to the summary. This sequence may be repeated until the summary is completed.

In some embodiments, if a trial is answered incorrectly, the passage may be presented again, beginning with the first page of the passage. Then the incorrect trial may be presented again with previously selected responses grayed out. The student may have up to a specified number (e.g., 3) attempts to answer correctly, at which point the correct answer may be selected for the student. Note that in some embodiments, upon completion of stage 2 for a passage, the student will preferably always have a completed correct diagram, graphic organizer, or summary of the passage, depending on the task performed, where the completed diagram, graphic organizer, or summary may then be used in one or more stage 3 trials. Note further that in some embodiments, the "choose a diagram" task may work slightly differently from other tasks, as will be explained below.

Stage 3: Post-Strategy Comprehension Questions

In some embodiments, stage 3 may be directed to post-strategy (post stage 2) questions that may target information that is better understood through the use of the (stage 2) strategy presented for the passage. For example, in one embodiment, with the correct diagram, organizer, or summary displayed (from the just-completed stage 2 task), the student may be presented with a number (e.g., 5) of multiple-choice questions about the passage. As before, the student may be required to click on the correct answer to the question, in light of the correct diagram, organizer, or summary displayed.

A more detailed description of the stages of the exercise (Lana's Lanes) is presented below:

Detailed Description of Stages

Stage 1: Passage Read/Comprehension Check

As mentioned above, the student may click the initiation (paw) or OR button to begin the stage. In some embodiments, the initiation button may be clicked to invoke display of the first page of each passage.

Trial Interaction:

The text of a page of the passage may be displayed. In some embodiments, to help the student know where he/she is in a passage (and when a passage begins and ends), a passage length indicator may be displayed at the bottom of the passage text display. For example, the passage length indicator may show a row of "page" icons mirroring the number of pages of text and highlighting the position of the current page within the passage. If there is only one page in the passage, the indicator may not be displayed.

As noted above, a "done reading" button or equivalent may be displayed, and may become active after a time period, e.g., equal to 1 second per line of text (up to a maximum of 8 seconds). The student may click the "done reading" button when he/she has finished reading the page, upon which the passage text may disappear and a question may be displayed along with a number of responses (e.g., 4 responses). In one embodiment, if the student has attempted the question before in the current passage evaluation, all previously selected incorrect answers may be grayed out.

If the student's response is correct, e.g., if the student clicks on the correct response, an indication of the correctness of the selection may be provided. For example, the box with the correct response may be highlighted, e.g., in yellow. Additionally, as with the previous exercises, a "ding" may be played and points awarded. As before, if bonus points are awarded, 3 "dings" may be played. In some embodiments, a "correct" animation (e.g., a facial expression change) may play.

If the student selects an incorrect response, e.g., if the student clicks on the incorrect response, an indication of the incorrectness of the response may be provided. For example, a "thunk" may be played, and the selected (incorrect) response may be grayed out. Additionally, if this is the third attempt at answering this question, the box with the correct response may be highlighted, e.g., in white. There may be a brief (e.g., 2 seconds) pause, to allow the student to read the correct response. Exemplary examples of this stage 1 interaction are illustrated in FIGS. 33-35, described above.

The above interaction may be repeated for each page in the passage. At the end of the passage, if all questions were answered correctly, the student may advance to stage 2. If any questions were answered incorrectly, the student may repeat the above interaction for each incorrect question (including the page read). This process may continue until the student has passed each question, or attempted each question a specified number of times, e.g., 3 times, at which point, the student may transition to stage 2, described in detail below.

Stage 2: Strategy Task

As noted above, in Stage 2, the student may be presented with one (or more) of the following task types:

Strategy Task Type 1: Choose a Diagram:

In this task the student first selects the statement that is true about the passage, and then selects the circle (i.e., Euler) diagram that represents that statement.

Trial Interaction:

In trials of this task, a logic question regarding the passage may be presented, and the student may be required to select from a plurality of logic answers to answer the question. For example, in one embodiment, the student may be requested to select a statement (from a plurality of statements, e.g., from 4 displayed statements) about the passage that is true. In one embodiment, if the student has attempted the question before in the current passage evaluation, all previously selected incorrect answers may be grayed out.

FIGS. 36 and 37, described above, are exemplary screenshots illustrating the type of question/response of this type of strategy task (stage 2), where the question and response are directed to the passage of FIG. 33, also described above.

If the student selects the correct response, e.g., clicks on the correct response, then, as above, an appropriate indication may be provided, e.g., the box with the correct response may be highlighted in yellow, a "ding" may play, and points may be awarded. In some embodiments, if bonus points are awarded, 3 "dings" may be played. Additionally, a "correct" animation (e.g., a facial expression change) may be played.

If the student selects an incorrect response, e.g., if the student clicks on the incorrect response, then a corresponding indication may be provided, e.g., a "thunk" may be played. If this is the third attempt at answering this question, then in one embodiment, the box with the correct response may be highlighted in white, and there may be a brief (e.g., 2 seconds) pause, to allow the student to read the correct response.

If this is not the third attempt at answering this question, then the passage may be displayed along with a "done reading" button, which may become active after a time period, e.g., equal to 0.5 second per line of text (up to a maximum of 4 seconds). As before, the student may click the "done reading" button when he/she has finished reading. The logic question screen may reappear with the previously selected response(s) in a grayed out state and the student may be given the opportunity to answer the question again.

Once the student has correctly selected the true statement regarding the passage, the student may be presented with a plurality of circle (i.e., Euler) diagrams, one of which corresponds to the (correct) selected statement described above. An exemplary trial interaction for this portion of the first strategy task is described below.

Trial Interaction:

In trials for this portion of the strategy task, in one embodiment, a number (e.g., 4) of numbered circle diagrams may be displayed. A corresponding number (e.g., 4) of selection or choice boxes may also be displayed, e.g., below the diagrams, each representing a respective displayed diagram. It should be noted, however, that in some embodiments, the respective diagrams may themselves be selectable by the student, thus obviating the separate selection boxes. The student may then be directed to select the diagram that illustrates a presented statement.

Figure 38:
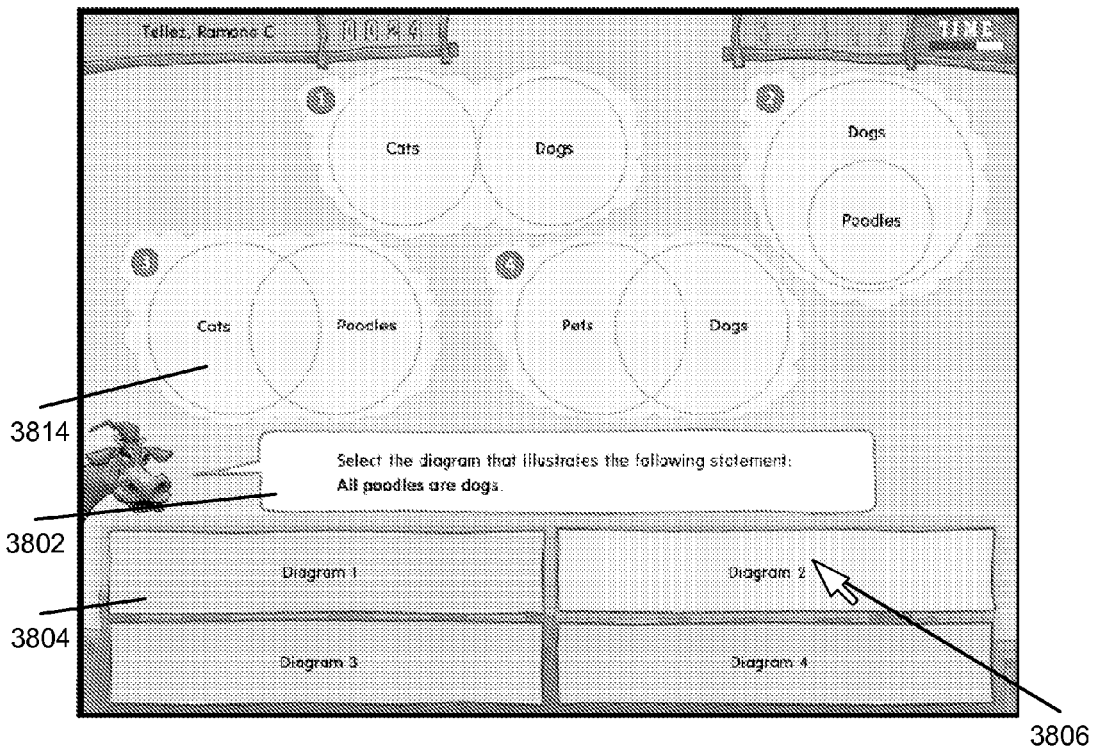
FIGS. 38 and 39 are exemplary screenshots illustrating trials in another strategy task in stage 2 of the Lana's Lanes exercise, according to one embodiment.
Figure 39:
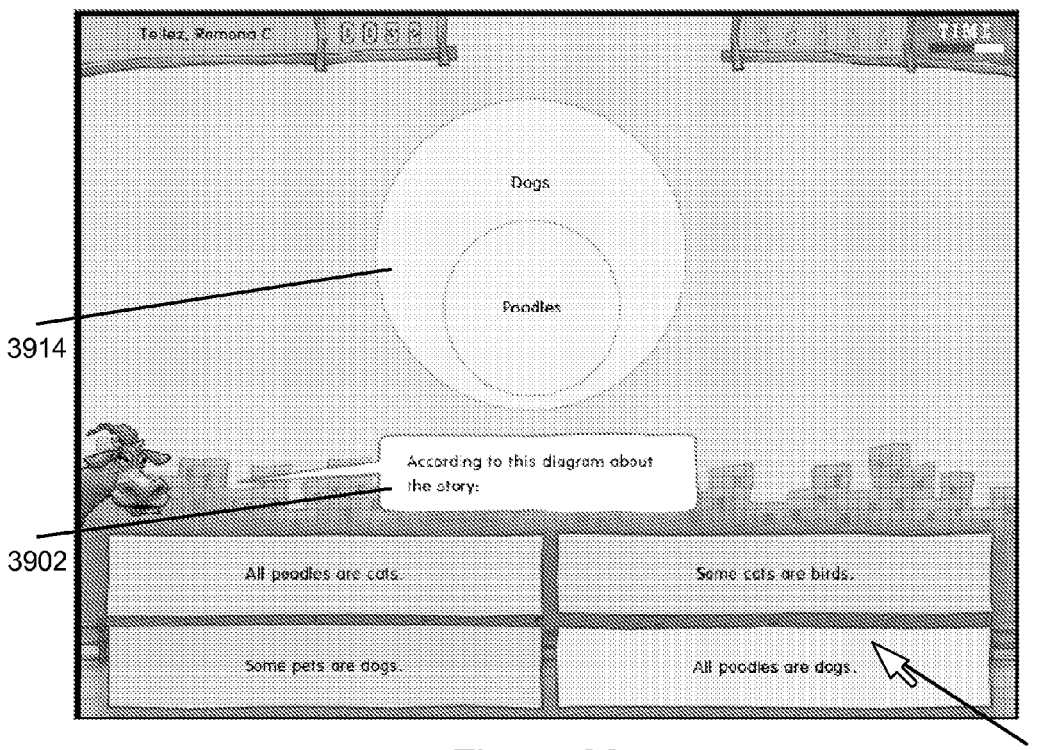

FIGS. 38 and 39 are exemplary screenshots illustrating this portion of the strategy task. In FIG. 38, various circle diagrams are presented representing various logical statements (both correct and incorrect) regarding pets, cats, dogs and poodles, e.g., graphically representing the ideas "no cats are dogs", "all poodles are dogs", "some cats are poodles/some poodles are cats", and some pets are dogs/some dogs are pets". As may be seen, the selection or choice boxes are labeled "Diagram 1", "Diagram 2", and so forth. The student is directed to select one of the diagrams representing a presented logical statement regarding the passage, in this particular example, the textual statement "all poodles are dogs". As shown, the student has (correctly) selected Diagram 2.

In an exemplary follow-on trial, illustrated in FIG. 39, a circle diagram is presented illustrating an idea or logical statement about the story, in this particular example, a circle diagram graphically illustrating the idea "all poodles are dogs". A number (e.g., 4) of textual responses are also displayed, from which the student is required to select one textually stating the idea graphically represented by the displayed circle diagram. As FIG. 39 shows, the student has selected the text response "All poodles are dogs", which is the correct selection.

In trials for this task, if the student selects the correct response, e.g., clicks on the correct response, then, as above, an appropriate indication may be provided, e.g., the box with the correct response may be highlighted in yellow, a "ding" may play, and points may be awarded. In some embodiments, if bonus points are awarded, 3 "dings" may be played.

If the student selects an incorrect response, e.g., if the student clicks on the incorrect response, then a corresponding indication may be provided, e.g., a "thunk" may be played. In one embodiment, if this is the third attempt at answering this question, The correct diagram may be highlighted, with blue text, and the presented statement may be changed to blue text, although it should be noted that other indications may be used as desired.

Strategy Task Type 2: Complete a Diagram

As noted above, in this task the student may be presented with a circle diagram that has been partially completed, and may be required to select missing elements by clicking on the item that belongs in the specified location.

Trial Interaction:

A partially completed or empty circle diagram may be displayed, along with a set of textual responses, each represented a logical statement regarding information from the passage. For example, in one embodiment, one of the empty locations in the diagram may include an icon with a number in it. The student may then be instructed to select one of the responses that includes the missing text illustrating a presented statement or an idea from the passage. If the student has attempted this trial before, in the current passage evaluation, all previously selected incorrect answers are grayed out and inactive.

Figure 40:
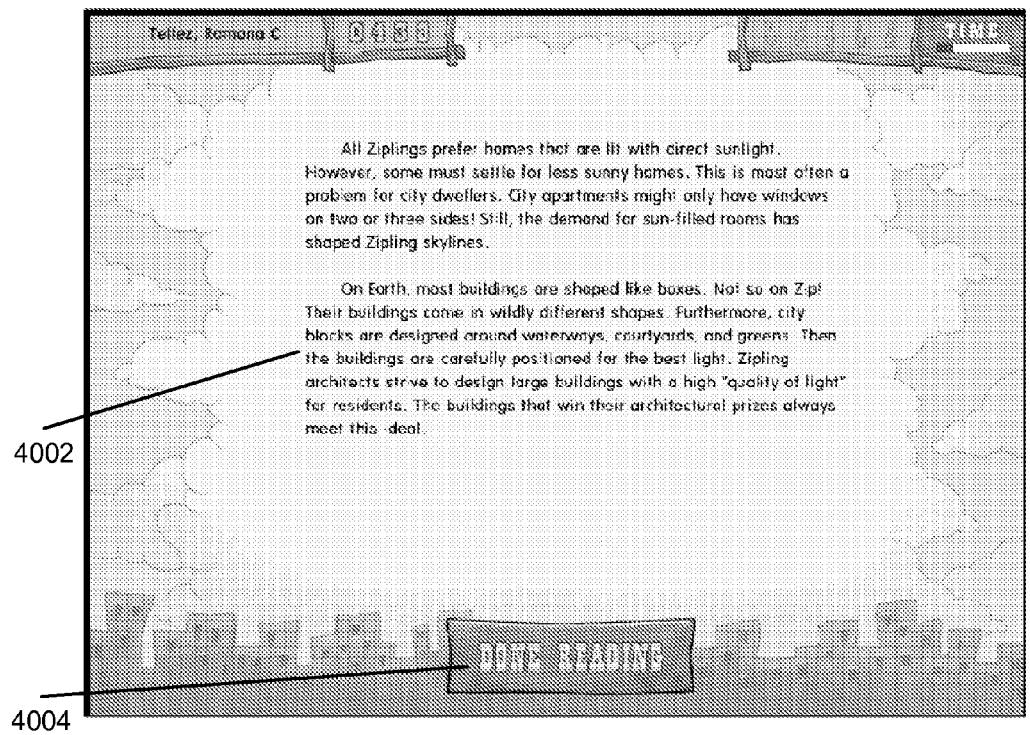
FIGS. 40-43 are exemplary screenshots illustrating progression through trials directed to another strategy task, e.g., including a diagram completion task, in stage 2 of the Lana's Lanes exercise, according to one embodiment.
Figure 41:
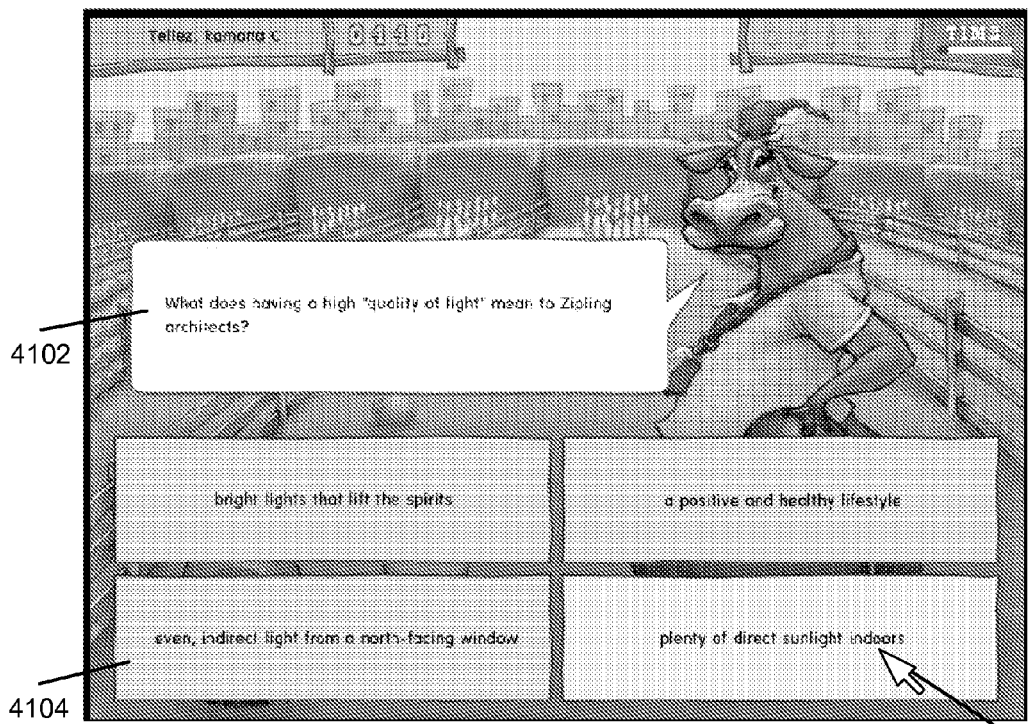

FIGS. 40-43 are exemplary screenshots illustrating progression through trials directed to this strategy task. Note that FIGS. 40 and 41 present the passage and a question/response regarding the passage, respectively, and that FIGS. 42 and 43 particularly illustrate the "complete the diagram" task. As FIG. 40 shows, a stimulus passage is provided regarding fictitious green skinned beings (called "Ziplings") whose reliance on and desire for sunlight impacts their architecture. FIG. 41 presents a question and possible responses regarding the passage of FIG. 40, where, as shown, in response to the question "What does having a high 'quality of light' mean to Zipling architects?", the student has (correctly) selected the response "plenty of direct sunlight indoors". Note that this trial is a stage 1 trial, and is described for context for the below-described stage 2 trials.

Figure 42:
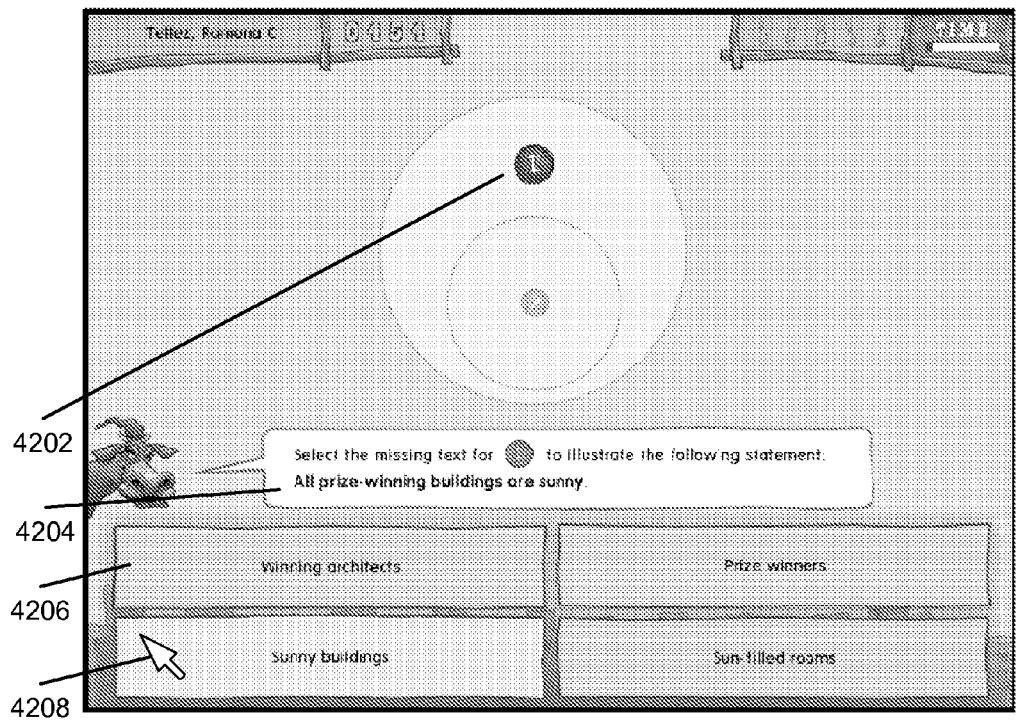

Turning now to FIG. 42, a partial circle diagram is displayed, where, in this particular example, a first circle, labeled "1", completely encloses a second circle, labeled "2", where the label "1" is emphasized compared to the label "2", e.g., the label "2" is shown grayed out. As may be seen, a plurality of text responses are also displayed, as is an instruction for the student to select a response with the missing text for the first circle ("1") illustrating a statement about the passage, specifically, "All prize-winning buildings are sunny." As shown, the student has selected the bottom left response "Sunny buildings", which correctly describes the overarching concept or portion of the stated relationship.

Figure 43:
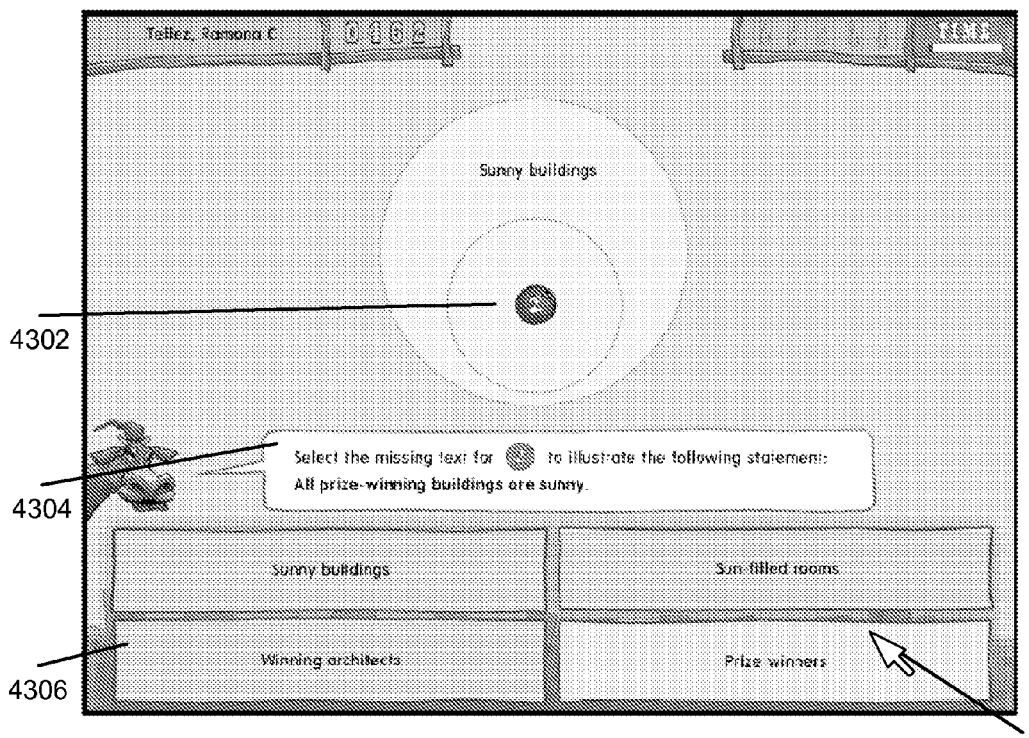

FIG. 43 presents another partial diagram, where the enclosing circle is labeled "sunny buildings", per the previous (correct) answer, and the second circle's label "2" is emphasized, e.g., not grayed out. As may be seen, the student is instructed to select (from a displayed plurality of text responses) the missing text for "2" (the second circle) illustrating a statement about the passage, specifically, "All prize-winning buildings are sunny." As shown, the student has (correctly) selected "prize-winners", the subclass of "sunny", in the context of the presented passage.

If the student selects the correct response, e.g., clicks on the correct response, e.g., clicks the correct item for the designated location in the diagram, then, as above, an appropriate indication may be provided, e.g., the box with the correct response may be highlighted in yellow, a "ding" may play, and points may be awarded. In some embodiments, if bonus points are awarded, 3 "dings" may be played. Moreover, in one embodiment, the correct answer may appear in the correct position in the diagram.

If the student selects an incorrect response, an appropriate indication may be provided. For example, a "thunk" sound may be played, and the selected response may change to a grayed out state. In some embodiments, if this is the third attempt for this trial, the box with the correct response may be highlighted, e.g., in white, and the correct response may appear in the correct position in the diagram, e.g., in blue text. If this is not the third attempt at answering this question, then the first page of the passage may be displayed along with a "done reading" button, where the button may become active after a specified time interval, e.g., 0.5 seconds per line of text (up to a maximum of 4 seconds). As described earlier, the student may click the "done reading" button when finished reading each page.

Note that if the student did not answer the trial correctly on the first attempt, the trial may reappear with previously selected responses grayed out. The student may select another answer from the remaining responses. After each incorrect response the student may be presented with the passage and given another opportunity to answer the trial. This may continue until the student responds correctly or the student has attempted unsuccessfully three times. At that point, the student moves on to the next trial in the Stage, repeating the interaction as described above. If this is the last trial in the stage (2) stage, the student may advance to stage 3, examples of which are provided below.

Strategy Task Type 3: Complete a Graphic Organizer

As noted above, in this task the student may be presented with a partially completed or empty graphic organizer, and may be required to select from a plurality of textual responses to complete or further completion of the organizer.

Trial Interaction:

In one embodiment, the graphic organizer may have one or more empty locations, i.e., may be missing one or more portions. One of the empty locations may be marked, e.g., may include an icon with a number. The student may be instructed to select the missing text for the numbered location. If the student has attempted this trial before (unsuccessfully), all previously selected incorrect answers may be grayed out.

Figure 44:
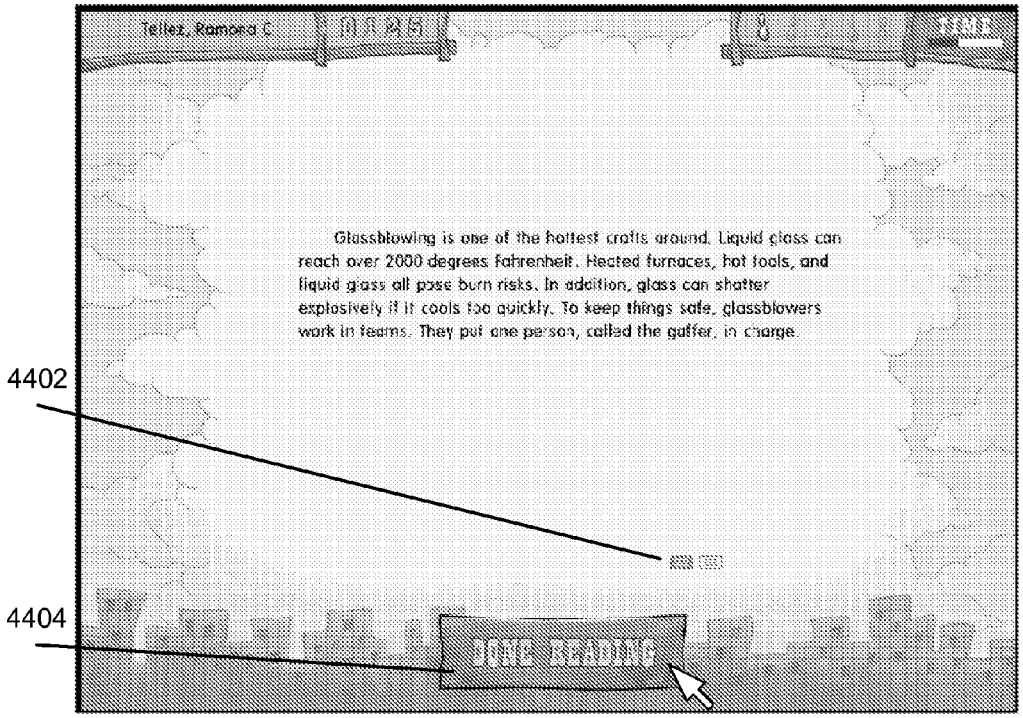
FIGS. 44-49 are exemplary screenshots illustrating progression through trials directed to a further strategy task, e.g., including a graphic organizer completion task directed to a table, in stage 2 of the Lana's Lanes exercise, according to one embodiment.
Figure 45:
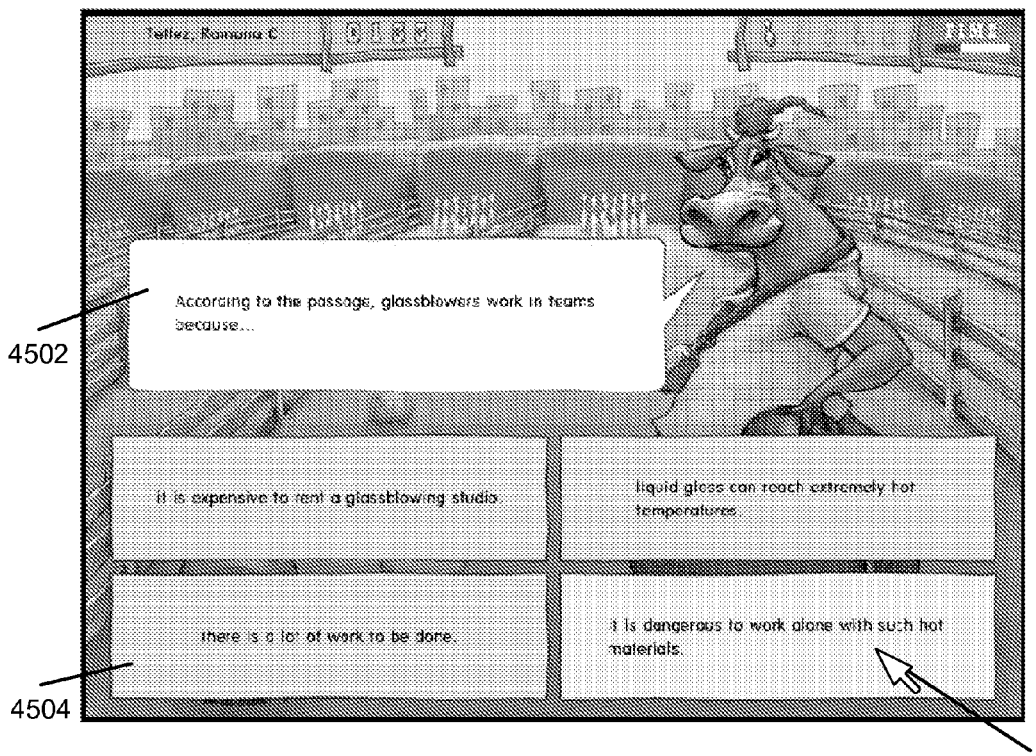

FIGS. 44-49 are exemplary screenshots from one embodiment of the exercise (Lana's Lanes) illustrating this strategy task (complete a graphic organizer). FIG. 44 presents a first page of an exemplary passage to be read by the student. Note that a passage length indicator 4402 is displayed in the bottom portion of the screen, where the passage length indicator 4402 includes a row of "page" icons mirroring the number of pages of text and highlighting the position of the current page within the passage. As with the previous passages, a "done reading" button 4404 may be provided to proceed when the student has finished reading the page. FIG. 45 is an exemplary screenshot illustrating a (stage 1) question/response directed to the just-read passage, where a question 4502 is presented to the student, and the student selects an answer, e.g., selection 4506, from a plurality of possible responses 4504, as described above at length. Thus, FIG. 45 may be considered to illustrate a stage 1 portion of the exercise.

Figures 46, 47:
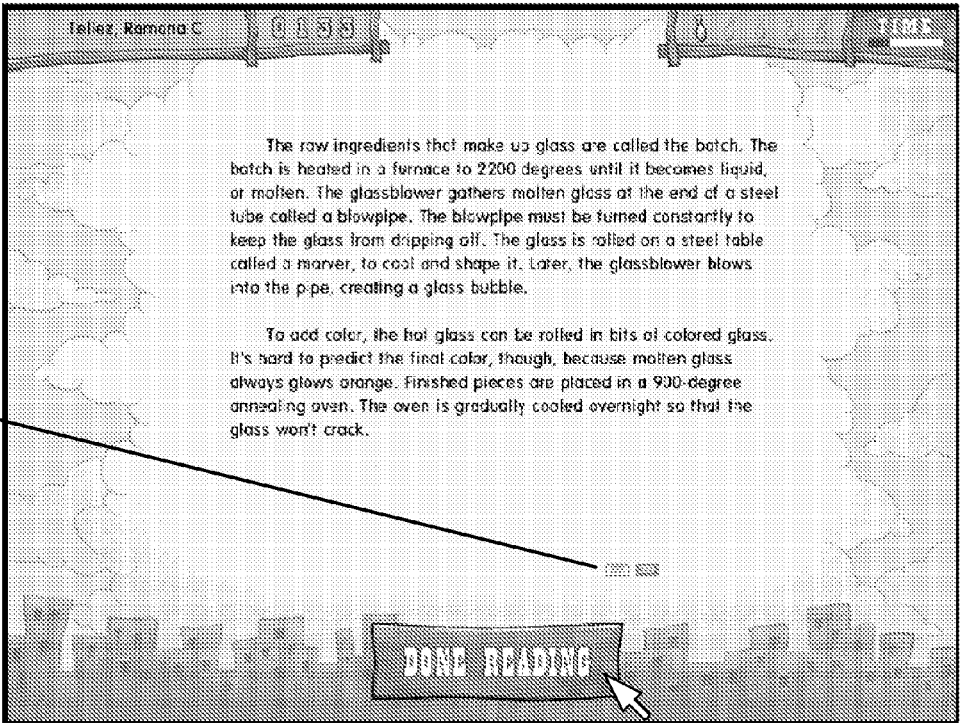

FIG. 46 is an exemplary screenshot presenting a second, final, portion of the passage, i.e., the last page of the passage begun in FIG. 44, as shown by the passage length indicator, and FIG. 47 is an exemplary screenshot illustrating a question/response directed to the just-read passage of FIG. 46, where, as before, a question 4702 is presented to the student, and the student selects an answer, e.g., selection 4706, from a plurality of possible responses 4704, as described above at length. Thus, as with FIG. 45, in one embodiment, FIG. 47 may be considered to illustrate a stage 1 portion of the exercise.

Figure 48:
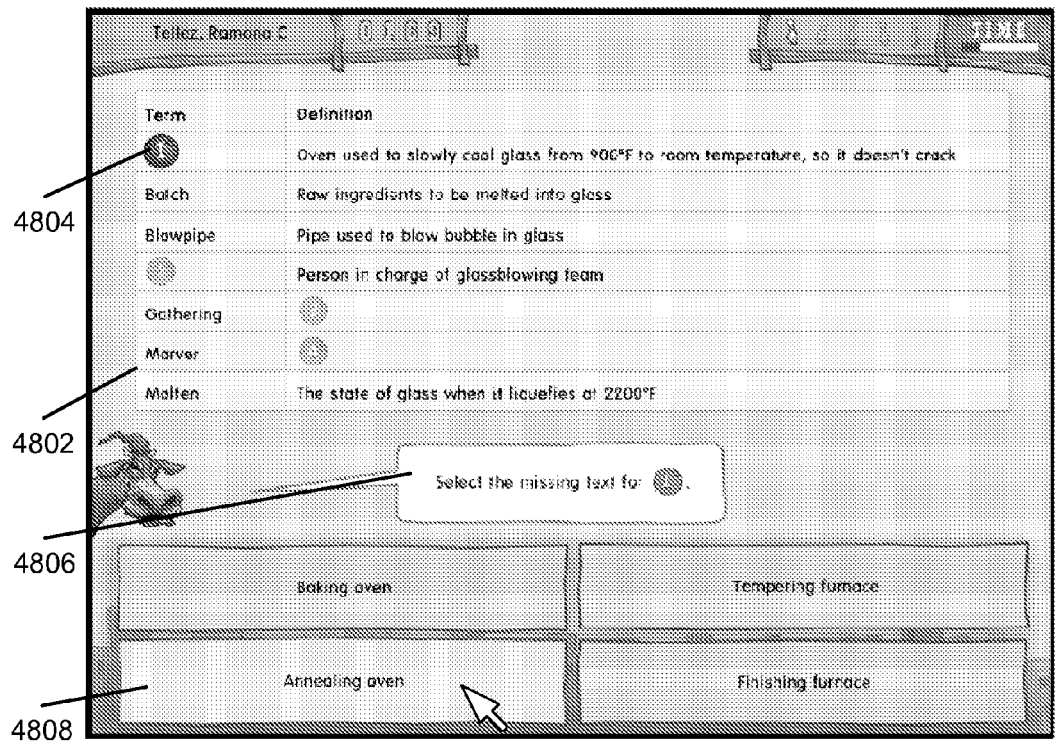
Figure 49:
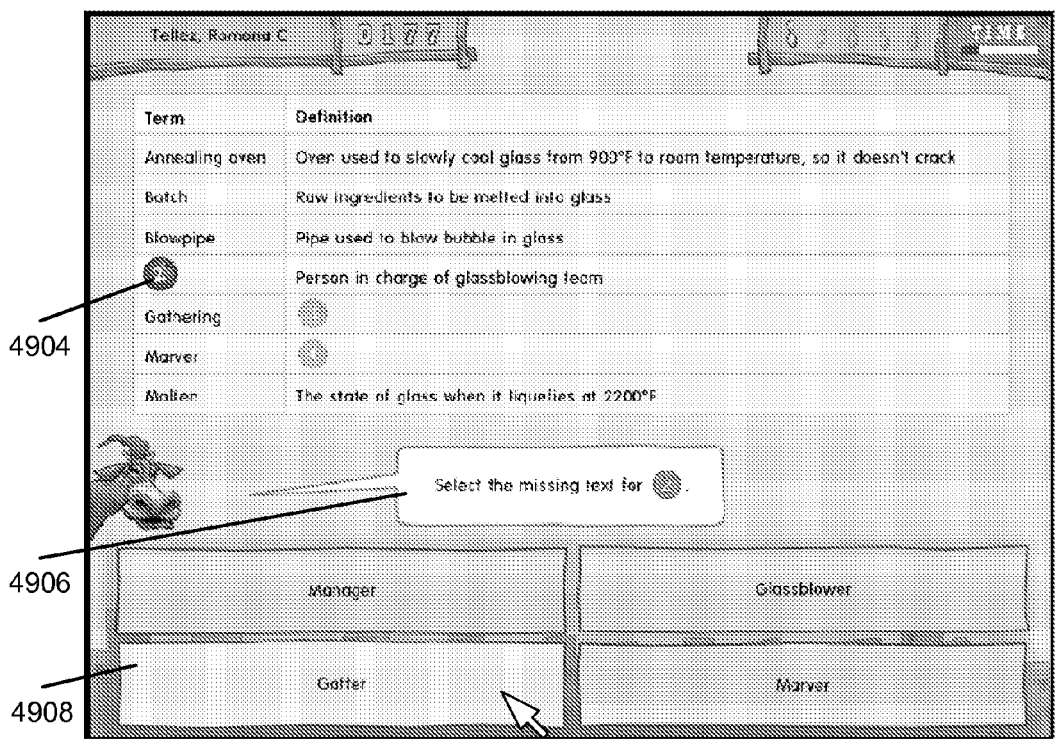

FIGS. 48 and 49 are exemplary screenshots illustrating embodiments of trial interactions in stage 2 directed to the third strategy task described above, i.e., the "complete a graphic organizer" task. As FIG. 48 shows, an incomplete graphic organizer 4802, in this case, an incomplete table, is presented to the student, where the graphic organizer (partially) summarizes information presented in the passage of FIGS. 44 and 46. As may be seen, missing portions of the graphic organizer, in this case, missing entries in the table, are numbered via numeric icons, where a first missing entry 4804 is labeled with a "1". Via instruction 4806, the student is directed to select from a plurality of textual responses 4808, to correctly fill in the missing portion of the graphic organizer.

FIG. 49 illustrates a second trial interaction, where the student is directed by instruction 4906 to fill in a second missing portion or entry 4904, labeled with a "2", with one of a plurality of presented responses 4908. This process may continue until the graphic organizer has been completed. In some embodiments, one or more trials, e.g., questions/responses, may be performed regarding the completed graphic organizer, e.g., in stage 3, where, following the above example, the completed table is shown, and one or more question/response trials performed. Examples of such stage 3 trials are described below with reference to FIGS. 54, 60, 61, and 69.

Figure 50:
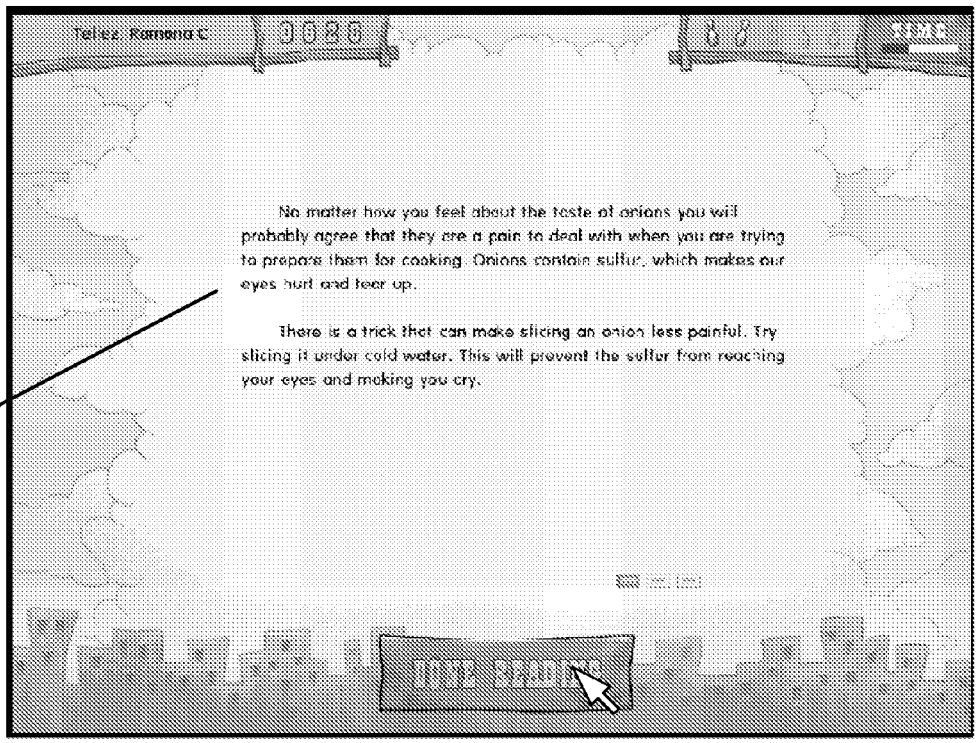
FIGS. 50-53 are exemplary screenshots illustrating progression through trials directed to a further strategy task, e.g., including a graphic organizer completion task directed to a concept web, in stage 2 of the Lana's Lanes exercise, according to one embodiment.
Figure 51:
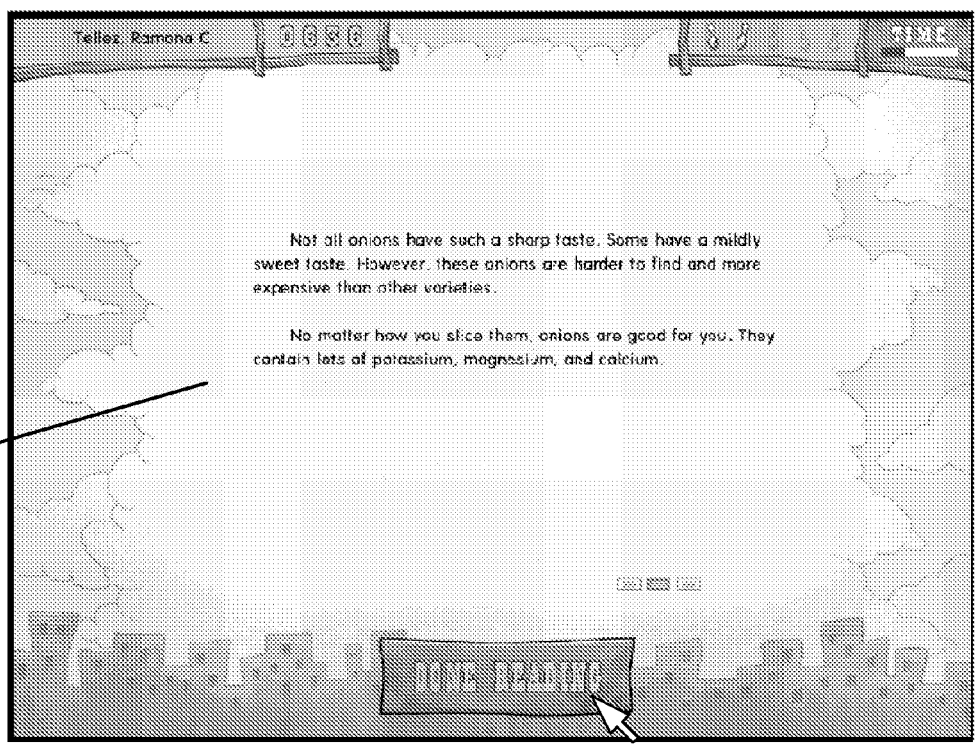
Figure 52:
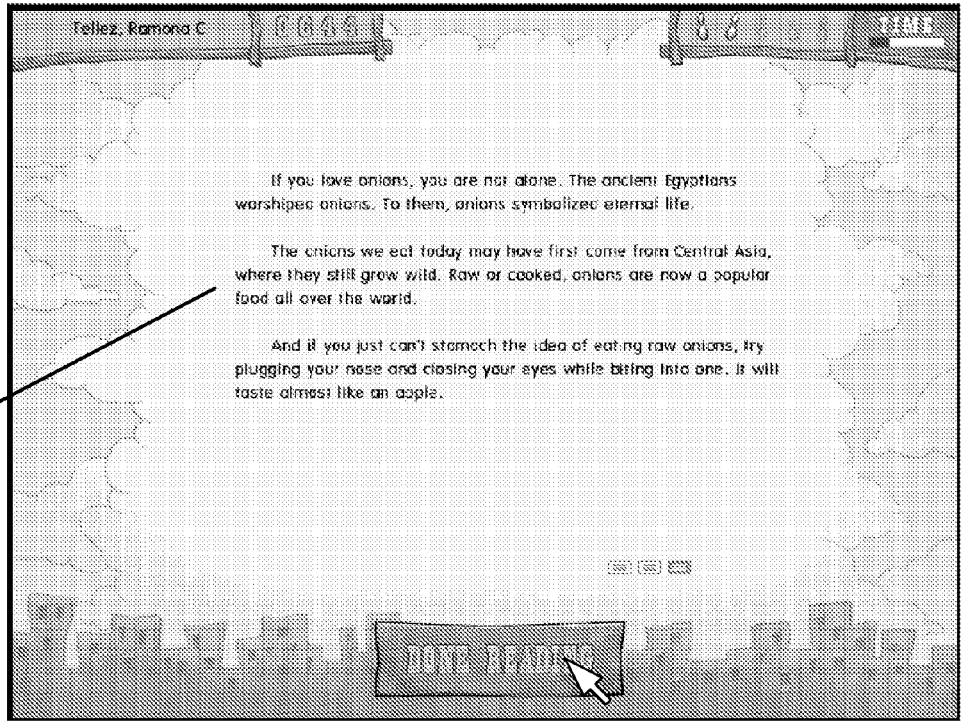
Figure 53:
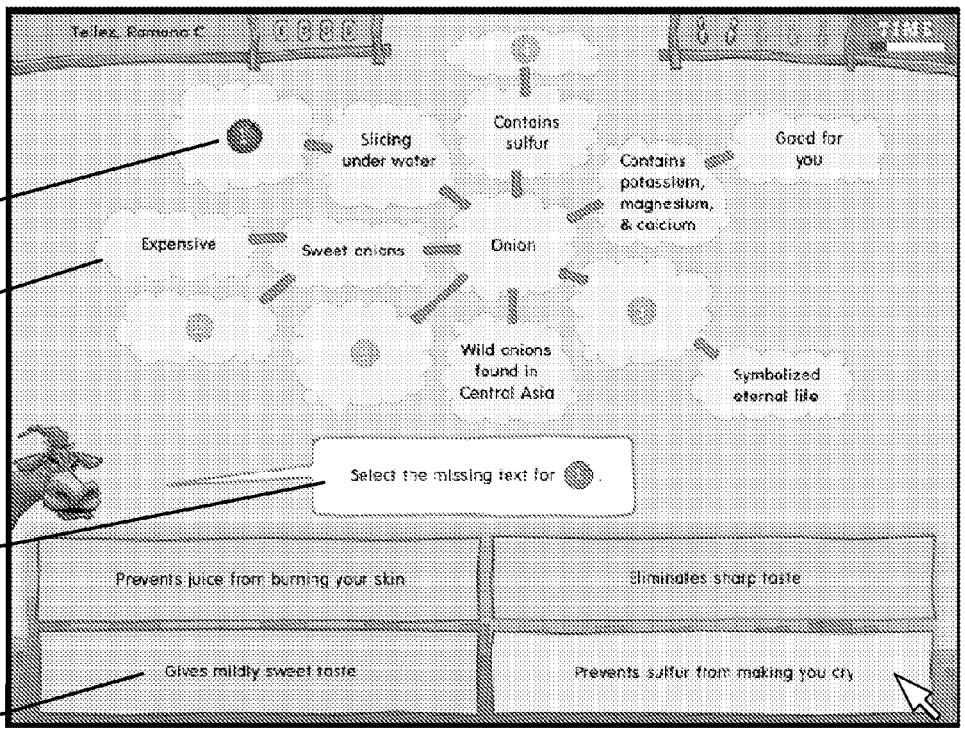

FIGS. 50-53 illustrate an exemplary "complete a graphic organizer" task where the graphic organizer is a concept web. FIGS. 50, 51, and 52 present successive pages 5002, 5102, and 5202, of a passage. Note that in some embodiments, after each page is presented, one or more stage 1 comprehension question/response trials may be performed. FIG. 53 illustrates an incomplete concept web based on facts and relationships disclosed in the passage, where, as with the table example described above, various missing elements are labeled numerically. In the example of FIG. 53, a concept web 5302 corresponding to the passage of FIGS. 50-52 is shown, where various elements are missing, labeled "1" through "5". Via instruction 5306, the student is directed to select from a plurality of responses 5308 a response that fills in the missing text for missing element "1" 5304 of the concept web. As shown, the student has (correctly) selected the bottom right response "prevents sulfur from making you cry". Of course, additional trials directed to filling in the remainder of the missing elements of the concept web are preferably also performed.

Figure 54:
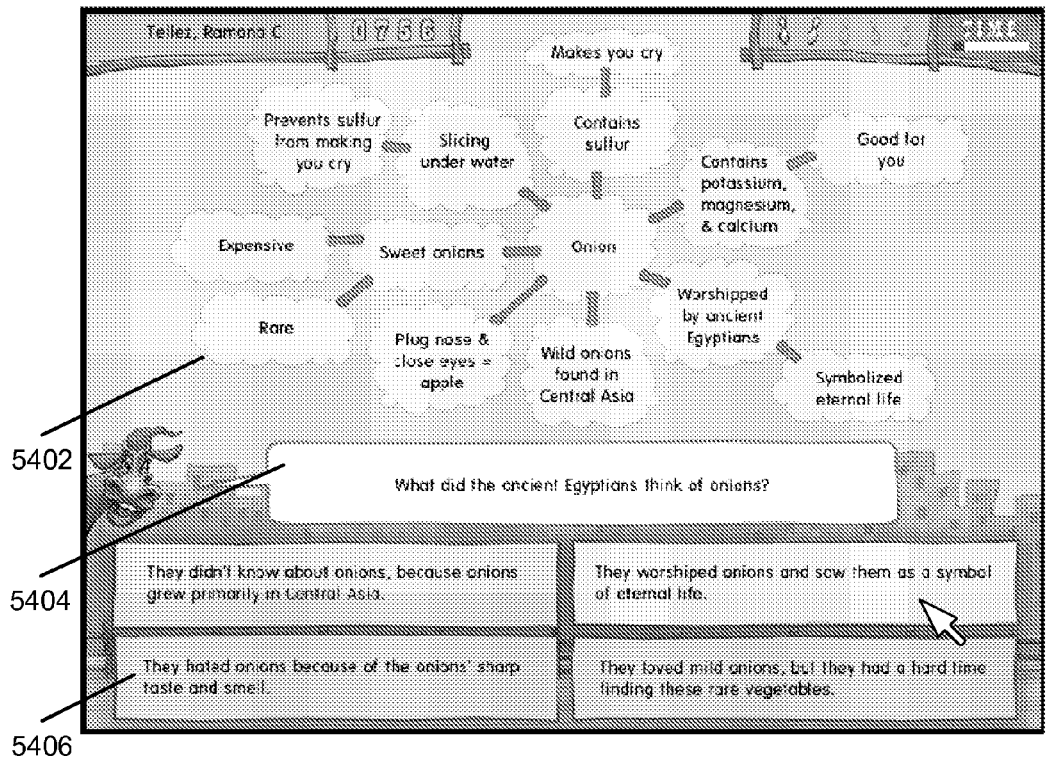
FIG. 54 is an exemplary screenshot illustrating a trial in stage 3, directed to use of the concept web of FIG. 53, according to one embodiment.

FIG. 54 illustrates an exemplary stage 3 follow-on screenshot (presented after all the missing elements have been selected and added to the concept web) wherein the completed concept web 5402 is presented to the student, and a question 5404 regarding the passage is asked of the student. The student is then required to select from among a plurality of responses 5406 to answer the question, e.g., using the completed concept web as a cognitive tool. Of course, further stage 3 trials may also be performed as desired.

Figure 55:
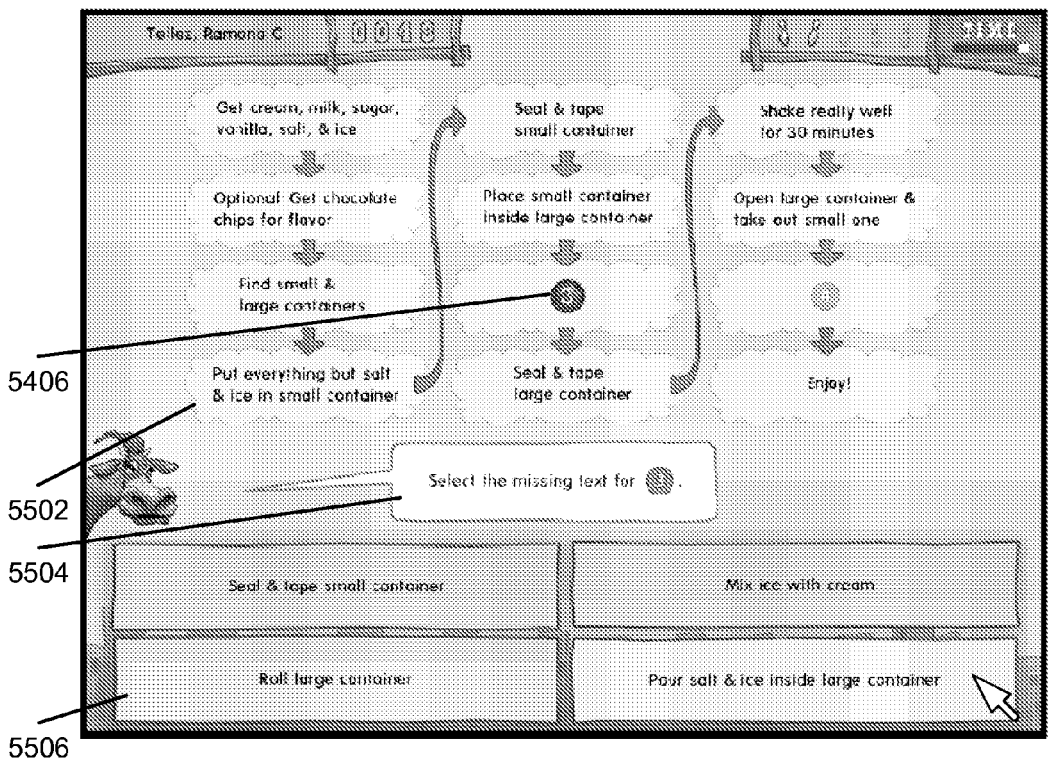
FIG. 55 is an exemplary screenshot illustrating a trial in stage 2 of the Lana's Lane exercise, where the incomplete graphic organizer is a timeline/flowchart, according to one embodiment.

FIG. 55 is an exemplary screenshot illustrating a trial where the incomplete graphic organizer is a timeline/flowchart. For brevity, the corresponding text passage is not shown, as the presentation of such passages is described repeatedly above, nor are the related stage 1 and stage 3 trials described. As FIG. 55 shows, a flowchart is shown, where the flowchart illustrates a stepwise process for making ice cream. In this "complete the graphic organizer" trial (stage 2), an incomplete flowchart 5502 is displayed, where various flowchart steps or elements are missing, each provided with a numeric label, such as the missing element labeled "3" 5504. An instruction 5506 is also displayed directing the student to select from a plurality of textual responses 5508 to fill in the indicated missing element (element 3). As may be seen, the student has (correctly) selected the bottom right response.

Note that in performing the above-described stage 2 trials, if the student selects the correct response, e.g., clicks on the correct response, e.g., clicks the correct item for the designated location in the graphic organizer, then, as above, an appropriate indication may be provided, e.g., the box with the correct response may be highlighted in yellow, a "ding" may play, and points may be awarded. In some embodiments, if bonus points are awarded, 3 "dings" may be played. Moreover, in one embodiment, the correct answer may appear in the correct position in the graphic organizer.

If the student selects an incorrect response, an appropriate indication may be provided. For example, a "thunk" sound may be played, and the selected response may change to a grayed out state. In some embodiments, if this is the third attempt for this trial, the incorrect responses may be grayed out, the box with the correct response may be highlighted, e.g., in white, and the correct response may appear in the correct position in the organizer, e.g., in blue text. If this is not the third attempt at answering this question, then the passage may be displayed along with a "done reading" button, where the button may become active after a specified time interval, e.g., 0.5 seconds per line of text (up to a maximum of 4 seconds). As described earlier, the student may click the "done reading" button when finished reading each page.

Similar to above, if the student did not answer the trial correctly on the first attempt, the trial may reappear with previously selected responses grayed out. The student may select another answer from the remaining responses. After each incorrect response the student may be presented with the passage and given another opportunity to answer the trial. This may continue until the student responds correctly or the student has attempted unsuccessfully three times. At that point, the student moves on to the next trial in the stage, repeating the interaction as described above. If this is the last trial in the stage (2) stage, the student may advance to stage 3.

Strategy Task Type 4: Choose a Summary

As noted above, in this task the student may be presented with a plurality of possible summaries of the passage, and may be required to select the best summary for the passage.

Trial Interaction:

In one embodiment, a plurality (e.g., 4) of possible summaries for the passage may be presented. The student may be instructed to select the best summary for the passage from among the plurality of possible summaries. If the student has attempted this trial before (unsuccessfully), all previously selected incorrect answers may be grayed out (and inactive).

Figure 56:
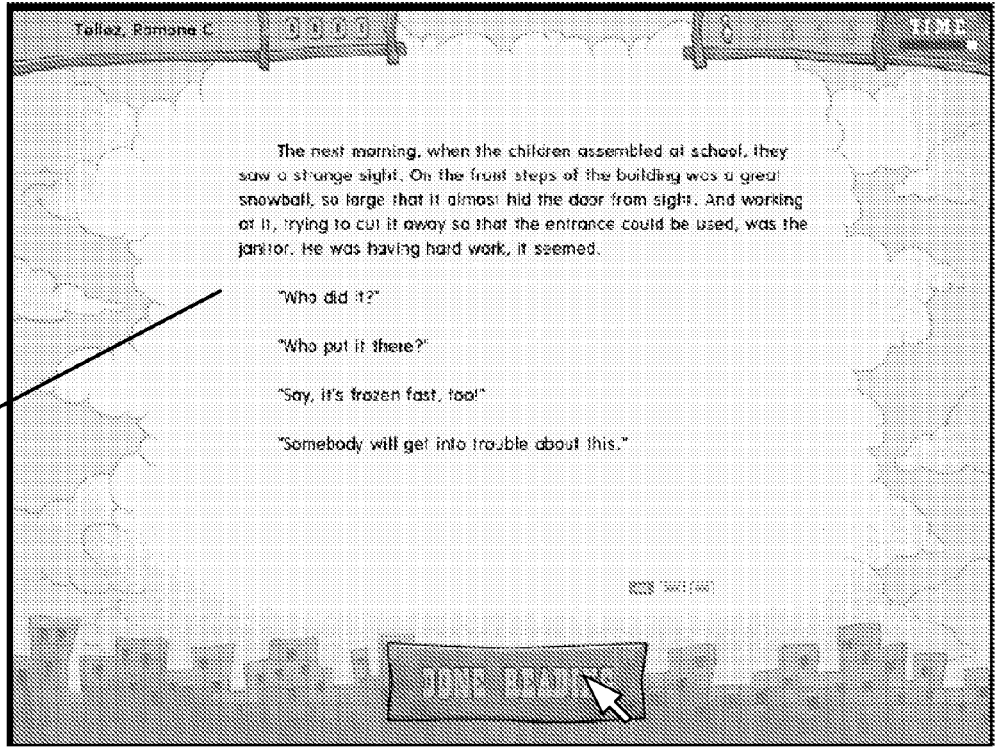
FIGS. 56-59 are exemplary screenshots illustrating trial interactions in a stage 2 "choose a summary" strategy task of the Lana's Lane exercise, according to one embodiment.
Figure 57:
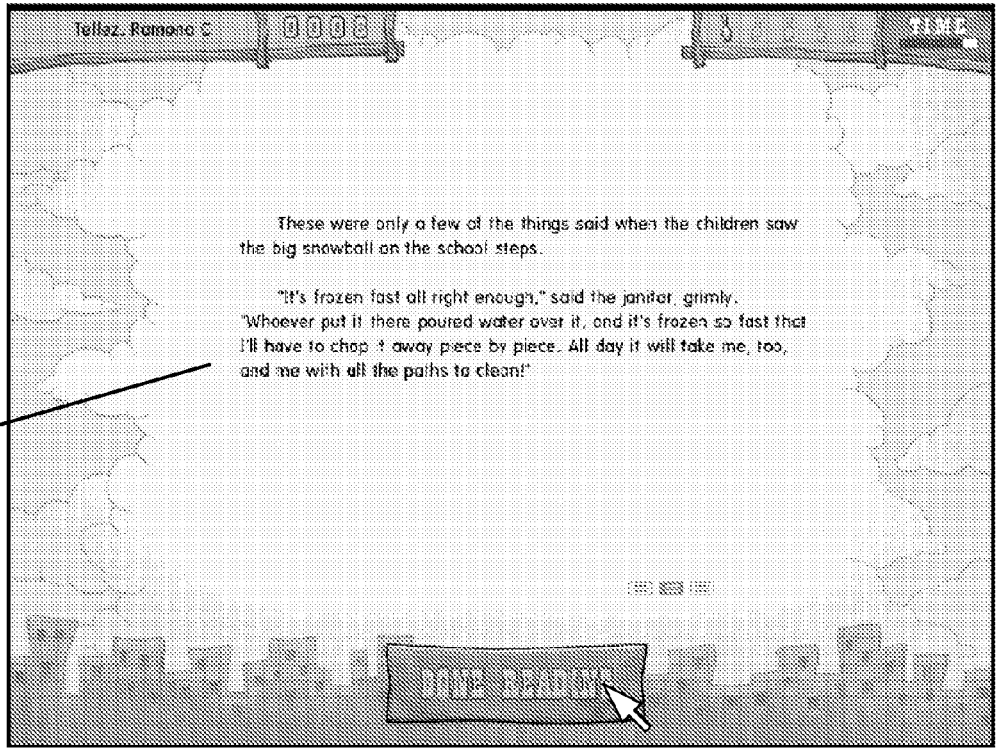
Figure 58:
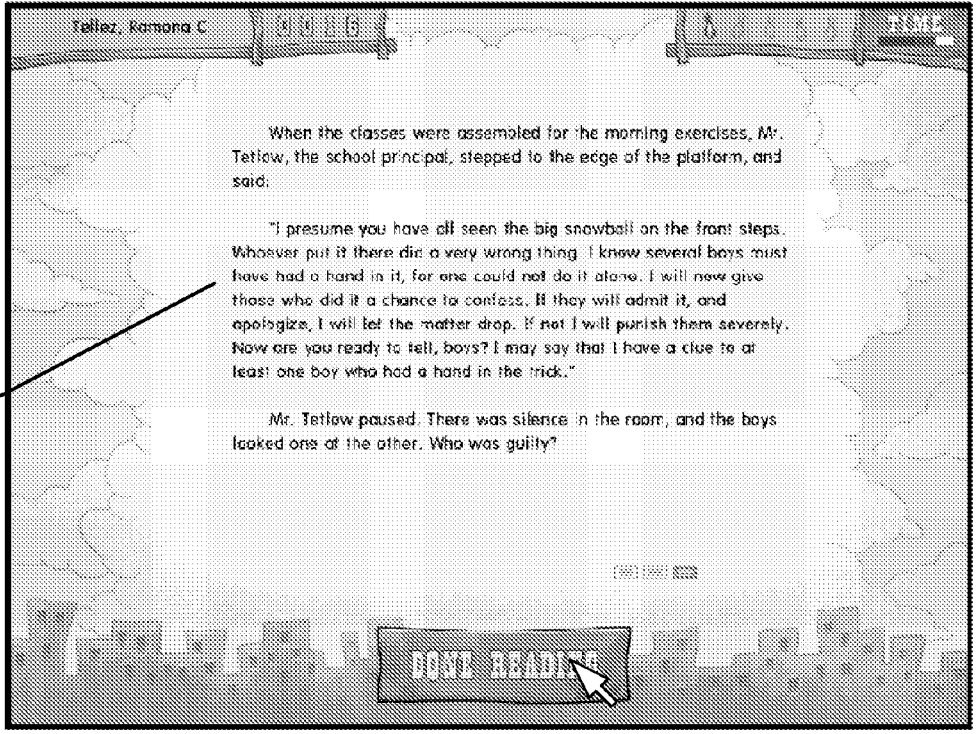
Figure 59:
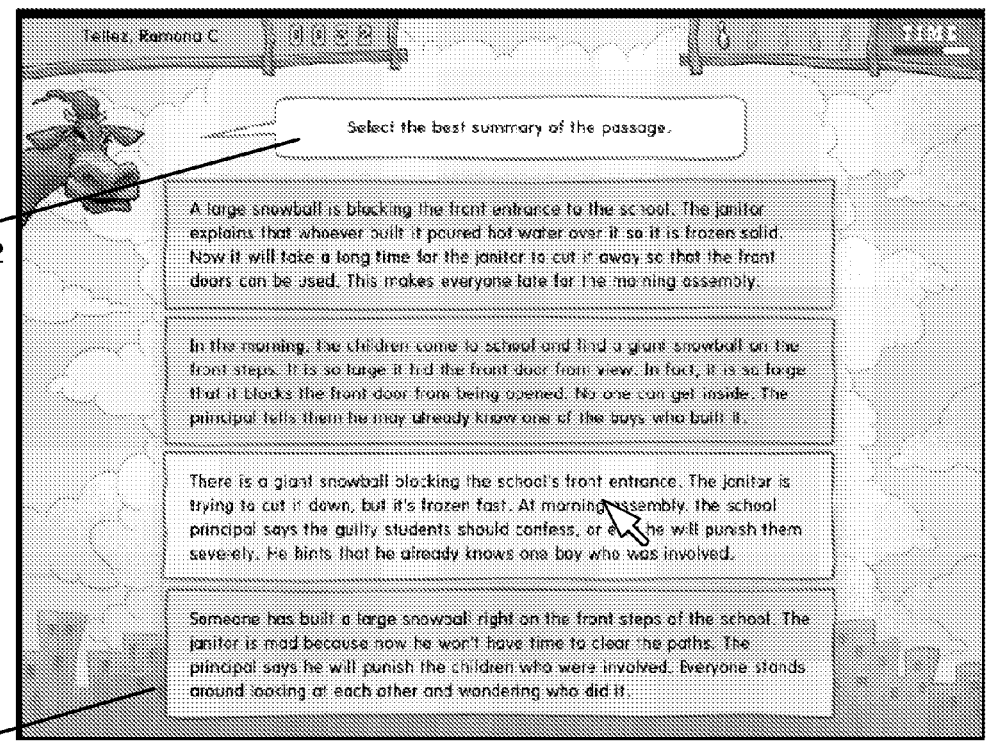

FIGS. 56-59 are exemplary screenshots illustrating trial interactions in the "choose a summary" strategy (stage 2) task. As shown, FIG. 56 presents a first page of a passage 5602 to the student. As noted above, in some embodiments, one or more stage 1 question/response cycles may be performed with respect to this page of the passage (not shown, for brevity), as described above, after which another page of the passage 5702 may be presented, as shown in FIG. 57. Similarly, after one or more possible (stage 1) question/response cycles are performed, a third, final, page of the passage 5802 is shown presented in FIG. 58. In one embodiment, an additional one or more question/response cycles (e.g., stage 1) may be performed regarding this last page of the passage (not shown for brevity). Finally, as shown in FIG. 59, per the "choose a summary" task of stage 2 of the exercise, a plurality of possible summaries 5904 for the passage of FIGS. 56, 57, and 58, are presented to the student, and the student is directed via instruction 5902 to select a best summary from the possible summaries 5904. As indicated by the cursor, the student has (correctly) selected the third summary from the possible summaries.

Figure 60:
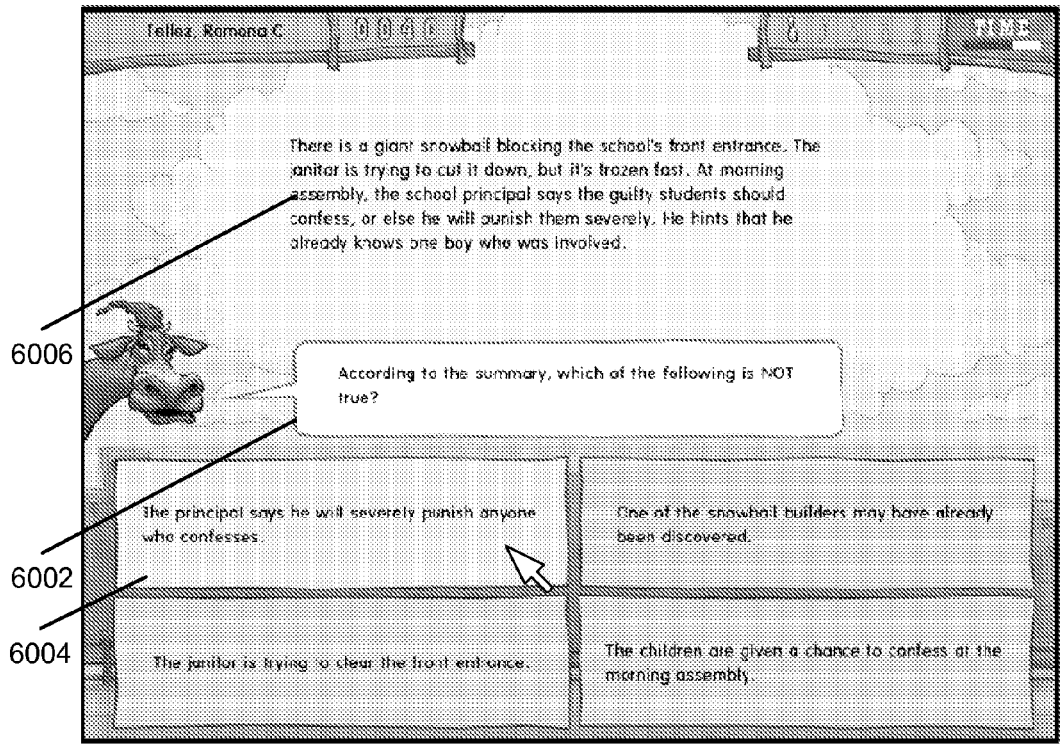
FIGS. 60 and 61 are exemplary screenshots illustrating trial interactions in stage 3 directed to the (correct) summary of FIG. 59, according to one embodiment.
Figure 61:
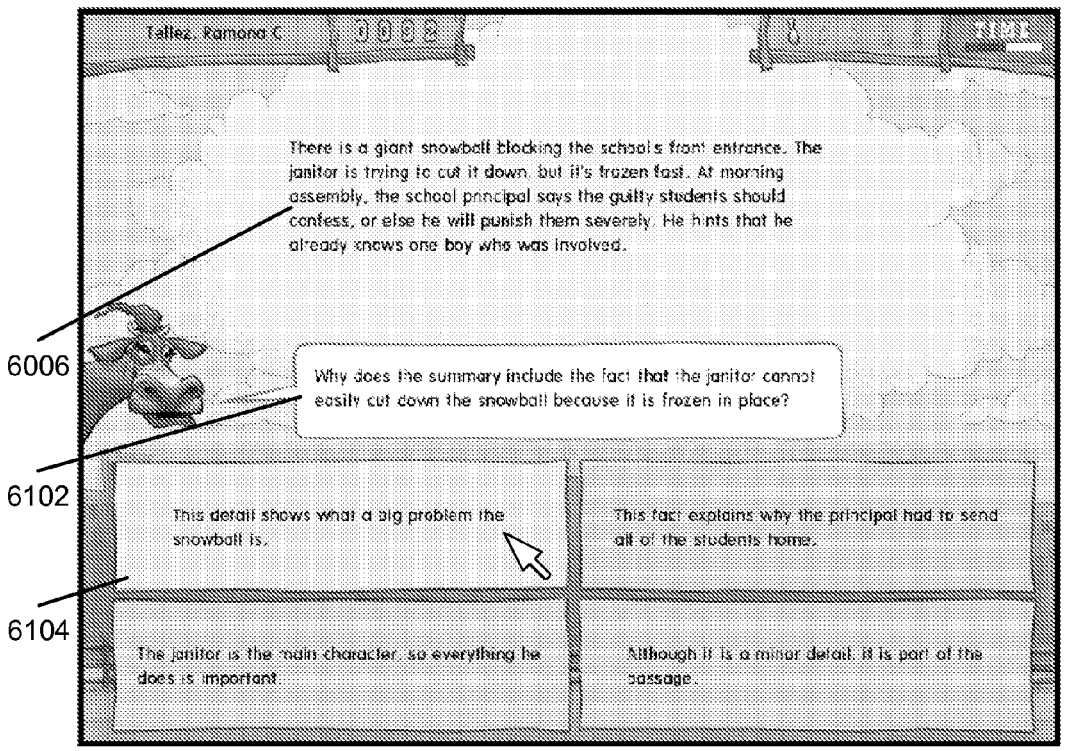
Figure 62:
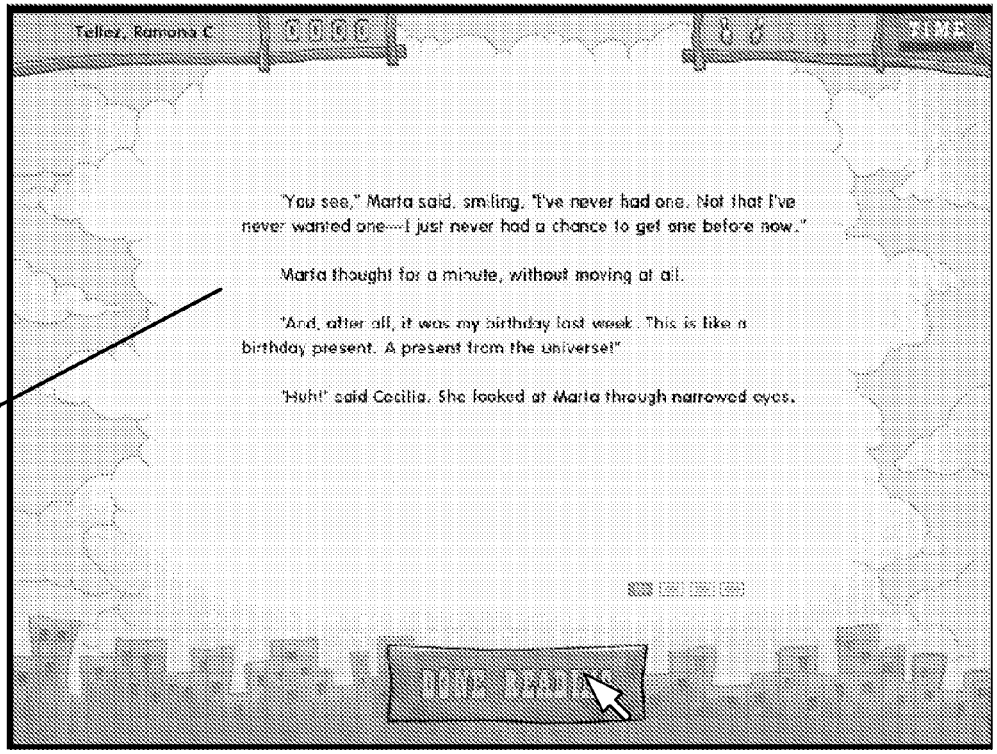
FIGS. 62-68 are exemplary screenshots illustrating trial interactions in a "build a summary" strategy task of stage 2 in the Lana's Lane exercise, according to one embodiment.
Figure 63:
Figure 64:
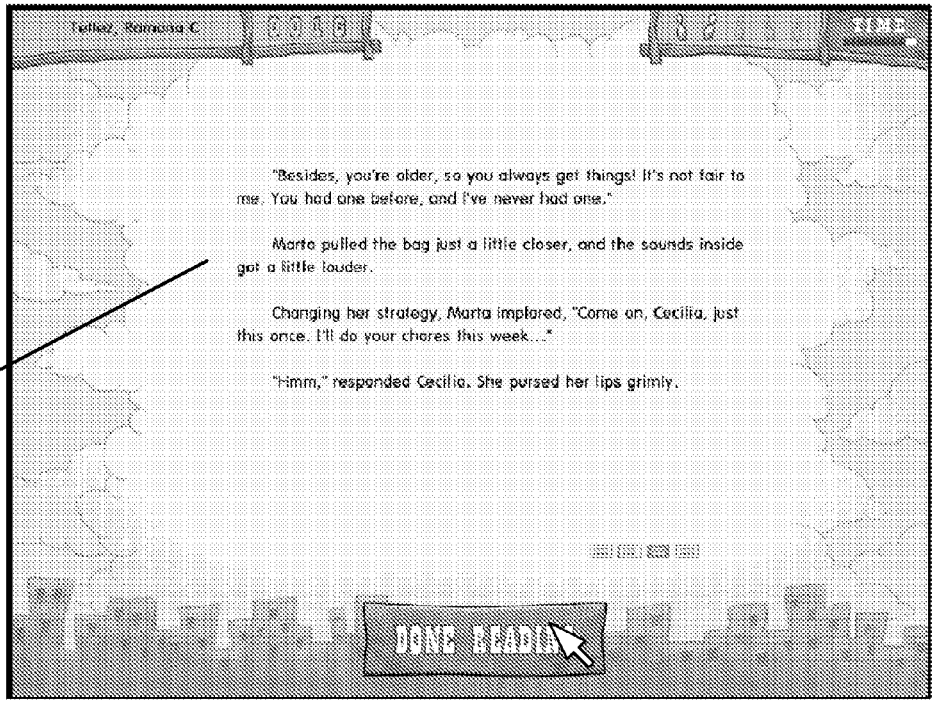
Figure 65:
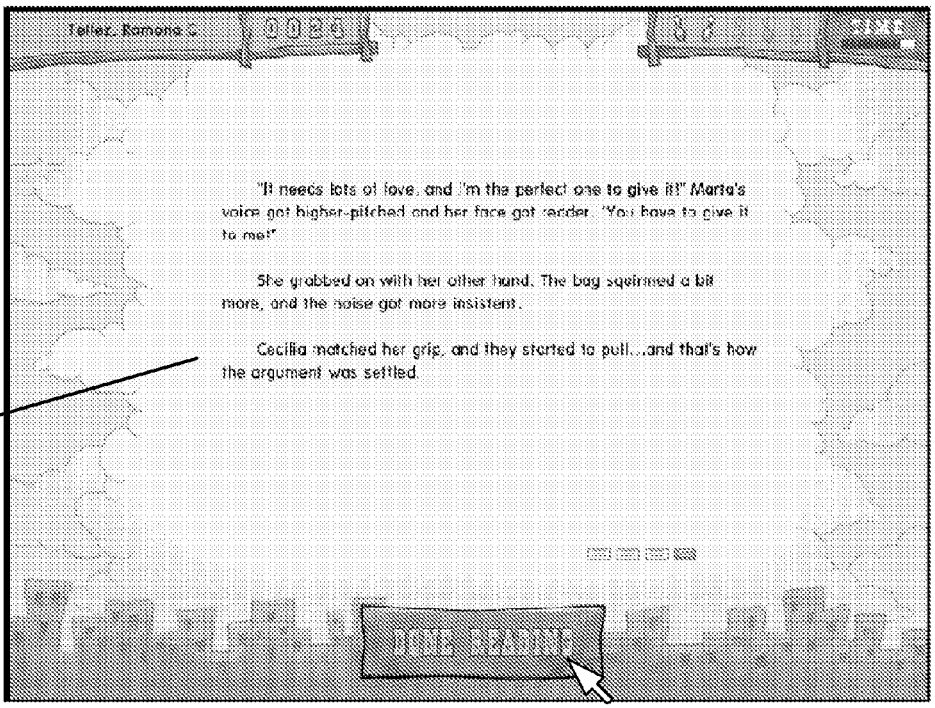

In some embodiments, once the summary has been correctly selected, one or more questions/responses may be performed regarding the summary in stage 3, as shown in FIGS. 60 and 61, where, as may be seen, the summary 6006 is presented, and in each case, a question (e.g., 6002 of FIG. 60, and 6102 of FIG. 61) is presented to the student, and, as above, the student is required to select from a plurality of possible answers (e.g., 6004 of FIG. 60, and 6104 of FIG. 61).

Similar to above, in these stage 2 trials, if the student selects the correct response, e.g., clicks on the correct summary item, then, as above, an appropriate indication may be provided, e.g., the box with the correct response may be highlighted in yellow, a "ding" may play, and points may be awarded. In some embodiments, if bonus points are awarded, 3 "dings" may be played.

If the student selects an incorrect response, an appropriate indication may be provided. For example, as above a "thunk" sound may be played, and the selected response may change to a grayed out state. In some embodiments, if this is the third attempt for this trial, the incorrect responses may be grayed out, the box with the correct response may be highlighted, e.g., in white, and a pause (e.g., for 2 seconds) may be provided to allow the student to read the correct summary. If this is not the third attempt at answering this question, then the passage may be displayed along with a "done reading" button, where the button may become active after a specified time interval, e.g., 0.5 seconds per line of text (up to a maximum of 4 seconds). As described earlier, the student may click the "done reading" button when finished reading each page.

As with the previous task, if the student did not answer the trial correctly on the first attempt, the trial may reappear with previously selected responses grayed out. The student may select another answer from the remaining responses. After each incorrect response the student may be presented with the passage and given another opportunity to answer the trial. This may continue until the student responds correctly or the student has attempted unsuccessfully three times, at which point, the student may move on to the next trial in the stage, repeating the interaction as described above. If this is the last trial in the stage (2) stage, the student may advance to stage 3.

Strategy Task Type 5: Build a Summary

As noted above, in this task the student may be presented with partial summary of the passage, and may be required to select from among a plurality of sentence to best start/continue/complete the summary for the passage.

Trial Interaction:

In one embodiment, a partial summary may be presented, along with a plurality (e.g., 4) of sentences, one of which best starts, continues, or completes the summary. The student may be instructed to select the best sentence to start, continue, or complete, the summary for the passage. If the student has attempted this trial before (unsuccessfully), all previously selected incorrect answers may be grayed out (and inactive).

Figure 66:
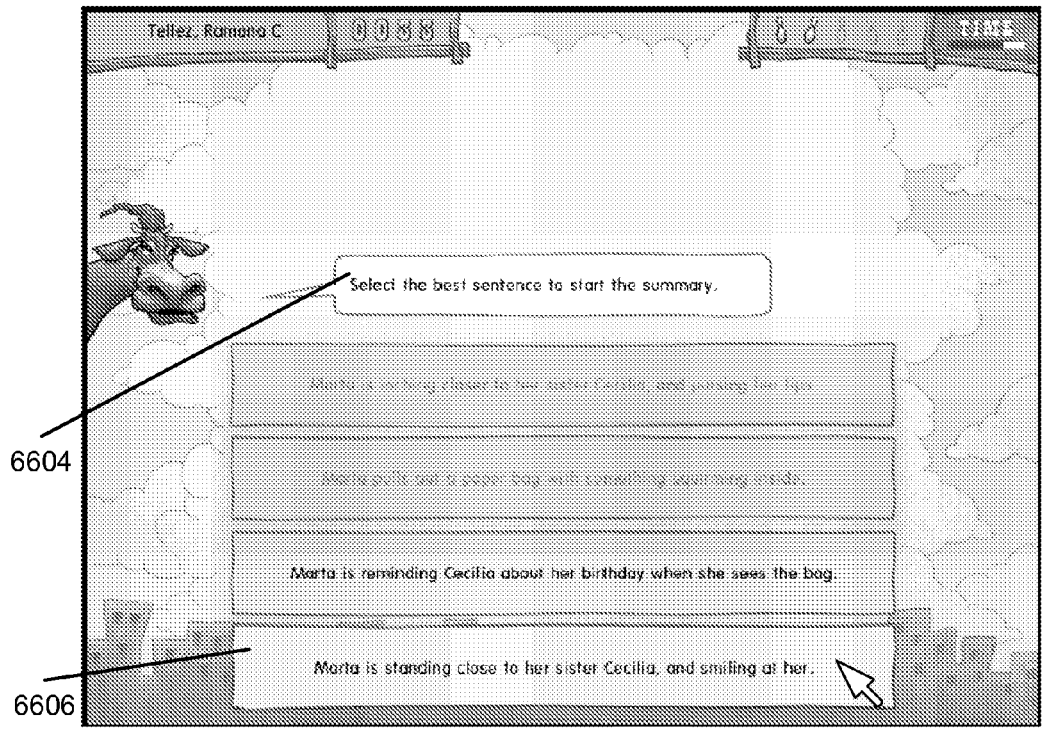

FIGS. 62-68 are exemplary screenshots illustrating trial interactions in the "build a summary" strategy task of stage 2. As may be seen, FIGS. 62-65 present successive pages (see elements 6202, 6302, 6402, and 6502, respectively) of a stimulus passage, as described above at length. In some embodiments, after each page is presented, one or more question/response cycles may be performed in stage 1, as also described above. FIG. 66 is an exemplary screenshot illustrating an instruction 6604 directing the student to select a best sentence from a plurality of presented sentences 6606 to begin a summary of the presented stimulus passage, where, as may be seen, the student has (correctly) selected the last of the sentences after making two incorrect selections (the first and second selections, shown grayed out).

Figure 67:
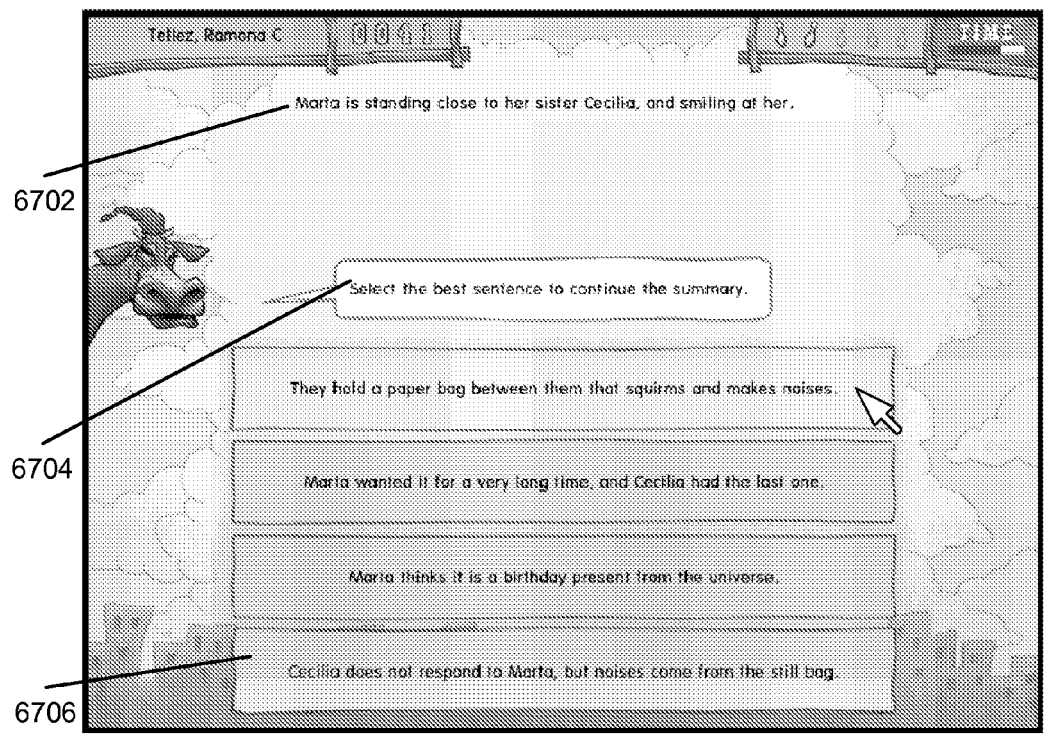
Figure 68:
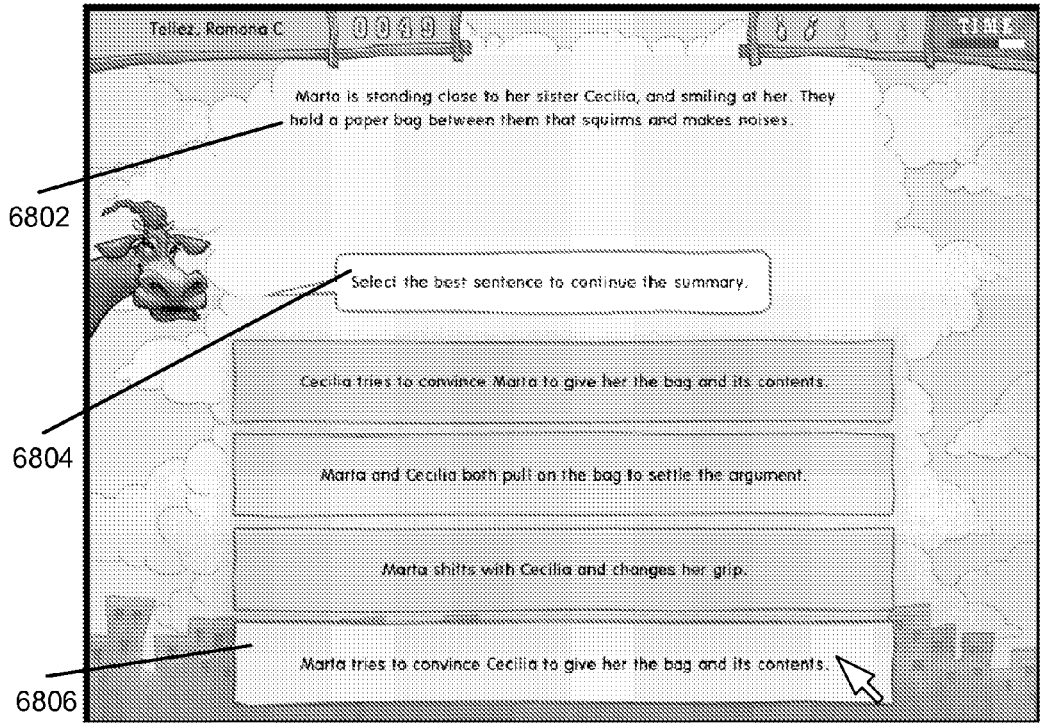

FIG. 67 is an exemplary screenshot wherein it may be seen that the correctly selected sentence from FIG. 66 is displayed in a summary display portion 6702 of the screen. As also shown in FIG. 67, an instruction 6704 is presented directing the student to select a next sentence from another plurality of sentences 6706 for the summary, where, as may be seen, the student has (correctly) selected the first sentence. FIG. 68 illustrates another screenshot where, as shown, the second sentence (from FIG. 67) has been added to the summary 6802. The student is again directed by instruction 6804 to select another sentence for the summary from yet another plurality of sentences 6806. As indicated, the student has (correctly) selected the last sentence. This process may be repeated until the student has completed the summary, after which, as indicated above, the student may perform trials in stage 3 directed to the completed summary.

Figure 69:
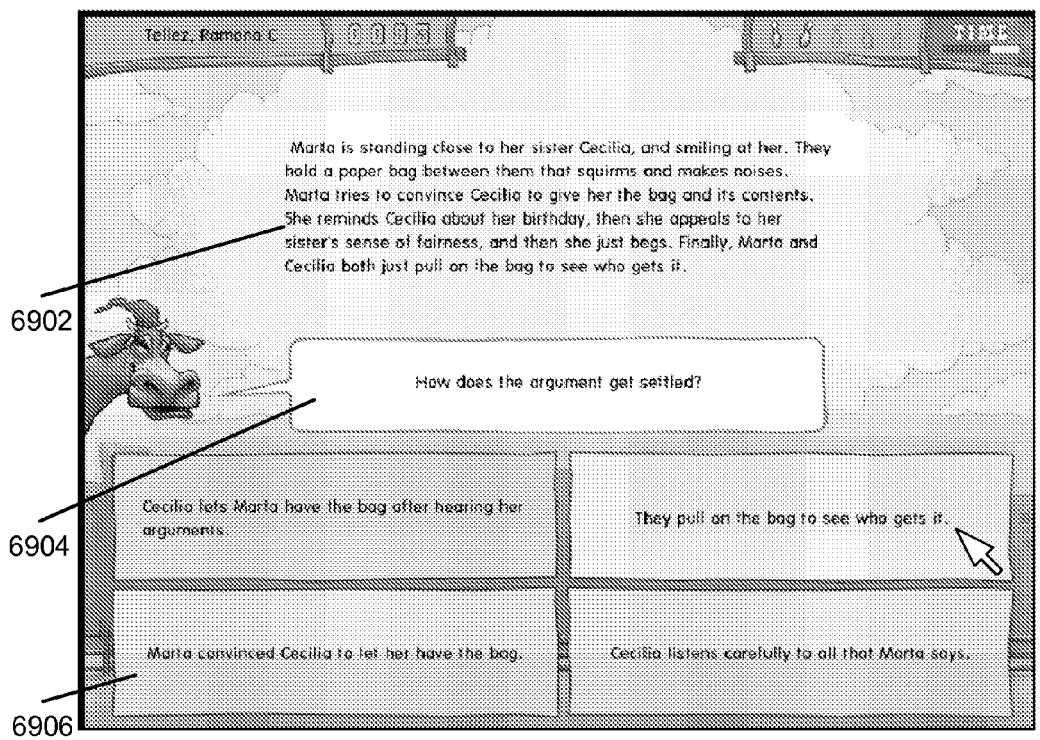
FIG. 69 is an exemplary screenshot illustrating a stage 3 trial interaction directed to the completed summary of FIGS. 62-68, according to one embodiment.

FIG. 69 is an exemplary screenshot illustrating a stage 3 trial interaction wherein the completed summary 6902 is displayed, and the student is asked a question 6904, in response to which the student is required to select an answer from a plurality of textual responses 6906. Of course, further stage 3 question/response trials may also be performed regarding the completed summary.

Regarding trials in this task, similar to above, if the student selects the correct response, e.g., clicks on the correct summary item, then, as above, an appropriate indication may be provided, e.g., the box with the correct response may be highlighted in yellow, a "ding" may play, and points may be awarded. In some embodiments, if bonus points are awarded, 3 "dings" may be played. Additionally, the correct sentence may be added to the displayed summary.

In the above stage 2 trials, if the student selects an incorrect response, an appropriate indication may be provided. For example, as above a "thunk" sound may be played, and the selected response may change to a grayed out state. In some embodiments, if this is the third attempt for this trial, the incorrect responses may be grayed out, and the box with the correct response may be highlighted, e.g., in white. If this is not the third attempt at answering this question, then the passage may be displayed along with a "done reading" button, where the button may become active after a specified time interval, e.g., 0.5 seconds per line of text (up to a maximum of 4 seconds). As described earlier, the student may click the "done reading" button when finished reading each page.

As with the previous tasks, if the student did not answer the trial correctly on the first attempt, the trial may reappear with previously selected responses grayed out. The student may select another answer from the remaining responses. After each incorrect response the student may be presented with the passage and given another opportunity to answer the trial. This may continue until the student responds correctly or the student has attempted unsuccessfully three times, at which point, the student may move on to the next trial in the stage, repeating the interaction as described above. If this is the last trial in the stage (2) stage, the student may advance to stage 3.

Stage 3: Post-Strategy Comprehension Questions

In stage 3, the student may be presented with trials directed to one or more of the tasks of stage 2, where the student is required to perform these trials with the goal of reviewing and showing proficiency in the techniques presented in those tasks.

Trial Interaction:

In one embodiment, the correct diagram, organizer, or summary from stage 2 (see above) may be displayed on the screen, as well as a question with a number (e.g., 4) of possible responses, one of which is the correct or best answer to the question.

Examples of stage 3 trials are described above with reference to FIGS. 54, 60, 61, and 69. Note that these descriptions are provided above after respective stage 2 trial descriptions to provide a context for the stage 3 trial descriptions.

In stage 3 trials, if the student selects the correct response, e.g., clicks on the correct answer to the question, then, as above, an appropriate indication may be provided, e.g., the box with the correct response may be highlighted in yellow, a "ding" may play, and points may be awarded. If bonus points are awarded, 3 "dings" may be played.

If the student selects an incorrect response, an appropriate indication may be provided, e.g., as above, a "thunk" sound may be played, and the selected response may change to a grayed out state.

The student may repeat the above interaction for each of a plurality of questions in the stage. At the end of the stage, the student may advance to the next passage in the current level. After all passages in the level have been attempted, the student may repeat those passages for which passing criteria were not met, e.g., following the advancement and progression rules outlined below.

Exemplary Content and Progression

The following presents an exemplary embodiment of a content set for the above-described exercise (Lana's Lanes), although it should be noted that the information is exemplary only, and is not intended to limit the exercise to any particular set of pictures, sentences, sentence segments, or progression sequence or criteria.

Task Type and Task Difficulty

Logic Diagrams: logic diagrams may be used in multiple tasks of varying difficulty. For example, in one embodiment, an "easy" or less difficult task may be characterized by the student being required to choose the best circle diagram representing a logical relationship from the passage from a plurality of circle diagrams, e.g., the "choose the best circle diagram" task described above. A "hard" or more difficult task may be characterized by the student being required to fill-in or complete a circle diagram, e.g., the "complete the diagram" task described above.

Graphic Organizers: graphical organizers may also be used in multiple tasks of varying difficulty, where, for example, the task may be "easy" or "hard", depending on the portion of information the student is required to fill in. Examples of graphic organizers include, but are not limited to: 1) Table; 2) Concept Web, and 3) Timeline/Flowchart; among others.

Summarization: finally, summaries may be used in multiple tasks of varying difficulty, where, for example, an "easy" task may be characterized by the student being required to choose the best summary from a plurality of possible summaries, as described above in the "choose the summary" task. A "hard" task may be characterized by the student being required to identify each of one or more sentences to build a summary, as also described above.

The various tasks may also have other dimensions of difficulty, including, for example, question difficulty (e.g., literal/look-up vs. inferential/integrative/met cognitive), text difficulty (e.g., grade levels 3-5 vs. 6-8, e.g., as characterized by an online Lexile Analyzer to rate each passage), and text length (e.g., short=75-200 words, long=240-480 words).

Content Overview and Order of Progression

The following presents an exemplary characterization of content for tasks in the exercise (Lana's Lanes), as well as the organization and content of progression levels the student works through while performing the exercise.

| Level-id | Task Type | Task Difficulty | Questions | Text Difficulty | Text Length | Passages | Eval. Quest. |
|---|---|---|---|---|---|---|---|
| 1 | Choose a diagram | Easy | Easy | Easy | Short | 4 | 12 |
| 2 | Fill in a diagram | Hard | Both | Easy | Short | 4 | 12 |
| | Graphic Organizer: | | | | | | |
| 3 | Table | Easy | Easy | Easy | Short | 2 | 10 |
| 3 | Table | Hard | Both | Easy | Long | 2 | 10 |
| 3 | Table | Hard | Both | Hard | Long | 2 | 10 |
| | Graphic Organizer: | | | | | | |
| 4 | Concept Web | Easy | Easy | Easy | Short | 2 | 10 |
| 4 | Concept Web | Hard | Both | Easy | Long | 2 | 10 |
| 4 | Concept Web | Hard | Both | Hard | Long | 2 | 10 |
| | Graphic Organizer: | | | | | | |
| 5 | Timeline/Flowchart | Easy | Easy | Easy | Short | 2 | 10 |
| 5 | Timeline/Flowchart | Hard | Both | Easy | Long | 2 | 10 |
| 5 | Timeline/Flowchart | Hard | Both | Hard | Long | 2 | 10 |
| 6 | Choose Summary | Easy | Easy | Easy | Short | 2 | 10 |

-continued

| Level-id | Task Type | Task Difficulty | Questions | Text Difficulty | Text Length | Passages | Eval. Quest. |
|---|---|---|---|---|---|---|---|
| 6 | Choose Summary | Easy | Both | Easy | Long | 2 | 10 |
| 6 | Choose Summary | Easy | Both | Hard | Long | 2 | 10 |
| 7 | Build Summary | Hard | Easy | Easy | Short | 2 | 10 |
| 7 | Build Summary | Hard | Both | Easy | Long | 2 | 10 |
| 7 | Build Summary | Hard | Both | Hard | Long | 2 | 10 |
|   |   |   |   |   |   | 38 | 174 |

Progression:

Terms: The following presents an exemplary set of terms used herein with respect to the exercise (Lana's Lanes), as well as the organization and content of progression levels the student works through while performing the exercise.

| Term | General definition | Exercise-specific definition |
|---|---|---|
| Trial | Stimulus and response options presented to a student; response is evaluated | See above for descriptions of each type of trial. |
| Unit | group of trials to be evaluated for advancement | All the trials in stage 3 of a Passage: There are 5 trials per unit in each passage. (Levels 1 and 2 have only 3 trials . . . ) |
| Stage | One of multiple activities performed by a student on the same or a related content set | Each passage is progressed through in 3 stages: Passage Read/Comprehension Check, Strategy Task, Passage Comprehension |
| Task | Type of activity performed by student in a trial; can be multiple tasks within a stage | Stage 1: Student reads passage and answers comprehension check questions; one per page of passage. Stage 2: Student performs strategy task; one of five types (choose an Euler diagram, fill in an Euler diagram, fill in a graphic organizer, choose a summary, build a summary) Stage 3: Student answers comprehension questions based on graphic organizer. |
| Passage | A block of related text. | Level 1 and 2 have 4 passages; all other levels have 6 passages varying in size and difficulty. |
| Page | The portion of the text block that fits on a single screen. | Passages vary from 1-4 pages. |
| Level | Grouping of sets designated as hierarchically equivalent based on one or more shared attributes | Levels 1-6: grouped based on Strategy Task Type: Euler Diagrams, Comparison Matrix, Semantic Web/Relationship Tree, Timeline/Outline/Flowchart, Choose a Summary, Build a Summary |

Advancement:

Evaluation of a Trial:

Stage 1, Passage Read/Check Questions, and Stage 2, Strategy Task: A trial may be evaluated as correct if the student clicks on the correct response, and the student may be awarded points, as described above. In some embodiments, stage 1 and 2 trials may not be evaluated for advancement, but may be tracked so that the data may be used for reporting purposes. Trials answered incorrectly on the first attempt may be repeated as "learning trials" up to 2 more times. Correct answers for these "learning trials" may receive fewer points and may not count as correct for the purpose of reporting or determining rules for repeating the passage.

Stage 3, Comprehension: A trial may be evaluated as correct if the student clicks on the correct response, and the student may be awarded points as described above.

Evaluation of a Unit:

Stage 3, Comprehension: In one embodiment, only stage 3 trials may be evaluated for advancement, and so a unit may be considered to be only the stage 3 trials for a given passage. To successfully pass a unit, the student may be required to answer some specified portion, e.g., 4 out of 5 questions, correctly in stage 3 (or, e.g., 3 of 3 if only 3 questions are available). If the student meets the criteria for passing the unit, the passage may be closed. If the student does not meet the criteria, the student may transition to the next passage in the current level. At the end of the level, any passages for which the criteria were not met may be repeated. In preferred embodiments, the student may repeat the failed passage beginning at stage 1.

Plateau Based Transition:

If after 3 attempts, the student has not met the criteria for passing all passages in the level, the student may transition to the next level. After all passages in the exercise have been completed (passed or failed 3 times), those passages that were not passed may be repeated, e.g., using the same progression and rules of advancement as when they were originally presented. The repetition of a passage at the end of the exercise preferably always begins with stage 1. The student may continue to work on these passages until mastery is achieved, e.g., until passing criteria are met.

Exit and Re-Entry:

The student may exit or time-out at any point during the exercise. If exiting before the end of stage 1, the student may be returned to the beginning of stage 1 upon re-entry. If exiting before the end of stage 2, the student may be presented with the passage, and after clicking "done reading" through all pages of the current passage, may be returned to the beginning of stage 2. If exiting after stage 2, upon re-entry to stage 3, the student may be presented with the initiation (e.g., OR) button. After clicking the initiation button the student may be presented with the next unanswered trial in stage 3.

Progress Markers:

Progress through the exercise (comparable to percent-through) may be marked by the addition of a total of 5 markers. In one embodiment, each of the first 4 markers may be awarded after 8 passages are passed. The final marker may be awarded after the final 6 passages are passed. The total number of markers may be 5.

End of Exercise:

The exercise may end when the student has met passing criteria in all units. It may then return to the wrapper, e.g., the startup screen, via a "Good Job" screen.

Figure 70A:
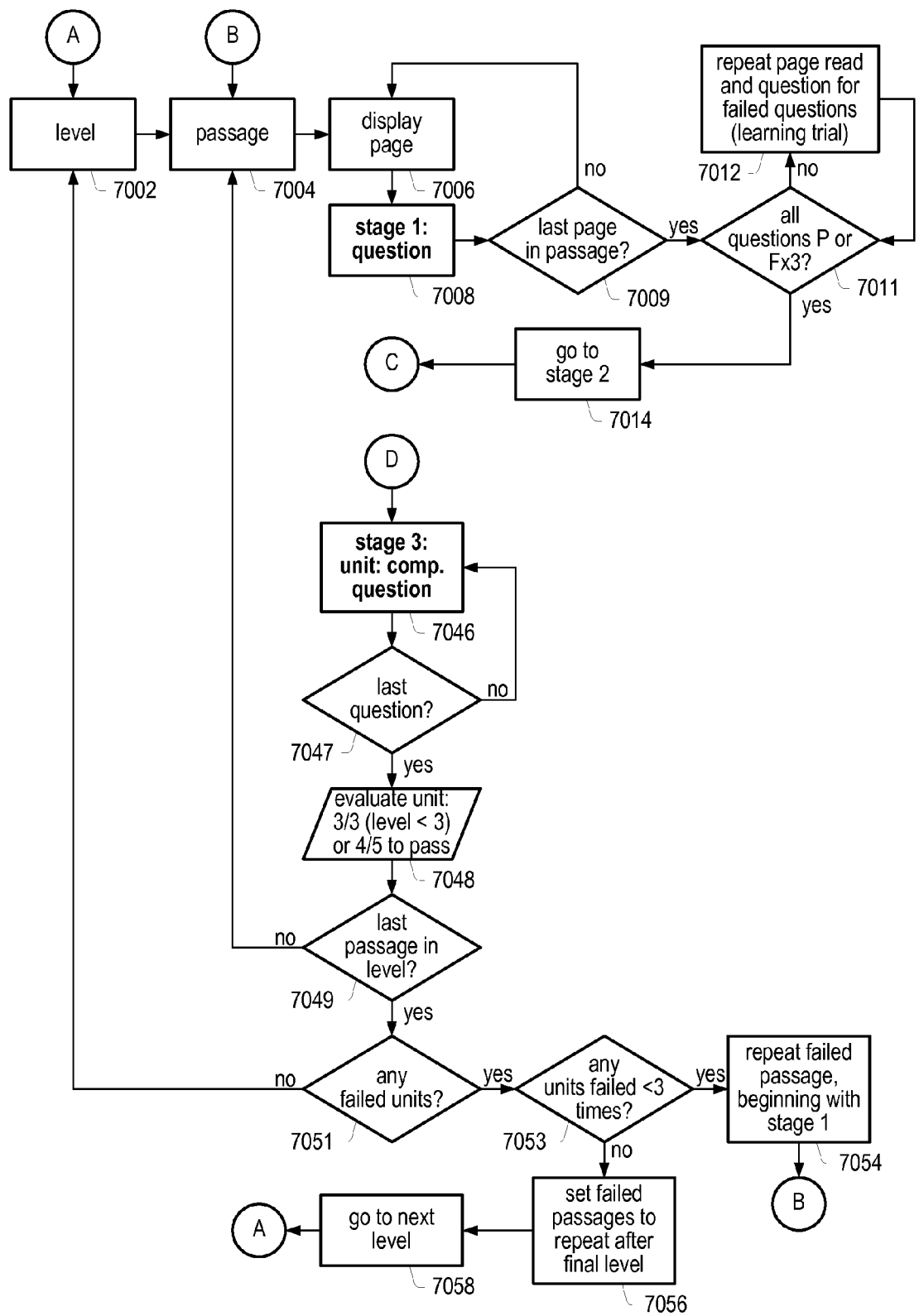
FIGS. 70A and 70B present a detailed flowchart illustrating progression through the Lana's Lanes exercise, according to one embodiment.
Figure 70B:
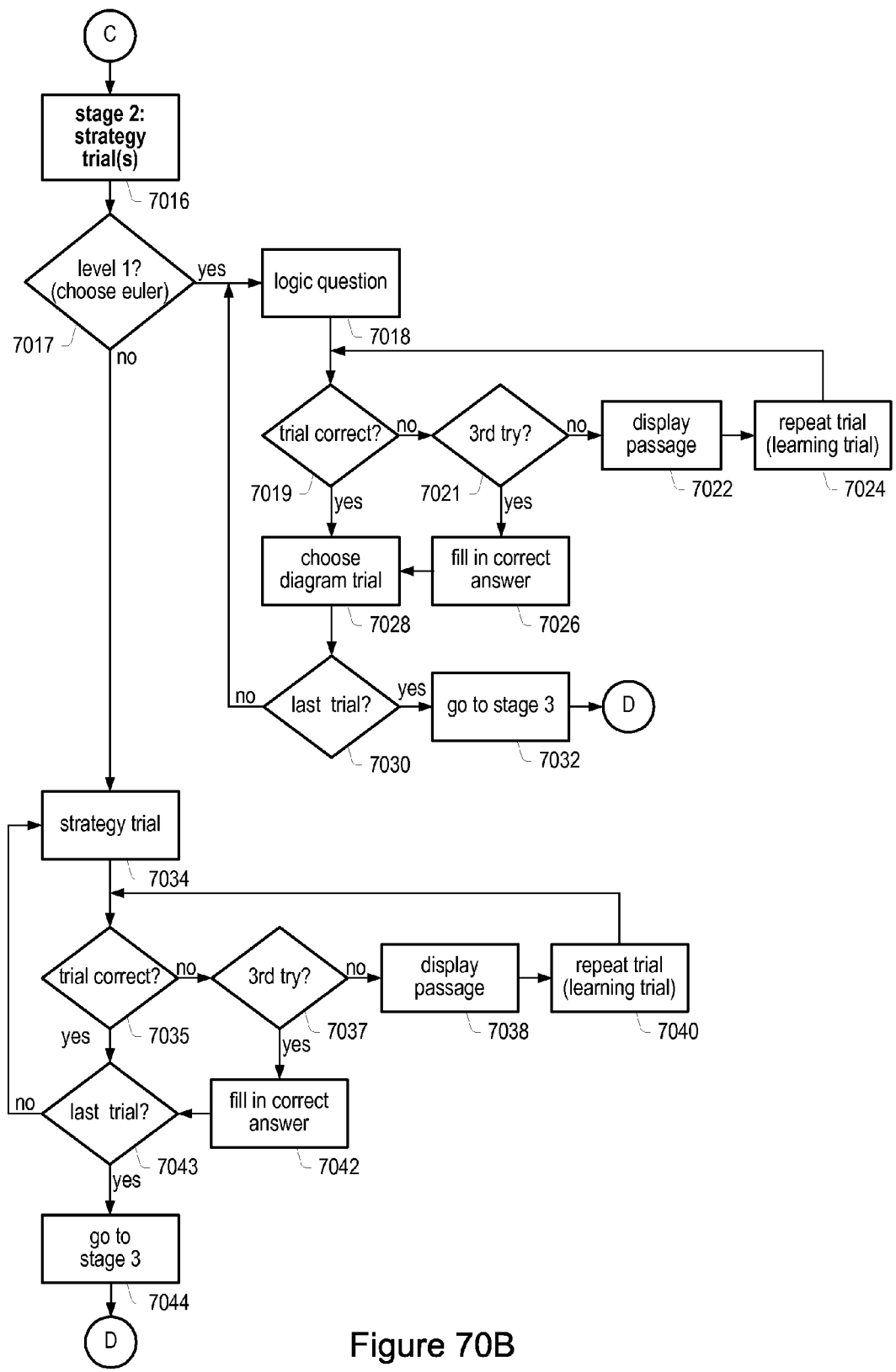

FIGS. 70A and 70B—Method For Building Skills in Accurate Text Comprehension and Use of Comprehension Strategies FIGS. 70A and 70B flowchart a computer-implemented method for building skills in accurate text comprehension and the use of comprehension strategies via a computing device, according to one embodiment. More specifically, the method is directed to performance of units in the Lana's Lanes exercise. Note that the method of FIGS. 70A and 70B is applicable to, and may include, embodiments of the method of FIG. 31 (and vice versa), and the description below may refer to various figures and passages directed to that method for brevity. Moreover, any of the aspects described above with respect to the method of FIG. 31 may be considered applicable to the method of FIGS. 70A and 70B (and vice versa). As noted above, in various embodiments, some of the method elements described may be performed concurrently, in a different order than described, or may be omitted. Additional method elements may be performed as desired.

Turning now to FIG. 70A, as may be seen, in 7002, the current level may be determined and set, e.g., to a next level in the exercise, or, at the start of the exercise, a first level (see, e.g., the Order of Progression chart above).

In 7004, the current passage may be determined and set, e.g., to a next passage in the exercise, or, initially, a first passage (again, see the above Order of Progression chart).

In 7006, a next page of the current passage may be displayed, e.g., on a display of the computing device. Various examples of screenshots displaying such pages are illustrated in FIGS. 33, 40, 44, 46, 50-52, 56-58, and 62-65, and described above.

In 7008, a stage 1 trial, e.g., a question/response regarding the displayed page, may be performed. For example, as described above with reference to each of FIGS. 34-37, 41, 45, and 47, a question may be displayed, as well as a plurality of possible answers or responses, from which the user may be required to select a best response to the question.

In 7009, a determination may be made as to whether the current page is the last page of the passage. If not, then the method may return to 7006, and continue as described above, i.e., displaying a next page in the passage. If the current page is the last page of the current passage, the method may proceed to 7011, described below.

In 7011, a determination may be made as to whether all the questions directed to the current passage were passed or failed a specified number of times, e.g., failed three times.

If all the questions directed to the current passage were not passed or failed the specified number of times (e.g., three times), then in 7012, the pages of the passage may be re-presented to the student and those questions that were not answered correctly may be presented again, with their respective pluralities of possible responses, where each plurality of possible responses is preferably displayed in a randomized order. This presentation of the passage and failed questions with responses may be repeated until the student has correctly answered (i.e., passed) all the questions for the passage.

Once all the questions for the current passage have been answered correctly, then in 7014, stage 2 may be initiated.

Turning now to FIG. 70B, progression of trials in stage 2 is shown. More specifically, as FIG. 70B indicates, in 7016, stage 2 strategy trials may be initiated.

In 7017, a determination may be made as to whether the current level is level 1 (where trials involve the student selecting an appropriate Euler diagram for a statement regarding the passage).

If in 7017 it is determined that the current level is level 1, then in 7018, a logic question or directive regarding the passage may be presented to the student, where, as described above, the student may be required to select a true logic statement from a plurality of possible logic statements regarding the passage. FIGS. 36 and 37, described above, illustrate exemplary trial interactions of this nature, i.e., in level 1 of stage 2.

In 7019, a determination may be made as to whether the trial of 7017 was performed correctly, i.e., was passed. If the trial was passed, then the method may proceed to 7028, described below, and if not, then in 7021, a determination may be made as to whether the trial has been failed a specified number of times, i.e., whether this was the third try at passing the trial. If not, then in 7022, the passage may be displayed again, and the trial repeated (e.g., as a "learning" trial), as indicated in 7024, and the method may proceed to 7019 and continue as described above (and below).

If in 7021, it is determined that the trial was failed the specified number of times, e.g., that this was the third (unsuccessful) try at passing the trial, then in 7021, the correct answer may be provided or displayed, i.e., the correct answer may be filled in, and the method may proceed to 7028, described below.

In 7028, a "choose the diagram" trial may be performed. An example of such trial is described above with reference to FIG. 38, where, as described, various circle diagrams are presented representing respective logical statements (both correct and incorrect) regarding pets, cats, dogs and poodles, e.g., graphically representing the ideas "no cats are dogs", "all poodles are dogs", "some cats are poodles/some poodles are cats", and some pets are dogs/some dogs are pets". As may be seen, the selection or choice boxes are labeled "Diagram 1", "Diagram 2", and so forth. The student is directed to select one of the diagrams representing a presented logical statement regarding the passage, in this particular example, the textual statement "all poodles are dogs".

In 7030, a determination may be made as to whether this was the last trial of stage 2 (e.g., at this level and/or task), and if not, then the method may proceed to 7018, where a next logic question may be presented, and the method may continue as described above.

If in 7030 it is determined that the trial was the last trial of stage 2 (e.g., at the current level and/or task) for the current passage, then in 7032, the method may proceed to stage 3, as indicated (see D of FIG. 70A).

If in 7017, it is determined that the current level is not level 1, then in 7034, a strategy trial may be performed, i.e., a stage 2 strategy trial in a level greater than level 1. Examples of such strategy trials for tasks in stage 2 are described above with reference to FIGS. 42, 43, 48, 49, 50-59, and 62-68.

In 7035, a determination may be made as to whether the trial of 7034 was performed correctly, i.e., was passed. If the trial was passed, then the method may proceed to 7043, described below, and if not, then in 7037, a determination may be made as to whether the trial has been failed a specified number of times, i.e., whether this was the third try at passing the trial. If not, then in 7038, the passage may be displayed again, and the trial repeated (e.g., as a "learning" trial), as indicated in 7040, and the method may proceed to 7034 and continue as described above (and below).

If in 7037, it is determined that the trial was failed the specified number of times, e.g., that this was the third (unsuccessful) try at passing the trial, then in 7042, the correct answer may be provided or displayed, i.e., the correct answer may be filled in, and the method may proceed to 7043, described below.

In 7043, a determination may be made as to whether the just performed trial is the last trial in stage 2, (e.g., at this level and/or task), and if not, then the method may proceed to 7034, where a next trial may be performed, and the method may continue as described above.

If in 7043 it is determined that the trial was the last trial of stage 2 (e.g., at the current level and/or task), then in 7044, the method may proceed to stage 3, as indicated (see D of FIG. 70A).

Turning back to FIG. 70A, and resuming the method at point D in the flowchart, in 7046, trials in stage 3 may be performed, e.g., a trial in a stage 3 unit directed to comprehension questions regarding the subject matter and techniques of the just-performed trials in stage 2 may be performed. In other words, the completed table, graphic organizer, or summary, from previous trials in stage 2 may be presented, and comprehension questions asked regarding the subject matter in the completed table, graphic organizer, or summary. Examples of such stage 3 trial interactions directed to completed summaries are described above with reference to FIGS. 60, 61, and 69.

In 7047, a determination may be made as to whether the current trial or question/response was the last trial or question in the stage 3 unit for the current passage, and if not, then the method may proceed to 7046, where the next trial or question/response in stage 3 for the current passage may be performed, and the method may continue as described above.

If in 7047, it is determined that the current trial or question/response was the last trial or question in the stage 3 unit for the current passage, then the unit may be evaluated to determine if the student passed or failed the stage 3 unit. For example, in one embodiment, in levels less than level 3, i.e., in levels 1 and 2, the passing criteria for the unit may be that the student pass all of the trials in the unit, e.g., the student must pass 3 of 3 trials in the unit. In some embodiments, in level 3 or higher, the passing criteria may be 80% of the trials, i.e., 4 out of 5 trials must be passed to pass the unit. Note, however, that in other embodiments, any other passing criteria may be used as desired.

In 7049, a determination may be made as to whether the current passage (for trials just completed) is the last passage in the current level, and if not, then the method may proceed to 7004, where the next passage may be selected, and the method may continue as described above.

If in 7049, it is determined that the current passage is the last passage in the current level, then in 7051, a determination may be made as to whether there are any failed units in the current level, and if not, the method may proceed to 7002, where the next level may be initiated, and the method may continue as described above.

If in 7051, it is determined that there are failed units in the current level, then in 7053, a determination may be made as to whether any of the units were failed less than some specified number, e.g., three, and if so, then in 7054, trials may be repeated directed to passages in the failed units, beginning with stage 1, i.e., the method may proceed to 7004, and continue as described above, directed to passages of the failed units.

If none of the failed units were failed less than the specified number of times, e.g., three times, then in 7056, the failed units may be marked or set aside to repeat after the final level of the exercise has been completed. In other words, any units that have been failed three times or more may be retained for performance at the end of the exercise, where the units may be performed until the student passes them.

Finally, as indicated in 7058, the method may proceed to the next level, continuing with 7002, as described above. As indicated above, once all the levels have been completed, any units that have been failed the specified number of times (e.g., three times) may be repeated until all units have been passed, thereby building skills in accurate text comprehension and the use of comprehension strategies.

Thus, various embodiments of the above methods may build skills in accurate text comprehension and the use of comprehension strategies in the student.

Exercise 5: Quack Splash

The goal of this exercise (i.e., Quack Splash) is to build skills in constructing and organizing multiple-paragraph stories and expository passages, including skills in understanding and using figurative language.

In this exercise, the student may build multiple-paragraph passages and demonstrate comprehension of the passages, by correctly identifying missing words, phrases, or sentences, by correctly sequencing sentences and paragraphs, and by answering comprehension questions about the completed passages.

The exercise may develop various cognitive skills in the student, such as memory, e.g., using working memory to hold words and sentences in memory while completing or reorganizing paragraphs; attention, sustaining attention across multiple steps to accurately complete a longer passage; processing, by using language skills to process grammar and meaning; and sequencing by recognizing and correcting the serial order of scrambled sentences and paragraphs, among others.

The different tasks involved in building each passage may focus on different aspects of constructing well-written text, including selecting relevant and informative content, ordering sentences within a paragraph to maximize clarity, and organizing paragraphs to create a logical flow of ideas. The passages and the sequencing tasks may be designed to help the student build awareness and understanding of transitional expressions, including terms that introduce examples, mark sequences, add intensity, show comparison and contrast, or indicate cause and effect.

In some embodiments, the student may be presented with long passages (653-3970 words) throughout the exercise, requiring the student to integrate information across multiple sections while performing several tasks on those sections. All passages may include figurative language (e.g., metaphor) in context, and questioning may guide students to reflect on the meanings of this language. In one embodiment, a final passage may provide a lesson on the historical processes of language change, guiding students to think meta-cognitively about the meanings of words and figures of speech.

In various embodiments, this exercise may address the following language arts curriculum standards for fifth graders:

Writing Strategies
Organization and Focus

The student may create multiple-paragraph expository compositions, including establishing a topic, important ideas, or events in sequence or chronological order, and providing details and transitional expressions that link one paragraph to another in a clear line of thought.

Word Analysis, Fluency, and Systematic Vocabulary Development
Vocabulary and Concept Development The student may be required to understand and explain the figurative and metaphorical use of words in context.

Reading Comprehension (Focus on Informational Materials)
Comprehension and Analysis of Grade-Level-Appropriate Text The student may be required to discern main ideas and concepts presented in texts, identifying and assessing evidence that supports those ideas.

Figure 71:
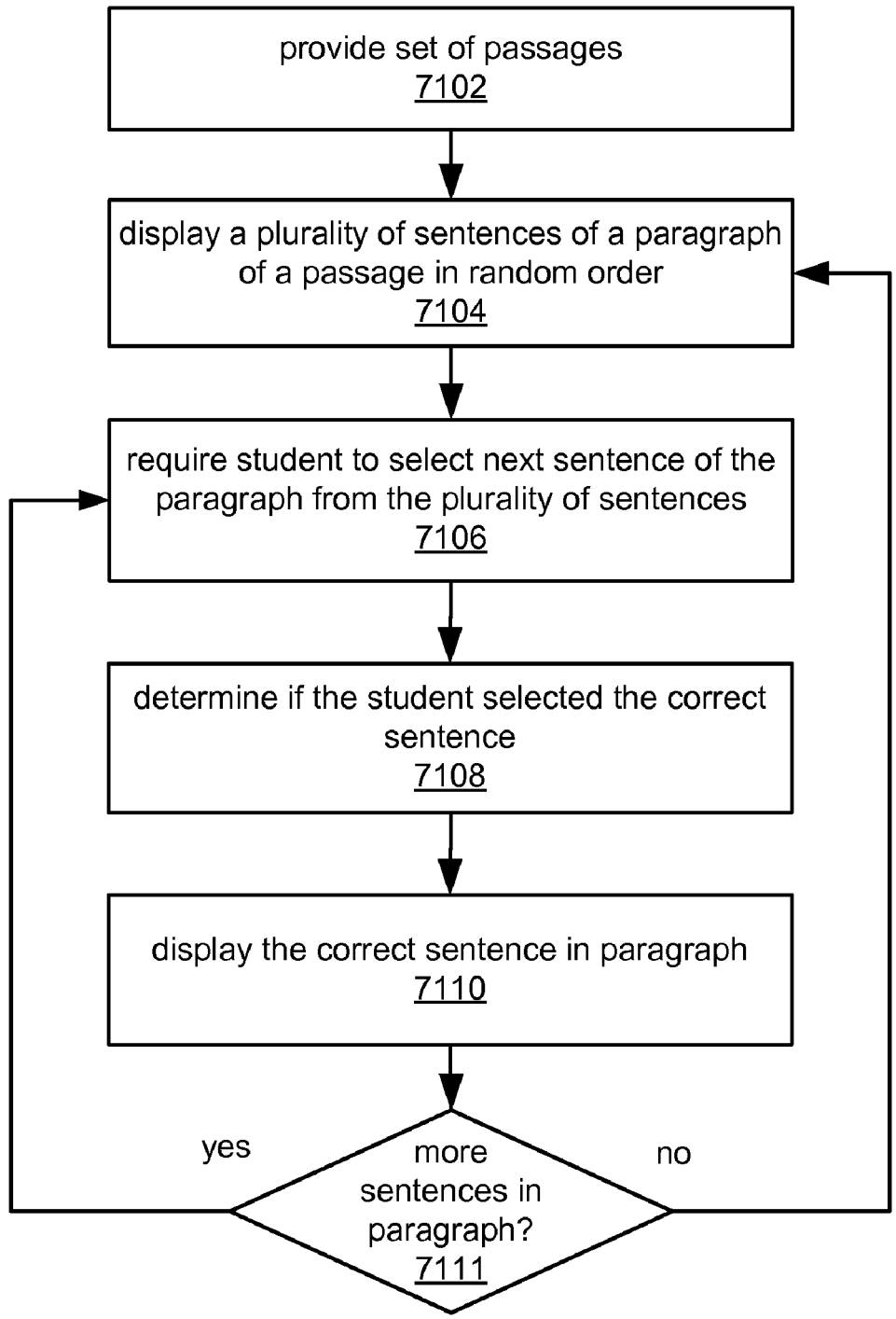
FIG. 71 is a high-level flowchart of a computer-implemented method for building in constructing and organizing multiple-paragraph stories and expository passages, including skills in understanding and using figurative language, according to one embodiment.

FIG. 71—Method for Building Skills in Constructing and Organizing Multiple-Paragraph Stories and Expository Passages FIG. 71 is a flowchart diagram of a method for building skills in constructing and organizing multiple-paragraph stories and expository passages, including skills in understanding and using figurative language via a computing device, according to one embodiment. As noted above, in various embodiments, some of the method elements described may be performed concurrently, in a different order than described, or may be omitted. Additional method elements may be performed as desired. As FIG. 71 shows, the method may be performed as follows:

In 7102, a set of stimulus passages, i.e., textual passages, may be provided. As with the above-described exercises, in preferred embodiments, a graphical user interface (GUI) may be provided whereby the exercise may be performed.

Figure 72:
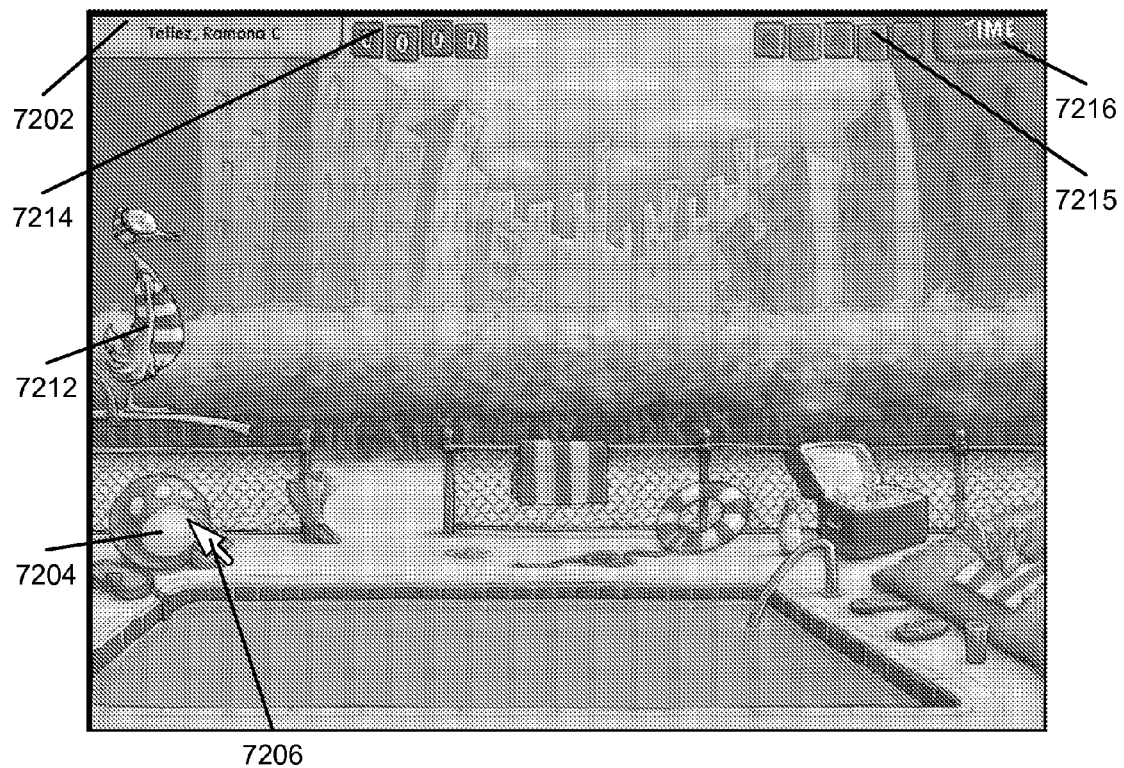
FIG. 72 is an exemplary introductory screenshot from a paragraph building task in the Quack Splash exercise, according to one embodiment.

FIG. 72 illustrates an exemplary screenshot 7200 of an introductory screen for the Quack Splash exercise. As FIG. 72 shows, (and as with FIGS. 7, 16, 24, and 32, described above) the screen includes the name of the student 7202, an initiation button, in this case, a selection paw 7204, also referred to as an OR button, and a cursor 7206. To begin a trial, the student may move the cursor 7206 over the selection paw 7204 and indicate the selection, e.g., by clicking the mouse. The screen further includes a main character, in this case, a duck 7212, a score indicator 7214, progress markers 7215 indicating progress through the exercise, and a time indicator 7216. The score indicator 7214 may add points to the students score as the student correctly responds to trials. The time indicator 7216 may provide a graphical illustration of the relative time left for the exercise. Exercise play may begin when the student selects the selection paw 7204.

Figure 73:
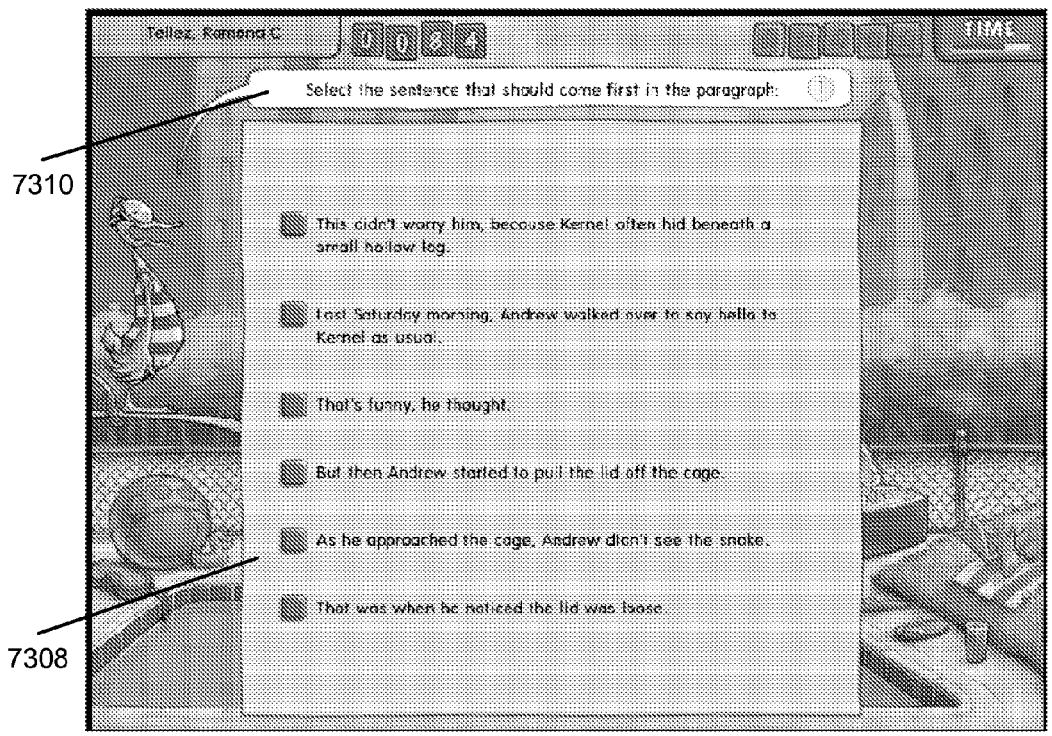
FIGS. 73-76 are exemplary screenshots illustrating progression through a paragraph building task in the Quack Splash exercise, according to one embodiment.

In 7104, a plurality of sentences from a paragraph (e.g., a next paragraph) of a stimulus passage from the set of stimulus passages may be displayed, e.g., on a display of a computing device. For example, the sentences may be presented in the above-described GUI. FIG. 73 is an exemplary screenshot from the exercise, where, as may be seen, a plurality of sentences 7308 from a first paragraph of a stimulus passage is displayed. Note that the sentences are presented in a scrambled order, i.e., out of order, although in preferred embodiments, this order may not be random.

Figure 74:
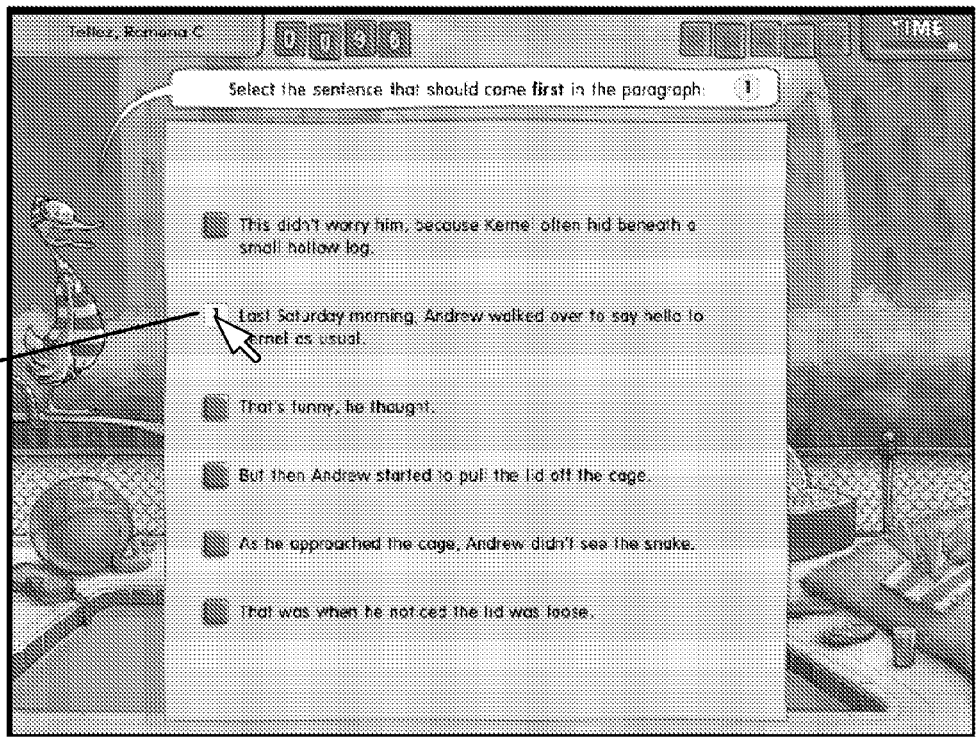

In 7106, the student may be required (e.g., asked or directed) to select a next sentence from the plurality of sentences to further construction of the paragraph. As also shown in FIG. 73, in this example, the student is asked or directed (by the main character 7212) to select the next (in this case, the first) sentence in the paragraph, as indicated by 7310. The student preferably selects the sentence by clicking on the sentence with a pointing device, e.g., a mouse, although any other means of selecting the sentence may be used as desired. FIG. 74 illustrates user selection of the second sentence, which is correct.

In 7108, a determination may be made as to the correctness of the student's selection, i.e., whether the selected sentence is correct or not. As with the above exercises, in preferred embodiments, an indication, i.e., graphical and/or audial, may be provided as to the student's correctness (or incorrectness), e.g., via speakers or headphones. For example, a "thunk" sound may be played indicating incorrectness, or a "ding" may be played indicating correctness and points awarded (or, as above, in the case of bonus points, 3 "dings" may be played). In some embodiments, an animation of the main character and/or secondary characters may also provide such an indication when the selection is correct, e.g., a "correct" animation may be presented. Of course, any other types of indication may be used as desired.

Note that in some embodiments, an incorrect selection may result in failure of the current trial, unit, and/or level, where failed units may be repeated (possibly a number of times) later, e.g., at the end of the current level, and/or at the end of the exercise, as will be described in detail below. Thus, in some embodiments, each unit may be performed until either the unit is passed, or the unit has been failed a specified number of times (e.g., 3 times), where the additional performances (beyond the first failure) may be performed just after the first failure, and/or at the end of the level. Moreover, the units that have been failed the specified number of times may be repeated at the end of the exercise until all units have been passed.

Figure 75:
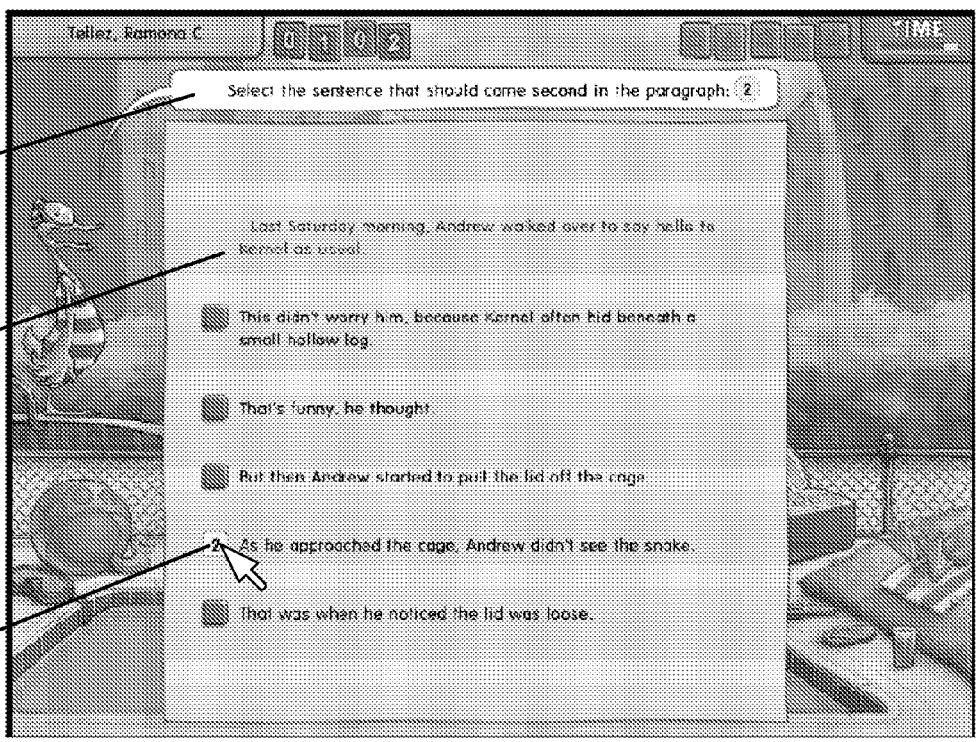

In 7110, the correct sentence may be displayed, e.g., above the displayed sentences. FIG. 75 is an exemplary screenshot illustrating the display of the selected sentence 7504. As may be seen the previously selected sentence (see FIG. 74) has been removed from the plurality of sentences and displayed above them, beginning the first paragraph of the passage.

In 7111, a determination may be made as to whether there are more sentences in the paragraph, i.e., if there are further sentences in the displayed plurality of sentences for this paragraph of the passage. If there are no further sentences to be selected from, then the current paragraph is complete, and, assuming that there are further paragraphs in the passage, the method may return to 7104, where another plurality of sentences for the paragraph of the passage may be displayed, and may continue as described above. Of course, if there is only one paragraph in the passage, then once the paragraph is complete, the method may continue with a successive stage with regard to the one paragraph passage, or may present sentences for a next passage, and so forth.

If there are further sentences in the current paragraph, then the method may proceed to 7106, where, as described above, the student may be required to select a next sentence for addition to the paragraph of the passage. For example, turning again to FIG. 75, as shown, the main character (duck) provides instructions 7502 to the student to select the sentence that should come second in the paragraph. As also shown, the student has (correctly) selected the next to last sentence 7506 for inclusion in the paragraph.

Figure 76:
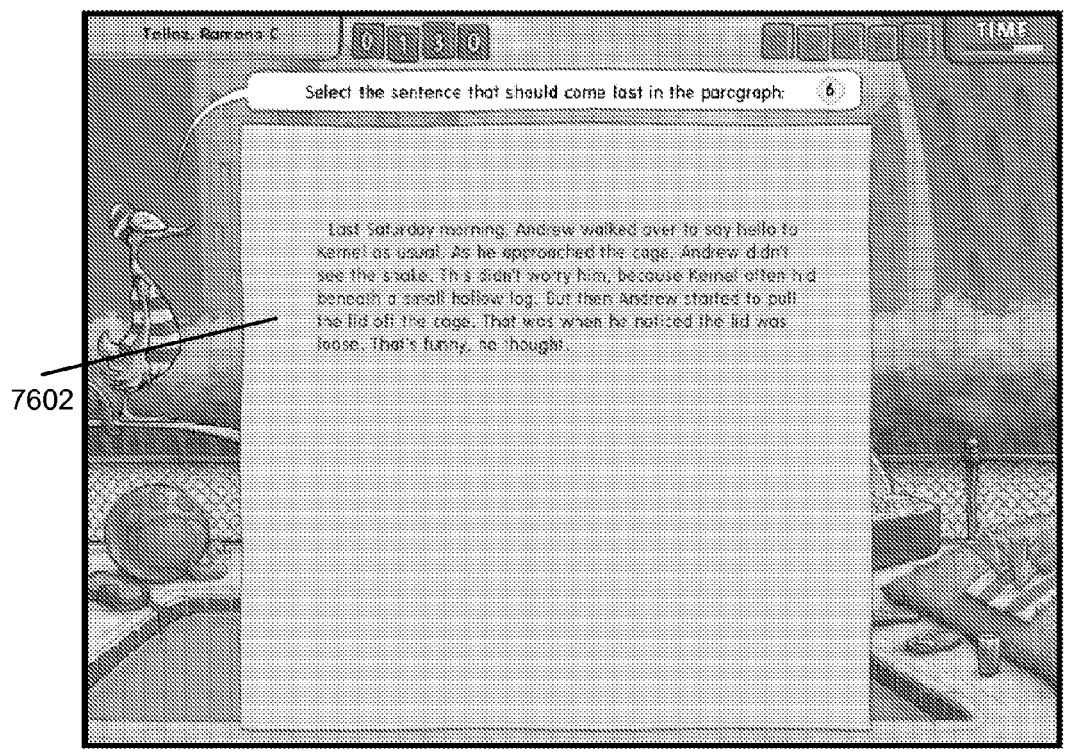

This process may continue as described above until all sentences have been placed in the paragraph in correct order. FIG. 76 is an exemplary screenshot showing the completed paragraph 7602.

In preferred embodiments, once all the paragraphs of the current stimulus passage have been presented and responded to (possibly in a plurality of stages, described below), paragraphs of a next passage may be presented, and the method may continue as described above in an iterative manner, thereby building skills in constructing and organizing multiple-paragraph stories and expository passages in the student. In Thus, additional stimulus passages from the set of stimulus passages may be presented, where, as described above, the student is required to select appropriate sentences in order, and the correctness or incorrectness of each selection determined (and recorded or stored). Note that in some embodiments, the passages may be presented in a specified order (as opposed to randomly), such that the passages may form an extended story or article. Thus, the displaying, the requiring, and the determining may be performed for each paragraph in each passage in the set of passages to build skills in constructing and organizing multiple-paragraph stories and expository passages.

Moreover, in preferred embodiments, the displaying the sentences of the paragraph of the passage, the requiring, the determining, and the displaying the selected sentence in the paragraph may be repeated for each paragraph of each stimulus passage, where the repeating builds skills in accurate text comprehension and the use of comprehension strategies in the student. In other words, the student may be exposed to the passages multiple times to facilitate development of the student's paragraph construction skills. Such repetition may occur in a plurality of sessions over days, weeks, or even months. Additionally, in some embodiments, the set of stimulus passages may be included in a plurality of stimulus passage sets, and the method may include performing the repeating for each stimulus passage set in the plurality of stimulus passage sets.

In one embodiment, as the student completes trials for each passage, the student may progress through a plurality of levels, where, for example, the sentence ordering may be increasingly difficult or subtle. Additionally, in preferred embodiments, in progressing through the levels, the student may perform various tasks in a plurality of stages, as will be described below. Detailed information regarding units (for evaluation), levels, and progression through them, is provided below.

Thus, performing the repeating for each stimulus passage set in the plurality of stimulus passage sets may include performing trials in each unit of a plurality of units for each level of a plurality of levels, as will be described in more detail below. As also indicated above, such performing with respect to the multiple stimulus passage sets may itself be repeated in an iterative manner, e.g., over a plurality of sessions, as described above, to facilitate development of the student's skills in constructing and organizing multiple-paragraph stories and expository passages.

In one embodiment, the method may also include performing introductory or training trials, where, for example, initially instructions may be provided explaining what is expected of the student in the exercise, and then example trials performed where the correct responses are indicated to the student. After the introductory or training trials are completed, the student may begin the actual trials of the exercise, as described above (and below).

As noted above, in some embodiments, the above method may be performed in each of a plurality of successive stages, where, for example, in stage 1, tasks directed to paragraph building may be performed, e.g., via sentence ordering (as described above), and paragraph completion, and where, for example, in stage 2, paragraph sequencing may be performed to create a coherent page of the passage. After stage 2, a third stage, i.e., stage 3, may be performed, in which questions regarding the completed passage may be presented and responded to. Thus, each stage may include one or more tasks, each directed to a particular skill or learning approach, as described in more detail below.

Overview of Exercise Stages

The following are high-level descriptions of exemplary stages of the exercise (Quack Splash), although it should be noted that variations of the described stages are also contemplated. More detailed descriptions follow.

The student may build multiple-paragraph passages and demonstrate comprehension of the passages by completing the following stages:

Stage 1: Paragraph Building

The student may complete paragraphs by performing various tasks, such as sentence sequencing, where the student may re-order sentences of a paragraph into the correct sequence; and a paragraph cloze task (completion), in which the student may select the best sentence to fill in a blank in the paragraphs, where the sentence may be one of a variety of sentence types, such as, for example, a topic sentence, supporting argument, idiom, linking sentence, and so forth. The student may perform one of these two tasks for each paragraph. In various embodiments, the paragraphs may be presented in a random order, or, alternatively, may be presented in a scrambled order, but not randomized.

Thus, in stage one, one or more of the paragraph building tasks (e.g., completion, and cloze) may be performed. Once stage 1 has been completed for the passage (or passages), stage 2 may be performed, as described below, where trials in this stage may be initiated via user activation of the initiation button of the GUI.

Stage 2: Page Building

In this stage, the student may perform paragraph sequencing, where the student orders the previously presented paragraphs (from stage 1), and possibly additional paragraphs, into the correct sequence to create a coherent page of the passage.

Stage 3: Passage Comprehension

The student may be given the opportunity to re-read the completed passage, and answer comprehension questions about the completed passage, e.g., by selecting an answer from a plurality of possible answers for each question.

In some embodiments, a passage may include multiple pages. In cases where the passage is more than one page, the student may complete Stage 1 for all pages (of the passage), then Stage 2 for all pages, before being presented with Stage 3, which may include comprehension questions covering all pages of the passage.

The content may be a balance of original fiction and non-fiction passages; and may include usage of figurative language.

Detailed Description of Stages

Stage 1: Paragraph Building

Trial Interaction:

In one embodiment, the student may be presented with one of the following tasks for each paragraph in the passage (e.g., for all pages in the passage):

Task: Sentence Sequencing

As mentioned above, the student may click the initiation (paw) or OR button to begin the stage. An instruction may be provided directing the student to select the next sentence for the paragraph, e.g., to select the first, second, ... last, sentence for the paragraph. In one embodiment the instruction may also include a sequence number indicating which sentence of the paragraph is being selected for, e.g., a "1" for the first sentence, and so forth.

The sentences of a paragraph, e.g., the current paragraph, may be displayed in a scrambled order. Note that in preferred embodiments, this sequence may be fixed, i.e., not randomized, and so may be the same every time the trial is presented. In some embodiments, a small empty box may be displayed next to each sentence, where the user may select a sentence by clicking on the box, although other means of selection are also contemplated, e.g., via number keys, etc. In one embodiment, these boxes may be highlighted upon rollover, e.g., upon selection by the student. Note, however, that in other embodiments, rather than boxes, the entire response may be selectable, highlighted, and so forth.

FIGS. 73-76, described above, illustrate an example embodiment of the first paragraph building task, i.e., the sentence sequencing task. As may be seen, in response to each instruction, the student may click on the box next to a sentence to select it. This process may continue until the paragraph is complete.

In one embodiment, if the student selects the correct sentence, the box next to the correct sentence may change color, e.g., to yellow, and the sequence number may appear in the box, although other indications may be used as desired. As with the previously described exercises, a "ding" may be played and points awarded. Moreover, in preferred embodiments, the selected sentence may be moved to the correct position within the paragraph. If this is the first sentence in the paragraph, the sentence will be indented. The sentence may change color, e.g., to green, and the box may no longer appear next to the sentence. The remaining sentences (i.e., those not selected) may be moved down on the screen, e.g., below the paragraph that is being constructed.

Moreover, if this is the final sentence in the paragraph and if all sentences were sequenced correctly, then if bonus points are not earned, 1 ding may be played and additional points may be awarded. If this is the final sentence in the paragraph and all sentences were sequenced correctly, then if bonus points are earned, 3 dings may be played and additional points plus bonus points may be awarded.

Alternatively, if this is not the last sentence in the paragraph, then the instruction may change as appropriate, i.e., the student may be asked or directed to select the next sentence in sequence.

If the student selects an incorrect response, an appropriate indication may be provided, e.g., as above, a "thunk" sound may be played, and the selected response may change to a grayed out state. In some embodiments, all the incorrect sentences may be grayed out, including the boxes next to the sentences. The text of the correct sentence may change color, e.g., may turn blue, and a pause, e.g., for 3.5 seconds, may be provided to allow the student to read the correct answer. The correct sentence may be moved to the correct position within the paragraph. As above, if this is the first sentence in the paragraph, the sentence may be indented. The sentence may change color, e.g., to green, and the box may no longer appear next to the sentence. The remaining sentences may be moved down on the screen, e.g., below the paragraph that is being constructed.

If this is the final sentence in the paragraph, a pause may be provided, e.g., for 3 seconds, to allow the student to read the completed paragraph. If this is not the final sentence in the paragraph, the instruction may be changed and the student may be asked or directed to select the next sentence in sequence. Note that all remaining sentences are available for selection.

The student may repeat the above interaction for each sentence in the paragraph, where the trial ends when the last sentence has been selected. The student may be required to sequence the final sentence, even though there are no other possible correct responses.

Task: Paragraph Completion

As noted above, this task is a cloze task directed to completion of a partial paragraph, i.e., a paragraph missing a word, phrase, or sentence.

As above, the student may initiate trials in this task via the initiation button, e.g., the paw or OR button. An incomplete paragraph may be displayed, e.g., with a blank replacing a missing sentence. A number (e.g., four) of sentences or phrases may be displayed as response options, e.g., at the bottom of the screen, and an instruction may be presented to the student asking or directing the student to select the response that best completes the paragraph.

Figure 77:
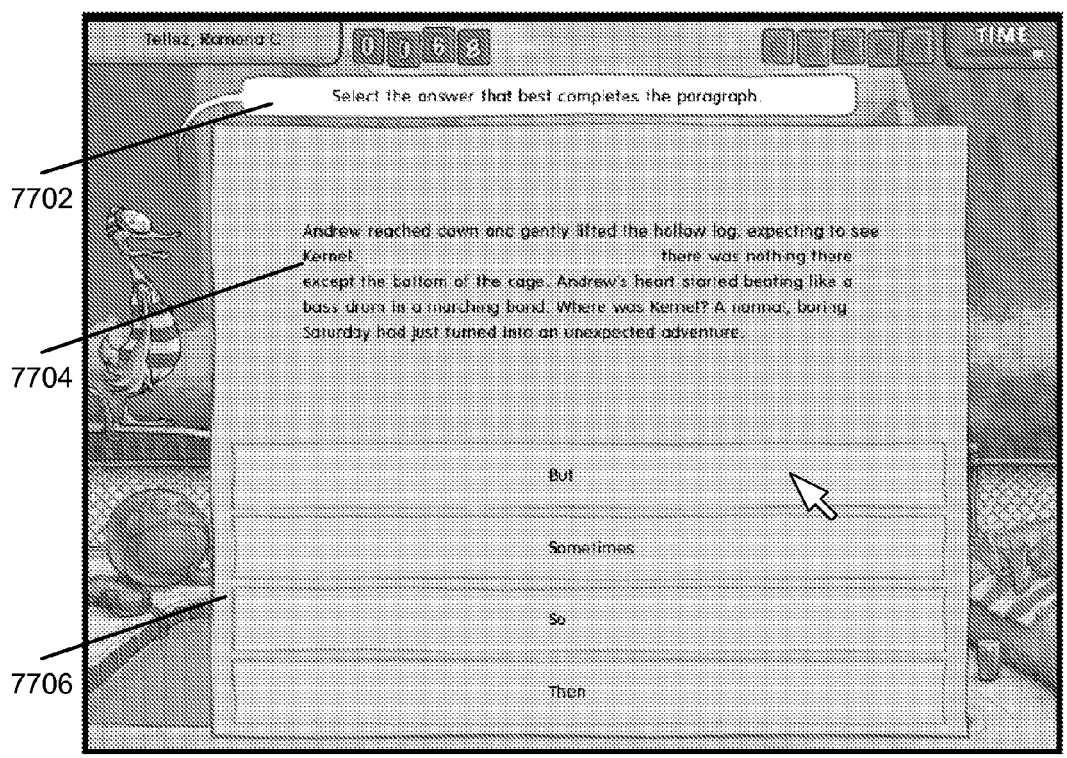
FIGS. 77-78 are exemplary screenshots illustrating progression through a paragraph completion (cloze) task in the Quack Splash exercise, according to one embodiment.
Figure 78:
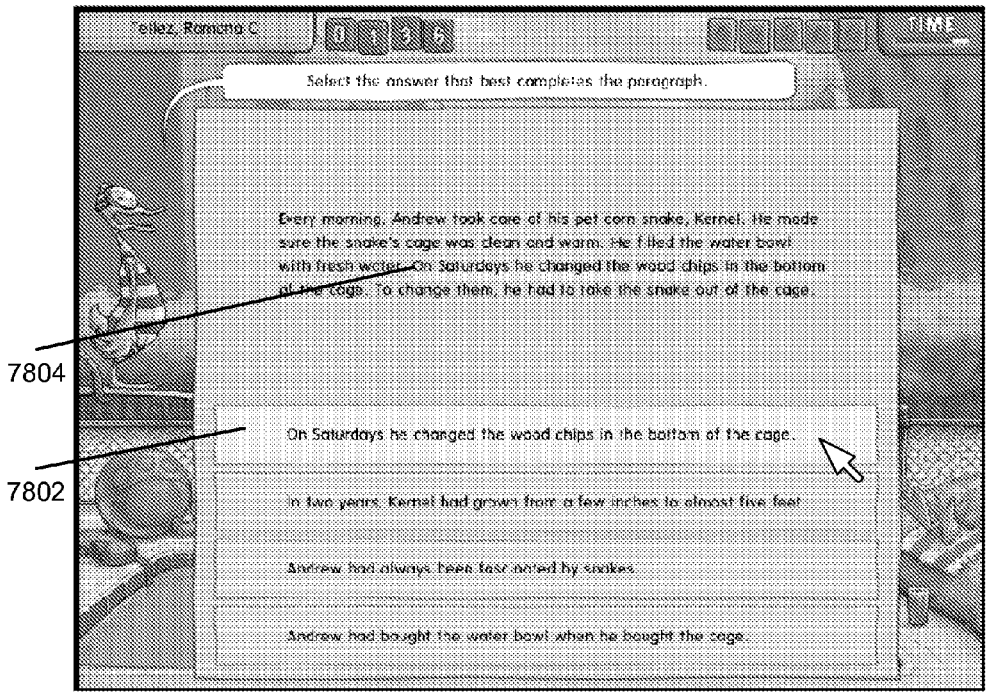

FIGS. 77-78 are exemplary screenshots illustrating the second paragraph building task, i.e., the paragraph cloze task. As FIG. 77 shows, a paragraph 7704 may be displayed in which a portion of the paragraph is missing, e.g., a word or phrase, where a blank may be displayed instead. In one embodiment, the blank may have a color, e.g., white, i.e., may be a color field, and/or may be underlined. Instructions 7702 may be presented directing the student to select from among a plurality of textual responses 7706 to complete the paragraph 7704. FIG. 78 illustrates user selection of the first response 7802 to fill in the missing portion of the paragraph. As may be seen, the (correctly) selected response is added to the paragraph 7804 displayed above the possible responses.

If the student answered correctly, e.g., clicked on the correct sentence, the correct answer may be highlighted, e.g., in yellow, a "ding" may be played, and points awarded. The sentence may be displayed in its correct position in the paragraph. In some embodiments, the white blank or color field may remain and may change size as necessary to accommodate the added sentence (or phrase/word). The remainder of the paragraph text may adjust as required.

If the student selects incorrectly, e.g., clicks on an incorrect sentence/phrase, a "thunk" may be played, and incorrect answers may be grayed out. The correct sentence may be displayed, e.g., in blue text, in its correct position in the paragraph. As described above, in some embodiments, the white blank or color field may remain and may change size as necessary to accommodate the sentence, and the paragraph text may adjust as required. Additionally, a pause may be provided to allow the student to read the paragraph.

Once the student has performed one of the stage 1 tasks described above one or more times, the student may perform a stage 2 task, as follows.

Stage 2: Page Building
Trial Interaction:
Task: Paragraph Sequencing

In this task the student may perform the following for each page in the current passage. As above, the student may initiate trials in this task via the initiation button, e.g., the paw or OR button.

The paragraphs of a passage (or the current page in the passage) may be displayed in scrambled order, where, as noted above the presentation order is fixed, not randomized, so that it will be the same every time the trial is presented. Similar to the sentences in the stage 1 task described above, in one embodiment, a small empty box may display next to each paragraph, where the boxes may highlight upon rollover, i.e., upon selection by the user. Of course, as noted above, in some embodiments, the text of each response may itself be selectable and highlighted.

An instruction may be presented asking or directing the student to select the paragraph that should come next, e.g., first, second, . . . or last. As before, the sequence number (e.g., of the paragraph to be selected) may also appear in the instruction.

The student may then select one of the paragraphs, e.g., by clicking on the box next to a paragraph, or, if the paragraph is selectable, the paragraph itself.

Figure 79:
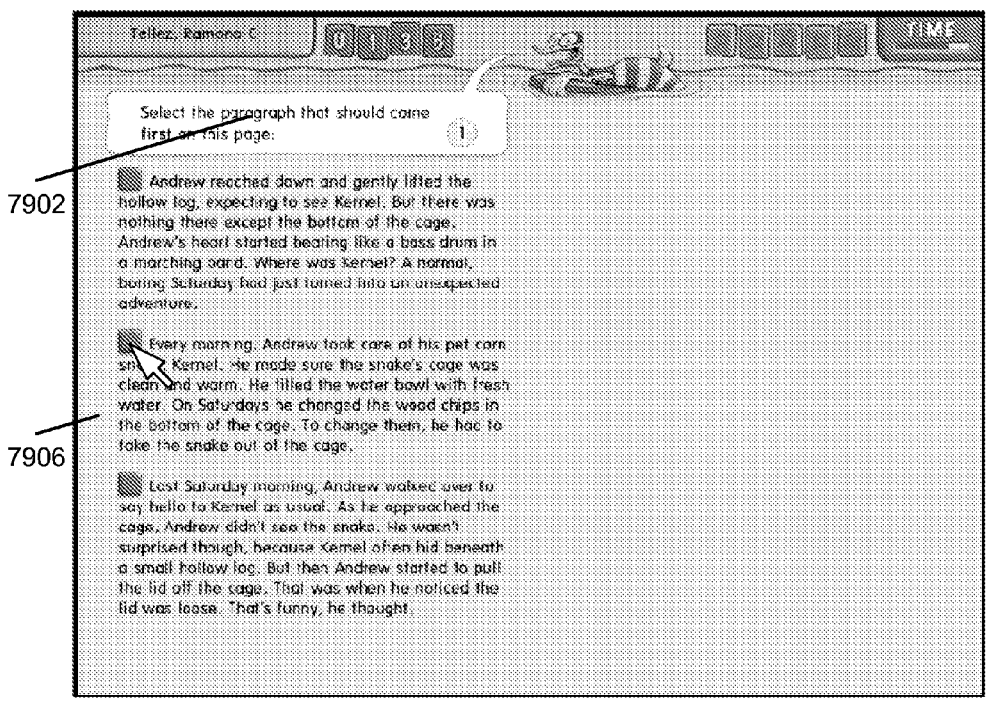
FIGS. 79-81 are exemplary screenshots illustrating progression through a text passage construction task in the Quack Splash exercise, according to one embodiment.
Figure 80:
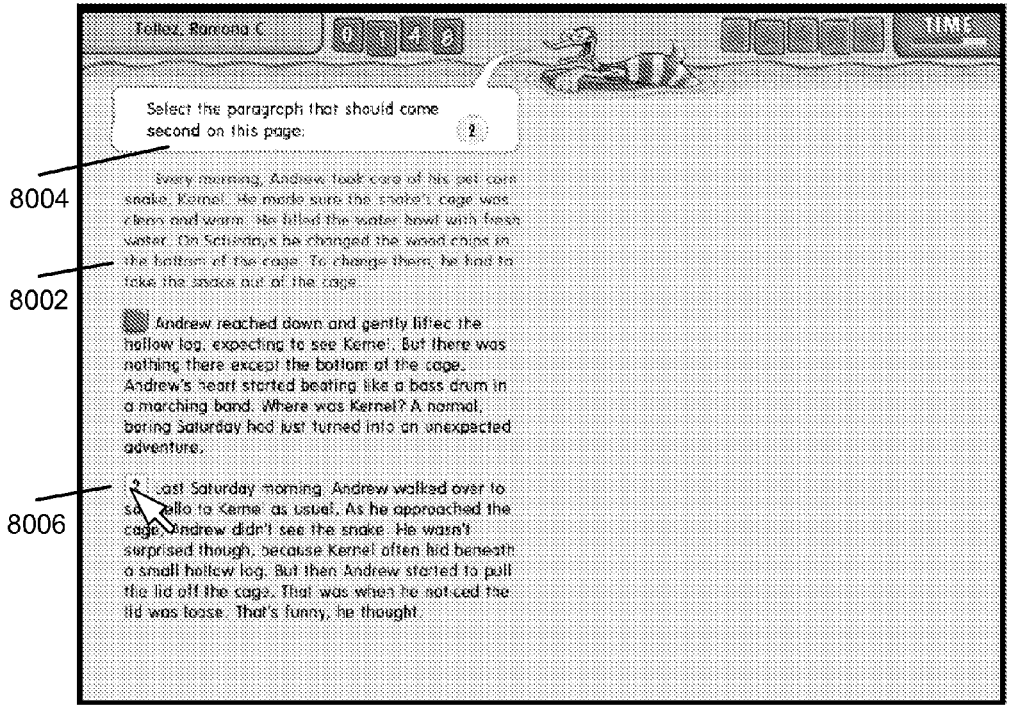

FIG. 79 is an exemplary screenshot wherein instructions 7902 are presented directing the student to select a next (in this case, a first) paragraph from a plurality of displayed paragraphs 7904 to construct a page of a stimulus passage. As FIG. 79 indicates, the student is selecting the second paragraph from the plurality of paragraphs. FIG. 80 is an exemplary screenshot wherein the previously selected paragraph is displayed in the page under construction, e.g., above the remaining paragraphs. In other words, the (correctly) selected paragraph 8002 has been moved into a page display region of the screen. In some embodiments, the color of the selected paragraph may be changed, as well, e.g., to green. As FIG. 80 also shows, a new instruction 8004 is presented directing the student to select the second paragraph for the page. As may be seen, the student has (correctly) selected the second (bottom) paragraph.

Figure 81:
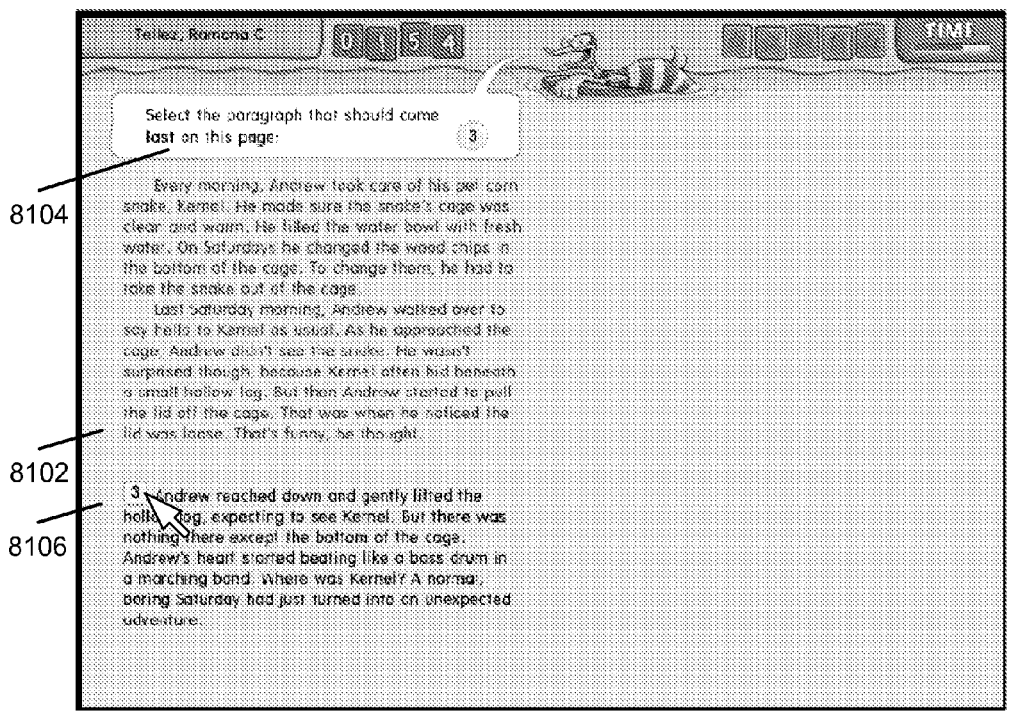

FIG. 81 is an exemplary screenshot illustrating the movement and display of the selected paragraph of FIG. 80 in the page 8102, and presentation of an instruction 8104 directing the student to select the next (i.e., third and last) paragraph for the page. As shown, the user has selected this last paragraph 8106 for addition to the page.

As with the sentence sequencing task, if the student successfully selects the correct paragraph, the box next to the paragraph may change color, e.g., to yellow, and the sequence number may appear in the box, although other graphical indications may be used as desired. A "ding" may be played and points awarded. Additionally, the paragraph may be moved to the correct position within the passage. Each paragraph is preferably indented, but there may be no blank lines between paragraphs once they are moved into the passages. The color of the paragraph may be changed, e.g., to green, and the box may no longer appear next to the paragraph. The remaining paragraphs may be moved down on the screen, below the page that is being constructed. Note that in some embodiments, paragraphs may wrap across columns.

If this is the final paragraph, and if all paragraphs were sequenced correctly, then if bonus points are not earned, 1 ding may play and additional points may be awarded. If bonus points are earned, then 3 dings may play and additional points plus bonus points may be awarded. Otherwise, if this is not the final paragraph, the instruction may change and the student may be asked to select the next paragraph in sequence.

If the student selects the wrong paragraph, then a "thunk" may play, and the incorrect paragraphs may be grayed out, including the boxes next to the sentences. The text of the correct paragraph may be changed, e.g., to blue. Additionally, the correct paragraph may be moved to the correct position within the page. Each paragraph is preferably indented, but there may be no blank lines between paragraphs once they are moved into the page. The color of the paragraph (upon being moved) may be changed, e.g., to green, and the box may no longer appear next to the paragraph. The remaining paragraphs may be moved down on the screen, below the page that is being constructed. As noted above, in some embodiments, paragraphs may wrap across columns.

If this is the final paragraph in the page, a pause, e.g., for 3 seconds, may be provided to allow the student to read the page of the passage. Otherwise, if this is not the final paragraph in the page, the instruction may be changed to ask or direct the student to select the next paragraph in sequence. Note that all remaining paragraphs are available for selection.

The student may repeat the above interaction for each paragraph in the page of the passage. The trial ends when all paragraphs are sequenced. Note that in one embodiment, the student may be required to sequence the final paragraph in the page, even though it is the only possible selection.

Once the student has performed the stage 2 task described above one or more times, the student may perform a stage 3 task, as follows.

Stage 3: Passage Comprehension
Task: Passage Re-Read

In this stage 3 task, the student may be given the opportunity to re-read the entire passage in the correct sequence. If the page is the last page of the final passage in the level, "The End" may appear at the bottom of the page.

Trial Interaction

As above, the student may initiate trials in this task via the initiation button, e.g., the paw or OR button. The text of a page of the current passage (e.g., just constructed in stage 2) may be displayed. A "done reading" button (or equivalent) may be displayed, e.g., allowing the student to dismiss the screen. In one embodiment, the done reading button may change to an active state after a brief pause, e.g., 8 seconds, i.e., after sufficient time for the student to read the page. The student may click the "done reading" button when finished reading the page. The next page of the passage (if there is one) may be displayed, also with a done reading button.

Figure 82:
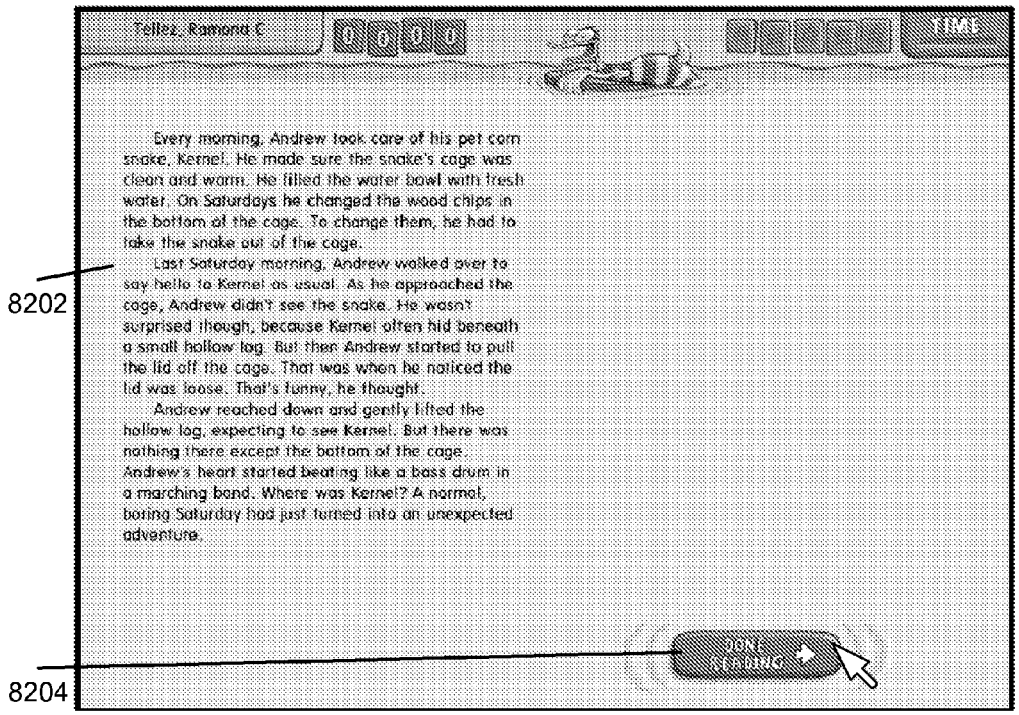
FIGS. 82-83 are exemplary screenshots illustrating a comprehension task directed to the completed passage of FIGS. 79-81, according to one embodiment.

FIG. 82 illustrates the passage re-read task, where, as may be seen, a first page 8202 from the passage is displayed, along with a done reading button 8204 for dismissing the display. If there are further pages in the passage, they may be presented as in FIG. 82 until all pages of the entire passage have been displayed. If no pages remain, the passage text may disappear and the student may be presented with a first comprehension question (of the next task), as described below.

Task: Comprehension Questions

In this task, the student may be asked a number of questions regarding the passage just read, and the student may select each answer from a respective plurality of possible responses.

Trial Interaction

In one embodiment, a question may be displayed, along with a number (e.g., 4) possible answer choices. The student may then select from the possible answers to answer the question.

Figure 83:
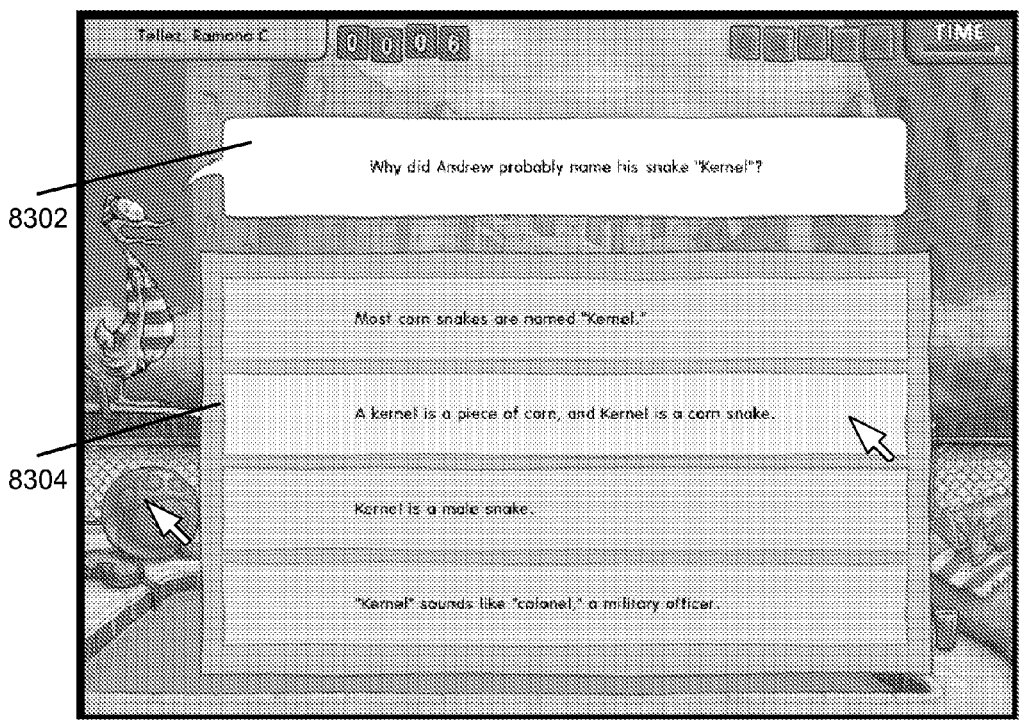

FIG. 83 is an exemplary screenshot illustrating presentation of instructions 8302 asking the student a question regarding the passage just read. As FIG. 83 also shows, a plurality of possible answers 8304 is displayed, where the student may select from the plurality of answers to answer the question. As may be seen, the student has (correctly) selected the second answer.

In stage 3 trials, if the student selects the correct response, e.g., clicks on the correct answer to the question, then, as above, an appropriate indication may be provided, e.g., the box with the correct response may be highlighted, e.g., in yellow, a "ding" may play, and points may be awarded. If bonus points are awarded, 3 "dings" may be played.

If the student selects an incorrect response, an appropriate indication may be provided, e.g., as above, a "thunk" sound may be played, and the correct answer (or answer box) may be highlighted, e.g., in white. Additionally, a pause, e.g., for 3 seconds, may be provided to allow the student to read the correct response. In one embodiment, the (incorrect) selected response may change to a grayed out state.

The student may repeat the above interaction for each of a plurality of questions in the stage. At the end of the stage, the student may advance to the next passage in the current level. After all passages in the level have been attempted, the student may repeat those passages for which passing criteria were not met, e.g., following the advancement and progression rules outlined below.

Exemplary Content and Progression

The following presents an exemplary embodiment of a content set for the above-described exercise (Quack Splash), although it should be noted that the information is exemplary only, and is not intended to limit the exercise to any particular set of passages, sentences, progression sequence, or criteria.

Overview a plurality of stages and at various levels. The following chart provides one exemplary embodiment of level progression, where the correspondence between the levels and the various tasks described above is shown.

Items and Trials by Task

| | | Tasks (per passage) | | | | |
|---|---|---|---|---|---|---|
| Level | Passages Per Level | Sentence order trials | Paragraph cloze trials | Paragraph order trials | Comprehension trials | Total trials per level |
| 1 | 4 | 1 | 2 | 1 | 5 | 36 |
| 2 | 4 | 2 | 3 | 1 | 5 | 44 |
| 3 | 4 | 2-4 | 6-8 | 2 | 7 | 76 |
| 4 | 4 | 4 | 6 | 2 | 7 | 76 |
| 5 | 4 | 6 | 9 | 3 | 10 | 112 |
| | 68 | 104 | 36 | 136 | 344 | |

In some embodiments, each content level may include either fiction or nonfiction content about a single topic. The passages may be presented in a set sequence emulating chapters that make up a book or sections that make up an article. However, each passage may be modular enough to make sense on its own if presented in isolation (e.g., for re-entry following plateau-based transitions).

An important secondary goal for this exercise may include building skills in understanding figurative language. Each passage may thus include some figurative language (e.g.,

| Level | Pages per passage | Para. per page | Sentence length | Vocab & topic | Fiction | Non-Fiction | *Est. Passage Length | Est. Total Words per level |
|---|---|---|---|---|---|---|---|---|
| 1 | 1 | 3 | Short | Easy | 4 | 0 | 135 | 540 |
| 2 | 1 | 5 | Medium | Easy | 0 | 4 | 315 | 1260 |
| 3 | 2 | 5 | Long | Easy | 4 | 0 | 630 | 2520 |
| 4 | 2 | 5 | Medium | Hard | 0 | 4 | 630 | 2520 |
| 5 | 3 | 5 | Long | Hard | 0 | 4 | 945 | 3780 |
| | 36 | 178 | | | 8 | 12 | | 10620 |

*Assuming an average of 4.5 sentences per paragraph for levels 1, 2, and 4, and 3.5 sentences per paragraph for levels 3 & 5.

In one embodiment, sentences of various lengths may be used in the exercise. For example, short sentences may have a maximum length of 14 words and an average length of 10 words (±1), across the passage; medium sentences may have a maximum length of 18 words and average length of 14 words (±1), across the passage; and long sentences may have an average length of 16 words (±1), across the passage.

Similarly, the topics covered in the various passages may be of varying difficulty. For example, easy topics may be familiar and interesting to children and young adults (e.g., 9-15 years old) from a wide range of cultural and educational backgrounds, while hard topics may still be age appropriate, but may originate from more unusual or academic domains.

The vocabulary used in the exercise may also differ in difficulty. For example, easy words may include 5th grade terms and below, e.g., per Mogilner. Hard words may include 6th grade terms per Mogilner, and Academic terms appropriate for elementary through middle school. Words from sorting and analogies tasks, e.g., from other exercises, described above, may be used whenever appropriate.

As noted above, as the student progresses through the exercise, trials may be performed directed to various tasks in metaphor, simile, metonymy, synechdoche, irony, conventional idioms, etc.) and paragraph completion trials and comprehension questions that relate to figurative language.

In one embodiment, the comprehension questions of stage 3 may include any of the following types of questions (among others):

1. Literal facts & details;

2. Figurative language;

3. Sequential (e.g., cause & effect, temporal or spatial sequence); and

4. Inferential/Integrative (e.g., overall theme, moral, main ideas, author's intent, vocabulary introduced in the passage, identifying/assessing arguments & evidence presented).

Progression:

Terms: The following presents an exemplary set of terms used herein with respect to the exercise (Quack Splash), as well as the organization and content of progression levels the student works through while performing the exercise.

| Term | General definition | Exercise-specific definition |
| --- | --- | --- |
| Trial | Stimulus and response options presented to a student; response is evaluated | Stage 1, Paragraph Building:<br>Paragraph Cloze Task:<br>Stimulus = paragraph w/missing sentence or words<br>4 response options: sentence or words<br>Sentence Sequencing:<br>Stimulus = sentences displayed in scrambled order<br>Response: select sentences in correct order, all responses are evaluated; all responses must be correct to evaluate trial as correct<br>Stage 2, Page Building:<br>Paragraph Sequencing:<br>Stimulus = paragraphs displayed in scrambled order<br>Response: select paragraphs in correct order, all responses are evaluated; all responses must be correct to evaluate trial as correct<br>Stage 3, Passage Comprehension:<br>Comprehension Questions:<br>Stimulus = Question (multiple choice)<br>4 response options |
| Unit | group of trials to be evaluated for advancement | All the trials in a Passage:<br>The size of the unit differs depending on the Level. (see Content Overview Table above)<br>Each level contains 4 passages.<br>There are a total of 20 units in the exercise. |
| Stage | One of multiple activities performed by a student on the same or a related content set | Each passage is progressed through in 3 Stages: Paragraph Building, Page Building, Passage Comprehension |
| Task | Type of activity performed by student in a trial; can be multiple tasks within a stage | Stage 1: 2 types of tasks, Paragraph Cloze and Sentence Sequencing<br>Stage 2: 1 task - Paragraph Sequencing<br>Stage 3: 2 tasks: Passage Re-Read and Comprehension Questions |
| Passage | A block of related text. | Each level is made up of 4 passages, varying in size and difficulty. The passages within a level are related as though chapters in a story (fiction) or sections of an article (nonfiction). |
| Page | The portion of the text block that fits on a single screen. | Passages vary from 1-3 pages. |
| Level | Grouping of sets designated as hierarchically equivalent based on one or more shared attributes | Levels 1-5: grouped based on Passage Length, Vocabulary, Topic, and Sentence Length. (see Content Overview table above). |
| Level Attributes | Attributes by which sets are grouped into levels (or sublevels). The attributes and the hierarchy assigned to the attributes may differ across exercises. | Passage Length: 1 to 3 "pages", ranging from approx. 135 words-945 words.<br>Sentence Length: Ave. number of words in passage:<br>Short, Medium, Long<br>Topic: difficulty level of topic<br>Easy, Hard<br>Vocabulary: difficulty level of vocabulary in content set<br>Easy, Hard |

Order of Progression

In some embodiments, the student may progress through the content in the order in which it is shown in the Order of Progression chart below, although other progressions are also contemplated. The passages within each level may be displayed in the sequence shown in the chart. Note that trials within each stage may be presented in random order, while sequencing trials may present each item within the trial in a fixed order.

|  |  | Stage 1 | | | Stage 2 | | | |
|---|---|---|---|---|---|---|---|---|
|  |  | Page 1 | Page 2 | Page 3 | Page 1 Trials | Page 2 | Page 3 | Stage 3 |
| Level 1 | Passage 1 | 1-3 | NA | NA | 1 | NA | NA | 1-5 |
|  | Passage 2 | 1-3 | NA | NA | 1 | NA | NA | 1-5 |
|  | Passage 3 | 1-3 | NA | NA | 1 | NA | NA | 1-5 |
|  | Passage 4 | 1-3 | NA | NA | 1 | NA | NA | 1-5 |
| Level 2 | Passage 1 | 1-5 | NA | NA | 1 | NA | NA | 1-5 |
|  | Passage 2 | 1-5 | NA | NA | 1 | NA | NA | 1-5 |
|  | Passage 3 | 1-5 | NA | NA | 1 | NA | NA | 1-5 |
|  | Passage 4 | 1-5 | NA | NA | 1 | NA | NA | 1-5 |
| Level 3 | Passage 1 | 1-5 | 1-5 | NA | 1 | 1 | NA | 1-7 |
|  | Passage 2 | 1-5 | 1-5 | NA | 1 | 1 | NA | 1-7 |
|  | Passage 3 | 1-5 | 1-5 | NA | 1 | 1 | NA | 1-7 |
|  | Passage 4 | 1-5 | 1-5 | NA | 1 | 1 | NA | 1-7 |
| Level 4 | Passage 1 | 1-5 | 1-5 | NA | 1 | 1 | NA | 1-7 |
|  | Passage 2 | 1-5 | 1-5 | NA | 1 | 1 | NA | 1-7 |
|  | Passage 3 | 1-5 | 1-5 | NA | 1 | 1 | NA | 1-7 |
|  | Passage 4 | 1-5 | 1-5 | NA | 1 | 1 | NA | 1-7 |
| Level 5 | Passage 1 | 1-5 | 1-5 | 1-5 | 1 | 1 | 1 | 1-10 |
|  | Passage 2 | 1-5 | 1-5 | 1-5 | 1 | 1 | 1 | 1-10 |
|  | Passage 3 | 1-5 | 1-5 | 1-5 | 1 | 1 | 1 | 1-10 |
|  | Passage 4 | 1-5 | 1-5 | 1-5 | 1 | 1 | 1 | 1-10 |

Evaluation of Trial

Sentence and Paragraph Sequencing: Each response may be evaluated as correct or incorrect, but the trial may not be evaluated as correct unless all sentences or paragraphs in the trial are sequenced correctly. The trial may be considered incorrect as soon as an incorrect response is made. As noted above, the student may be required to sequence the final item even though there is only one possible correct answer.

Paragraph Completion and Comprehension Questions: The trial may be evaluated as correct if the student clicks on the correct response.

Evaluation of Unit

A unit may refer to the total number of trials directed to a particular passage, thus if there are multiple pages in a passage, the unit includes trials for all the pages of the passage. This number may vary for each level, as described in the chart below. The number of correct trials for each stage may also be tracked.

| Level | Trials per: Stage 1 | Trials per Stage 2 | Trials per Stage 3 | Trials per Unit (Passage) | Trials per Level |
|---|---|---|---|---|---|
| 1 | 3 | 1 | 5 | 9 | 36 |
| 2 | 5 | 1 | 5 | 11 | 44 |
| 3 | 10 | 2 | 7 | 19 | 76 |
| 4 | 10 | 2 | 7 | 19 | 76 |
| 5 | 15 | 3 | 10 | 28 | 112 |

A unit may refer to the total number of trials directed to a particular passage, thus if there are multiple pages in a passage, the unit includes trials for all the pages of the passage. This number may vary for each level, as described in the chart below. The number of correct trials for each stage may also be tracked.

Advancement

A unit (passage) may be evaluated as "passed" if the student meets the advancement criteria for each stage in the passage. If the student fails to meet the criteria for any stage, the unit (passage) may be considered "failed."

After the final passage within the level, the student may repeat all passages that were failed, beginning at stage 1 of the first failed passage.

| Advancement Criteria per Stage/Level | | | |
|---|---|---|---|
| Level | Stage 1 | Stage 2 | Stage 3 |
| 1 | 3/3 | 1/1 | 4/5 |
| 2 | 4/5 | 1/1 | 4/5 |
| 3 | 9/10 | 2/2 | 6/7 |
| 4 | 9/10 | 2/2 | 6/7 |
| 5 | 13/15 | 3/3 | 9/10 |

Plateau Based Transition

If the student has not met the criteria for all passages within a level after a specified number of attempts at passing each passage (e.g., three attempts), the student may transition to the next level. At the end of the exercise, after the student has either passed all passage or had the specified number of attempts to pass each passage, the failed passages may be repeated following the same progression and advancement rules as during the initial presentation.

Exit and Re-entry:

In stage 1 and stage 2, the student may time out or exit at any time, except when a trial is in progress. Re-entry may return the student to the point from which he/she exited. Since a sequencing task is counted as one trial, the student may not exit during a sequencing task. In stage 3, the student may time out or exit at any time, except when a trial is in progress. Re-entry may return the student to the passage re-read task, i.e., the re-presentation of the passage. Upon completing the re-read of the passage, the student may begin at the first previously unanswered question.

Progress Markers

Progress through the exercise (comparable to percent-through) may be marked by the addition markers, e.g., a total of 5 markers. For example, each marker may be awarded after 20% of content is passed.

End of Exercise

The exercise may end when the student has met passing criteria in all units. It may then return to the wrapper, e.g., the startup screen, via a "Good Job" screen.

Figure 84:
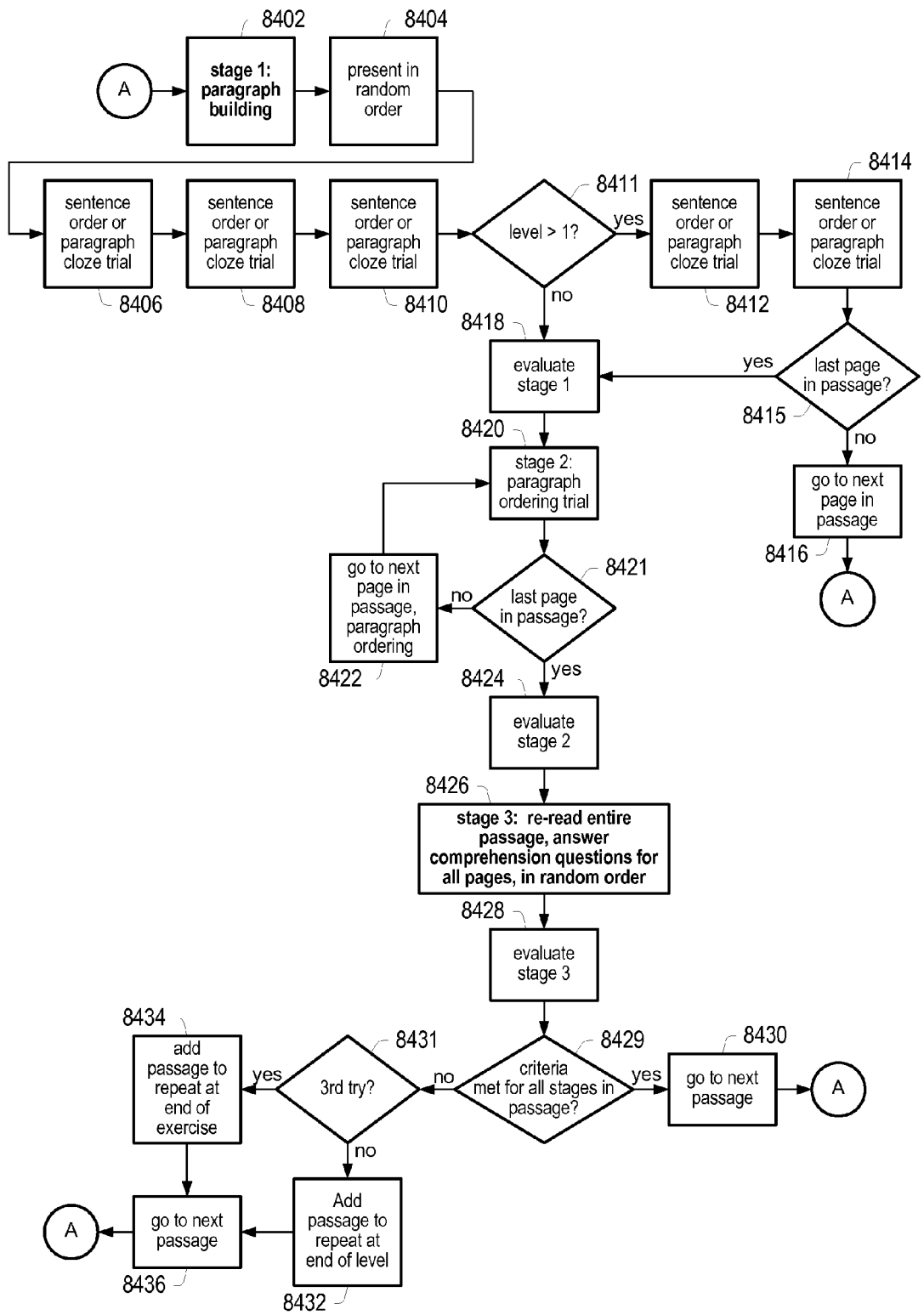
FIG. 84 is a detailed flowchart diagram illustrating progression through the Quack Splash exercise, according to one embodiment.

FIG. 84—Method For Building Skills in Constructing and Organizing Multiple-Paragraph Stories and Expository Passages FIG. 84 flowcharts a computer-implemented method for building skills in constructing and organizing multiple-paragraph stories and expository passages, including skills in understanding and using figurative language, via a computing device, according to one embodiment. More specifically, the method is directed to performance of units in the Quack Splash exercise. Note that the method of FIG. 84 is applicable to, and may include, embodiments of the method of FIG. 71 (and vice versa), and the description below may refer to various figures and passages directed to that method for brevity. Moreover, any of the aspects described above with respect to the method of FIG. 71 may be considered applicable to the method of FIG. 84 (and vice versa). As noted above, in various embodiments, some of the method elements described may be performed concurrently, in a different order than described, or may be omitted. Additional method elements may be performed as desired.

Turning now to FIG. 84, as may be seen, in 8402, stage 1, directed to paragraph building, may be initiated. In some embodiments, this may include determining and setting the current level, e.g., to a next level in the exercise, or, at the start of the exercise, a first level (see, e.g., the Order of Progression chart above). Note that the method of FIG. 84 particularly addresses progression through stages for passages at a current level, and does not describe inter-level progression, although embodiments of such progression are described in the charts above.

In 8404, the passages for the current stage/level may be randomized. In other words, in some embodiments, the passages used for the trials may be presented in random order.

A plurality of trials may then be performed in stage 1, as indicated in 8406, 8408, and 8410, where, for example, each trial may be performed according to either the sentence ordering task, or the paragraph cloze task, both of which are described above, with reference to FIGS. 73-78. As noted above, in some embodiments, the student may be given up to a specified number of tries to pass each trial, e.g., three tries.

In 8411, a determination may be made as to whether the level is greater than level 1. If the level is greater than level 1, then additional trials may be performed, e.g., two more trials may be performed, as indicated in 8412 and 8414, where, as with the previous stage 1 trials, each trial may involve one of the stage 1 tasks, i.e., the sentence ordering task, or the paragraph cloze task.

In 8415, a determination may be made as to whether the current page is the last page in the passage, and, if not, then in 8416, the next page in the passage may be determined or selected, and the method may return to 8402, as indicated, and the method may continue as described above. In other words, trials directed to the next page of the passage may be performed.

If in 8415, it is determined that the current page is the last page of the passage, then in 8418, the unit may be evaluated, e.g., the stage 1 unit at the current level may be evaluated. For example, depending on the current level, the student's performance for trials in the unit may be compared to passing criteria, e.g., passing 3 of 3 trials in level 1, and so forth, per the advancement criteria chart presented above.

In 8420, a trial (or more than one trial) in stage 2, directed to paragraph ordering, may be performed, where, as described above, the paragraphs of the passage of stage 1 may be presented in scrambled order, and which the student may be required to order into a coherent page of the current passage. Note that this trial may begin with the first page of the current passage. FIGS. 79-82, described above, illustrate an exemplary stage 2 trial.

In 8421, a determination may be made as to whether the current page is the last page in the current passage, and if not, then in 8422, the next page in the current passage may be determined or selected, and the method may proceed to 8420, and continue as described above, i.e., a stage 2 paragraph ordering trial may be performed with respect to the next page in the passage.

If in 8421 it is determined that the current page is the last page in the passage, then in 8424 the student's performance in stage 2 may be evaluated, and the method may proceed to 8426, described below.

In 8426, one or more trials in stage 3, directed to comprehension of the passage from stage 2 (and stage 1) may be performed. For example, as described above, first, the entire passage may be re-presented to the student to read (again), where each page is displayed and dismissed with a done reading button. Then, a plurality of questions directed to the passage may be asked of the student, where the questions are preferably in random order. As described above, for each question the student may select from a respective plurality, e.g., four, possible answers, and the correctness of the selected answer determined. Exemplary embodiments of stage 3 trials are illustrated in FIGS. 82 and 83.

In 8428, the student's performance in stage 3 may be evaluated, e.g., per the advancement criteria chart above.

In 8429, a determination may be made as to whether passing criteria have been met in all stages for the passage, e.g., where stages 1, 2, and 3 have all been passed. If so, then in 8430, the next passage may be determined or selected, and the method may proceed to 8402, and continue as described above.

If passing criteria have not been met in all the stages for the passage, then in 8431, a determination may be made as to whether a specified number (e.g., three) of attempts have been made to pass all stages for the passage, and if not, the passage may be marked or indicated to be repeated at the end of the current level, as indicated in 8432, and the next passage may be determined or selected, as indicated in 8436, after which the method may proceed to 8402, and continue as described above.

If in 8431, it is determined that the specified number of attempts at passing all stages for the passage have been made, then the passage may be marked or indicated to be repeated at the end of the exercise, as indicated in 8434, and the next passage may be determined or selected, as indicated in 8436, after which the method may proceed to 8402, and continue as described above.

Thus, various embodiments of the methods described above may build skills in constructing and organizing multiple-paragraph stories and expository passages, including skills in understanding and using figurative language, in the student.

Embodiments of the systems and methods described above with respect to the various exercises presented may develop cognitive skills in the student, e.g., reading and comprehension skills, via a computing device. As noted above, the particular embodiments described meant to be exemplary, and are not meant to limit the invention to any specific data sets, organization, or progression sequences.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for developing cognitive skills in a student, utilizing a computing device to present stimuli and to record responses, the method comprising:
   providing a stimulus set comprising a plurality of stimuli;
   via a display corresponding to the computing device, graphically presenting a representation of a stimulus from the stimulus set to the student;
   requiring the student to employ the computing device to respond to the stimulus;
   determining, via the computing device, if the response is correct;
   wherein said graphically presenting, said requiring, and said determining composes a trial;
   wherein a unit comprises a specified set of trials; and
   wherein said performing said graphically presenting, said requiring, and said determining for each of a plurality of stimuli comprises:
      performing trials in each unit of a plurality of units for each level of a plurality of levels;
   performing one or more introductory trials to demonstrate to the student what is required in performing a trial:
   performing said graphically presenting, said requiring, and said determining for each of a plurality of stimuli; and
   repeating said graphically presenting, said requiring, said determining, and said performing, in an iterative manner that is directed to improve the cognitive skills of the student.

2. The method of claim 1, wherein a unit comprises a smallest group of trials to be evaluated for advancement, and wherein passing the unit comprises the student correctly performing a specified percentage of trials in the unit.

3. The method of claim 2, further comprising:
   if the student fails a unit, repeating the unit until:
      the student passes the unit; or
      the student fails the unit a specified number of times.

4. The method of claim 2, the method further comprising:
   if the student fails the unit the specified number of times, retaining the unit for later presentation to the student; and
   performing a next unit.

5. The method of claim 1, further comprising:
   performing a fluency round, comprising a time-limited round of one or more trials from a previously presented unit.

6. The method of claim 1, wherein said repeating said graphically presenting, said requiring, said determining, and said performing, in an iterative manner is performed over a plurality of sessions, and wherein each successive session begins approximately where a previous session ends.

7. The method of claim 6, wherein the sessions occur a specified number times each day, for a specified number of days.

8. The method of claim 1, wherein said graphically presenting, said requiring, and said determining are performed via a graphical user interface (GUI) displayed on a display of the computing device.

9. The method of claim 8, wherein the GUI displays two or more of:
   a student indicator;
   a time indicator;
   an initiation button, whereby the student invokes presenting stimulus words; and
   a score indicator.

10. The method of claim 1, further comprising:
    indicating if the response is correct.

11. The method of claim 10, wherein said indicating if the response is correct comprises one or more of:
    presenting a respective sound indicating correctness or incorrectness of the response;
    presenting a respective graphical indication of correctness or incorrectness of the response; and
    awarding points based on the correctness of the response.

12. The method of claim 1, wherein sounds are presented to the student via headphones attached to the computing device.

13. The method of claim 1,
    wherein said providing a stimulus set comprises providing a stimulus word set comprising a plurality of stimulus words, each comprising a word element;
    the method further comprising:
       displaying a plurality of bins via a computing device, wherein each of the plurality of bins represents a respective word element from a plurality of word elements;
    wherein said graphically presenting a stimulus from the stimulus set to the student via the computing device comprises:
       presenting a stimulus word from the stimulus word set to the student, wherein the stimulus word contains one of the plurality of word elements represented by the plurality of bins;
    wherein said requiring the student to respond to the stimulus comprises:
       requiring the student to select a bin from the plurality of bins representing a word element contained in the presented stimulus word;
    wherein said determining if the response is correct comprises:
       determining if the student selected the bin correctly;
    wherein said performing said graphically presenting, said requiring, and said determining for each of a plurality of stimuli comprises:
       repeating said displaying, said presenting, said requiring, and said determining for each stimulus word in the stimulus word set; and
    wherein said repeating builds accuracy and fluency in phonemic analysis, decoding, and spelling skills in the student.

14. The method of claim 13,
    wherein the word element is a phoneme; and
    wherein said presenting the stimulus word comprises graphically presenting the stimulus word from the stimulus word set to the student.

15. The method of claim 14, wherein said displaying a plurality of bins comprises:
    graphically displaying a phonetic symbol for the respective phoneme of each bin; and
    aurally presenting a description of the respective phoneme of each bin.

16. The method of claim 13,
    wherein the word element is a spelling pattern;
    wherein said presenting the stimulus word comprises audibly presenting the stimulus word from the stimulus word set to the student.

17. The method of claim 16, wherein said displaying a plurality of bins comprises:
graphically displaying the respective spelling pattern of each bin.

18. The method of claim 16, wherein performing a trial in stage 3 comprises:
displaying a completed construct from stage 2 directed to the stimulus passage;
asking the student a question regarding information displayed in the completed construct;
presenting a plurality of responses to the student via the computing device, wherein one of the responses correctly answers the question regarding the information;
requiring the student to select a response from the plurality of responses to answer the question; and
determining if the student selected the correct response.

19. The method of claim 1,
wherein said providing a stimulus set comprises providing an analogy set comprising a plurality of analogies;
wherein said graphically presenting a stimulus from the stimulus set to the student via the computing device comprises:
displaying an incomplete analogy via a computing device, wherein the analogy is missing a word;
the method further comprising:
presenting a plurality of words to the student, wherein one of the plurality of words includes the missing word of the incomplete analogy;
wherein said requiring the student to respond to the stimulus comprises:
requiring the student to select a word from the plurality of words to complete the incomplete analogy
wherein said determining if the response is correct comprises:
determining if the student selected the word correctly; and
wherein said performing said graphically presenting, said requiring, and said determining for each of a plurality of stimuli comprises:
repeating said displaying, said presenting, said requiring, and said determining for each analogy in the analogy set; and
wherein said repeating builds vocabulary skills and improves accuracy and fluency in critical thinking and abstract reasoning in the student.

20. The method of claim 19, further comprising:
performing said displaying, said receiving user input, and said performing, for successive categories from multiple categories until trials for each of the multiple categories have been completed;
wherein said performing said displaying, said receiving user input, and said performing, for successive categories from the multiple categories until trials for each of the multiple categories have been completed compose performing a unit in stage 1.

21. The method of claim 20, further comprising:
displaying an analogy via the computing device, wherein the analogy has a category from plurality of categories;
presenting a set of categories to the student, wherein one of the set of categories is the category of the analogy;
requiring the student to select a category for the analogy from the set of categories;
determining if the student selected the category correctly; and
repeating said displaying the analogy, said presenting the set of categories, said requiring the student to select a category, and said determining if the student selected the category correctly for each analogy in the analogy set;
wherein said repeating said displaying the analogy, said presenting the set of categories, said requiring the student to select a category, and said determining if the student selected the category correctly for each analogy builds vocabulary skills and improves accuracy and fluency in critical thinking and abstract reasoning in the student.

22. The method of claim 21, wherein the analogy set is comprised in a plurality of analogy sets, the method further comprising:
performing said repeating said displaying the analogy, said presenting the set of categories, said requiring the student to select a category, and said determining if the student selected the category correctly for each of at least a subset of analogy sets in the plurality of analogy sets.

23. The method of claim 22, wherein said displaying the analogy, said presenting the set of categories, said requiring the student to select a category, and said determining if the student selected the category correctly compose performing a trial in stage 2.

24. The method of claim 1,
wherein said providing a stimulus set comprises providing a set of pictures and corresponding sentences comprising a plurality of pictures and corresponding sentences;
wherein said graphically presenting a stimulus from the stimulus set to the student via the computing device comprises:
displaying a picture via a computing device;
the method further comprising:
presenting a plurality of sentence segments to the student, wherein one of the plurality of sentence segments is a portion of a sentence that correctly describes the picture;
wherein requiring the student to respond to the stimulus comprises:
requiring the student to select a sentence segment from the plurality of sentence segments that constructs at least a portion of the sentence that correctly describes the picture;
wherein said determining if the response is correct comprises:
determining if the student selected the sentence segment correctly;
wherein said performing said graphically presenting, said requiring, and said determining for each of a plurality of stimuli comprises:
repeating said displaying, said presenting, said requiring, and said determining for each picture in the set of pictures and corresponding sentences; and
wherein said repeating builds accuracy and fluency in recognizing and constructing sentence structures in the student.

25. The method of claim 24, further comprising:
performing said displaying, said presenting, said requiring, and said determining for successive additional pluralities of sentence segments until the sentence that correctly describes the picture is complete.

26. The method of claim 25, further comprising:
performing said displaying, said presenting, said requiring, said determining, and said performing said displaying, said presenting, said requiring, and said determining for successive additional pluralities of sentence segments for successive additional sentences describing the picture.

27. The method of claim 26,
wherein the set of pictures and corresponding sentences includes sentences comprising each of a plurality of structure types;
wherein trials each have a corresponding level; and
wherein a unit comprises all trials directed to a respective structure type within a level.

28. The method of claim 1,
wherein said providing a stimulus set comprises providing a stimulus passage set comprising a plurality of stimulus passages, wherein each stimulus passage comprises one or more pages;
wherein said graphically presenting a stimulus from the stimulus set to the student via the computing device comprises:
presenting a page from a stimulus passage from the stimulus passage set to the student via a computing device;
the method further comprising:
asking the student a question regarding the page; and
textually presenting a plurality of answers to the student via the computing device, wherein one of the answers is a correct answer to the question;
wherein requiring the student to respond to the stimulus comprises:
requiring the student to select an answer from the plurality of answers to answer the question;
wherein said determining if the response is correct comprises:
determining if the student selected the correct answer;
the method further comprising:
performing said presenting the page, said asking, said textually presenting the plurality of answers, said requiring, and said determining for each page of the stimulus passage;
wherein said performing said graphically presenting, said requiring, and said determining for each of a plurality of stimuli comprises:
repeating said performing for each stimulus passage in the stimulus passage set;
wherein said repeating builds skills in accurate text comprehension and the use of comprehension strategies in the student.

29. The method of claim 28, further comprising:
performing said asking, said presenting the plurality of answers, said requiring, and said determining for one or more additional questions regarding the page.

30. The method of claim 28, wherein said presenting the page, said asking, said textually presenting the plurality of answers, said requiring, and said determining composes performing a trial in stage 1.

31. The method of claim 30, further comprising:
if the trial in stage 1 is passed or has been failed a specified number of times, performing trials in stage 2 directed to the stimulus passage.

32. The method of claim 31, wherein performing a trial in stage 2 comprises:
asking the student a logic question regarding the stimulus passage;
presenting a plurality of logic answers to the student via the computing device, wherein one of the logic answers is a correct answer to the logic question;
requiring the student to select a logic answer from the plurality of logic answers to answer the logic question; and
determining if the student selected the correct logic answer.

33. The method of claim 31, wherein performing a trial in stage 2 comprises:
displaying a plurality of logic diagrams regarding the stimulus passage set to the student via the computing device;
directing the student to select one of the plurality of logic diagrams to match a logical statement;
requiring the student to select a logic diagram from the plurality, of logic diagrams to match the logical statement; and
determining if the student selected the correct logic diagram.

34. The method of claim 31, wherein performing a trial in stage 2 comprises:
displaying an incomplete construct directed to the stimulus passage, wherein the incomplete construct is missing a text portion, wherein the construct comprises one or more of:
a circle diagram;
a graphic organizer, comprising one or more of:
a table;
a concept web;
a timeline; or
a flowchart; and
a summary;
presenting a plurality of textual responses to the student via the computing device, wherein one of the textual responses provides the missing text portion;
requiring the student to select a textual response from the plurality of textual responses to provide the missing text portion; and
determining if the student selected the correct textual response.

35. The method of claim 34, wherein the incomplete construct is missing one or more additional text portions, and wherein performing a trial in stage 2 comprises performing one or more additional trials in stage 2, comprising:
performing said presenting the plurality of textual responses, said requiring the student to select a textual response, and said determining if the student selected the correct textual response in an iterative manner until the construct is complete.

36. The method of claim 35, further comprising:
if there are no further trials to be performed in stage 2 in the current level, performing trials in stage 3.

37. The method of claim 1,
wherein said providing a stimulus set comprises providing a stimulus passage set comprising a plurality of stimulus passages, wherein each stimulus passage comprises a sequence of one or more pages;
wherein said graphically presenting a stimulus from the stimulus set to the student via the computing device and said requiring the student to respond to the stimulus comprises:
performing a sentence ordering task or a paragraph cloze task, with respect to a paragraph of a stimulus passage from the set of stimulus passages;
wherein said determining if the response is correct comprises:
determining if the student performed the sentence ordering task or the paragraph cloze task correctly;
wherein said performing said graphically presenting, said requiring, and said determining for each of a plurality of stimuli comprises:
repeating said performing and said determining for each paragraph of each page for each stimulus passage of the plurality of stimulus passages; and wherein said repeating builds skills in constructing and organizing multiple-paragraph stories and expository passages in the student.

38. The method of claim 37, wherein said performing the sentence ordering task comprises:
presenting a plurality of sentences of the paragraph from a page of the stimulus passage from the stimulus passage set to the student via a computing device, wherein the sentences are out of order;
requiring the student to select a next sentence from the plurality of sentences to construct the paragraph, wherein one of the plurality of sentences is a correct next sentence in the paragraph;
determining if the student selected the correct next sentence;
removing the correct next sentence from the plurality of sentences;
displaying the correct next sentence in the paragraph; and
repeating said requiring the student to select a next sentence, said determining if the student selected the correct next sentence, said removing, and said displaying the correct next sentence in the paragraph until the paragraph is complete.

39. The method of claim 37, wherein said performing the paragraph cloze task comprises:
displaying a paragraph from the stimulus passage, wherein the paragraph is missing a portion;
presenting a plurality of textual responses to the student, wherein one of the textual responses provides the missing portion of the paragraph;
requiring the student to select a textual response from the plurality of textual responses to complete the paragraph; and
determining if the student correctly selected the textual response.

40. The method of claim 37, wherein said performing the sentence ordering task or the paragraph cloze task, and said determining if the student performed the sentence ordering task or the paragraph cloze task correctly composes performing a trial in stage 1.

41. The method of claim 40, further comprising:
for each stimulus passage, performing a trial in stage 2 with respect to the stimulus passage, wherein performing the trial in stage 2 comprises performing a paragraph sequencing task, comprising:
presenting a plurality of paragraphs from a page of the stimulus passage from the stimulus passage set to the student via a computing device, wherein the paragraphs are out of order;
requiring the student to select a next paragraph from the plurality of paragraphs to construct the page, wherein one of the plurality of paragraphs is a correct next paragraph in the page;
determining if the student selected the correct next paragraph;
removing the correct next paragraph from the plurality of paragraphs;
displaying the correct next paragraph in the page;
repeating said requiring the student to select a next paragraph, said determining if the student selected the correct next paragraph, said removing, and said displaying the correct next paragraph in the page until the page is complete; and
performing said repeating for each page in the stimulus passage.

42. The method of claim 40, further comprising:
for each stimulus passage, performing one or more trials in stage 3 with respect to the stimulus passage, wherein performing a trial in stage 3 comprises performing a comprehension task, comprising:
displaying the stimulus passage to the student via the computing device;
asking the student a question regarding the stimulus passage;
presenting a plurality of answers to the student via the computing device, wherein one of the answers is a correct answer to the question;
requiring the student to select an answer from the plurality of answers to answer the question; and
determining if the student selected the correct answer.

43. A computer-accessible memory medium that stores program instructions for developing cognitive skills in a student, utilizing a computing device to present stimuli and to record responses, wherein the program instructions are executable by a processor to perform:
providing a stimulus set comprising a plurality of stimuli;
via a display corresponding to the computing device, graphically presenting a representation of a stimulus from the stimulus set to the student via the computing device;
requiring the student to employ the computing device to respond to the stimulus;
determining, via the computing device, if the response is correct;
performing said graphically presenting, said requiring, and said determining for each of a plurality of stimuli;
repeating said graphically presenting, said requiring, said determining, and said performing, in an iterative manner that is directed to improve the cognitive skills of the student.

* * * * *